(12) United States Patent
Dao et al.

(10) Patent No.: US 10,728,952 B2
(45) Date of Patent: Jul. 28, 2020

(54) SYSTEM AND METHODS FOR SESSION MANAGEMENT

(71) Applicants:Ngoc Dung Dao, Ottawa (CA); Hang Zhang, Nepean (CA); Xu Li, Nepean (CA)

(72) Inventors: Ngoc Dung Dao, Ottawa (CA); Hang Zhang, Nepean (CA); Xu Li, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/862,194

(22) Filed: Jan. 4, 2018

(65) Prior Publication Data

US 2018/0198867 A1    Jul. 12, 2018

Related U.S. Application Data

(60) Provisional application No. 62/521,922, filed on Jun. 19, 2017, provisional application No. 62/503,117, (Continued)

(51) Int. Cl.
*H04L 12/26*    (2006.01)
*H04W 76/30*   (2018.01)
*H04W 76/34*   (2018.01)
*H04W 76/27*   (2018.01)
*H04W 76/10*   (2018.01)
*H04L 29/08*    (2006.01)
*H04W 36/14*   (2009.01)
*H04W 36/00*   (2009.01)
(Continued)

(52) U.S. Cl.
CPC ............. *H04W 76/30* (2018.02); *H04L 67/14* (2013.01); *H04W 36/0016* (2013.01); *H04W 36/0022* (2013.01); *H04W 36/14* (2013.01); *H04W 76/10* (2018.02); *H04W 76/27* (2018.02); *H04W 76/34* (2018.02); *H04L 69/327* (2013.01); *H04W 24/10* (2013.01); *H04W 28/24* (2013.01); *H04W 36/0011* (2013.01); *H04W 80/10* (2013.01); *H04W 88/14* (2013.01)

(58) Field of Classification Search
CPC ............................. H04W 76/30; H04W 76/27
See application file for complete search history.

(56) References Cited

U.S. PATENT DOCUMENTS

2009/0213762 A1    8/2009  Guo et al.
2010/0135255 A1    6/2010  Zhang et al.
(Continued)

FOREIGN PATENT DOCUMENTS

CN          1849004 A       10/2006
CN        105813079 A        7/2016

OTHER PUBLICATIONS

"System Architecture for the 5G System; Stage 2"; 3GPP TS 23.501 V0.3.1 (Mar. 2017).
"Procedures for the 5G System; Stage 2"; 3GPP TS 23.502 V0.3.0 (Mar. 2017).
SA WG2 Meeting #116bis S2-164567,"Session management per PDU session",NEC,Aug. 29-Sep. 3, 2016.
(Continued)

*Primary Examiner* — Samina F Choudhry

(57) ABSTRACT

A network architecture and methods of managing packet data unit (PDU) sessions in a network are provided. The methods include PDU session establishment procedures, PDU session modification procedures, PDU session state transfer procedures, PDU session release procedures, and user equipment (UE) handover procedures.

18 Claims, 87 Drawing Sheets

Related U.S. Application Data filed on May 8, 2017, provisional application No. 62/492,045, filed on Apr. 28, 2017, provisional application No. 62/472,720, filed on Mar. 17, 2017, provisional application No. 62/460,533, filed on Feb. 17, 2017, provisional application No. 62/455,412, filed on Feb. 6, 2017, provisional application No. 62/448,239, filed on Jan. 19, 2017, provisional application No. 62/444,251, filed on Jan. 9, 2017.

(51) Int. Cl.
| | | |
|---|---|---|
| H04W 88/14 | (2009.01) | |
| H04W 24/10 | (2009.01) | |
| H04W 80/10 | (2009.01) | |
| H04W 28/24 | (2009.01) | |

(56) References Cited

U.S. PATENT DOCUMENTS

| | | | | |
|---|---|---|---|---|
| 2013/0294320 | A1* | 11/2013 | Jactat | H04L 12/189 370/312 |
| 2016/0029278 | A1* | 1/2016 | Poikonen | H04W 36/12 370/331 |
| 2016/0227590 | A1* | 8/2016 | Huang | H04W 60/00 |
| 2016/0373267 | A1* | 12/2016 | El Khayat | H04L 12/1881 |
| 2017/0339609 | A1* | 11/2017 | Youn | H04W 76/11 |
| 2018/0192337 | A1* | 7/2018 | Ryu | H04W 36/0066 |

OTHER PUBLICATIONS

A WG2 Meeting #120 S2-172636(revision of S2-172083),"23.502 §4.3.4: PDU session release procedure",LG Electronics et al.,Mar. 27-31, 2017.

International Search Report dated Mar. 27, 2018 for corresponding International Application No. PCT/CN2018/071826 filed Jan. 9, 2018.

Huawei et al. Interim Agreement of the Network Initiated PDN Session Activation, 3GPP SA WG2 Meeting 118, S2-167166. Nov. 18, 2016.

3GPP TR 23.799 v1.0.2. Study on Architecture for Next Generation System. Sep. 30, 2016.

China Mobile,"Proposal on Session Release and Deactivation Procedures",SA WG2 Meeting #114 S2-161702, Apr. 11-15, 2016, Sophia Antipolis, France,total 3 pages.

Samsung,"Session release procedures for single PDU session",SA WG2 Meeting #115 S2-162519, May 23-27, 2016, Nanjing, P.R. China,total 3 pages.

Huawei et al.,"Update of interim agreements on MMF-SMF split",SA WG2 Meeting #118 S2-166676, Nov. 15-18, 2016, Reno, Nevada, USA,total 6 pages.

Huawei et al.,"Comparison of the options for session ID allocation and routing of subsequent SM signalling",SA WG2 Meeting #118 S2-167000, Nov. 14-18, 2016, Reno, Nevada, USA,total 8 pages.

Samsung,"Session release procedures for multiple PDU sessions",SA WG2 Meeting #115 S2-162521, May 23-27, 2016, Nanjing, P.R. China,total 3 pages.

* cited by examiner

SYSTEM AND METHODS FOR SESSION MANAGEMENT

CROSS REFERENCE TO RELATED APPLICATIONS

This application is related to U.S. Provisional Patent Application Ser. No. 62/444,251 entitled "System and Methods for Session Management" filed Jan. 9, 2017, to U.S. Provisional Patent Application Ser. No. 62/448,239 entitled "System and Methods for Session Management" filed Jan. 19, 2017, to U.S. Provisional Patent Application Ser. No. 62/455,412 entitled "System and Methods for Session Management" filed Feb. 6, 2017, to U.S. Provisional Patent Application Ser. No. 62/460,533 entitled "System and Methods for Session Management" filed Feb. 17, 2017, to U.S. Provisional Patent Application Ser. No. 62/472,720 entitled "System and Methods for Session Management" filed Mar. 17, 2017, to U.S. Provisional Patent Application Ser. No. 62/492,045 entitled "System and Methods for Session Management" filed Apr. 28, 2017, to U.S. Provisional Patent Application Ser. No. 62/503,117 entitled "System and Methods for Session Management" filed May 8, 2017, and U.S. Provisional Patent Application Ser. No. 62/521,922 entitled "System and Methods for Session Management" filed Jun. 19, 2017 the contents of which are incorporated herein by reference, inclusive of all filed appendices.

FIELD OF THE INVENTION

The present invention pertains to the field of network communications, and in particular to system and methods for packet data unit (PDU) session-related management.

BACKGROUND

When a user equipment (UE) initiates a new data session in a fifth generation (5G) network, the UE attaches (i.e., connects, or registers) to the network. A session management function of the network will oversee connection management tasks. Furthermore, when a UE is already attached to a network, the session management function may oversee changes to UE's network connection. Current session management procedures include signaling overhead and connection time issues.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a system and methods for session management of a communications network.

In accordance with embodiments of the present invention, there is provided a method of releasing a packet data unit (PDU) session. The method comprises determining to trigger a PDU session release, sending a N4 Session Release Request message to a User Plane Function (UPF), receiving a N4 Session Release Response message from the UPF, sending a N11 Request with PDU Session Release Command to an access and mobility function (AMF), receiving a N11 Response with PDU Session Release Acknowledgement from the AMF, and sending a N11 message to the AMF.

In accordance with embodiments of the present invention, there is also provided a handover method comprising receiving a N2 Path Switch Request from a Target Radio Access Network (T-RAN), sending a N11 Message to a Session Management Function (SMF), receiving N11 Message Acknowledgment from the SMF, and sending a N2 Path Switch Request Acknowledgment to the T-RAN.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
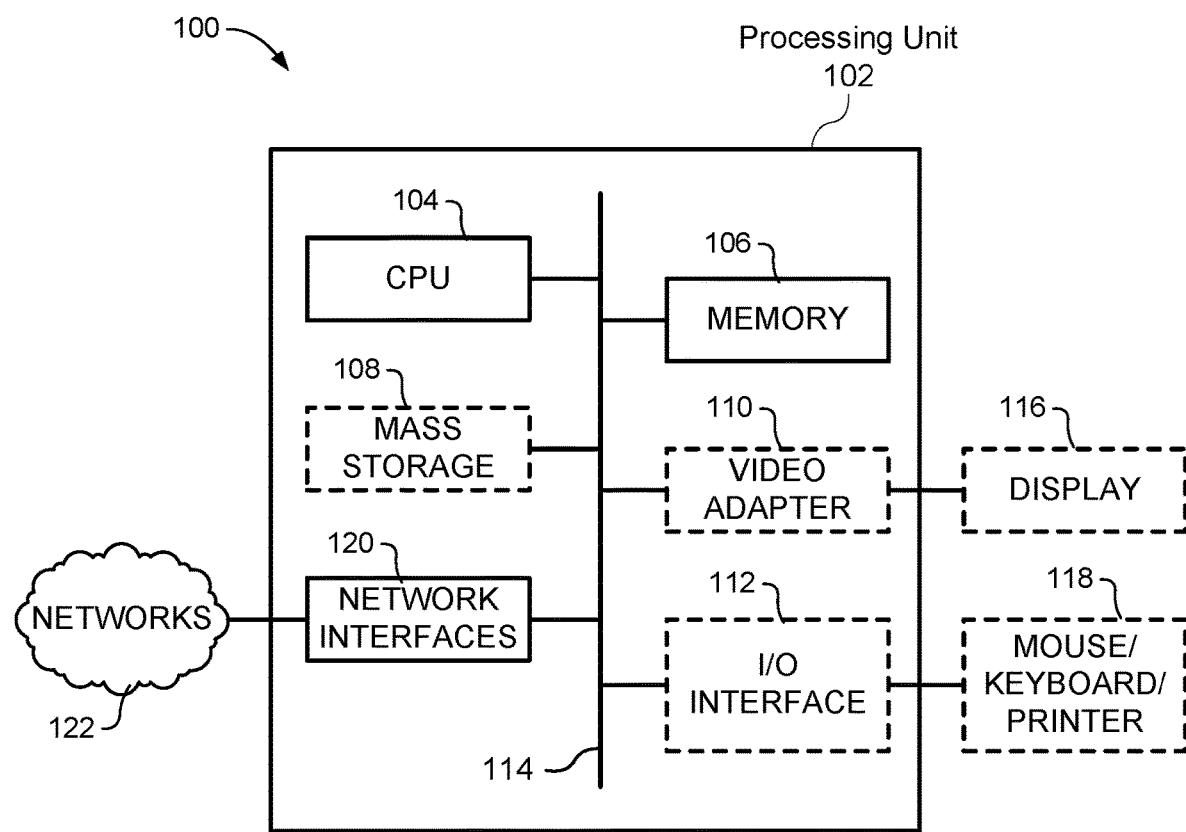
FIG. 1 illustrates, in a block diagram, a computing system that may be used for implementing devices and methods disclosed herein.

Embodiments of the present invention are directed towards session management procedures for a communications network.

As used herein, a "network" or "communication network" may service various devices including but is not necessarily limited to, wireless devices. Such a network may include a radio access portion and a backhaul portion. The network may further comprise various virtualized components. A primary example of such a network is a 5G network, which is reconfigurable and capable of network slicing.

Network slicing relates to the ability of a network, such as a 5G communication network accessible by wireless devices, to provide multiple logical network slices on demand, with each network slice operating as a substantially separate network for different market scenarios which demand diverse requirements. The capabilities and operating parameters of each network slice may be customized to the service requirements. Configuration of the network slices may be based on software defined networking, network function virtualization and network orchestration.

One use of network slicing is in the core network. Through the use of network slicing, different service providers can have distinct core networks that run on the same physical set of network and computing resources. This can also be used to create a virtual network dedicated to particular types of network traffic. It should be understood that this discussion is not intended to exclude the application of network slicing to the radio access edge of the radio access network (RAN), which may use specific functionality to support multiple network slices or partitioning of resources for different network slices. In order to provide performance guarantees, the network slices may be isolated from each other so that one slice does not negatively affect the other slices. The isolation is not restricted to different types of services, but also allows the operator to deploy multiple instances of the same network partition.

Network slicing allows the instantiation of separate network slices respectively directed toward different network services. This allows different types of traffic to be isolated from each other by assigning each traffic type to a different slice. Each slice can have characteristics tailored to the needs of the traffic flow it carries. Such needs may include different packet processing requirements, different service requirements, and different quality of service (QoS) requirements. Different network slices corresponding to different allocations of pooled resources may offer different services to different customers, or groups of customers. The different services may be supported by different network slices (a network slice may be considered as a type of customized virtual network), where the different network slices (i.e., different customized virtual networks) are substantially separate from one another from the customer's point of view though they may share common physical network resources. The pooled resources may be commercial off-the-shelf hardware components capable of configuration through virtualization approaches, such as NFV, in order to support various network functionalities for supporting the operations of the network slices.

Session management functionality in a network is responsible for the setup of Internet protocol (IP) or non-IP traffic connectivity for a user equipment (UE), as well as the management of the user plane for that connectivity. Network functions within the next generation (NG) control plane may have service based interfaces for services that can be used by authorized network functions.

FIG. 1 is a block diagram illustrating a computing system 100 that may be used for implementing devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 100 includes a processing unit 102. The processing unit 102 includes a central processing unit (CPU) 104, memory 106, and may further include a mass storage device 108, a video adapter 110, and an I/O interface 112 connected to a bus 114.

The bus 114 may be one or more of any type of several bus architectures including a memory bus or memory controller, a peripheral bus, or a video bus. The CPU 104 may comprise any type of electronic data processor. The memory 106 may comprise any type of non-transitory system memory such as static random access memory (SRAM), dynamic random access memory (DRAM), synchronous DRAM (SDRAM), read-only memory (ROM), or a combination thereof. The memory 106 may include ROM for use at boot-up, and DRAM for program and data storage for use while executing programs.

The mass storage 108 may comprise any type of non-transitory storage device configured to store data, programs, and other information and to make the data, programs, and other information accessible via the bus 114. The mass storage 108 may comprise, for example, one or more of a solid state drive, hard disk drive, a magnetic disk drive, or an optical disk drive.

The video adapter 110 and the I/O interface 112 provide interfaces to couple external input and output devices to the processing unit 102. As illustrated, examples of input and output devices include a display 116 coupled to the video adapter 110 and a mouse/keyboard/printer 118 coupled to the I/O interface 112. Other devices may be coupled to the processing unit 102, and additional or fewer interface cards may be utilized. For example, a serial interface such as universal serial bus (USB) (not shown) may be used to provide an interface for an external device.

The processing unit 102 may also include one or more network interfaces 120, which may comprise wired links, such as an Ethernet cable, and/or wireless links to access nodes or different networks. The network interfaces 120 allow the processing unit 102 to communicate with remote units via the networks. For example, the network interfaces 120 may provide wireless communication via one or more transmitters/transmit antennas and one or more receivers/receive antennas. The processing unit 102 may be coupled to a local-area network 122 or a wide-area network for data processing and communications with remote devices, such as other processing units, the Internet, or remote storage facilities.

Figure 2A:
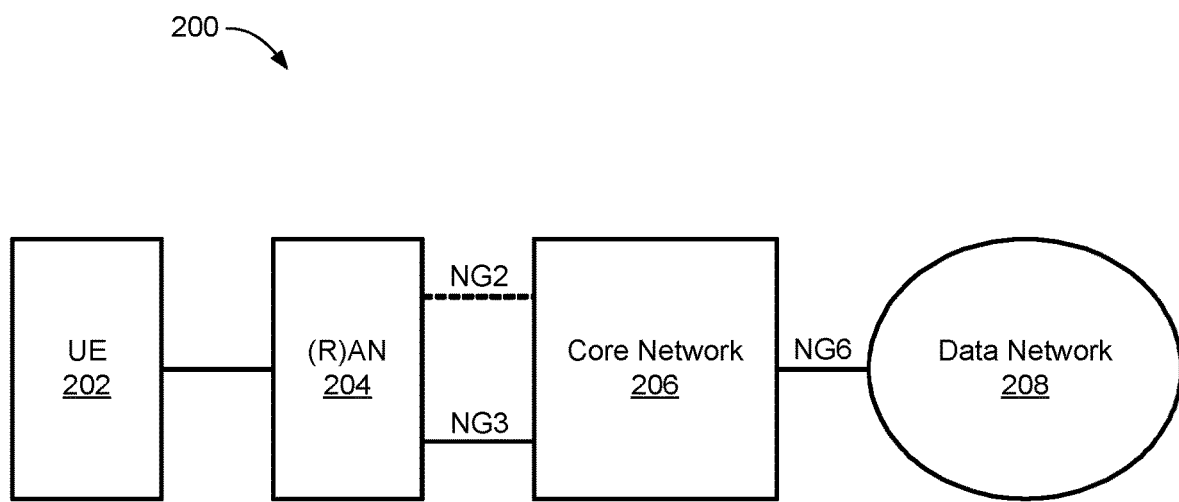
FIG. 2A illustrates, in a component diagram, an example of a communication network architecture.

FIG. 2A illustrates, in a component diagram, an example of a communication network architecture 200. The communication network architecture 200 comprises a user equipment (UE) 202, an access network (AN) 204, a core network (CN) 206 and a data network (DN) 208. One example of an AN 204 is a radio access network (RAN). The term (R)AN is used in this description to designate that either an AN and/or a RAN may apply. The UE 202 communicates with a DN 208 via the (R)AN 204 and CN 206. Message packet data units (PDUs) between the UE 202 and DN 208 pass through the (R)AN 204 and CN 206. A DN 208 may be a public network operator, a private data network, such as local area data work (LADN), an intra-operator data network, or any other type of data network.

In an uplink (UL) direction, user plane (UP) PDUs pass from the UE 202 to the (R)AN 204 via a communication link. The (R)AN 204 forward the UP PDUs to the CN 206 that then forwards the UP PDUs to the DN 208. In a downlink (DL) direction, DL PDUs pass from the DN 208 to the CN 206 that then forwards the DL PDUs to the (R)AN 204 that then forwards the DL PDUs to the UE 202. CP functionality on the CN 206 configures UP functions on the CN 206 to provide traffic handling functionality for a session. One or more UP functions per session may be activated and configured by the CP functionality for a given UP scenario.

The connections between the components of the communication network architecture 200 may be suitable for any communication channel. For next generation (NG) architectures, the connection between the (R)AN 204 and the CP of the CN 206 may be via an NG2 interface. The connection between the (R)AN 204 and the UP of the CN 206 may be via an NG3 interface. The connection between the UP of the CN 206 and the DN 208 may be via an NG6 interface.

Figure 2B:
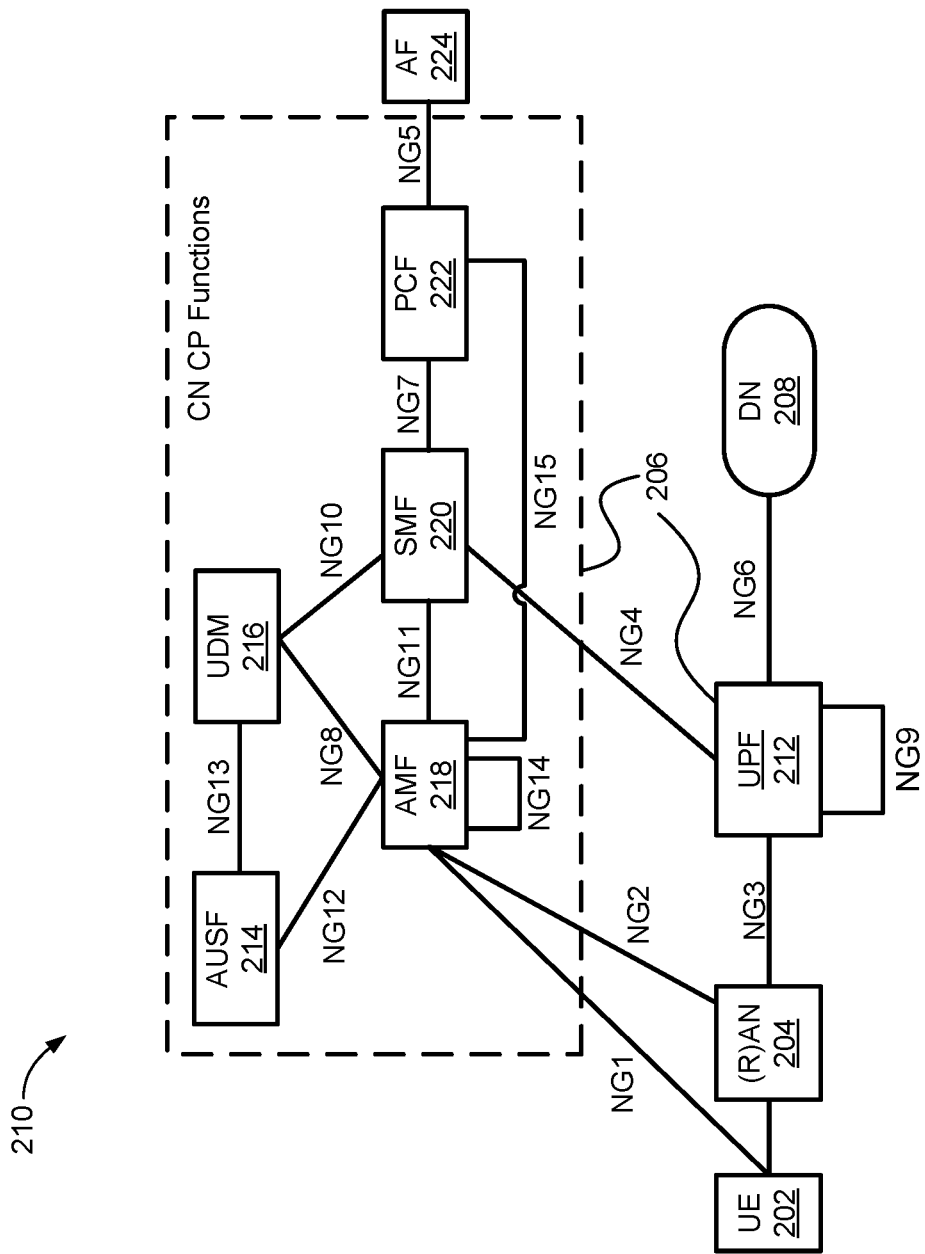
FIG. 2B illustrates, in a component diagram, an example of a non-roaming next generation (NG) (such as 5G mobile wireless networks) architecture, in point-to-point reference point representation.

FIG. 2B illustrates, in a component diagram, an example of a non-roaming NG (such as 5G mobile wireless networks) architecture 210, in point-to-point reference point representation. The non-roaming NG architecture 210 comprises the UE 202, the (R)AN 204, the CN 206, an application function (AF) 250 that is outside the CN 206 and the DN 208. The CN 206 comprises a UP function (UPF) module 212 and CP functions. The CP functions include an authentication server function (AUSF) 214, a unified data management (UDM) function 216, an access and mobility management function (AMF) 218, a session management function (SMF) 220, and a policy control function (PCF) 222. The AMF 218 manages the termination of signalling interfaces NG1 and NG2, the forwarding of signalling messages from the UE 202 and the (R)AN 204 to the SMF 220, and the management of mobility and security procedures for the UE 202. The SMF manages the UP connection establishment between the UE 202 and the DN 208. The PCF 222 provides policies to different network functions to handle a UE's session, such as QoS, mobility management, session management and charging policies. The UDM 216 provides storage management for network information and user information, and security measures to protect the data. The AUSF 214 provides security functions, such as authenticating the users and users' requests, and providing security keys for encrypting data transmitted over interfaces. The AF 224 may be any application server outside the 3GPP network, which provides control information between external applications and the CN 206. For example, an IMS server may be an AF 224. The UPF 212 provides user plane functions, such as mapping IP packets to QoS flows, forwarding packets, traffic measurement and preparing and sending reports. The (R)AN 204 provides an air interface connection for the UE 202, and forwards packets between the UE 202 and CN UPF 212.

The components of the CN 206 in the non-roaming NG architecture 210 may be implemented as software modules on one or more servers. FIG. 2B illustrates one example of possible interfaces between some of the components. Table 1 shows the communication interfaces used by some of the components in FIG. 2B.

TABLE 1

Interfaces used by some components of a non-roaming NG architecture

| Component | Interface | Component |
|---|---|---|
| UE 202 | NG1 | AMF 218 |
| (R)AN 204 | NG2 | AMF 218 |
| (R)AN 204 | NG3 | UPF 212 |
| UPF 212 | NG4 | SMF 220 |
| PCF 222 | NG5 | AF 224 |
| UPF 212 | NG6 | DN 208 |
| SMF 220 | NG7 | PCF 220 |
| AMF 218 | NG8 | UDM 216 |
| UDM 216 | NG10 | SMF 220 |
| AMF 218 | NG11 | SMF 220 |
| AUSF 214 | NG12 | AMF 218 |
| AUSF 214 | NG13 | UDM 216 |
| AMF 218 | NG14 | AMF 218 |
| AMF 218 | NG15 | PCF 222 |

Figure 2C:
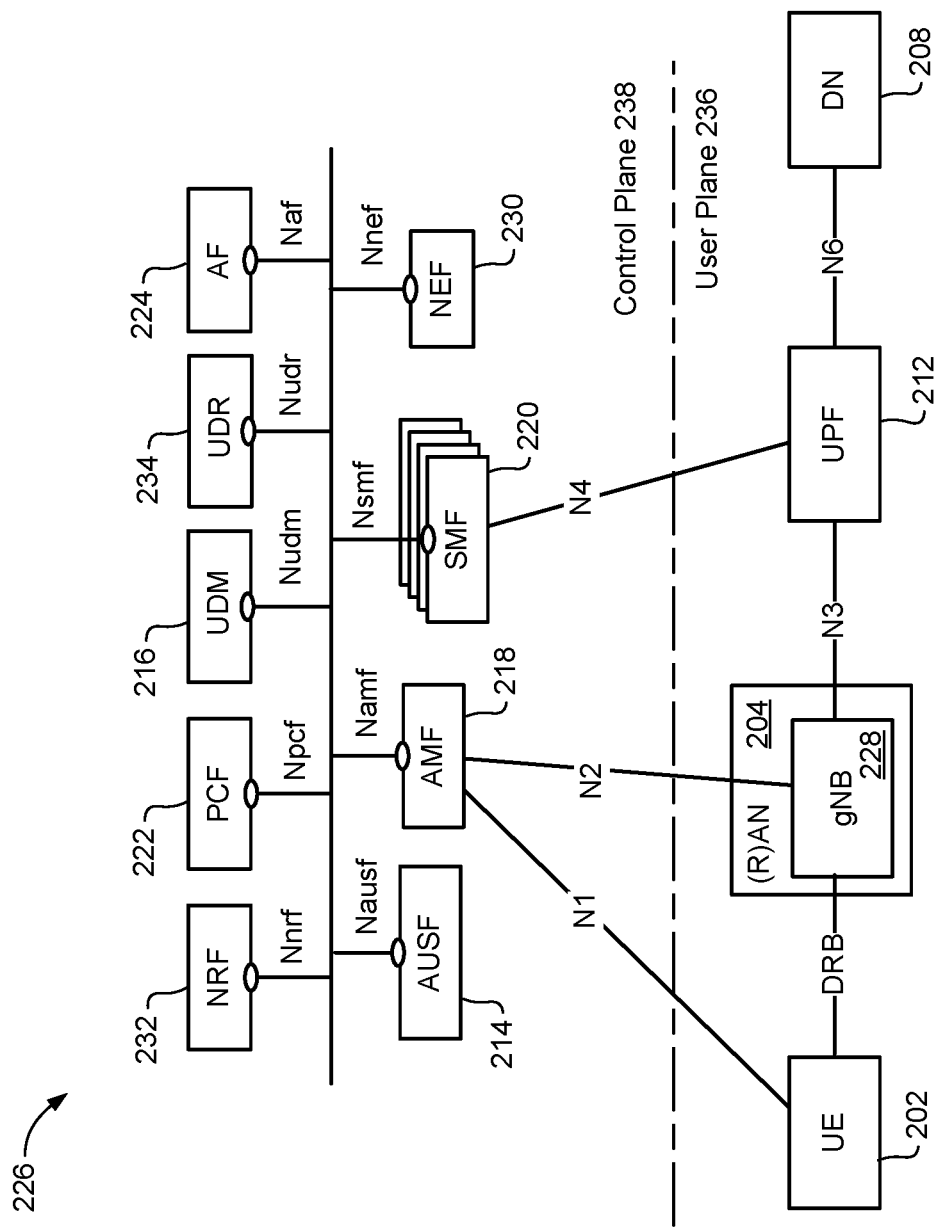
FIG. 2C is a block diagram illustrating a service-based view of a system architecture of a 5G Core Network.

FIG. 2C illustrates a service-based architecture 226 for a 5G or Next Generation Core Network (5GCN/NGCN/NCN). This illustration depicts logical connections between nodes and functions, and its illustrated connections should not be interpreted as direct physical connections. UE 202 forms a radio access network connection with a (Radio) Access Network ((R)AN) node 228 (which may, for example, be an gNodeB (gNB)), which is connected to a CN User Plane (UP) Function (UPF) 212 such as a UP Gateway over a network interface providing a defined interface such as an N3 interface. UPF 212 provides a logical connection to a Data Network (DN) 208 over a network interface such as an N6 interface. The radio access network connection between the UE 202 and the (R)AN node 226 may be referred to as a Data Radio Bearer (DRB).

DN 208 may be a data network used to provide an operator service, or it may be outside the scope of the standardization of the Third Generation Partnership Project (3GPP), such as the Internet, a network used to provide third party service, and in some embodiments DN 208 may represent an Edge Computing network or resource, such as a Mobile Edge Computing (MEC) network.

UE 202 also connects to the Access and Mobility Management Function (AMF) 218 through a logical N1 connection (although the physical path of the connection is not direct). The AMF 218 is responsible for authentication and authorization of access requests, as well as mobility management functions. The AMF 218 may perform other roles and functions as defined by the 3GPP Technical Specification (TS) 23.501. In a service based view, AMF 218 can communicate with other core network control plane functions through a service based interface denoted as Namf.

The Session Management Function (SMF) 220 is a network function that is responsible for the allocation and management of IP addresses that are assigned to an ED as well as the selection of a UPF 212 (or a particular instance of a UPF 212) for traffic associated with a particular session of UE 202. It will be appreciated that there will typically be multiple SMFs 220 in the network 226, each of which may be associated with a respective group of UEs 202, (R)AN nodes 2282 or UPFs 212. The SMF 220 can communicate with other core network functions, in a service based view, through a service based interface denoted as Nsmf. The SMF 220 may also connect to a UPF 212 through a logical interface such as network interface N4.

The Authentication Server Function (AUSF) 214, provides authentication services to other network functions over a service based Nausf interface.

A Network Exposure Function (NEF) 230 can be deployed in the network to allow servers, functions and other entities such as those outside a trusted domain to have exposure to services and capabilities within the network. In one such example, an NEF 230 can act much like a proxy between an application server outside the illustrated network and network functions such as the Policy Control Function (PCF) 222, the SMF 220, the UDM 216, and the AMF 218, so that the external application server can provide information that may be of use in the setup of the parameters associated with a data session. The NEF 230 can communicate with other network functions through a service based Nnef network interface. The NEF 230 may also have an interface to non-3GPP functions.

A Network Repository Function (NRF) 232, provides network service discovery functionality. The NRF 232 may be specific to the Public Land Mobility Network (PLMN) or network operator, with which it is associated. The service discovery functionality can allow network functions and UEs connected to the network to determine where and how to access existing network functions, and may present the service based interface Nnrf.

PCF 222 communicates with other network functions over a service based Npcf interface, and can be used to provide policy and rules to other network functions, including those within the control plane. Enforcement and application of the policies and rules is not necessarily the responsibility of the PCF 222, and is instead typically the responsibility of the functions to which the PCF 222 transmits the policy. In one such example the PCF 222 may transmit policy associated with session management to the SMF 220. This may be used to allow for a unified policy framework with which network behavior can be governed.

A Unified Data Management Function (UDM) 216 can present a service based Nudm interface to communicate with other network functions, and can provide data storage facilities to other network functions. Unified data storage can allow for a consolidated view of network information that can be used to ensure that the most relevant information can be made available to different network functions from a single resource. This can make implementation of other network functions easier, as they do not need to determine where a particular type of data is stored in the network. The UDM 216 may employ an interface, such as Nudr to connect to a User Data Repository (UDR) 234. The PCF 222 may be associated with the UDM 216 because it may be involved with requesting and providing subscription policy information to the UDR 234, but it should be understood that typically the PCF 222 and the UDM 216 are independent functions.

The PCF 222 may have a direct interface to the UDR 234 or can use Nudr interface to connect with UDR 234. The UDM 216 can receive requests to retrieve content stored in the UDR 234, or requests to store content in the UDR 234. The UDM 216 is typically responsible for functionality such as the processing of credentials, location management and subscription management. The UDR 234 may also support any or all of Authentication Credential Processing, User Identification handling, Access Authorization, Registration/Mobility management, subscription management, and Short Message Service (SMS) management. The UDR 234 is typically responsible for storing data provided by the UDM 216. The stored data is typically associated with policy profile information (which may be provided by PCF 222) that governs the access rights to the stored data. In some embodiments, the UDR 234 may store policy data, as well as user subscription data which may include any or all of subscription identifiers, security credentials, access and mobility related subscription data and session related data.

The Application Function (AF) 224 represents the non-data plane (also referred to as the non-user plane) functionality of an application deployed within a network operator domain and within a 3GPP compliant network. The AF 224 interacts with other core network functions through a service based Naf interface, and may access network capability exposure information, as well as provide application information for use in decisions such as traffic routing. The AF 224 can also interact with functions such as the PCF 222 to provide application specific input into policy and policy enforcement decisions. It should be understood that in many situations the AF 224 does not provide network services to other NFs, and instead is often viewed as a consumer or user of services provided by other NFs. An application outside the 3GPP network, can perform many of the same functions as AF 224 through the use of NEF 230.

The UE 202 communicates with network functions that are in the User Plane (UP) 236, and the Control Plane (CP) 238. The UPF 212 is a part of the CN UP 236 (DN 208 being outside the 5GCN). (R)AN node 228 may be considered as a part of a User Plane, but because it is not strictly a part of the CN, it is not considered to be a part of the CN UP 236 or UPF 212. AMF 218, SMF 220, AUSF 214, NEF 230, NRF 232, PCF 222, and UDM 216 are functions that reside within the CN CP 238, and are often referred to as Control Plane Functions. AF 224 may communicate with other functions within CN CP 238 (either directly or indirectly through the NEF 230), but is typically not considered to be a part of the CN CP 238.

Those skilled in the art will appreciate that there may be a plurality of UPFs connected in series between the (R)AN node 228 and the DN 208, and multiple data sessions to different DNs can be accommodated through the use of multiple UPFs in parallel.

Figure 3:
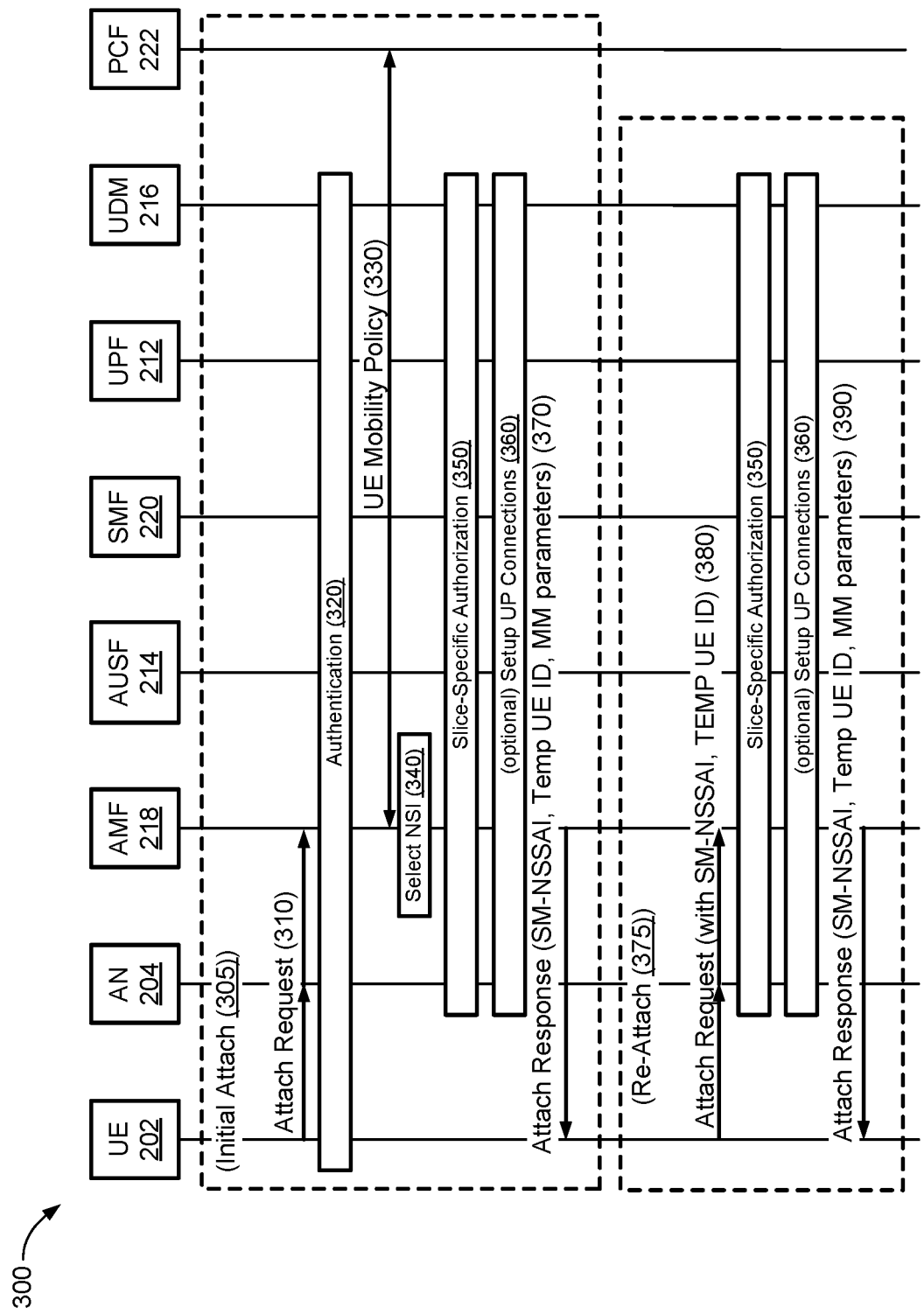
FIG. 3 illustrates, in a message flow diagram, an example of methods of attaching and re-attaching a UE to a data network.

FIG. 3 illustrates, in a message flow diagram, an example of methods (300) of attaching (305) and re-attaching (375) a UE 202 to a data network 208. The method of attaching (305) comprises the UE 204 sending an initial attach request to the AN 204 (310) including UE capability and, optionally, the requested service and network slice selection assistance information (NSSAI). The AN 204 forwards the attach request to the AMF 218. The AMF 218 determines which slice(s) the UE 204 has selected by accessing a subscriber repository and then authenticates the UE 204 (320) to check whether the UE 204 is permitted to access the network. The AMF 218 then checks the UE mobility policy (330) to verify whether the UE can access the network in this location. The AMF 218 selects the appropriate network slice function SMF 220 based on the information received from the UE 204 in the attach request and profile information in a subscriber repository. The AMF 218 further interacts with the AUSF 214 to perform the authentication/slice authorization procedure by checking the UE identity with the subscriber repository. The procedure determines whether the UE 204 is authorized to access this slice. Optionally, a setup of the UP connections (360) for a default or UE specific type slice may be performed. The AMF 218 then may send an attach response to the UE 202 via the AN 204. The attach response includes a session management—network slice selection assistance information (SM-NSSAI), a temporary UE identifier (Temp UE ID), and MM parameters. When the UE 204 receives the SM-NSSAI, a temp UE ID and mobility management (MM) parameters, the UE 204 may use the information to assist the network slice selection (e.g., when the UE detaches from the network and then re-attaches to the network again).

The method of re-attaching (375) comprises the UE 202 sending an attach request (380) to the AN 204. The attach request includes the SM-NSSAI, the Temp UE ID and the MM parameters. The AN 204 forwards the attach request to the AMF 218. The slice-specific authorization step (350) and optionally, the setup of UP connections step (360) described above may be performed. The AMF 218 then may send an attach response (390) to the UE 202 via the AN 204. The attach response includes the (possibly updated) SM-NSSAI, Temp UE ID and MM parameters. Once the UE 202 is attached (or re-attached) to the data network 208, the UE may initiate a packet data unit (PDU) session with the data network 208.

Session management states describe the UP connectivity for a PDU session between the UE 202 and the SMF 220. For an established PDU session, there may be at least two session management states for a PDU session: an active state (e.g., Session-ACTIVE) and an idle state (e.g., Session-IDLE). In this description, "Session-ACTIVE" may be used to denote an active state and "Session-IDLE" is used to denote an idle state. Since the PDU session state is related to data transmission activities (UL and DL) of the user, the session state may alternatively be called a session connection state.

A session management state may be designed for each PDU session respectively. The session management state may be maintained in the UE 202 and the SMF 220. The AN 204 and the UP functions may not be aware of the session management state. However, the AN 204 and the UP functions may maintain the session context of the established PDU session.

When a UE 202 is roaming (in a home routed roaming model), the PDU session may be served by two SMFs 220 in a chain: one for the visited public land mobile network (VPLMN) and one for the home public land mobile network (HPLMN). The session management state may be updated in the SMF 220 in the VPLMN, while the SMF 220 in the HPLMN may consider the PDU session as Session-ACTIVE.

When a UE's PDU session does not have UL or DL activity for a certain period, this session's state may be changed to Session-IDLE. The UE may resume the PDU session(s) after a certain period of time by sending an access stratum (AS) message to the AN 204 to activate the data radio bearer (DRB). Alternatively, the UE may resume the PDU session(s) after a certain period of time by sending an non-access stratum (NAS) message to the SMF to notify the session activation request. For example, a user is browsing a website. The user may not have any data transmission while viewing downloaded pages or downloaded video. The UE may again download new data for the same session after reading or viewing the downloaded content. In this example, if a time period expires while the user is viewing the downloaded content, the PDU session may be changed to Session-IDLE. When the user begins downloading further data, the PDU session is then changed to Session-ACTIVE.

In a combined attach and PDU session request procedure, a UE may send a request for a new session in an attach request message. However, if the UE does not have UL or DL packet transmission after a period of time, the session state may be changed from Session-ACTIVE to Session-IDLE. Thus, by allowing a session to have an active state and an idle state, a UE may set up and keep a new session for "future use" (or near future use) even if the UE does not have UL or DL packet transmission for a period of time after setting up the new session. Without the Session-IDLE state, the session may have been released prematurely.

The session state attribute may allow the CN 206 to efficiently handle PDU sessions of various applications. The UE 202 may trigger a session connection state transition in the CN 206 by sending an AS message to the AN 204 to change the state of a DRB (between an active or suspended state); the AN 204 may then inform the SMF 220 of the UE request to activate or deactivate a PDU session in the CN 206. Alternatively, The UE 202 may trigger a session connection state transition in the CN 206 by sending a NAS message to the CN 206; then the CN activates session management procedures in the CN and inform the AN 204 to assign radio resources for the PDU session. The session connection state attribute may also allow fast reconnection in the CN 206 when a session is resumed, may reduce signaling overhead in the CP when a session or a radio resource control (RRC) is resumed, may utilize resource usage of network functions when PDU sessions are idle for long period, and may avoid RRC signaling regarding session state changes in the CN 206. In one embodiment, the UE 202 is unaware of the state of sessions in the CN 206. In another embodiment, the UE 202 is aware of the session connection state.

Figure 4:
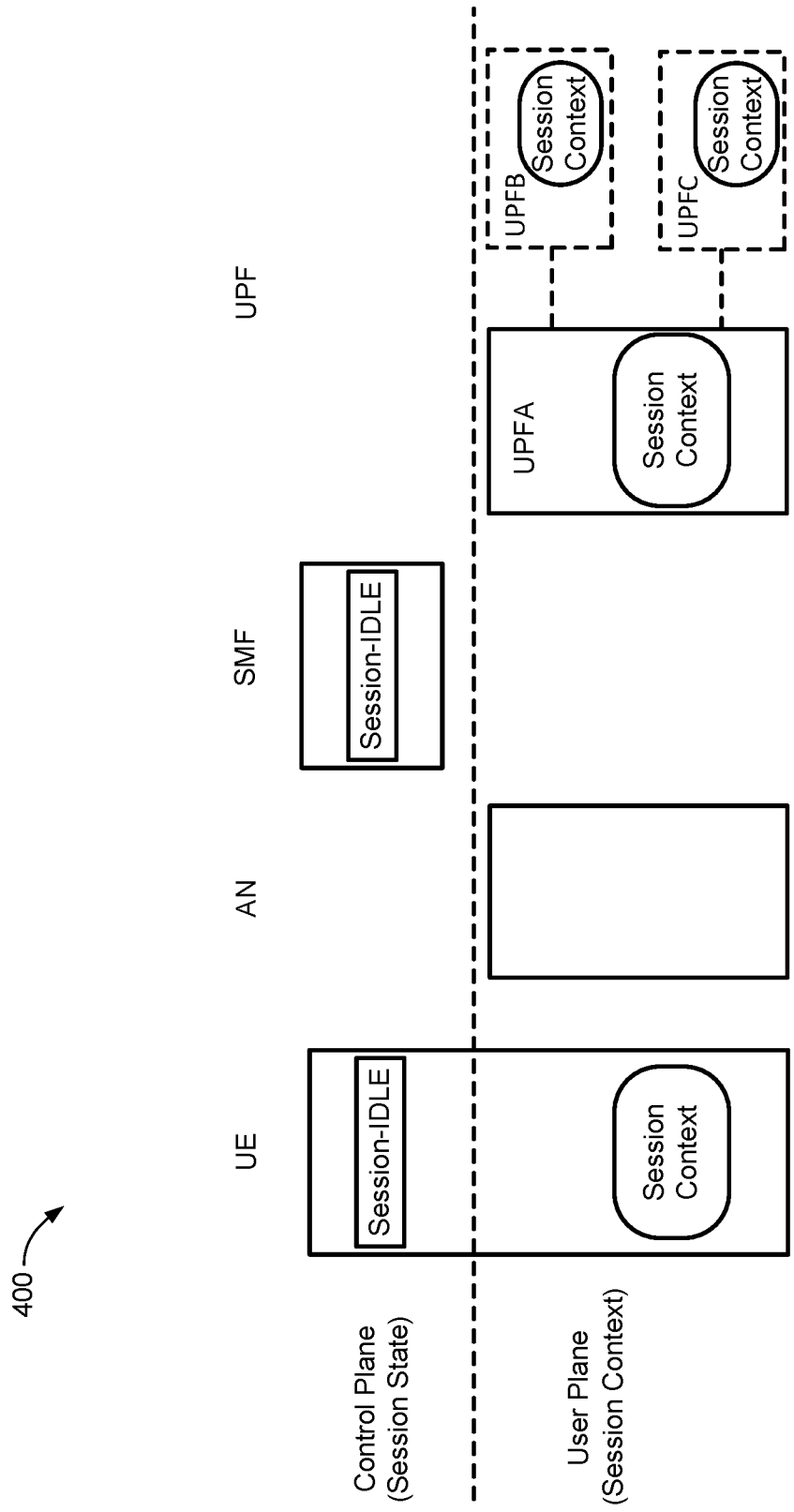
FIG. 4 illustrates, in a component diagram, an example of a Session-IDLE state model.

FIG. 4 illustrates, in a state model diagram, an example of a Session-IDLE state model 400. The Session-IDLE state model 400 shows how a Session-IDLE state may be represented in the CP (as a session state) and the UP (as a session context) for the UE 202, the AN 204, the SF 220 and the UPF 212. When a PDU session is in the Session-IDLE state, there may be no UP connection dedicated to the PDU session existing between UE 202 and the UPF 212 function terminating NG3. The UE 202 may maintain the session context without activated RAN resources corresponding to the PDU session. In this example, the AN does not maintain any radio resource context corresponding to the PDU session. If the PDU session is served by only one UPF 212, (i.e., if only the UPF A is present for the UPF 212 in FIG. 4), then the session context may be maintained in the UPF A without AN 204 related information of the NG3. If the PDU session is served by two UPFs 212 in a chain (i.e., if only the UPF A and UPF B were present for the UPF 212 in FIG. 4), then the session context may be maintained in both UPF A and UPF B. The UPF terminating NG3 may not maintain AN 204 related information. Both UPF A and UPF B may maintain the NG9 tunnel related information. If the PDU session is a multi-homing PDU session (i.e., UPF A, UPF B and UPF C are present as shown in FIG. 4), then the session context in the branch point UPF (i.e., UPF A) does not maintain AN 204 related information. In this multi-homing PDU session, the branch point UPF A may maintain the NG9 tunnel related information towards both UPF B and UPF C. UPF B and UPF C may maintain the NG9 tunnel related information towards the branch point UPF A.

The UE 202 and the SMF 220 may be in the Session-IDLE state when the data connection (i.e., NG3) dedicated to the give PDU session is not established between the UE 202 and the UPF 212. A NAS message (e.g., a Service Request) including the given PDU session identifier (ID) may initiate a transition from Session-IDLE to Session-ACTIVE. When a PDU session is in the Session-IDLE state, the session context in the UE 202 and the SMF 220 may be unsynchronized (i.e., the UE 202 and the network may have different sets of activated QoS flows (e.g., for guaranteed bit rate (GBR) QoS flows)). During transition from the Session-IDLE state to the Session-ACTIVE state, the UE 202 may include QoS flows status which indicate each QoS flow status (i.e., activated or deactivated) of the PDU session in the NAS message (e.g., Service Request), the set of activated QoS flows is synchronized between the UE 202 and SMF 220.

Figure 5:
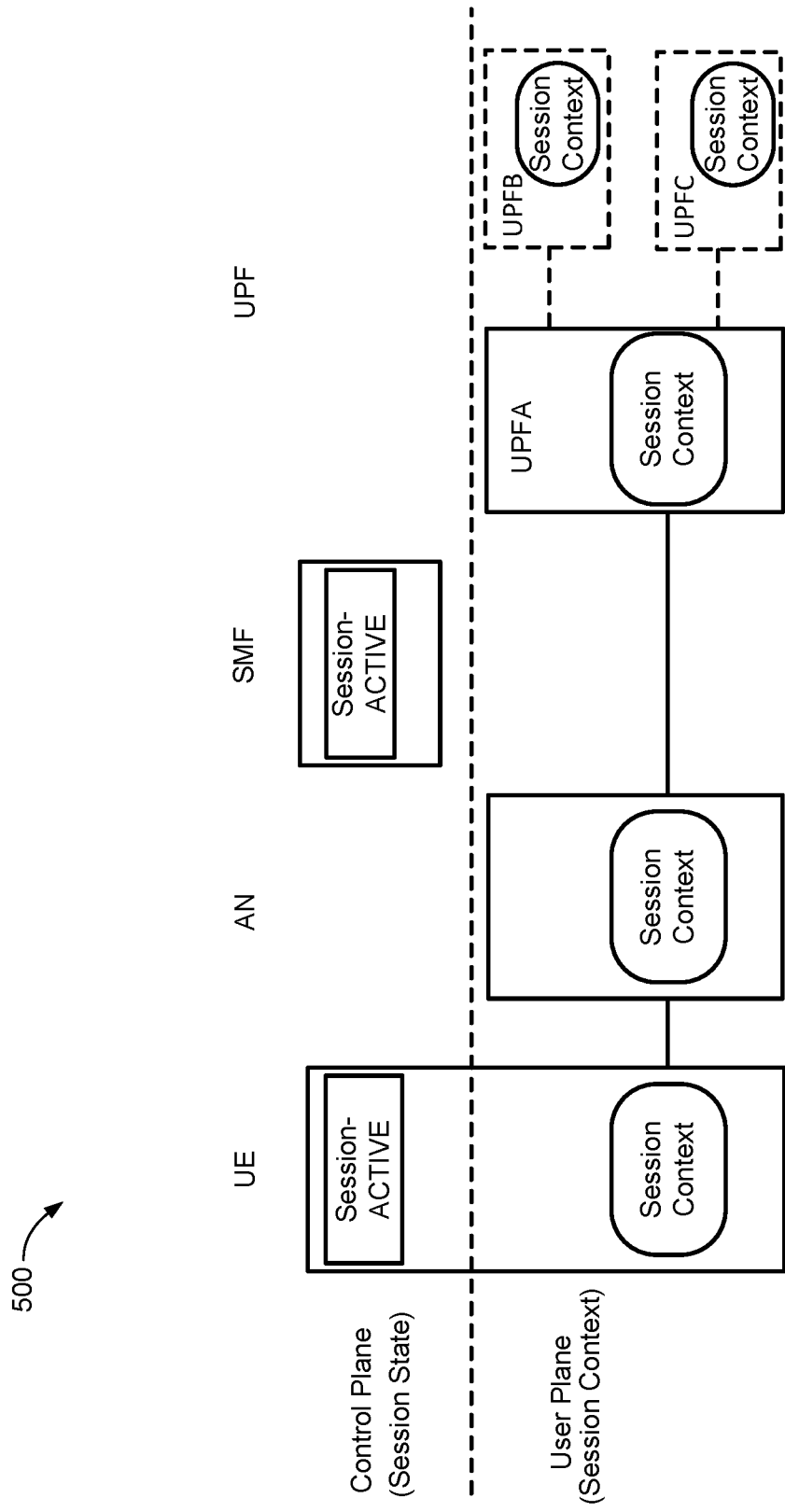
FIG. 5 illustrates, in a component diagram, an example of a Session-ACTIVE state model.

FIG. 5 illustrates, in a component diagram, an example of a Session-ACTIVE state model 500. The Session-ACTIVE state model 500 shows how a Session-ACTIVE state may be represented in the CP (as a session state) and the UP (as a session context) for the UE 202, the AN 204, the SF 220 and the UPF 212. A PDU session may be in the Session-ACTIVE state when the data connection (i.e., NG3) dedicated to the give PDU session is established between the UE 202 and the UPF 214. In the Session-ACTIVE state, the UL/DL data belonging to the PDU session may be directly sent between the UE 202 and the network. The UE 202 may maintain a session context with activated RAN resources corresponding to the PDU session. The AN 204 may maintain a session context and reserve RAN resource (for GBR QoS flow, if present) corresponding to the PDU session. In the PDU session is served by only one UPF (i.e., only UPF A), the session context may be maintained in the UPF A with AN 204 related information of NG3. If the PDU session is served by two UPFs in a chain (i.e., only UPF A and UPF B), the session context may be maintained in the both UPF A and UPF B. The UPF terminating NG3 may maintain AN 204 related information of NG3. Both UPF A and UPF B may maintain the NG9 tunnel related information. If the PDU session is a multi-homing PDU session (i.e., UPF A, UPF B and UPF C), the session context in the branch point UPF (i.e., UPF A) may maintain AN 204 related information. Branch point UPF A may maintain the NG9 tunnel related information towards both UPF A and UPF B. UPF A and UPF B may maintain the NG9 tunnel related information towards the branch point UPF A.

The AN 204 may be configured with a Session Inactive Timer by the SMF 220 when a PDU session is established or activated. If, for the duration of the Session Inactive Timer, there is no UL/DL data detected on the PDU session at the AN 204, then the AN 204 may initiate a session connection state transition procedure. The session connection state in both the UE 202 and the SMF 220 may enter Session-IDLE for the given PDU session.

The AN 202 and the SMF 220 may also initiate the PDU session deactivation procedure due to certain causes. For example, an O&M intervention, an unspecified failure, etc. When a PDU session is in the Session-ACTIVE state, during handover procedures, the AN 204 may send the AMF 218 the PDU session ID in a "Handover Required" message. According to the PDU session ID, the AMF 218 may notify the corresponding SMF 220 to execute the handover procedure.

The following session management (SM) parameters are used in this disclosure: "Session-State", "Activate-Session-when-RRC-Resumed", "Session-Activity-Timeout", "SM-Action-for-Idle" and "Keep-UE-Context-For-All".

The parameter, Session-State, may be used in a UE's PDU session context of AN 204, SMF 220, UPF 212, UDM 216 and PCF 222. The parameter, Session-State, may have two values: "Session-ACTIVE" and "Session-IDLE".

The parameter, Activate-Session-when-RRC-Resumed, may be used to indicate whether a PDU session is in the Session-ACTIVE state when an RRC is resumed. This parameter may have two values: "Yes" and "No". The parameter may be configured by the PCF 222. The PCF 222 may send this parameter to the SMF 220. Then the SMF 220 may send this parameter to the AN 204 and/or to the UE 202 during a session establishment procedure.

The parameter, Session-Activity-Timeout, may be a timer parameter in the AN 204, configured by the PCF 222 for individual PDU sessions. The parameter may be used to monitor activities in the UL and DL of a PDU session. If the UE 202 does not have UL or DL packets longer than the Session-Activity-Timeout parameter, then the AN 204 may inform the SMF 220. The SMF 220 may then either release this PDU session or change the state of a session from Session-ACTIVE to Session-IDLE, depending on the session management (SM) policy configured by PCF 222.

The parameter, SM-Action-for-Idle-Session, is a SM policy parameter configured by the PCF 222. The PCF 222 may send this parameter to the SMF 220 during a session establishment procedure. The SM-Action-for-Idle-Session parameter may have two values: "Keep-Idle-Session" and "Release-Idle-Session". If the value is set to "Keep-Idle-Session", then the SMF 220 may change the state of the PDU session from Session-ACTIVE to Session-IDLE. If the value is set to "Release-Idle-Session", then the SMF 220 may release the idle PDU session.

The parameter, Keep-UE-Context-For-Idle-Sessions, may be in the UE context of the SMF 220 and the UPF 222, as configured by PCF 222. This parameter may be used to indicate whether the UE 202 context may be kept in the SMF 220 and UPF 222 when all PDU sessions of the same UE 202 that are served by the SMF 220 and by the UPF 222 are in the Session-IDLE state. The Keep-UE-Context-For-Idle-Sessions parameter may have two values: "Keep" and "Can-Be-Released". If the Keep-UE-Context-For-Idle-Sessions parameter is set to "Keep", then the SMF 220 and the UPF 222 may keep the UE context regardless of the session state. If the Keep-UE-Context-For-Idle-Sessions parameter is set to "Can-Be-Released", then at least one of the following may apply:

The UPF 212 and SMF 220 may keep a complete UE context if their UE context have at least one active session. However, some information in the UE context may be released, such as NG3 connection information, including the NG3 tunnel endpoint identifier and IP address of AN 204.

The UPF 212 and the SMF 220 may or may not keep UE context if all sessions they serve are in the idle state.

When a UPF 212 releases the UE context of a UE 202 having all idle sessions, the UPF 212 may transfer its complete UE context to the SMF 220. Additionally, the UPF 220 may transfer to the PCF 222 the charging information of the UE context.

Figure 6A:
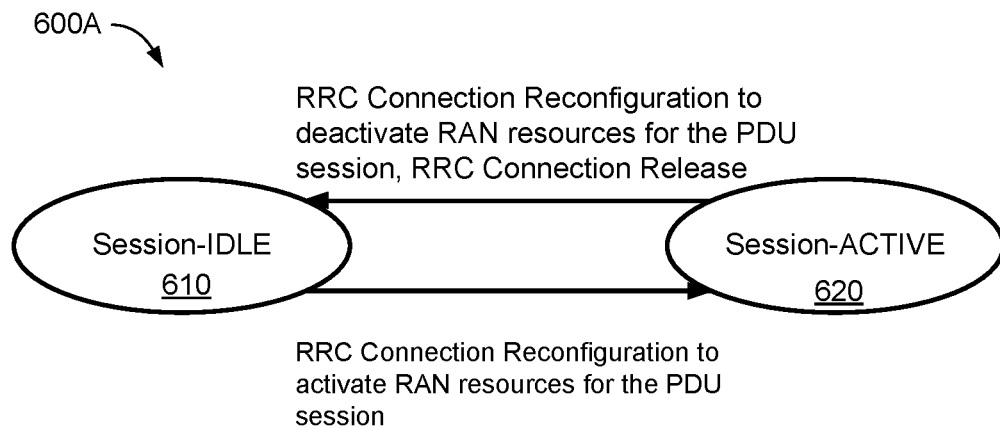
FIG. 6A illustrates, in a state diagram, an example of a session management state model in a UE.

FIG. 6A illustrates, in a state diagram, an example of a session management state model 600A in a UE 202. The session management state model 600A shows a Session-IDLE state 610 and a Session-ACTIVE state 620. An active session (i.e., a session that is in the Session-ACTIVE state 620) may be transitioned to the Session-IDLE state 610 after a request by the UE 202 or a request by the AN 204. Such requests may include a RRC connection reconfiguration to deactivate RAN resources for the PDU session, and a RRC connection release. An idle session (i.e., a session that is in the Session-IDLE state 610) may be transitioned to the Session-ACTIVE state 620 after a request by the UE 202 (mobile originated (MO) data) or a request by the UPF 212 (mobile terminated (MT) data). Such requests may include a RRC connection reconfiguration to activate RAN resources for the PDU session.

Figure 6B:
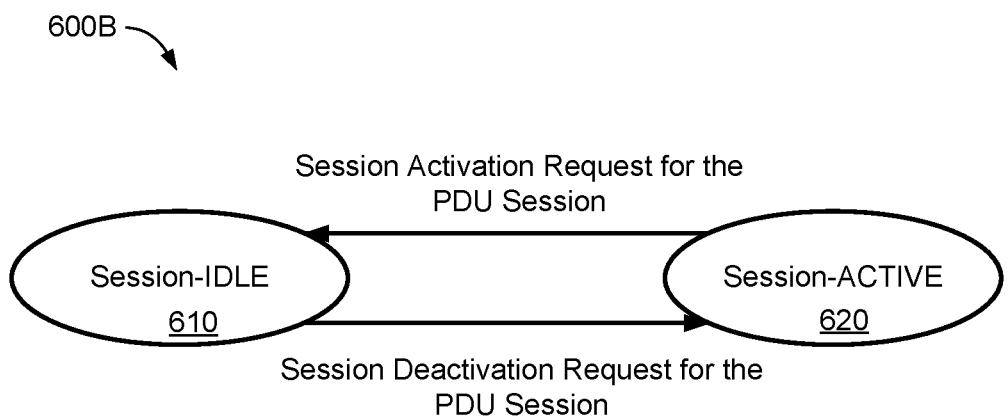
FIG. 6B illustrates, in a state diagram, an example of a session management state model in a SMF.

FIG. 6B illustrates, in a state diagram, an example of a session management state model 600B in a SMF 220. The session management state transition model 600B shows the Session-IDLE state 610 and a Session-ACTIVE state 620. An active session (i.e., a session that is in the Session-ACTIVE state 610) may be transitioned to the Session-IDLE state 620 after a request by the UE 202 or a request by the AN 204. Such requests may include a session deactivation request for the PDU session. An idle session (i.e., a session that is in the Session-IDLE state 620) may be transitioned to the Session-ACTIVE state 610 after a request by the UE 202 (MO data) or a request by the UPF 212 (MT data). Such requests may include a RRC connection reconfiguration to activate RAN resources for the PDU session.

Figure 6C:
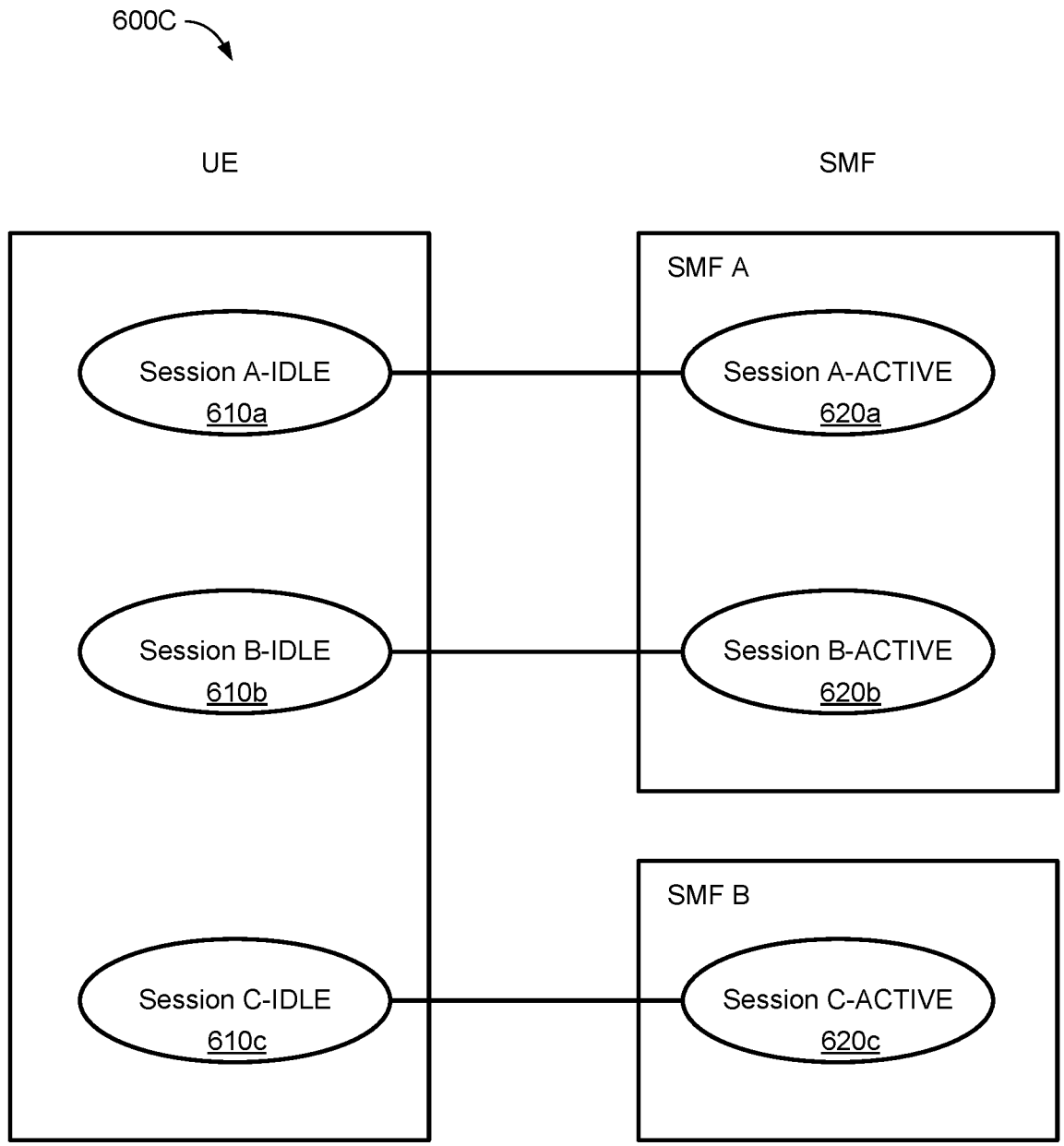
FIG. 6C illustrates, in a component diagram, an example of a session management state model for multiple PDU sessions.

FIG. 6C illustrates, in a component diagram, an example of a session management state model 600C for multiple PDU sessions. A UE 202 may have multiple established PDU sessions using multiple SMFs 220 and UPFs 212. The NextGen system supports the independent session connection state per PDU session (e.g., Session A is in Session-IDLE state, while Session B and Session C are in Session-ACTIVE state. Session A and Session B are served by SMF A, while Session C is served by SMF B). When multiple PDU sessions are activated for a UE 202, the AN 204 may be configured with individual Session Inactive Timers by the SMF(s) 220 for each PDU session during the session activation procedure. When the UE 202 is in the CN-IDLE state, the session connection state of each PDU session may be Session-IDLE. When the UE 202 requests to enter the CN-CONNECTED state from the CN-IDLE state (e.g., a Service Request), the UE 202 may also indicate the PDU session(s) to be activated. The session connection status for the requested PDU session(s) may be changed to Session-ACTIVE in the UE 202 and SMF 220, while the other PDU sessions(s) (if any) may remain in Session-IDLE. Whether or not the UE 202 has an activated PDU session, the NextGen system may support the activation of additional PDU sessions.

When a session is in a Session-IDLE state 610, a RRC can be in any state (e.g., RRC-CONNECTED, RRC-IDLE, RRC-INACTIVE). If all PDU sessions are in the Session-IDLE state, then the RRC may be in any states, the mobility state is MM-Registered, and the CN state is either CN-IDLE or CN-CONNECTED. The DRB may be suspended. Thus there is no AS signaling for idle sessions. The UE 202, the AN 204, the UPF 212, the SMF 220, the UDM 216 and the PCF (222) may store a relevant UE context, including tunnel information, for a fast connection resumption. However, the NG3 tunnel information may not be updated in the case of UE mobility or UPF 212 relocation. Tunnel maintenance procedures may not be performed. Furthermore, an NG3 tunnel of idle sessions may be removed from routing tables of the AN 204 and the UPF 212. The tunnel information will be updated when a session changes its state from Session-IDLE to Session-ACTIVE. In a UE context of the AN 204, the UPF 212, the SMF 220, the UDM 216 and the PCF 222, the parameter Session-State may be marked "Session-IDLE". NAS signaling is not required for idle sessions. In the UPF 212, for idle sessions, the TFTs may not be available in the packet classification function of UPF 212. Resources used for session data rate (AMBR/MBR/GBR) monitoring and charging may be released.

When a session is in a Session-ACTIVE state 620, and a RRC is in a RRC-CONNECTED state, the DRB/AS/NAS signaling are established. The mobility state is MM-Registered and the CN state is CN-CONNECTED. Network functions serving PDU sessions, including the UE 202, the AN 204, the UPF 212, the AMF 218, the SMF 220, the UDM 216 and the PCF 222, have relevant UE context information. In the UE contexts of the AN 204, the UPF 212, the SMF 220, the UDM 216 and the PCF 222, the parameter Session-State is marked "Session-ACTIVE". In the UPF 212, the traffic flow template (TFT) is available at the packet classification function of UPF 212. The TFT is used to classify packets into quality of service (QoS) flows. Therefore, the more TFTs that are in use, the higher the search complexity at the UPF 212. Thus, only the TFTs of active sessions are searched for ingress packets in UPF 212. In the AN 204 and the UPF 212, resources for the PDU session data rate (aggregate maximum bit rate (AMBR)/maximum bit rate (MBR)/guaranteed bit rate (GBR)) monitoring and charging are in operation.

The SMF 220 may change the state of a PDU session from Session-ACTIVE to Session-IDLE based on UE 202 and AN 204 requests, or based on its own decision. The UE 202 and UPF 212 may inform the SMF 220 about the presence of UE data so that the SMF 220 can change the state of a session from Session-IDLE to Session-ACTIVE. It is possible to change the state of individual sessions or a group of sessions. The SMF 220 informs the UPF 212 so that the UPF 212 either must keep or can optionally remove the UE context, depending on the SM policy for this PDU session configured by the PCF 222.

When the RRC of the UE 202 is in a RRC-CONNECTED state and the AN 204 changes the RRC to RRC-IDLE or RRC-INACTIVE CONNECTED mode, the state of all the UE's 202 PDU sessions may be set to the Session-IDLE state.

When a RRC connection is resumed, the CN state is changed from CN-IDLE to CN-CONNECTED. For MO transmission, the UE 202 may send an AS request to the AN 204 to resume the RRC connection. This request may include the DRB identifiers (IDs) to be resumed. Alternatively, the UE 202 may send a NAS request to the SMF 220 to indicate which session is to be resumed. It is possible to resume SM for some specific PDU sessions. For MT transmission, the UPF 212 may send a UE context update request to the SMF 220. The SMF 220 interacts with the AMF 218 to page the UE 202 in order to activate the RRC connection.

To support individual session (de-)activation, the UE 202 and the AN 204 may initiate a procedure to suspend or resume DRBs. If a DRB is suspended, the session state in the CN 206 may be changed to Session-IDLE. If a DRB is resumed, the session state in the CN 206 may be changed to Session-ACTIVE.

Session management procedures for session establishment, session release, session modification, RRC state transition, and session state transition are described below.

Figure 7:
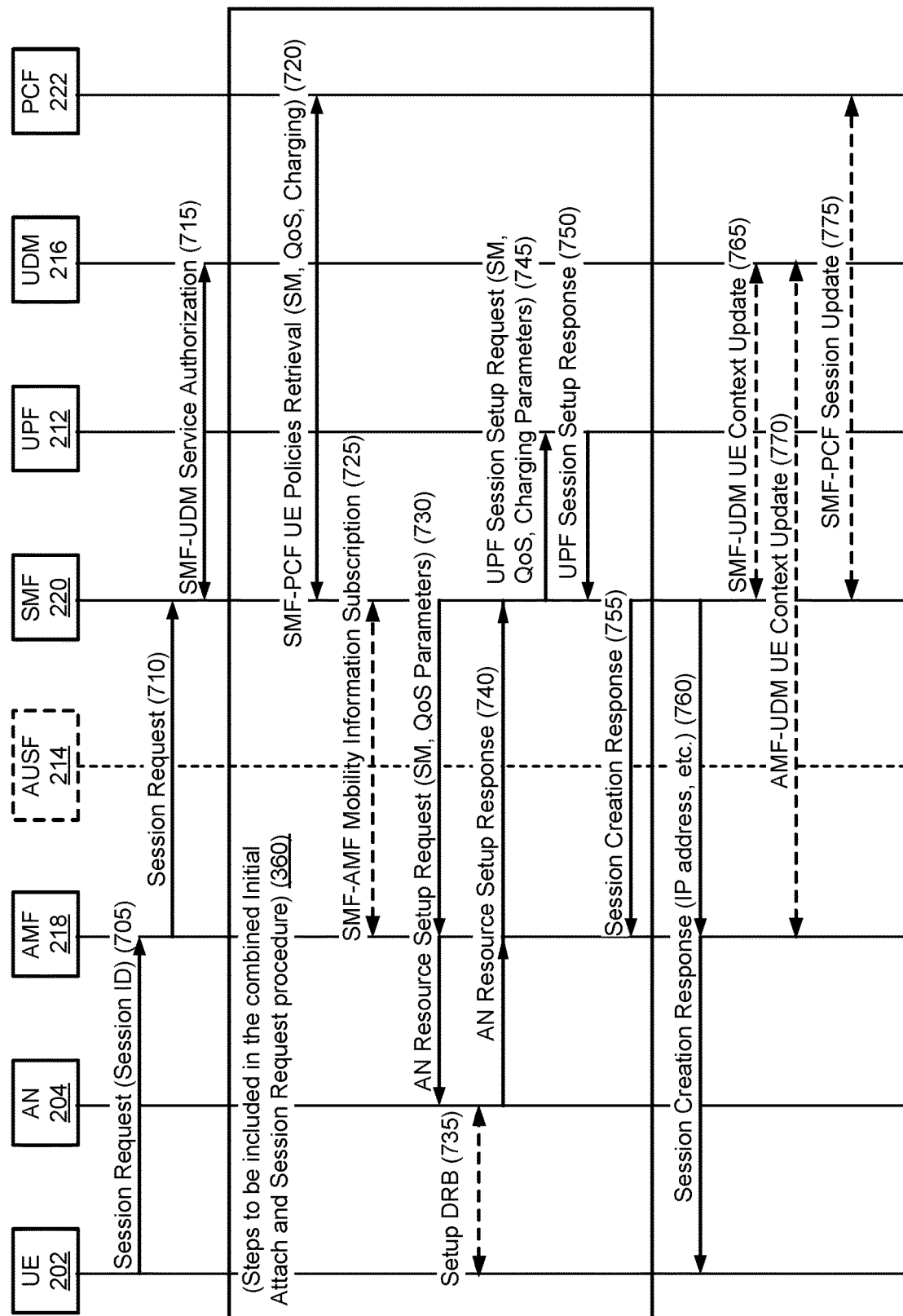
FIG. 7 illustrates, in a message flow diagram, an example of a session establishment procedure, in accordance with an embodiment of the present invention.

FIG. 7 illustrates, in a message flow diagram, an example of a session establishment procedure (700), in accordance with an embodiment of the present invention. Steps to the session establishment procedure (700) may be performed by several components of the non-roaming architecture 210 to establish a session between the UE 202 and the DN 208. The PCF 222 may have a SM policy that includes information regarding network slice-specific preferable logical UL and DL paths between the AN 204 and the UPF 212.

The method (700) comprises the UE sending a new NAS session request message (705) that includes a SM-NSSAI, a UE temp ID, and a UE-generated session ID, service type, and a domain name network (DNN) to the AMF 218 via the AN 204. It is noted that when the PDU session is created together with a UE initial attach or re-attach procedure for some specific network slices, the UE may provide the UE-generated session ID together with the initial attach or re-attach request. The AMF 218 uses the SM-NSSAI to select a SMF 220 and forward the session request message to the selected SMF 220 (710), together with an IP address of the serving AN. The AMF 218 may store the ID of the selected SMF 220. When the SMF 220 receives the request from the AMF 218, the SMF 220 may store the ID of the AMF 218 that serves the UE 202. The SMF 220 may access user subscription information in the UDM 216 for service authorization (715) (i.e., SMF-UDM service authorization messaging). If the service is not authorized, then the SMF 220 may send an appropriate session creation response message (760) is sent to the UE 202 via the AMF 218. The session creation response may include a session denial code.

If the service is authorized (715), then the setup of the UP connections (360) for a default or UE specific type slice may be performed. The setup of the UP connections (360) may include the SMF 220 obtaining UE polices from the PCF 222 (720), including the SM, the QoS, and the charging policies (i.e., SMF-PCF UE policies retrieval (SM, QoS, charging) messaging). The SMF 220 may also allocate the IP address(es) for the UE 202 if the PDU session is an IP-based session. The SM policy may include at least the following information: the preferred UPF(s) 212 to support mobile edge computing (MEC) applications; the parameter Session-Activity-Timeout; the parameter Keep-UE-Context-For-Idle-Sessions; the parameter SM-Action-for-Idle-Session; and the parameter Activate-Session-when-RRC-Resumed.

Optionally, the SMF 220 may subscribe to the AMF 218 for UE mobility information (725), if mobility-pattern based session management optimization is to be performed and if the SMF has not yet subscribed to the AMF 218 for the information. It is noted that the SMF-AMF UE mobility information subscription messaging (725) may be an independent procedure that may take place anytime before, after or during session establishment. In this example, the SMF-AMF UE mobility information subscription is shown within the session establishment procedure.

Next, the SMF 220 may send to the serving AN 204, via the AMF 218, an AN resource setup request message (730). The request may include the UE temp ID, the session ID, the QoS profile, and the selected IP address of the UPF 212. The request may also include the Session-Activity-Timeout parameter and the Activate-Session-when-RRC-Resumed parameter.

Optionally, if the UE 202 provided session ID is included in the attach request, the AN 204 may perform admission control for the requested PDU session according to the QoS profile. If the PDU session is accepted, the AN 204 may establish (i.e., set up) a DRB (735) according to the QoS profile. It is noted that for some services, although UE may not request for a new session during attach procedure, the CN 206 may still establish the UP path, even though there is no DRB is established between UE 202 and the AN 204.

The AN 204 may then send to the SMF 220, via the AMF 218, an AN resource setup response message (740). The AN 204 may store all UE-related information in a UE-specific context profile, include the Session-State parameter. Next, the SMF 220 may select the UPF 212 based on the preferred UPF(s) policy, if available, and the current traffic load of the UPFs 212. The SMF 220 may send a UPF session setup request message (745) to the selected UPF 212, which may include at least the UE temp ID, the session ID, the IP address(es) of the UE 202, the QoS and charging policies, the DNN, and the Keep-UE-Context-For-Idle-Sessions parameter. The UPF 212 may store all UE-related information in a UE-specific context, which may include the UE temp ID, the session ID, the AN 204, the IP address(es) of UE 202, the QoS and charging policies, and other information. It is noted that the session ID may be omitted for some UE types, such as simple Internet of things (IoT) devices, which access only one slice and only one PDU session per network slice.

Next, the UPF 212 may send a UPF session setup response message (750) to the SMF 220. The SMF 220 may store all UE-related information in a SM UE context profile, including the Session-State parameter. The SMF 220 may then send a session creation response message (755) to the AMF 218, which may include the UE temp ID and the session ID. The AMF 218 may trigger mobility management procedures. The SMF 220 may then send a NAS session creation response message (760) to the UE 202 via the AMF 218. If the session request is accepted, the session creation response may include the session ID, the assigned IP address (es), an optional QoS profile, and the service and session continuity (SSC) mode. The SM may store UE context information, including SM policy, QoS and charging policies, the assigned IP address(es), the AMF ID, the AN ID, the UPF ID, the NG3 tunnel information, and other parameters. The two steps 755 and 760 may be combined. For example, the SMF 220 may send one message containing two parts: one for the AMF 218 and one for the UE 202. After receiving the combined session creation response message, the AMF 218 may detach the information for itself and forward the UE's part to the UE 202. As noted above, if the session request is reject, the session creation response may include an error code. This error code may be "Unauthorized Service Request", "Network Resources Outage", "Not Enough Credit for Charging", or another error code. It is noted that if the UE 202 requests a new session in an initial attach and re-attach request, step (760) may be omitted. In this case, in the initial attach and re-attach procedures, the AMF 218 may send an attach response message that includes session management information. The SM information may include the session ID and the QoS profile.

Optionally, the SMF 220 may send UE session management information (i.e., via a SMF-UE context update (765) procedure) to the UDM 216. Also optionally, the AMF 218 may send UE mobility management related information (i.e., via an AMF-UDM UE context update (770) procedure) to the UDM 216. Optionally, the SMF 220 and the PCF 222 may perform a SMF-PCF session update procedure (775) where the actual parameters of the PDU session may be sent from the SMF 220 to the PCF 222. It is noted that the AN 204 and the UPF 212 may setup a tunnel if this tunnel does not yet exist.

Figure 8:
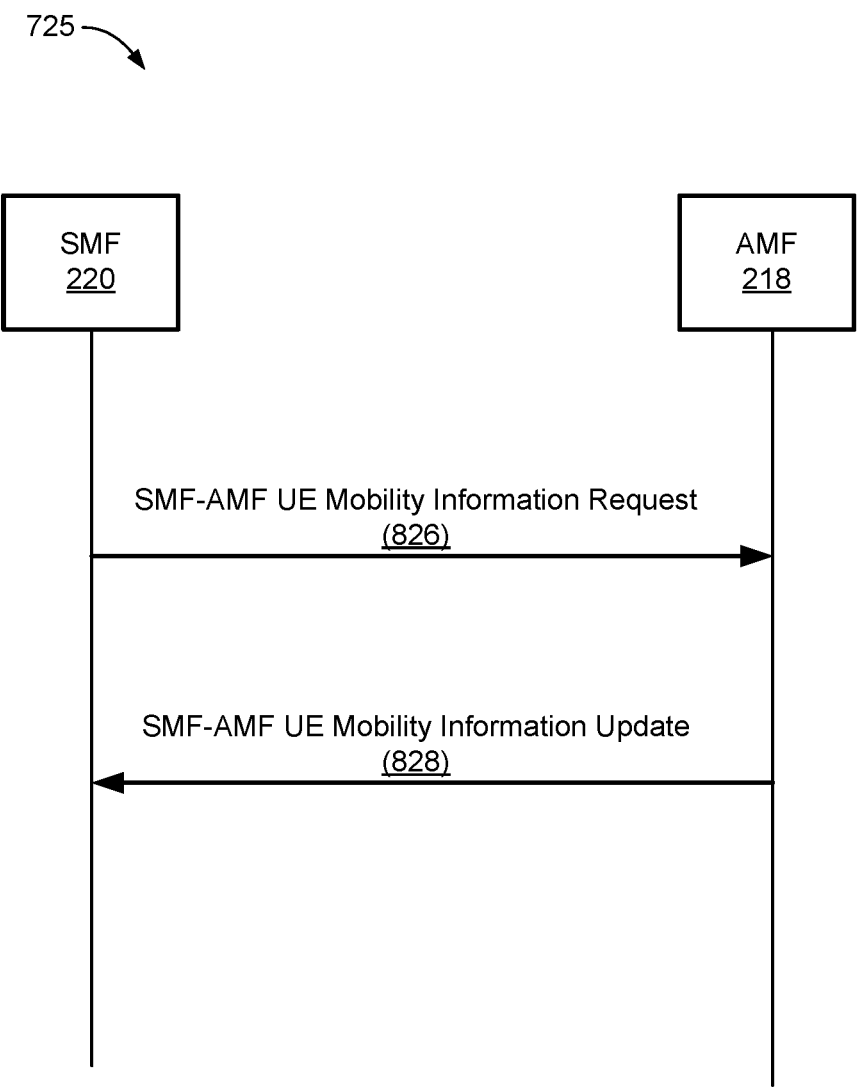
FIG. 8 illustrates, in a message flow diagram, an example of the SMF-AMF UE mobility information subscription procedure, in accordance with an embodiment of the session establishment procedure.

FIG. 8 illustrates, in a message flow diagram, an example of the SMF-AMF UE mobility information subscription procedure (725), in accordance with an embodiment of the session establishment procedure (700). The SMF 220 may send to the AMF 218 (or the AMF 218 may receive from the SMF 220) a SMF-AMF UE mobility information request (826) message. The message (826) may include one or more identifiers to identify the UE 202 (such as temp UE ID, international mobile subscriber identity (IMSI), GUTI), the mobility time window, and the type of subscription. The mobility time window indicates the time span of the requested UE mobility information. The type of subscription indicates whether the subscription is a one-time information retrieval or may use periodic information updates. The SMF 220 then may receive from the AMF 218 (or the AMF 218 may send to the SMF 220) a SMF-AMF UE mobility information update (828) message. The message may include the identifiers of the set of ANs 204 that may potentially serve the UE in the specified mobility time window. The AMF 218 may perform the mobility information update (828) upon receiving the request (826), and, if the request (826) indicates a periodic update, when the requested mobility information changes. The AMF 218 may determine the service AN 204 set according to the mobility pattern of the UE 202. Other steps may be added to the procedure (725).

Figure 9:
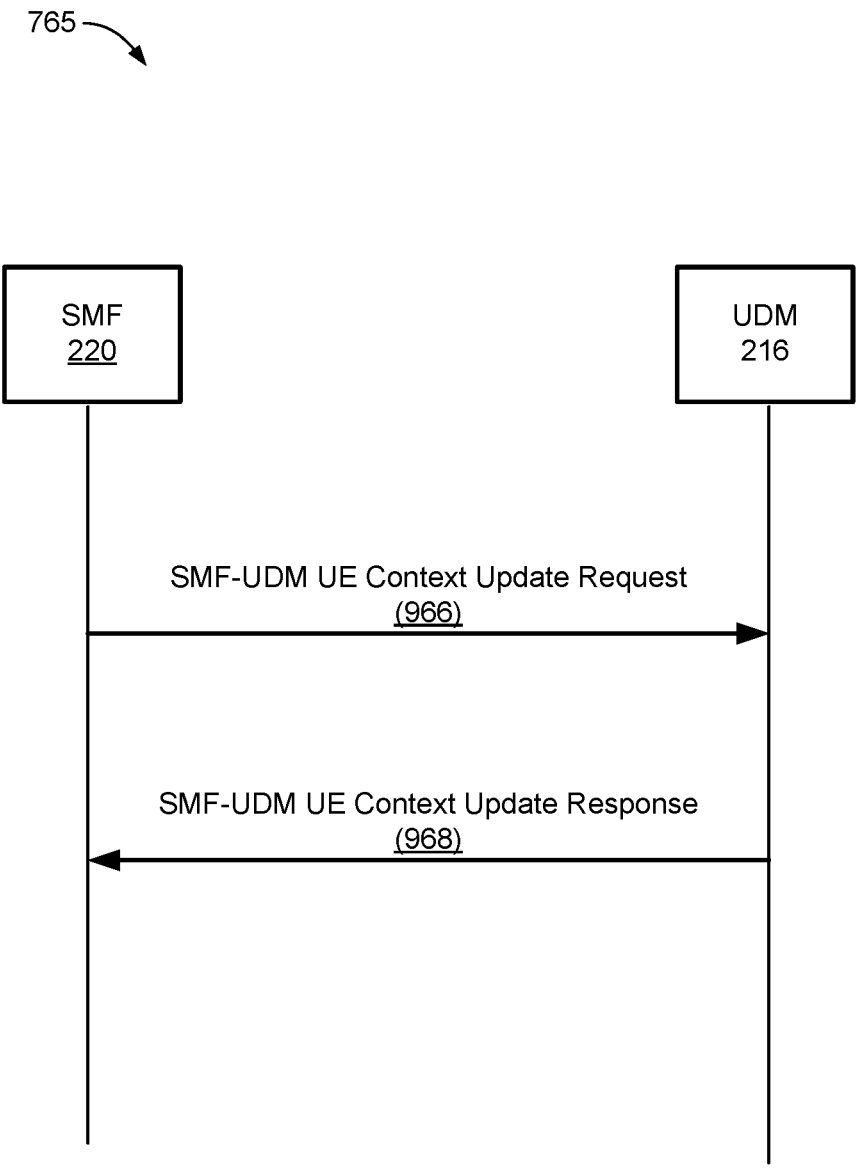
FIG. 9 illustrates, in a message flow diagram, an example of the SMF-UDM UE context update procedure, in accordance with an embodiment of the session establishment procedure.

FIG. 9 illustrates, in a message flow diagram, an example of the SMF-UDM UE context update procedure (765), in accordance with an embodiment of the session establishment procedure (700). The SMF 220 may send to the UDM 216 (or the UDM 216 may receive from the SMF 220) a SMF-UDM UE context update request (966) message. The message (966) may include identifiers to identify the UE 202 (such as temp ID, IMSI, GUTI), and the UE context or new values of parameters of the UE context that have changed. The SMF 220 may then receive from the UDM 216 (or the UDM 216 may send to the SMF 220) a SFM-UDM context update response (968) message to confirm that the UE context has been updated in the UDM 216. Other steps may be added to the procedure (765).

Figure 10:
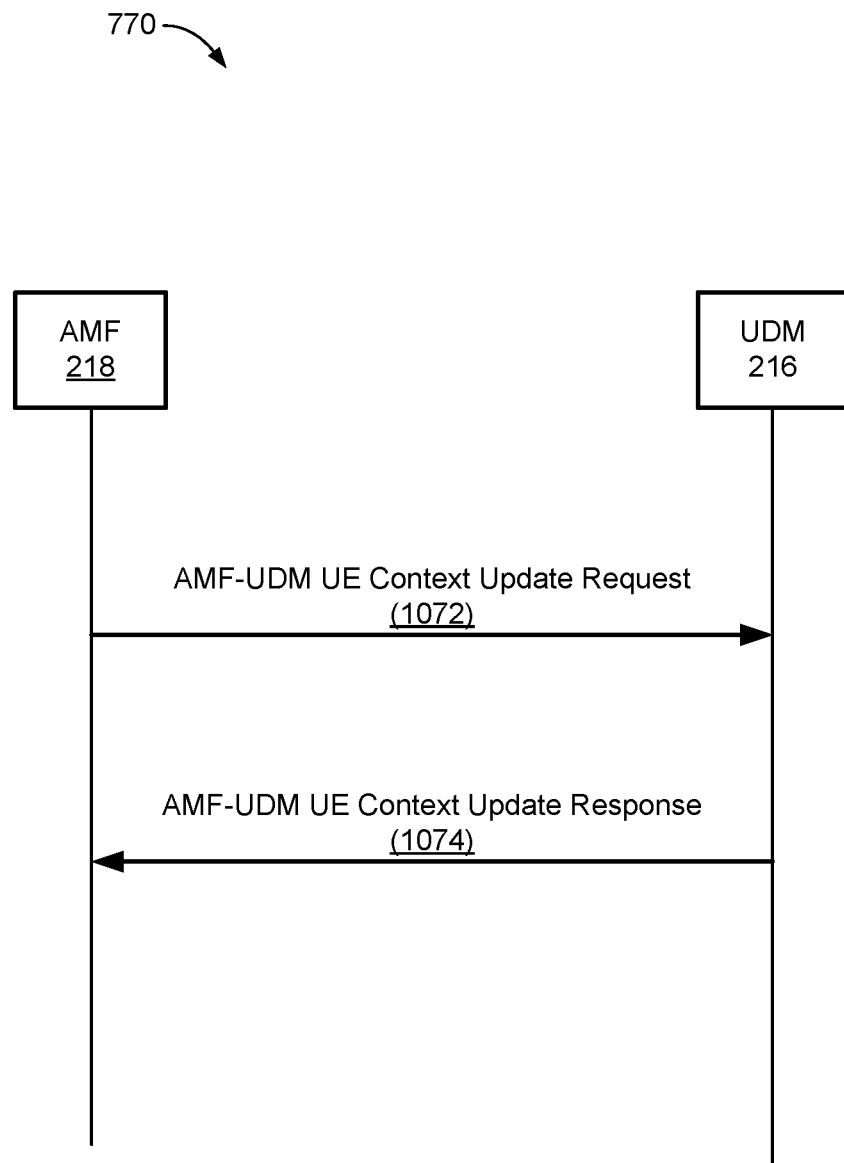
FIG. 10 illustrates, in a message flow diagram, an example of a AMF-UDM UE context update procedure, in accordance with an embodiment of the session establishment procedure.

FIG. 10 illustrates, in a message flow diagram, an example of a AMF-UDM UE context update procedure (770), in accordance with an embodiment of the session establishment procedure (700). The AMF 218 may send to the UDM 216 (or the UDM 216 may receive from the AMF 218) a AMF-UDM UE context update request (1072) message to update the mobility management parameters for a UE 202. The message (1072) may include identifiers to identify the UE 202 (such as temp UE ID, IMSI, GUTI) and the UE context or new values of parameters of the UE context that have changed. The AMF 218 may then receive from the UDM 216 (or the UDM 216 may send to the AMF 218) an AMF-UDM UE context update response (1074) message to confirm that the mobility management parameters of in the UE context have been updated in the UDM 216. Other steps may be added to the procedure (770).

Figure 11:
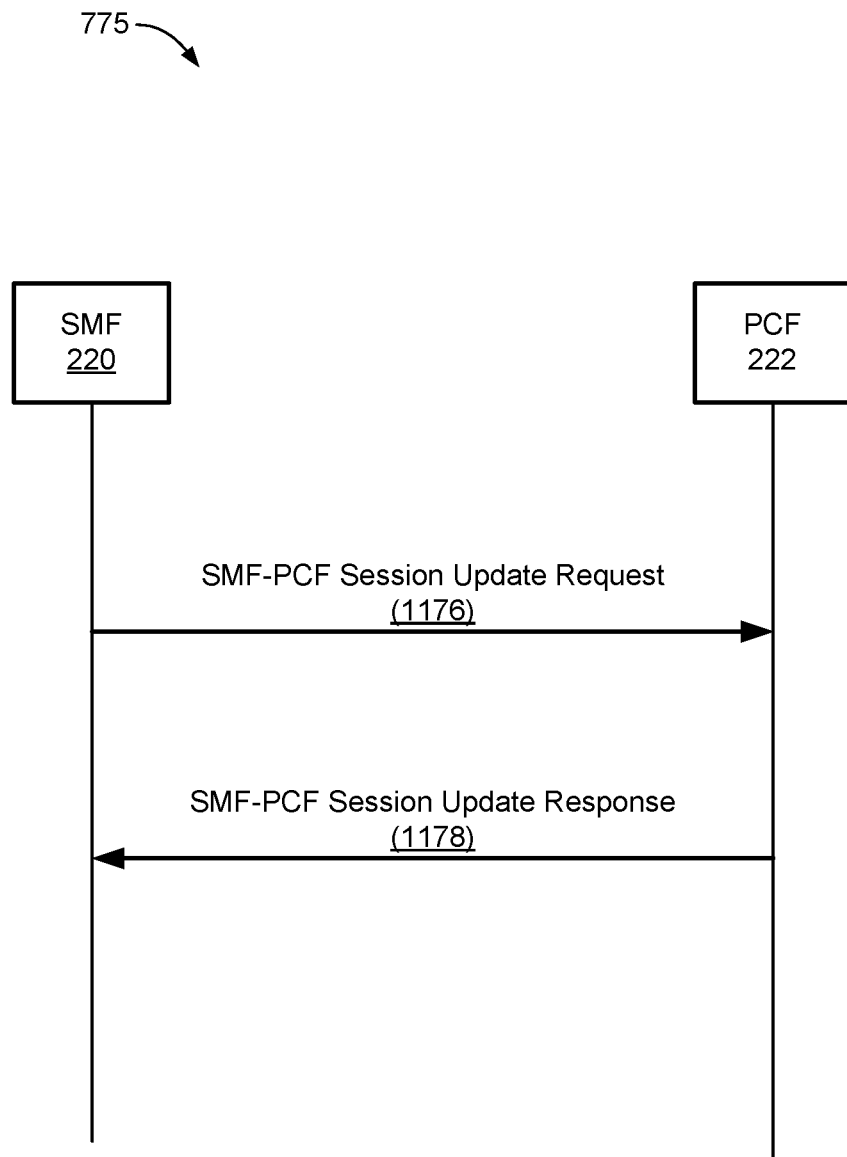
FIG. 11 illustrates, in a message flow diagram, an example of a SMF-PCF session update procedure, in accordance with an embodiment of the session establishment procedure.

FIG. 11 illustrates, in a message flow diagram, an example of a SMF-PCF session update procedure (775), in accordance with an embodiment of the session establishment procedure (700). The SMF 220 may send to the PCF 222 (or the PCF 222 may receive from the SMF 220) a SMF-PCF UE session update request (1176) message to update the session parameters for a UE 202. The message (1176) may include identifiers to identify the UE 202 (such as temp UE ID, IMSI, GUTI) and the UE context (session management, QoS parameters, charging information) or new values of parameters of the UE context that have changed. The SMF 220 may then receive from the PCF 222 (or the PCF 222 may send to the SMF 220) a SMF-PCF session update response (1178) message to confirm that the session management parameters of the UE 202 have been updated in the PCF 136. Other steps may be added to the procedure (775).

Figure 12:
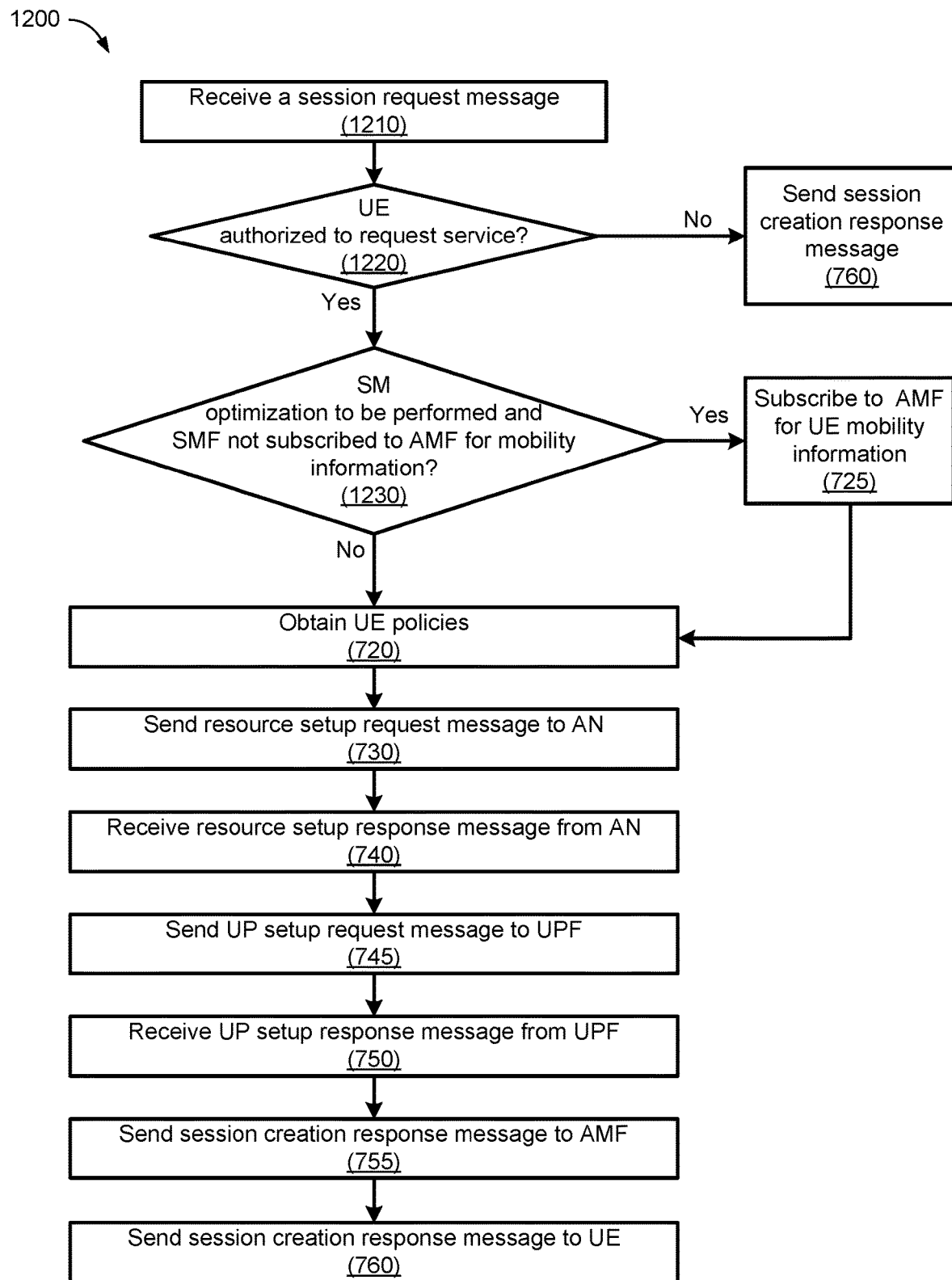
FIG. 12 illustrates, in a flowchart, an example of a method of establishing a session, in accordance with the session establishment procedure.

FIG. 12 illustrates, in a flowchart, an example of a method of establishing a session (1200), in accordance with the session establishment procedure (700). The method (1200) is performed by the SMF 220. The SMF 220 may be implemented as a session management function module on a server on the CN 206. The SMF 220 may be configured to receive a session request message (1210). The session request message may be from an AMF 218 that received the session request message from a UE 202. Once the SMF 220 receives the session request message, the SMF 220 may determine if the UE 202 is authorized to request the service (1220). To perform this service authorization, the SMF 220 may access user subscription information in the UDM 216. If the service is not authorized (1220), then the SMF 220 may send an appropriate session creation response message (760) to the UE 202 via the AMF 218. As describe above, the session creation response may include a session denial code. If the service is authorized (1220), and if a mobility-pattern based session management optimization is to be performed, and if the SMF 220 has not yet subscribed to the AMF for the information, (1230) then the SMF 220 may subscribe to the AMF 218 for UE mobility information (725), as described above. It is noted that, as described above, steps (1230) and (725) may be performed at any time before, during or after the method (2040).

The SMF 220 may obtain UE policies from the PCF 222 (720), as described above. Next, the SMF 220 may send to the serving AN 204 via the AMF 218 the resource setup request message (730), as described above. The SMF 220 may then receive the resource setup response message from the AN 204 via the AMF 218 (740), as described above. Next, the SMF 220 may send a UP setup request message to a selected UPF 212 (745), as described above. Next, the SMF 220 may receive a session setup response message from the UPF 212 (750), as described above. The SMF 220 may then send a session creation response message (755) to the AMF 218, as described above. The SMF 220 may then send a session creation response message (760) to the UE 202 via the AMF 218, as described above.

Other steps may be added to the method (2040), including the SMF 220 storing all UE-related information in a SM UE context profile, including the Session-State parameter. The SMF 220 may also optionally send UE session management information to the UDM 216 (765).

Figure 13:
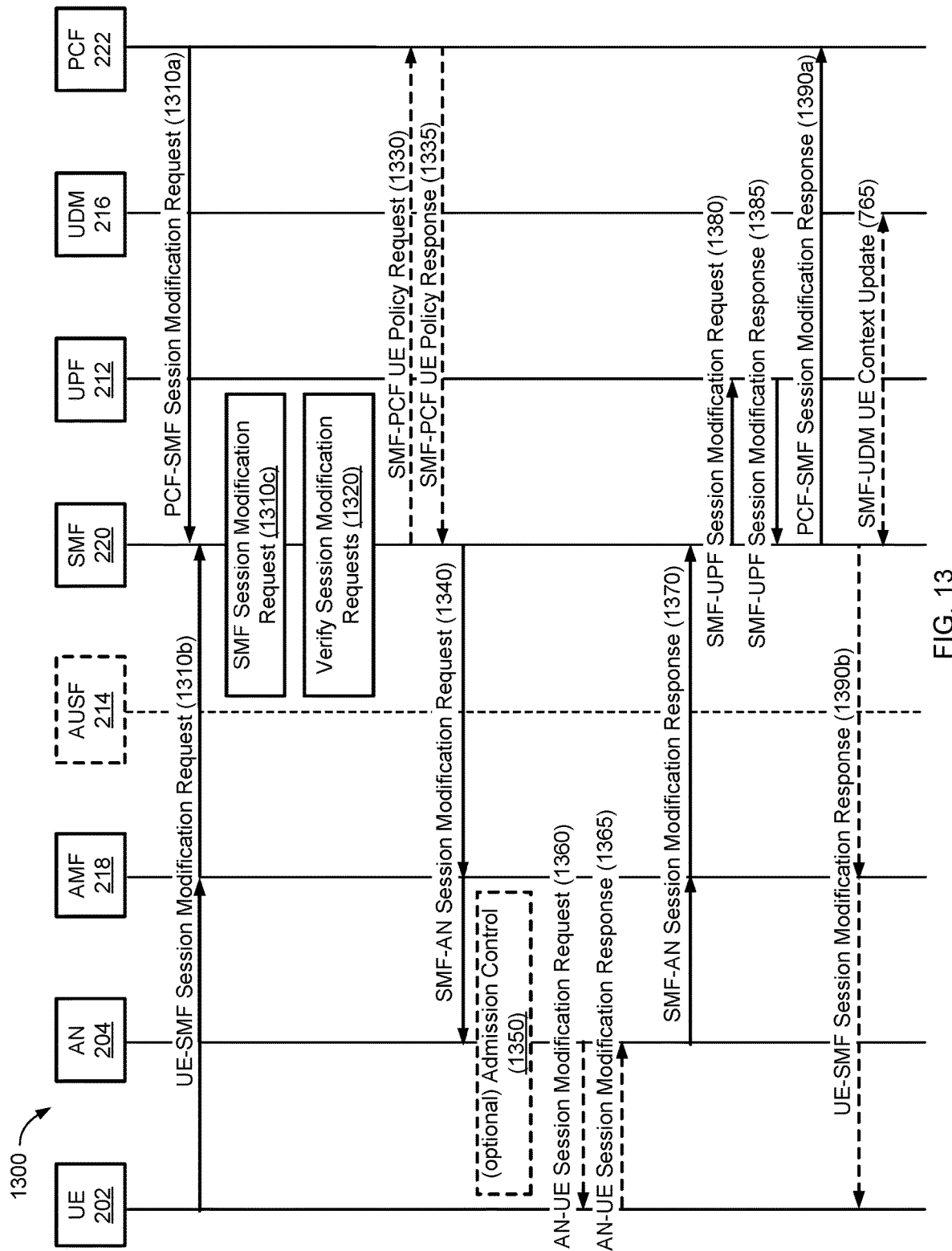
FIG. 13 illustrates, in a message flow diagram, an example of a session modification procedure, in accordance with an embodiment of the present invention.

FIG. 13 illustrates, in a message flow diagram, an example of a session modification procedure (2060), in accordance with an embodiment of the present invention. A PDU session modification procedure may be triggered by the PCF 222, the UE 202, and the SMF 220. A first possible trigger for session modification occurs when the PCF 222 sends to the SMF 220 a PCF-SMF session modification request (1310a). The request may include the temp UE ID, the session ID, and new SM/QoS/charging policy parameters. A second possible trigger for session modification occurs when the UE 202 sends to the SMF 220, via AMF 218, a UE-SMF session modification request for an active session (1310b). The request may include the SM-NSSAI, the temp UE ID, the session ID, a list of parameters to be changed and their new values, and a UE time zone. A third possible trigger for session modification occurs when the SMF 220 creates a SMF session modification request (1310c) based on current UE policies, and other factors (e.g., load changes in the UPF 212 and the AN 204).

If the first and second possible triggers were responsible for the session modification request, then the SMF 220 may verify the session modification requests (1320). If the request comes from the PCF 222 for UE policy updates (1310a), then the new policy update may be stored in a local memory of the SMF 220. The SMF 220 may create a session modification request to the AN 204 and the UPF 212 based on the new policy parameters. If the request comes from the UE 202 (e.g., for new QoS parameters (higher MBR or higher GBR)) (1310b), the SMF 220 may verify the request with the current UE policies. If the UE request (1310b) is allowed, then the SMF 220 may create a session modification request to the AN 204 and the UPF 212 based on the UE request. If the UE request (1310b) is not allowed, then the SMF 220 may send a cause code to UE (1390b) and the other steps in the procedure (1300) may be disregarded.

The UE 202 may request session modification that may be out of policies stored in the SMF 220. For example, the UE 202 may request an additional GBR flow for a current PDU session that has no GBR flows. If the UE 202 requests additional GBR flow, then the SMF 220 and PCF 222 may perform a UE policy retrieve procedure. The SMF 220 may send to the PCF 222 a SMF-PCF UE policy request message (1330), which may include the required policy for the additional PDU flow that the UE requested. The PCF 222 may return to the SMF 220 a SMF-PCF UE policy response message (1335), which may include the UE policy.

Next, the SMF 220 may send to the AN 204, via the AMF 218, a SMF-AN session modification request message (1340). The request may include new SM parameters and/or new QoS parameters. Optionally, the AN 204 may then perform admission control (1350) if a new GBR flow is requested or a current GBR flow is modified. If the QoS parameter changes are accepted, the AN 204 may optionally perform a session modification procedure with the UE 202. The AN 204 may send to the UE 202 a AN-UE session modification request message (1360). The request may include new QoS, SM or policy parameters. After applying new QoS, SM or policy parameters, the UE 202 may send to the AN 204 a AN-UE session modification response message (1365).

Next, the AN 204 may send to the SMF 220, via the AMF 218, a SMF-AN session modification response message (1370), which may include either an acknowledgment or a cause code. If the SMF-AN session modification response message included a cause code, steps (1380) and (1385) may be disregarded. Otherwise, the SMF 220 and the UPF 212 may perform a SMF-UPF session modification procedure. The SMF 220 may send to the UPF 212 a SMF-UPF session modification request message (1380), which may include the temp UE ID, the session ID, and new parameters of the PDU session. The UPF 212 may receive new session parameters and check whether the new parameters can be supported. If the new parameters can be supported, the UPF 212 may reconfigure its resources to support the PDU session. The UPF 212 may then send to the SMF 220 a SMF-UPF session modification response message (1385), which may include either an acknowledgment or a cause code. Next, the SMF 220 may send a response to the original request. If the session modification request came from the PCF 222, then the SMF 220 may send to the PCF 222 a PCF-SMF session modification response message (1390*a*), which may either include an acknowledgment or a cause code. If the session modification request came from the UE 202 (1310*b*) or the SMF 220 (1310*c*), the SMF 220 may send to the PCF 222 a PCF-SMF session modification response message (1390*a*) which contains new session parameters. If the session modification request came from the UE 202 (1310*b*), then the SMF 220 may send to the UE 202 a UE-SMF session modification response message (1390*b*), which may either include an acknowledgment or a cause code. Optional, the SMF 220 may perform a UE context update procedure (765) with the UDM 216.

Figure 14:
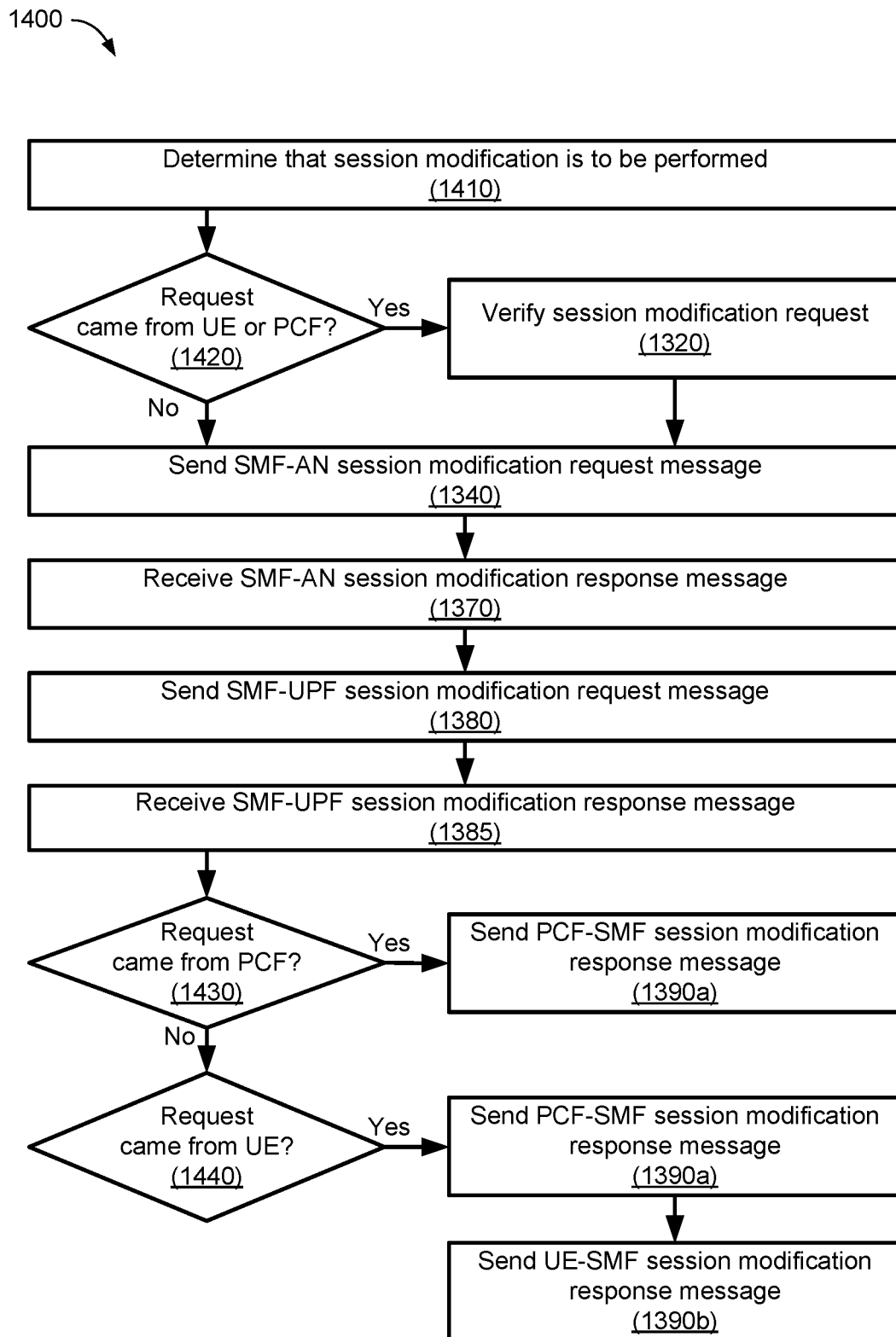
FIG. 14 illustrates, in a flowchart, an example of a method modifying a session, in accordance with the session modification procedure.

FIG. 14 illustrates, in a flowchart, an example of a method modifying a session (1400), in accordance with the session modification procedure (1300). The method (1400) is performed by the SMF 220. The SMF 220 may be configured to determine that a session modification is to be performed (1410). This determination (1410) may be due to the SMF 220 receiving a PCF-SMF session modification request message from the PCF 222. Alternatively, this determination (1410) may be due to the SMF 220 receiving a UE-SMF session modification request message from the UE 202. Alternatively, this determination (1410) may be due to the SMF 220 generating a SFM session modification request message based on current UE policies and other factors (e.g., load changes in the UPF 212 and the AN 204). If the determination (1410) was made due to requests from the PCF 222 or the UE 202 (1420), then the SFM 220 is configured to verify the received session modification requests (1320), as described above. The SMF 220 may then send the SMF-AN session modification request message to the AN 204 (1340), via the AMF 218, as described above. Next, the SMF 220 may receive the SMF-AN session modification response message from the AN 204 (1370), via the AMF 218, as described above. Next, the SMF 220 may send to the UPF 212 the SMF-UPF session modification request message (1380), as described above. The SMF 220 may then receive from the UPF 212 the SMF-UPF session modification response message (1385), as described above. If the session modification was due to a request from the SMF 220 (1430), then the SMF 220 may send to the PCF 222 a PCF-SMF session modification response message (1390*a*), as described above. If the session modification was due to a request from the UE 202 (1440), then the SMF 220 may send to the PCF 222 a PCF-SMF session modification response message (1390*a*), and then the SMF 220 may send to the UE 202 a UE-SMF session modification response message (1390*b*), as described above.

Other steps may be added to the method (2080), including sending a PCF-SMF session modification response message to the PCF 222 if the PCF 222 sent the original session modification request to the SMF 220. Alternatively, the SMF 220 may send UE-SMF session modification response message to the UE 202 if the UE 202 sent the original session modification request to the SMF 220. Additionally, the SMF 23 may optionally send a SMF-PCF UE policy request message to the UPF 212 (1330), and receive a SMF-PCF UE policy response message from the UPF 212 (1335), as described above.

Figure 15:
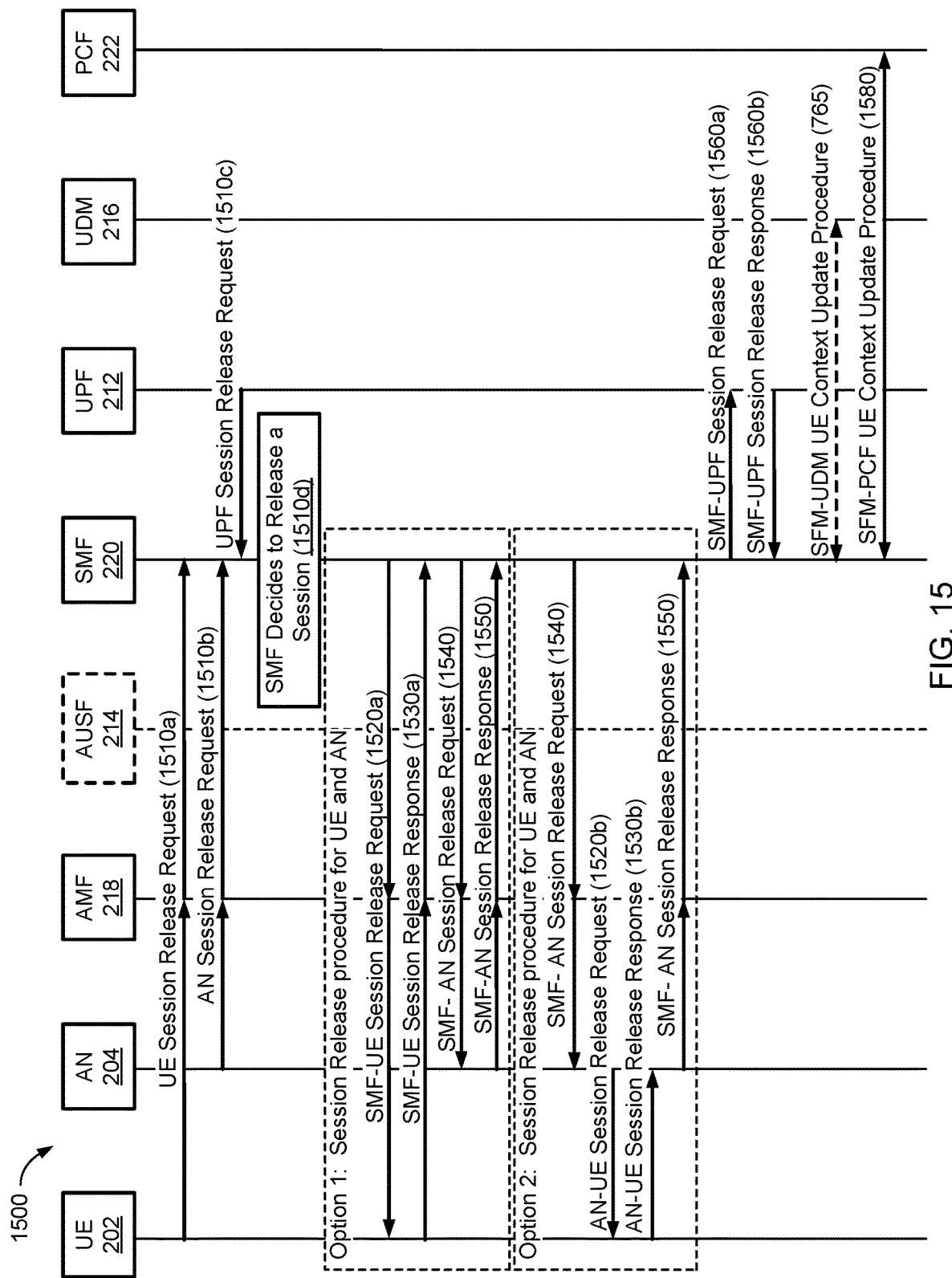
FIG. 15 illustrates, in a message flow diagram, an example of a session release procedure, in accordance with an embodiment of the present invention.

FIG. 15 illustrates, in a message flow diagram, an example of a session release procedure (1500), in accordance with an embodiment of the present invention. The PDU session release procedure (1500) may be triggered by the UE 202, the AN 204, the UPF 212 and the SMF 220. A first possible trigger for the PDU session release occurs when the UE 202 sends to the SMF 220 a UE session release request message (1510*a*). The message may include the SM-NSSAI, the temp UE ID and the session ID. A second possible trigger for the PDU session release occurs when the AN 204 sends to the SMF 220 an AN session release request message (1510*b*). The AN 204 may report one of: a congestion condition for some PDU sessions, no traffic activity for a long period, and/or other conditions. A third possible trigger for the PDU session release occurs when the UPF 212 sends to the SMF 220 a UPF session release request message (1510*c*). The UPF 212 may report at least one of a congestion condition for some PDU sessions, a charging policy violation (i.e., time-based, data volume-based, etc.), and/or other conditions. A fourth possible trigger for the PDU session release occurs when the SMF 220 decides to release a PDU session by its own logic (1510*d*), or by receiving information from the UE 202, the AN 204 and/or the UPF 212. Once a decision is made by the SMF 220 to release a session, there are two options for a session release procedure for the UE 202 and the AN 204.

In the first session release procedure option, the SMF 220 may send to the UE 202, via the AMF 218, a SMF-UE session release request message (1520*a*), which may include the UE temp ID, the session ID, and a cause code. The value of the cause code may indicate the source of the session release request, such as: "Session Release by UE" (corresponding to step 1510*a*); "Session Release by AN" (corresponding to step 1510*b*); "Session Release by UPF" (corresponding to step 1510*c*); and "Session Release by SMF" (corresponding to step 1510*d*). Next, the UE 202 may release its DRB resources and PDU session context. The UE 202 may send to the SMF 220, via the AMF 218, a SMF-UE session release response message (1530*a*) to confirm the release of AN 204 resources for the released PDU session. Next, the SMF 220 may send to AN 204, via the AMF 218, a SMF-AN session release request message (1540), which may include the UE temp ID and the session ID. Next, the AN 204 may remove the UE's PDU context, and releases DRB resources. The AN 204 may send to the SMF 220, via the AMF 218, a SMF-AN session release response message (1550) to confirm the release of AN 204 resources for the released PDU session.

In the second session release procedure option, the SMF 220 may send to the AN 204, via the AMF 218, a SMF-AN session release request message (1540), which may include the UE temp ID, the session ID, and a cause code. The value of the cause code may indicate the source of the session release request, such as: "Session Release by UE" (corresponding to step 1510*a*); "Session Release by AN" (corresponding to step 1510*b*); "Session Release by UPF" (corresponding to step 1510*c*); and "Session Release by SMF" (corresponding to step 1510*d*). Next, the AN 204 may send to the UE 202 an AN-UE session release request message (1520*b*). The message indicates the DRB to be released (which is being used to serve the PDU session) and a cause code. Next the UE 202 may release its DRB resources and PDU session context. The UE 202 may send to the AN 204 an AN-UE session release response message (1530*b*). Next, the AN 204 may remove the UE's PDU context, and release DRB resources. The AN 204 may send to the SMF 220 a SMF-AN session release response message (1550) to confirm the release of AN resources for the released PDU session.

Next, the SMF 220 and the UPF(s) 212 may perform a SMF-UPF session release procedure. The SMF 220 may send to the UPF 212 a SMF-UPF session release request message (1560*a*). The message may include the temp UE ID and the session ID. Next, the UPF 212 may remove the UE's PDU session context, and release resources that serve the PDU session. The UPF 212 may send to the SMF 212 a SMF-UPF session release response message (1560*b*). It is noted that the UPFs 212 may send charging information to the PCF 222 via the SMF 220. Optional, the SMF 220 and the UDM 216 may perform a SMF-UDM UE context update procedure (1570), in which the UDM 216 may remove the UE's PDU session information. Next, the SMF 220 and the PCF 222 may perform a SMF-PCF UE context update procedure (1580). The SMF may forward charging information to the PCF 222. The PCF 222 may remove the PDU session information of the released PDU session.

Figure 16:
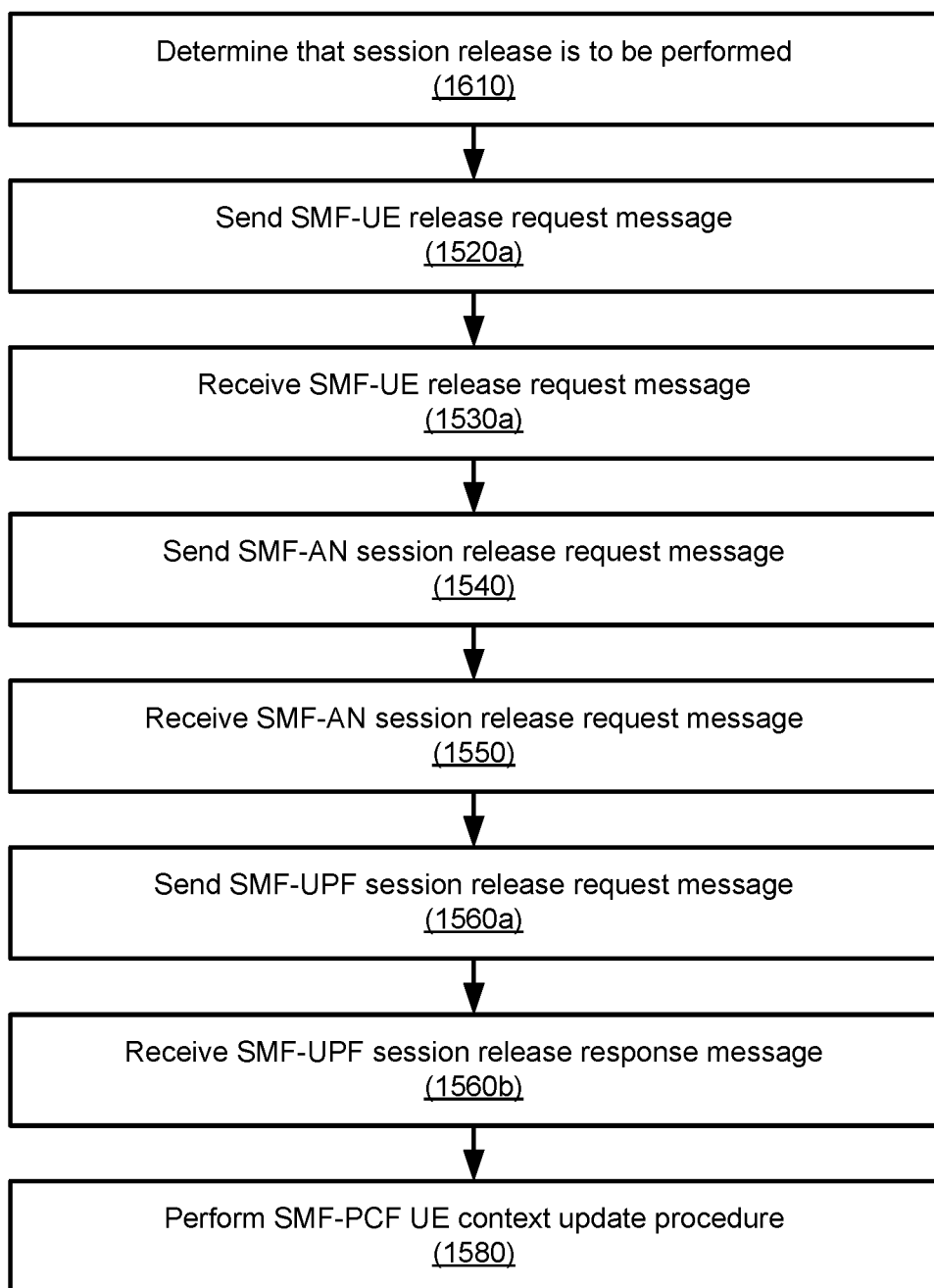
FIG. 16 illustrates, in a flowchart, an example of a method of releasing a session, in accordance with the session release procedure.

FIG. 16 illustrates, in a flowchart, an example of a method of releasing a session (1600), in accordance with the session release procedure (1500). The method (1600) is performed by the SMF 220. The SMF 220 may be configured to determine to release a session (1610), as described above with reference to FIG. 15. Once the determination (1610) is made, the SMF 220 may send the SMF-UE release request message (1520*a*) to the UE 202, via the AMF 218, as described above. Next, the SMF 220 may receive the SMF-UE release response message (1530*a*) from the UE 202, via the AMF 218, as described above. Next, the SMF 220 may send the SMF-AN session release request message (1540) to the AN 204, via the AMF 218, as described above. Next, the SMF 220 may receive the SMF-AN session release response message (1550) from the AN, via the AMF 218, as described above. Next, the SMF 220 may send the SMF-UPF session release request message (1560*a*) to the UPF 212, as described above. Next, the SMF 220 may receive the SMF-UPF session release response (1560*b*) from the UPF 212, as described above. Next, the SMF may perform a SMF-PCF UE context update procedure (1570) with the PCF 222, as described above. Other steps may be added to the method (1600), including the SMF 220 and the UDM 216 perform an optional SMF-UDM UE context update procedure (765), as described above.

Figure 17:
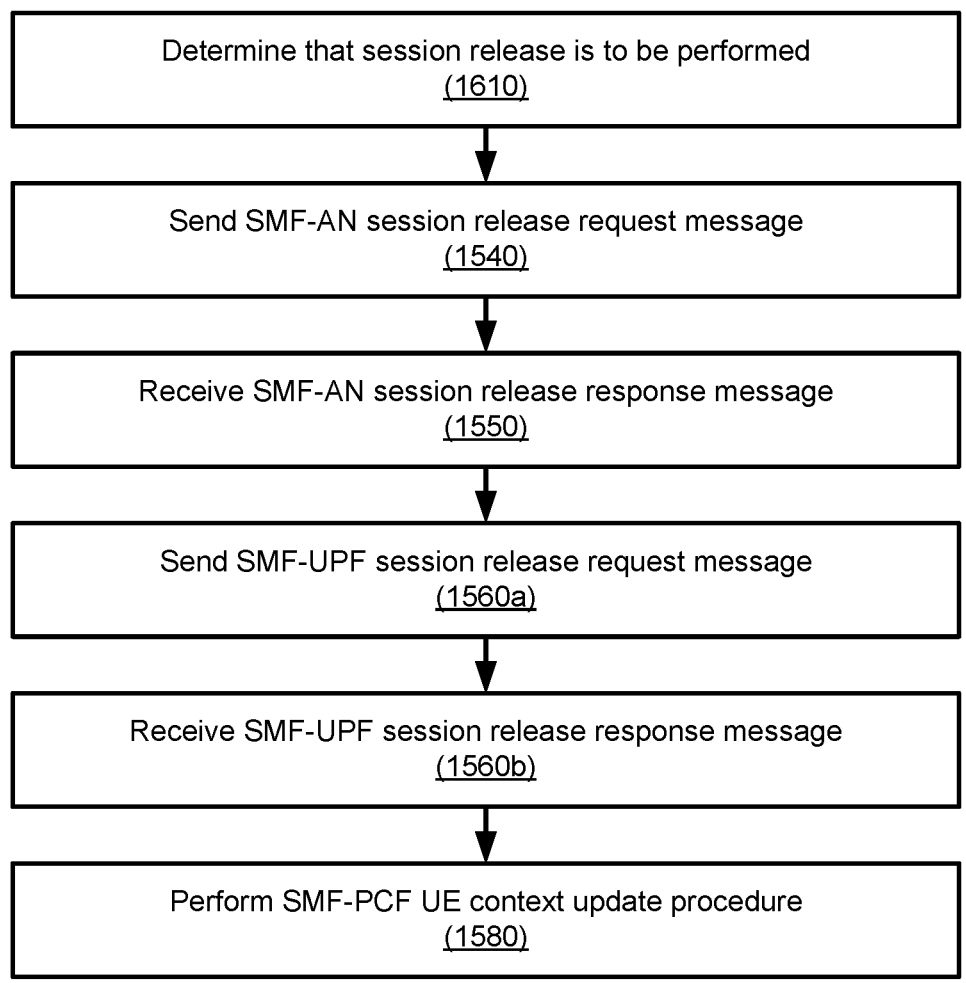
FIG. 17 illustrates, in a flowchart, another example of a method of releasing a session, in accordance with the session release procedure.

FIG. 17 illustrates, in a flowchart, another example of a method of releasing a session (1700), in accordance with the session release procedure (1500). The method (1700) is performed by the SMF 220. The SMF 220 may be configured to determine to release a session (1610). The determination (1610) may be based on receiving a session release request message from the UE 202. Alternatively, the determination (1610) may also be based on receiving a session release request message from the AN 204. Alternatively, the determination (1610) may also be based on receiving a session release request message from the UPF 212. Alternatively, the determination (1610) may also be based on logic of the SMF 220. Once the determination is made, the SMF 220 may send the SMF-AN session release request message (1540) to the AN 204, via the AMF 218, as described above. Next, the SMF 220 may receive the SMF-AN session release response message (1550) from the AN, via the AMF 218, as described above. It is noted that prior to the SMF receiving the SMF-AN session release response message (1550) from the AN, the AN would have sent to the UE an AN-UE session release request, and received from the UE an AN-UE session release response, as described above. Next, the SMF 220 may send the SMF-UPF session release request message (1560*a*) to the UPF 212, as described above. Next, the SMF 220 may receive the SMF-UPF session release response (1560*b*) from the UPF 212, as described above. Next, the SMF may perform a SMF-PCF UE context update procedure (1570) with the PCF 222, as described above. Other steps may be added to the method (1700), including the SMF 220 and the UDM 216 perform an optional SMF-UDM UE context update procedure (765), as described above.

Figure 18:
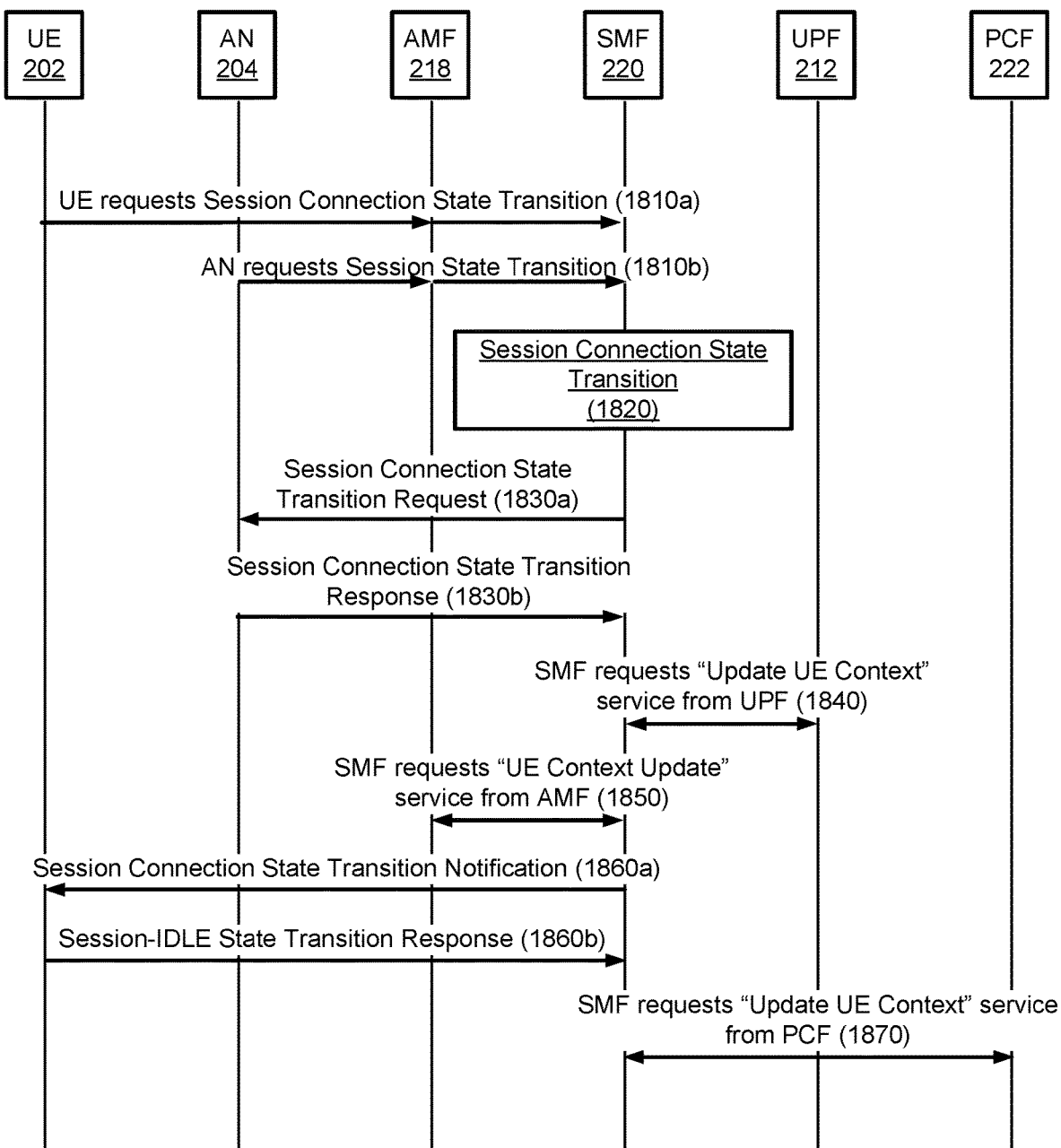
FIG. 18 illustrates, in a message flow diagram, an example of a PDU session connection state transition procedure, in accordance with an embodiment of the present invention.

FIG. 18 illustrates, in a message flow diagram, an example of a PDU session connection state transition procedure (1800), in accordance with an embodiment of the present invention. The UE 202 may have its own logic to determine whether the session connection state of a session can be changed. The AN 204 may monitor UL/DL activities of the PDU session to request the SMF 220 to change the session connection state to Session-IDLE. The procedure (1800) may be triggered by the UE 202 or by the AN 204. A first possible trigger for the PDU session connection state transition procedure occurs when the UE 202 sends to the SMF 220 a session connection state transition request (1810*a*) (either Session-ACTIVE or Session-IDLE). The message (1810*a*) may include the temp UE ID, the SM-NSSAI(s), the session ID(s), and the new session connection state. A special value of the session ID (e.g., wildcard) may be used to represent that all the PDU sessions being served by the same SM indicated in SM-NSSAI are in the idle state. Another possible trigger for the PDU session connection state transition procedure occurs when the AN 204 monitors PDU session activities of all PDU sessions and the AN 204 detects no UL and DL packets of a session after a Session Inactive Timer set by the SMF 220 during a session establishment procedure (700). The AN 204 sends to the SMF 220 a Session-IDLE state transition request (1810*b*), which requests to set the state of a single PDU session, or multiple PDU sessions, to the Session-IDLE state. The message may include the temp UE ID, the SM-NSSAI(s), the session ID(s) and the AN ID. A special value of the session ID (e.g., wildcard) may be used to represent that all the PDU sessions being served by the same SM indicated in SM-NSSAI are in the idle state.

The parameter for the session connection state of the UE context of the SM is set to the new state as requested (1820). Next, the SMF 220 may notify the AN 204 of the session connection state transition (1830*a*). The notification may include the UE ID, the session ID, and other information. If the session connection state is changed to Session-IDLE, then the SMF 220 may request the AN 202 to release PDU session information, including NG3 tunnel information. The AN 204 may also release radio resources that serve the PDU session. If the session connection state is changed to Session-ACTIVE, then the SMF 220 may send to the AN the PDU session context, including the NG3 tunnel information and QoS profile. The AN 204 may then prepare radio resources to serve the PDU session according to the QoS profile. If the QoS flows require admission control, the AN 204 may perform the admission control. Next, the AN 204 may send to the SMF 220 a session connection state transition response (1830*b*). The response may be an acknowledgement or a error (cause) code. If the response is a cause code, then the remaining steps in the procedure are not performed.

If the response (1830*b*) is not a cause code, then the SMF 220 may request the UPF 212 to perform an "Update UE Context" service (1840). The SMF 220 may request the UPF 212 to release NG3 tunnel information form the UE context in the UPF 212 if the session connection state is changed to Session-IDLE. In this request, the tunnel endpoint ID of the AN 204 may be set to NULL. If the session connection state is changed to Session-ACTIVE, the SMF may request the UPF 212 to add the IP address of the AN 204 for NG3 tunnel information. Next, the SMF 220 may request the AMF 218 to perform an "Update UE Context" service (1850). The session connection state in the UE context of the AMF 218 may be set to the new session connection state. The notification may include the UE ID, the session ID, and new session connection state requested. The AMF 218 may store the session connection state of the session in its UE context.

Next, the SMF 220 may notify the UE 202 of the new session connection state (1860*a*). The notification may include the session ID, the new session connection state, and a cause code if the SMF 220 received a cause code from the AN 204. Next, the UE 202 may send a Session-IDLE state transition response message (1860*b*) to the SMF 220. Next, the SMF 220 requests the PCF 222 to perform an "Update UE Context" service (1870). The new session connection state may be sent to the PCF 222. The service request from the SMF 220 may include the UE ID, the session ID, and the new session connection state. The request (1870) may be the SMF-PCF UE context update procedure (1580), as described above.

Figure 19:
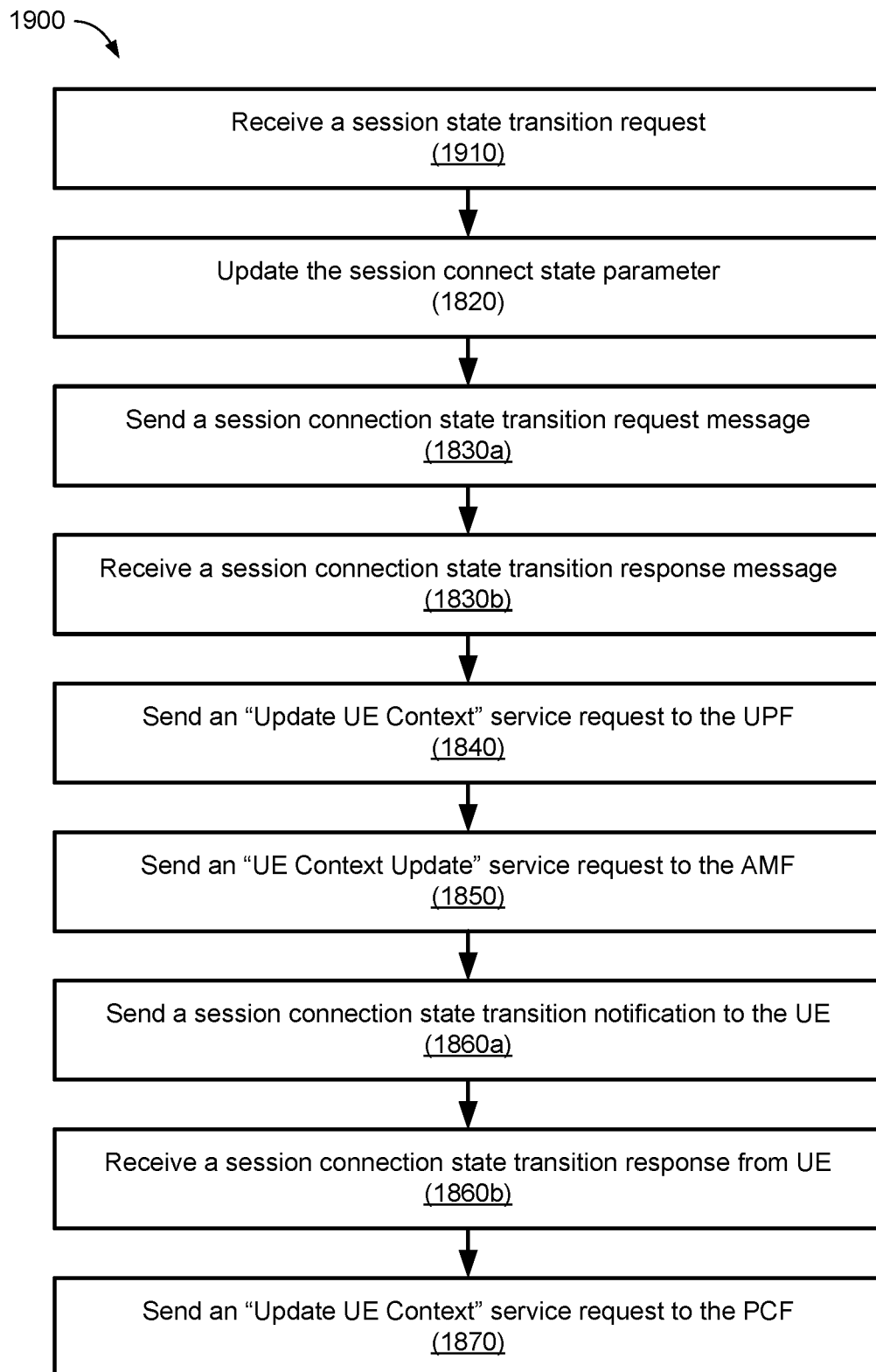
FIG. 19 illustrates, in a flowchart, an example of a method of performing a state transition, in accordance with the PDU session connection state transition procedure.

FIG. 19 illustrates, in a flowchart, an example of a method of performing a state transition (1900), in accordance with the PDU session connection state transition procedure (1800). The method (1900) may be performed by the SMF 220. The SMF 220 may be configured to receive a session state transition request (1910). The request may be from the UE 202 or from the AN 204. Next, the SMF 220 may update the session connect state parameter of the UE context of the SM to the requested connection state (1820). Next, the SMF 220 may send a session connection state transition request message to the AN 204 (1830*a*). Next, the SMF 220 may receive a session connection state transition response message from the AN 204 (1830*b*). Next, the SMF 220 may send an "Update UE Context" service request to the UPF 212 (1840). Next, the SMF 220 may send an "UE Context Update" service request to the AMF 218 (1850). Next, the SMF 220 may send a session connection state transition notification to the UE 202 (1860*a*). Next, the SMF 220 may receive a session connection state transition response from the UE 202 (1860*b*). Next, the SMF 220 may send an "Update UE Context" service request to the PCF 222 (1870). Other steps may be added to the PDU session connection state transition procedure (1800).

Figure 20:
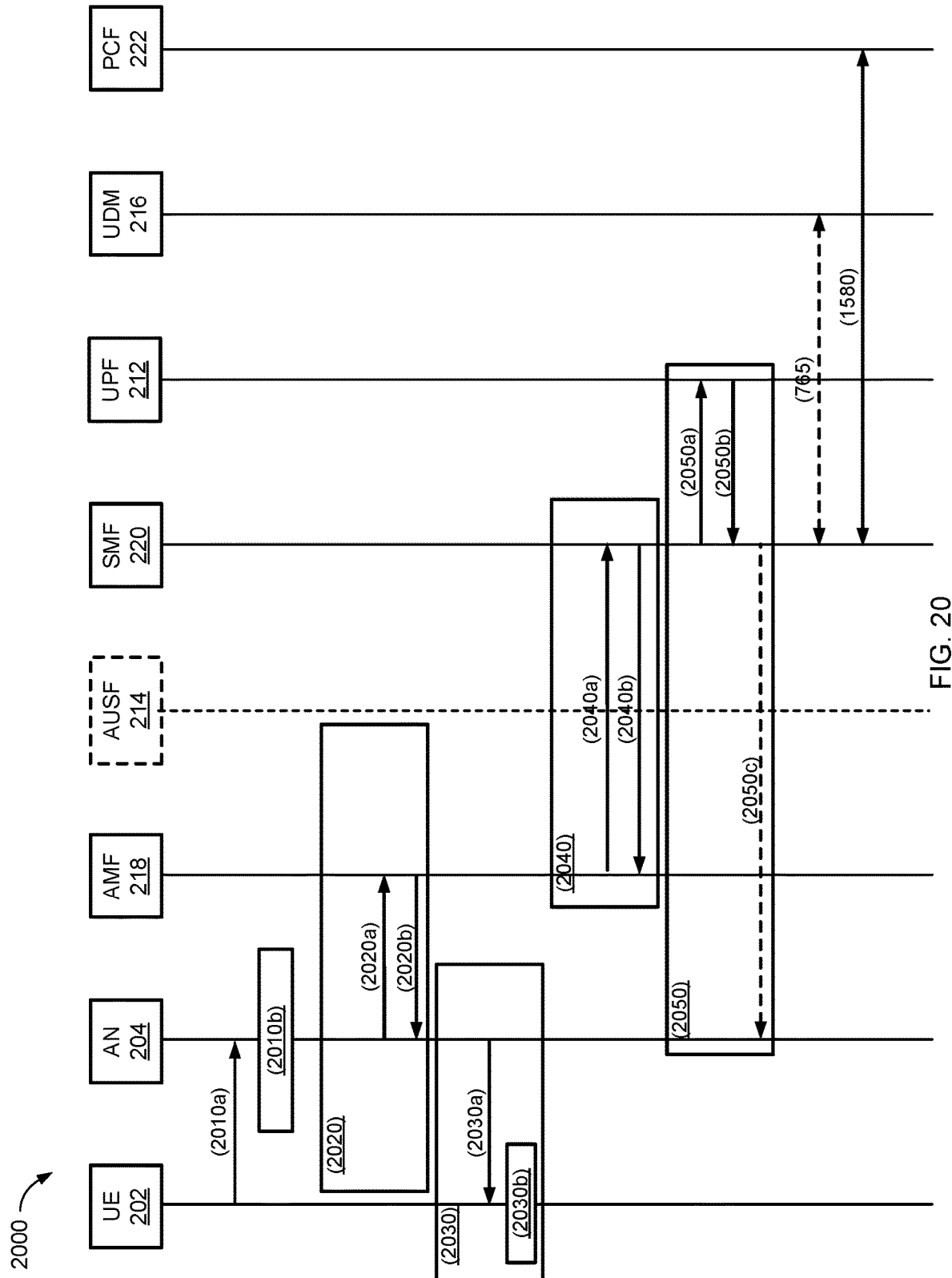
FIG. 20 illustrates, in a message flow diagram, an example of an RRC suspend procedure, in accordance with an embodiment of the present invention.

FIG. 20 illustrates, in a message flow diagram, an example of an RRC suspend procedure (2000), in accordance with an embodiment of the present invention. A result of this procedure (2000) may be the transitioning of a PDU session from an active state to the PDU Session-IDLE state. The UE 202 may have its own logic to determine whether the state of RRC can be suspended to save energy, but without releasing the current session(s). In this scenario, the state of the current session(s) may be set to Session-IDLE in the AN 204, the UPF 212, the SMF 220, the PCF 222, and optionally in the UDM 216. The UE 202 may have multiple PDU sessions, where each session may be served by a single UPF 212 or multiple UPFs 212. The UE may have access to multiple network slices, where each slice may have a separate SMF 220 to serve the UE 202. The RRC suspend procedure (2100) may be triggered by the UE 202 or the AN 204. A first possible trigger for the Session-IDLE state transition occurs when the UE 202 sends to the AN 204 a UE-AN RRC suspend request message (2010*a*). A second possible trigger for the Session-IDLE state transition occurs when the AN 204 detects no activities in the UL and the DL (2010*b*). After a UE-Activity-Timeout timer expires, the AN 204 may suspend the RRC connection.

Next, the AN 204 and the AMF 218 may perform an AN-AMF UE CN state update procedure (2020). The AN 204 may send to the AMF 218 an AN-AMF UE CN-IDLE state transition request message (2020*a*), which may include the temp UE ID, the new CN-IDLE state of the UE 202, and a cause code "UE Requests RRC Suspension" (corresponding to step 2010*a*) or "All Sessions Idle" or "No Data Activities" (corresponding to step 2010*b*). The AMF 218 may then change the state of the UE 202 to CN-IDLE and stop the AMF 218 procedures with the UE 202. The AN may then send to the UE 202 a AN-AMF UE CN-IDLE state transition response message (2020*b*).

Next, the AN 204 and the UE 202 may perform a UE-AN RRC suspend procedure (2030). The AN 204 may send to the UE 202 a UE-AN RRC suspend response message (2030*a*), which may include a cause code and a RRC resume ID. The value of the cause code may be the same as the cause code in step (2020*a*). The AN 204 may then deactivate all AS signaling procedures and mark all DRBs in a suspended state. Then, the UE 202 may perform a UE RRC suspend procedure (2030*b*).

Next, the AMF 218 and the SMF(s) 220 may perform an AMF-SMF UE CN-IDLE state update procedure (2040). The AMF 218 may send to the SMF(s) 220 an AMF-SMF UE CN-IDLE state transition request message (2040*a*), which may contain the temp UE ID, the new CN-IDLE state of the UE 202, and the optional cause code as in step (2020*a*). Then, the SMF(s) 220 may send to the AMF 218 an AMF-SMF UE CN-IDLE state transition response message (2040*b*). By acknowledging the UE CN-IDLE state transition request message received from the AMF 218, the SMF 220 may implicitly assume that the AN 204 has placed all PDU sessions of the UE 202 in the Session-IDLE state.

Next, the SMF 220 may perform a SMF deactivate all sessions procedure (2050) to place the PDU sessions in the Session-IDLE state in the UPF(s) 220. The SMF 220 may send to the UPF(s) 212 that serve the UE's PDU session(s) a SMF-UPF deactivate all sessions request message (2050*a*), which may indicate that the state of the PDU session is to be changed to the Session-IDLE state. The message (2050*a*) includes the temp UE ID and the session ID(s) (or a wildcard parameter). The wildcard parameter (which may be a special value for a session ID) may indicate that the state of the PDU sessions being served by the UPF 212 should be set to "Session-IDLE". Then, the UPF 212 may set the field "Session-State" of the UE's PDU session context to Session-IDLE. The UPF 212 may follow the SM policy in the Keep-UE-Context-For-Idle-Sessions parameter. If in this UPF 212, the UE 202 has no other active PDU session (served by other RATs), and if the value of the Keep-UE-Context-For-Idle-Sessions parameter is set to "Keep", then the UPF 212 (and the SMF 220) may keep the UE context regardless of session state. If in this UPF 212, the UE 202 has no other active PDU session (served by other RATs), and if the value of the Keep-UE-Context-For-Idle-Sessions parameter is set to "Can-Be-Released", then the UPF 212 may keep the complete UE context, depending on the storage resource.

Next, the UPF 212 may send to the SMF 220 a SMF-UPF deactivate all sessions response message (2050*b*). If the UE context is released, then the UPF 212 may send to the SMF 220 the complete UE context, including the UE's SM context and the UE's charging context. It is noted that the UPF 212 may also send to the PCF 222 the UE charging context. If the UPF 212 releases the UE context, then the SMF 220 may receive the complete UE context from the UPF 212 and may store the complete UE context in local memory. It is noted that the UPF's UE context and the SMF's context may have some common fields, such as the UE temp ID, the IP address(es), and the TFT. To save memory resources, the SMF 220 may store only the additional UPF's UE context parameters that SMF's UE context does not have. Optionally, the SMF 220 may notify the AN 204 that all PDU sessions are in the Session-IDLE state by sending a SMF-AN all session idle notification message (2050c). Also optionally, the SMF 220 and the UDM 216 may perform a SMF-UDM UE context update procedure (765), as described above. Next, the SMF 220 and the PCF 222 may perform a SMF-PCF UE context update procedure (1580), that may include the UE CN state and the state of sessions that change their session state. It is noted that, optionally, the PCF 222 function may also access the UDM 216 to obtain the UE context if the policy is to store the UE context in UDM 216.

Figure 21:
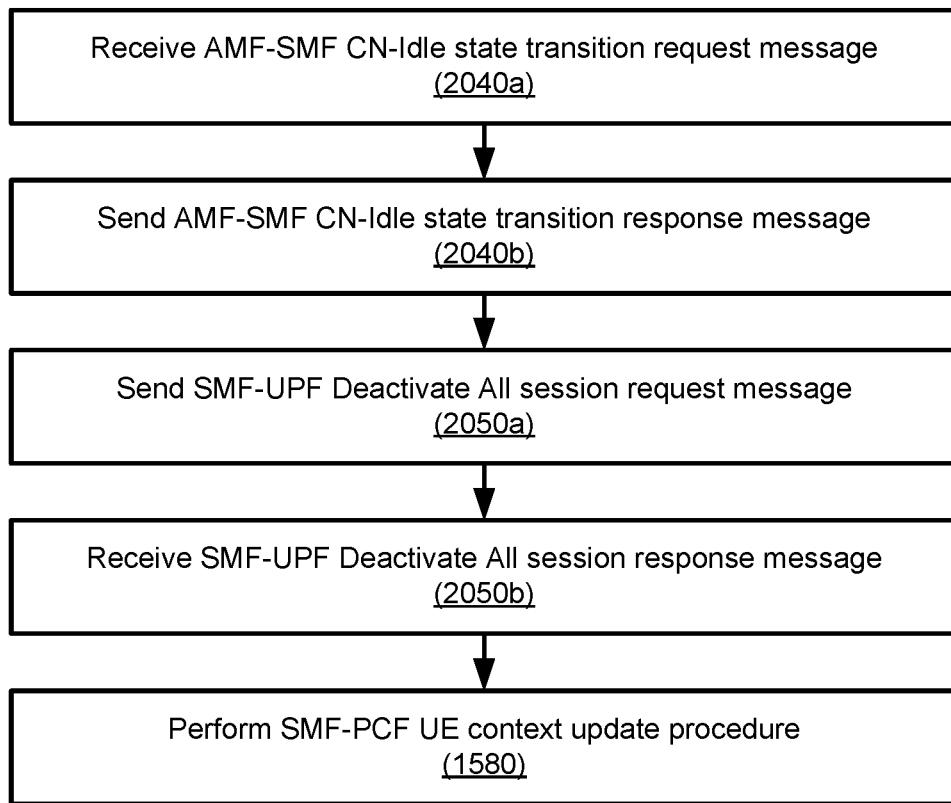
FIG. 21 illustrates, in a flowchart, an example of a method of transitioning a session state, in accordance with the RRC suspend procedure.

FIG. 21 illustrates, in a flowchart, an example of a method of transitioning a session state (2100), in accordance with the RRC suspend procedure (2000). The method (2100) is performed by the SMF 220. The SMF 220 may be configured to receive from the AMF 218 the AMF-SMF UE CN-Idle state transition request message (2040a), as described above. The SMF 220 may then send to the AMF 218 the AMF-SMF UE CN-IDLE state transition response message (2040b), as described above. Next, the SMF 220 may send to the UPF 212 the SMF-UPF deactivate all session request message (2050a), as described above. The SMF 220 then receives from the UPF 212 the SMF-UPF deactivate all session response message (2050b), as described above. Next, the SMF 220 performs a SMF-PCF UE context update procedure (1580) with the PCF 222, as described above. Other steps may be added to the method (2100), including the SMF optionally sending the SMF-AN all sessions idle notification message to the AN 204, and performing the SMF-UDM UE context update procedure (765), as described above.

Figure 22:
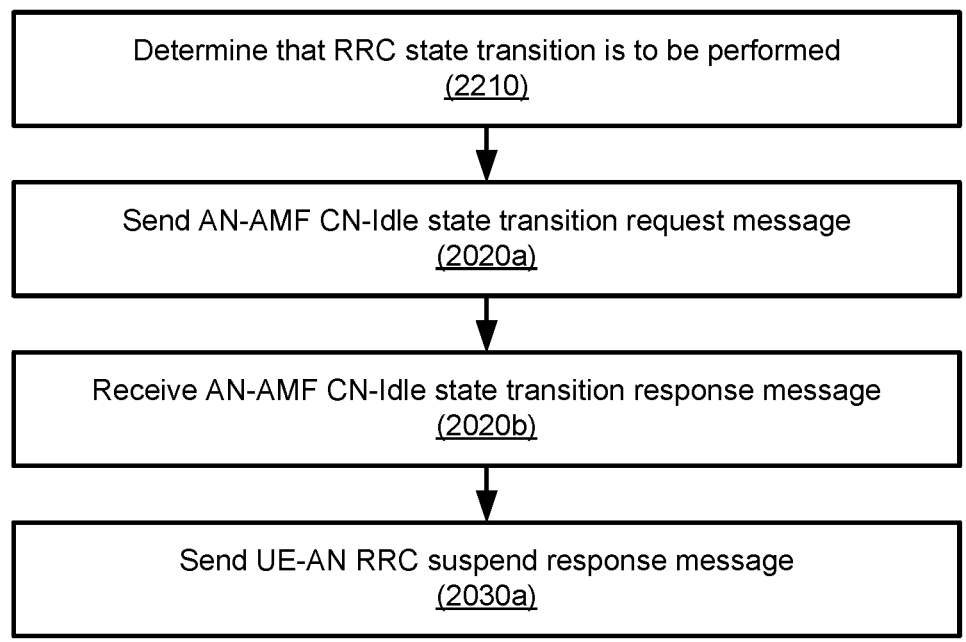
FIG. 22 illustrates, in a flowchart, another example of a method of transitioning a session state, in accordance with the RRC suspend procedure.

FIG. 22 illustrates, in a flowchart, an example of a method of transitioning a session state (2200), in accordance with the RRC suspend procedure (2000). The method (2200) is performed by the AN 204. The AN 204 may be configured to determine to release a session (2210). The determination (2210) may be based on receiving a UE-AN RRC suspend request message from the UE 202. Alternatively, the determination (2210) may also be based on the AN 204 detecting no activities in the UL and DL. Once the determination (2210) is made, the AN 204 may send the AN-AMF UE CN-IDLE state transition request message (1620a) to the AMF 218, as described above. The AMF 218 may then send the AN-AMF UE CN-IDLE state transition response message (1620b) to the AN 204, as described above. Next, the AN 202 may send the UE-AN RRC suspend response message (1630a), as described above. Other steps may be added to the method (1800), including AN 204 receiving the SMF-AN all session idle notification message (1650c) from the SMF 220, as described above.

Figure 23:
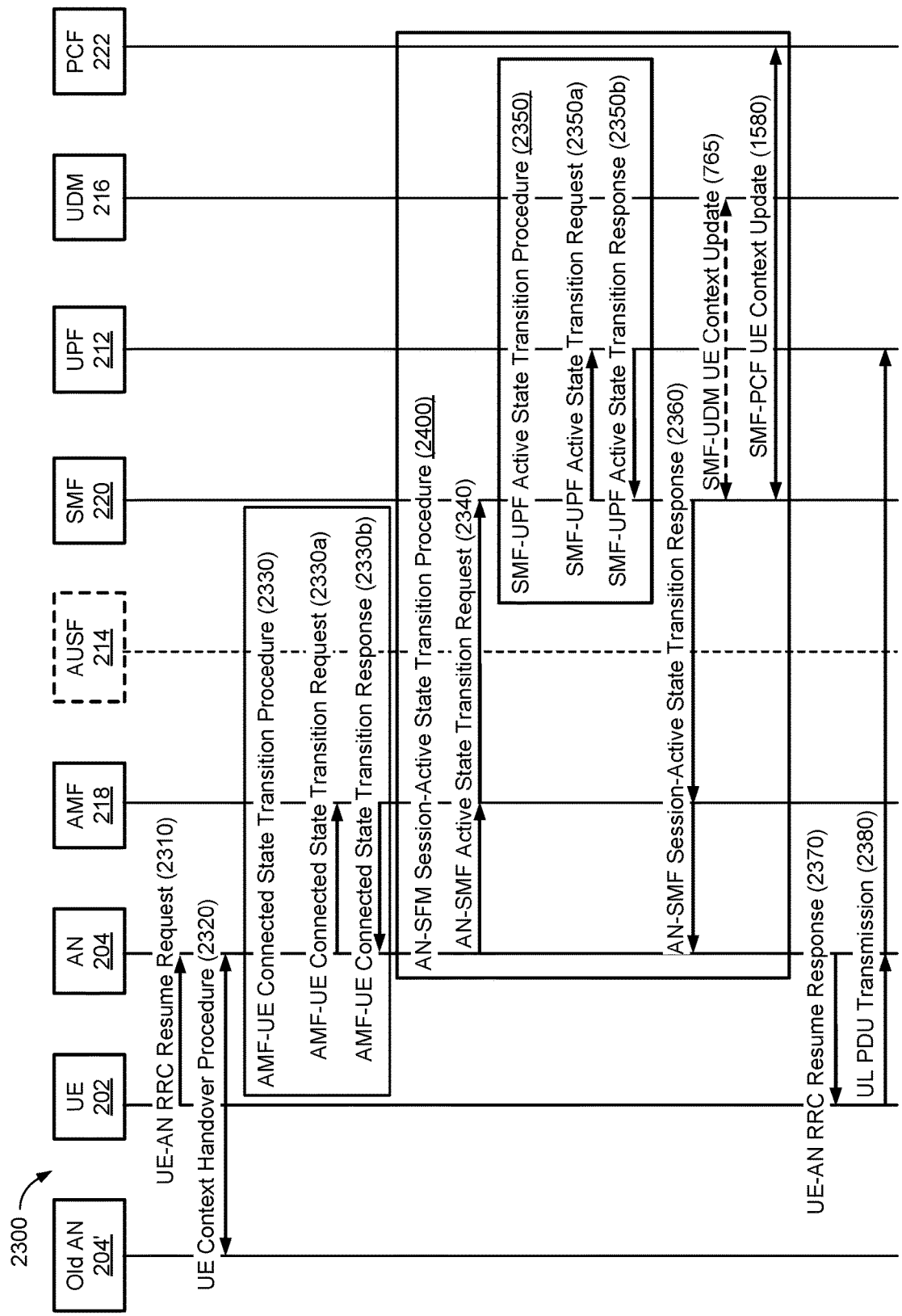
FIG. 23 illustrates, in a message flow diagram, an example of a RRC resume procedure, in accordance with an embodiment of the present invention.

FIG. 23 illustrates, in a message flow diagram, an example of a RRC resume procedure (2300), in accordance with an embodiment of the present invention. The procedure (2300) may be triggered when the UE RRC is in a RRC-Suspended state and the UE 202 has data to send in the UL.

The procedure (2300) is triggered when the UE 202 sends to the AN 204 a UE-AN RRC resume request message (2310). The message may include at least the RRC resume ID. Optionally, the RRC resume request includes the DRB IDs or Session ID to be resumed. If the AN ID denotes the previous (former) AN 204' when the RRC was suspended (note, the former AN ID is provided in the RRC resume ID), then the new serving AN 204 and the former AN 204' perform a UE context handover procedure (2320) so that the new serving AN 204 can get the UE context from the former AN 204'. After sending the UE context to the new serving AN 204, the former AN 204' may release the UE context.

Next, the AN 204 and the AMF 218 perform an AN-AMF UE CN-CONNECTED state transition procedure (2330). The AN 204 may check the UE context to find the serving AMF 218. The AN 204 may send to the AMF 218 an AN-AMF UE CN-CONNECTED state transition request message (2330a). The message may include the temp UE ID and the new CN-CONNECTED state. Next, the AMF 218 may send to the AN 204 an AN-AMF UE CN-CONNECTED state transition response message (2330b). If the AMF 218 can support the UE 202, the UE CN state transition response message may include an acknowledgement. Otherwise, the message may include a cause code.

It should be noted that if the RRC resume request in step (2310) does not include a DRB ID or Session ID, then the following AN-SMF Session-ACTIVE state transition procedure (2400) is not performed. Furthermore, if the CN-CONNECTED state transition response includes a cause code, the UE 202 performs a re-attachment procedure and the procedure (2400) and step (2380) are not performed. In step (2370), the RRC resume response may include the cause code generated by the AMF 218 in step (2330b). Moreover, if there are errors in step (2320) or (2330), the procedure (2400) and step (2380) are not performed and the UE 202 does not resume the RRC suspended connection. In step (2370), the AN 204 may send a cause code to the UE 202 so that the UE may initiate a new (re-)attach procedure (300).

The AN 204 may send, via the AMF 218, to the SMF 220 an AN-SMF Session-ACTIVE state transition request message (2340), which may include the session ID(s), its new state Session-ACTIVE, the SM-NSSAI to be recognized by AMF 218 for selecting the SMF, and the temp UE ID. The message may include a cause code "RRC Resumed by UE". If the value of the Activate-Session-when-RRC-Resumed parameter is set to "Yes" for some PDU sessions, the AN 204 may include the session ID(s) of those PDU sessions in the Session-ACTIVE state transition request. In the case where the UE 202 is served by a new AN 204, the AN-SMF Session-ACTIVE state transition request may also include an AN path switch request message, which may include the IP address of the new serving AN 204.

Next, the SMF 220 and the UPF 212 may perform a SMF-UPF Session-ACTIVE state transition procedure (2350). The SMF 220 may send to the UPF 212 a SMF-UPF Session-ACTIVE state transition request message (2350a). The message may include the temp UE ID, the session IDs and the new state Session-ACTIVE. If the UPF 212 has released the UE context, then the SMF 220 may also send to the 212 UPF the previously stored UE context in the SMF-UPF Session-ACTIVE state transition request message. In the case where the UE 202 is served by a new AN 204, the SMF-UPF Session-ACTIVE state transition request may also include the AN path switch request, which may include the IP address of the new serving AN 204. The UPF 212 prepares its resources according to the UE context. If the resources at the UPF 212 are ready, the UPF 212 may send to the SMF 220 a SMF-UPF Session-ACTIVE state transition response message (2350b) with an acknowledgment. If the UPF 212 has enough resources to support the resumed session(s), then the session state in the UPF's 212 UE context may be changed to Session-ACTIVE. If the UPF 212 does not have enough resources to support the resumed session(s), the Session-ACTIVE state transition response message may include a cause code.

The SMF 220 may send to the AN 204 an AN-SMF Session-ACTIVE state transition response message (2070), which may include the state of the requested session IDs. In its UE context, the AN 204 may change the session state from Session-IDLE to Session-ACTIVE. For sessions that are not activated due to errors in steps (2030) and (2050), the AN-SMF Session-ACTIVE state transition response may include a cause code. Optionally, the SMF 220 and the UDM 216 may perform a SMF-UDM UE context update procedure (765), as described above.

The SMF 220 and the PCF 222 may perform a SMF-PCF UE context update procedure (1580). Next, the AN 204 may send to the UE 202 a UE-AN RRC resume response message (2370). The message may include either an acknowledgement or cause codes for the RRC resume request. The cause codes may indicate an error of the AN 204 (in step (2320)), the AMF (in step (2330), or the RRC resume errors. If in step (2310), the UE-AN RRC resume request included DRB IDs (or session IDs), the UE-AN RRC resume response message may also include either an acknowledgement or cause code for each requested DRB IDs.

The UE 202 has UL data to send in the DRB that was requested in step (2310). The UE may send to the AN 204 the UL grant request message (2380). The AN 204 provides resources for the DRB in the UL. After that, the UE may send data over the DRB.

Figure 24:
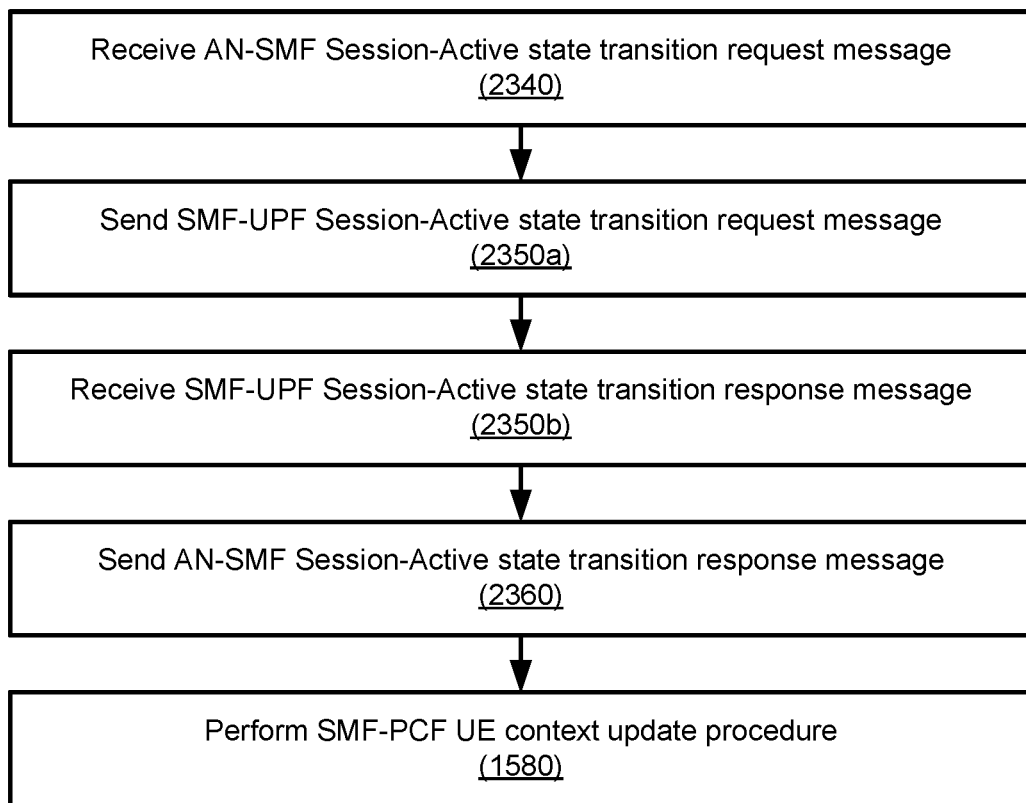
FIG. 24 illustrates, in a flowchart, an example of a method of transitioning a session state, in accordance with the RRC resume procedure.

FIG. 24 illustrates, in a flowchart, an example of a method of transitioning a session state (2400), in accordance with the RRC resume procedure (2300). The method (2400) is performed by the SMF 220. The method comprises the SMF 220 configured to receive from the AN 204, via the AMF 218, the AN-SMF Session-ACTIVE state transition request message (2340), as described above. Next, the SMF 220 may send to the UPF 212 the SMF-UPF Session-ACTIVE state transition request message (2350a), as described above. The SMF 220 then receives from the UPF 212 the SMF-UPF Session-ACTIVE state transition response message (2350b), as described above. Next, the SFM 220 may send to the AN 204, via the AMF 218, the AN-SMF Session-ACTIVE state transition response message (2360), as described above. Next, the SMF 220 performs a SMF-PCF UE context update procedure (1580) with the PCF 222, as described above. Other steps may be added to the method (2400), including the SMF optionally performing the SM-UDM UE context retrieval procedure, performing the SMF-UE context update procedure (765), and receiving from the UE (via the AN 204) the UL grant request message, as described above.

Figure 25:
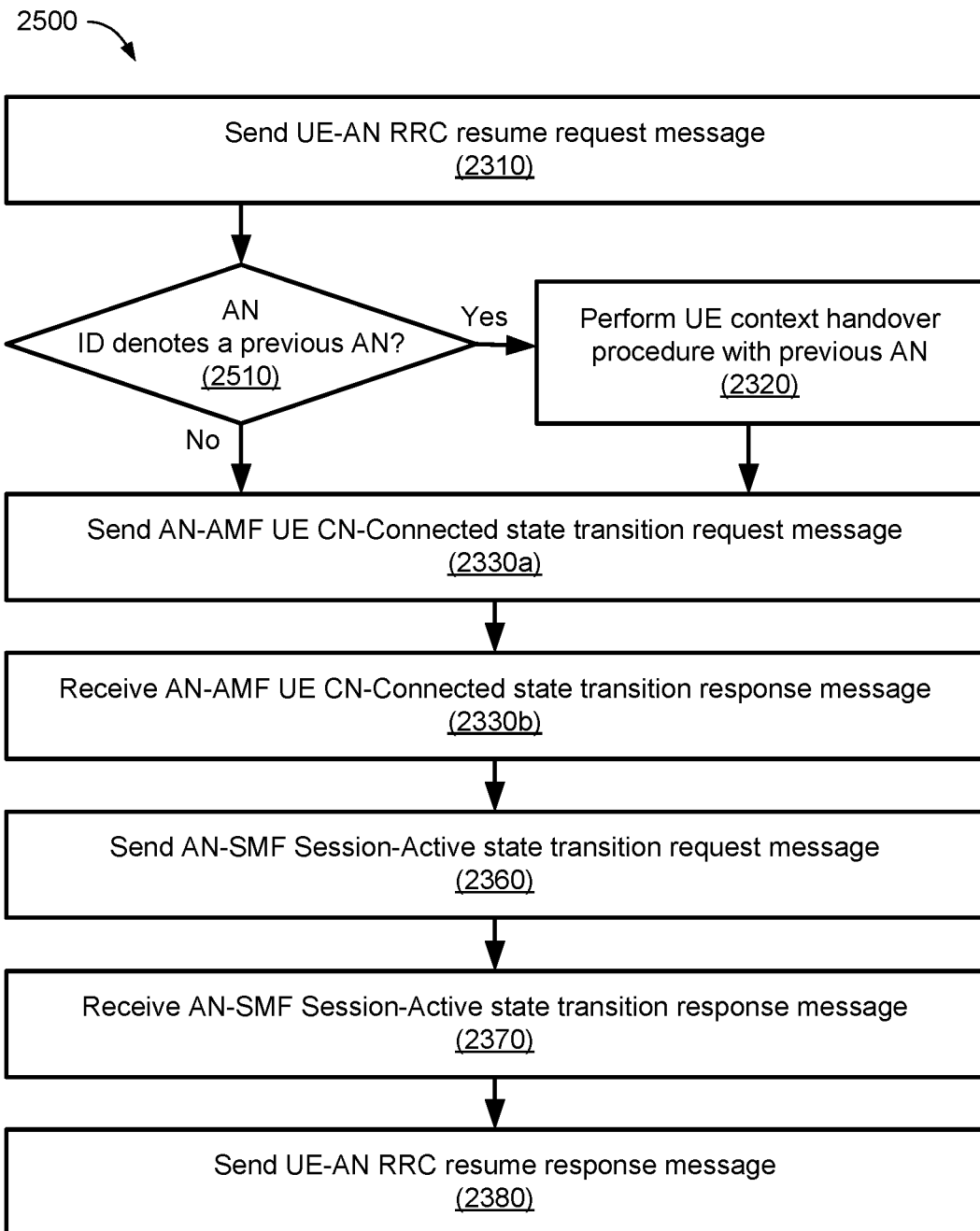
FIG. 25 illustrates, in a flowchart, an example of a method of transitioning a session state, in accordance with the RRC resume procedure.

FIG. 25 illustrates, in a flowchart, an example of a method of transitioning a session state (2500), in accordance with the RRC resume procedure (2300). The method (2500) is performed by the AN 204. The method comprises the AN 204 receiving the UE-AN RRC resume request (2310) from a UE 202, as described above. Next, if the AN ID denotes a previous AN 204' (2510), then the serving AN 204 and the previous AN 204' perform the UE context handover procedure (2320), as described above. The AN 204 may send to the AMF 218 the AN-AMF UE CN-CONNECTED state transition request message (2330a), as described above. The AN 204 may then receive the AN-AMF UE CN-CONNECTED state transition response message (2330b) from the AMF 218. Next, the AN 204 may send to the SMF 220, via the AMF 218, the AN-SMF Session-ACTIVE state transition request message (2340), as described above. The AN 204 may then receive from the SMF 220, via the AMF 218, the AN-SMF Session-ACTIVE state transition response message (2350), as described above. Next, the AN 204 may send to the UE the UE-AN RRC resume response message, as described above. Other steps may be added to the method (2500), including forwarding UL PDU transmissions received from the UE 202 to the UPF 212.

Figure 26:
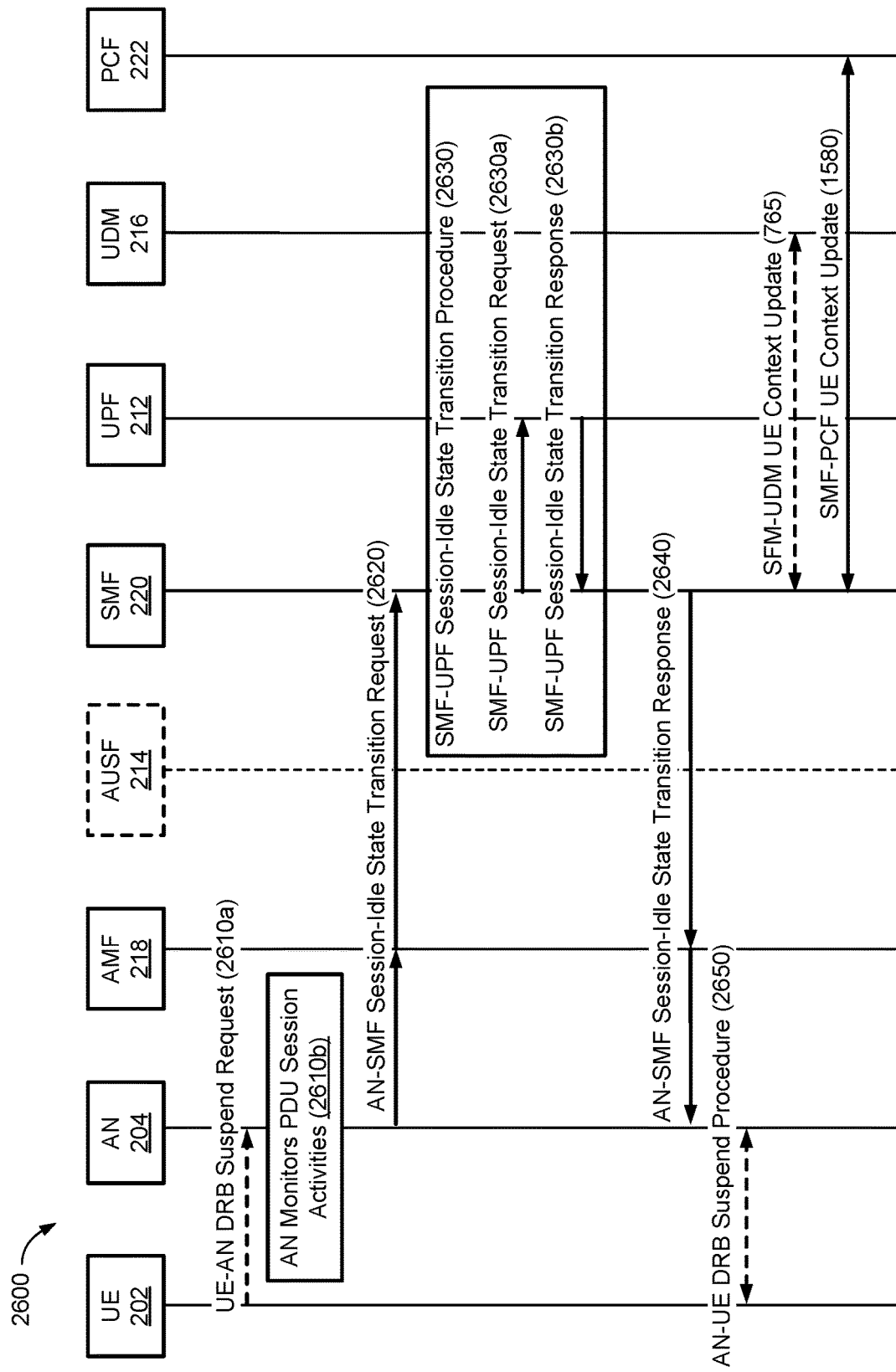
FIG. 26 illustrates, in a message flow diagram, an example of an individual PDU Session-IDLE state transition procedure, in accordance with an embodiment of the present invention.

FIG. 26 illustrates, in a message flow diagram, an example of an individual PDU Session-IDLE state transition procedure (2600) triggered by the UE 202 or the AN 204, in accordance with an embodiment of the present invention. The UE 202 may have its own logic to determine whether the state of RRC can be suspended to save energy, but without releasing the current session(s). In this scenario, the state of the current session(s) may be set to Session-IDLE in the AN 204, the UPF 212, the SMF 220, the PCF 222, and optionally in the UDM 216. The UE 202 may have multiple PDU sessions, where each session may be served by a single UPF 212 or multiple UPFs 212. The UE 202 may have access to multiple network slices, where each slice may have a separate SMF 220 to serve the UE 202. There is one-to-one mapping between the PDU session ID and the DRB ID.

The individual PDU Session-IDLE state transition procedure (2600) may be triggered by the UE 202 and by the AN 204. A first possible trigger for the individual PDU Session-IDLE state transition procedure (2600) occurs when the UE 202 sends to AN 204 a DRB-Suspend request message (2610a). A second possible trigger for the individual PDU Session-IDLE state transition procedure (2600) occurs when the AN 204, that is monitoring PDU session activities of all PDU sessions, detects no UL and DL packets (2610b) of a session after Session-Monitor-Timeout timer. It is noted that each PDU session may have a Session-Monitor-Timeout parameter configured by the PCF 222. The SMF 220 may obtain the Session-Monitor-Timeout parameter from the PCF 222 and send it to the AN 204 during the session establishment procedure (700).

The AN 204 may send to the SMF 220 an AN-SMF Session-IDLE state transition request message (2620), which may request to set a single or multiple PDU sessions to the Session-IDLE state. The message (2620) may include the temp UE ID, the SM-NSSAI(s), and the session ID(s). A special value of a session ID (e.g., wildcard) may indicate that the PDU sessions being served by the same SM indicated in SM-NSSAI should be set to the idle state.

Next, the SMF 220 and the UPF(s) 212 may perform a SMF-UPF Session-IDLE state transition procedure (2630). The SMF 220 may send to the UPF(s) 212 that serve the PDU session(s) SMF-UPF Session-IDLE state transition request message(s) (2630a), indicating the Session-IDLE state of the PDU session(s). The message (2630a) may include the temp UE ID and the session ID(s). A special value of the session ID (e.g., wildcard) may indicate that the state of the PDU sessions being served by the UPF 212 should be set to "Session-IDLE". Next, if there are UL or DL packets in the UPF 212 buffer, the UPF 212 may send to the SMF 220 a SMF-UPF Session-IDLE state transition response message (2630b) that may include a cause code. The state of the session remains Session-ACTIVE. If there are no DL packets in the UPF 212 buffer, the UPF 212 may set the field "Session-State" of UE's PDU session context to Session-IDLE. The UPF 212 may send to the SMF 220 a SMF-UPF Session-IDLE state transition response message (2630b) with an acknowledgement. If there are no more active sessions in the same UPF 212, the UE context could be released and the UPF 212 may send to the SMF 220 the complete UE context, including the SM context and the PCF context.

Next, the SMF 220 may send to the AN 204 an AN-SMF Session-IDLE state transition response message (2640) (response to step (2620)). The message (2640) may include either an acknowledgement or the cause code in step (2630b). If the UPF 212 releases the UE context, the SMF 220 may receive the complete UE Context and the charging information from the UPF 212. The SMF 220 may store the complete UE context in a local memory and forward the charging information to the PCF 222 as in step (2670) below. It is noted that the UPF's UE context and the SMF's context may have some common fields, such as the UE temp ID, the IP address(es), and the TFT. To save memory resources, the SMF 220 may store only the UPF's UE context parameters that SMF's UE context does not have.

Next, the AN 204 and UE 202 may optionally perform an AN-UE DRB suspend procedure (2650). The UE 202 may perform a UE DRB suspended procedure. After this step (2650), there may be no AS signaling for the suspended DRB, and there may be no NAS signaling for PDU session associated with the suspended DRB. Also optionally, the SMF 220 and the UDM 216 may perform a SMF-UDM UE context update procedure (765), as described above. However, this step (765) may be mandatory if the SMF 220 releases the UE context. The SMF should then send all of the UE's UP context and the UE's SM context to UDM 216. Next, the SMF 220 and the PCF 222 may perform a SMF-PCF UE context update procedure (1580), that may include a UE CN state, the state of sessions that change their session state, and charging information. It is noted that, optionally, the PCF function 222 may also access the UDM 216 to obtain the UE context if the policy is to store the UE context in the UDM 216. It is further noted that the UPF 212 may directly send to the PCF 222 the charging context.

Figure 27:
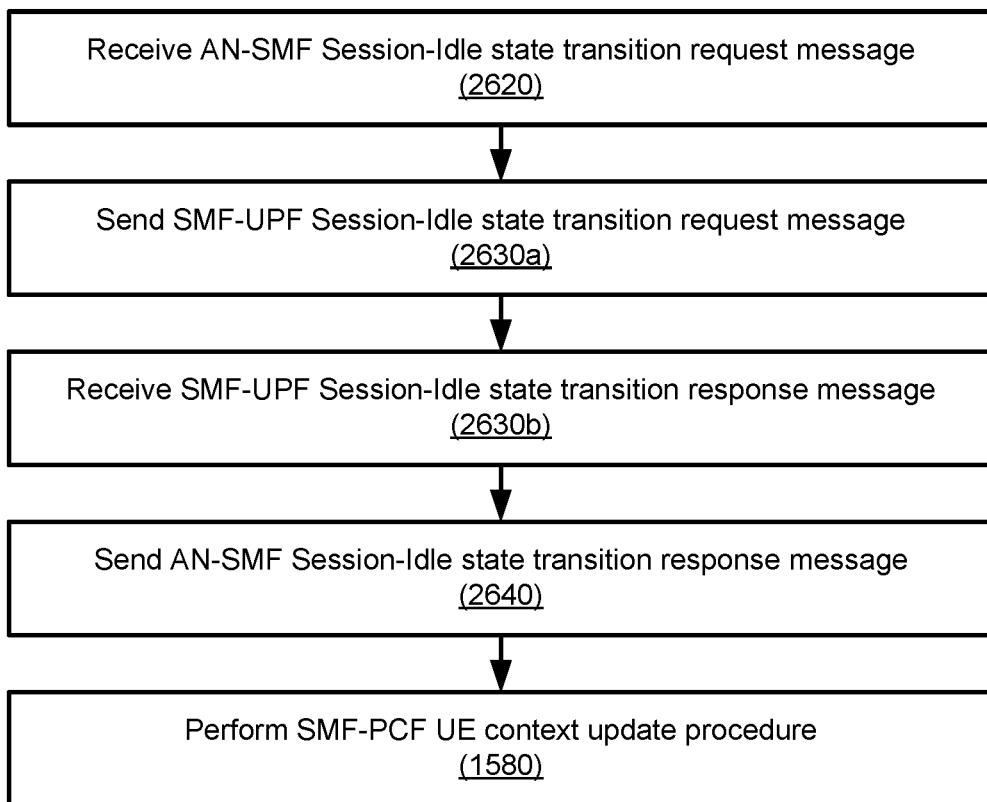
FIG. 27 illustrates, in a flowchart, an example of a method of transitioning a session state, in accordance with the individual PDU Session-IDLE state transition procedure.

FIG. 27 illustrates, in a flowchart, an example of a method of transitioning a session state (2700), in accordance with the individual PDU Session-IDLE state transition procedure (2600). The method (2700) is performed by the SMF 220. The method comprises the SMF 220 configured to receive from the AN 204, via the AMF 218, the AN-SMF Session-IDLE state transition request message (2620), as described above. Next, the SMF 220 may send to the UPF 212 the SMF-UPF Session-IDLE state transition request message (2630a), as described above. The SMF 220 then receives from the UPF 212 the SMF-UPF Session-IDLE state transition response message (2630b), as described above. Next, the SMF 220 may send to the AN 204, via the AMF 218, the AN-SMF Session-IDLE state transition response message (2640), as described above. Next, the SMF 220 performs a SMF-PCF UE context update procedure (1580) with the PCF 222, as described above. Other steps may be added to the method (2700), including the SMF optionally performing the SMF-UDF UE context update procedure (765), as described above.

Figure 28:
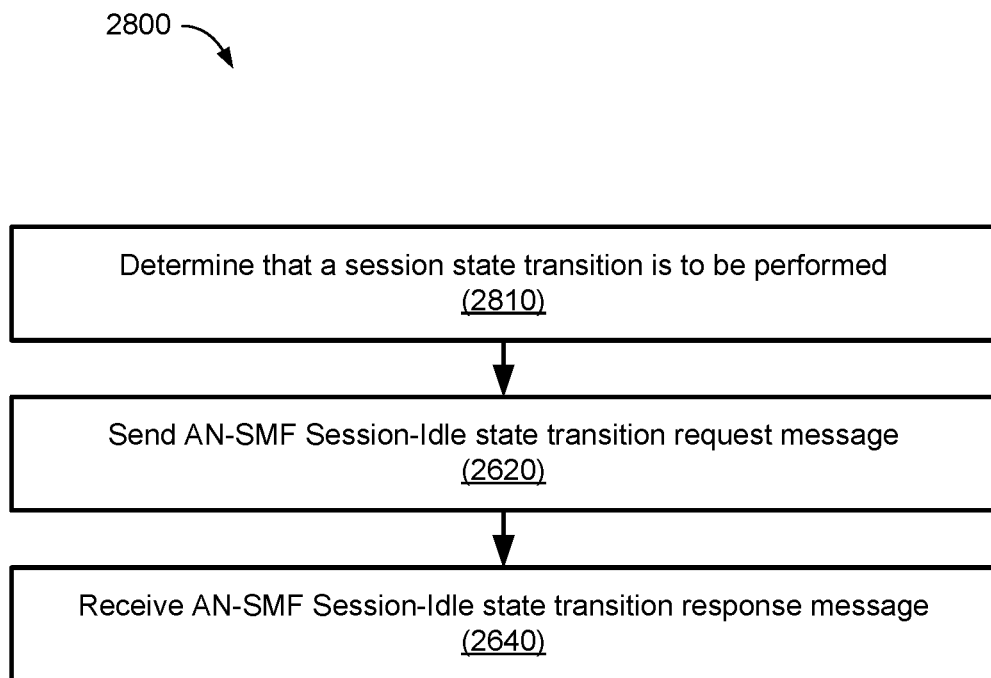
FIG. 28 illustrates, in a flowchart, another example of a method of transitioning a session state, in accordance with the individual PDU Session-IDLE state transition procedure.

FIG. 28 illustrates, in a flowchart, an example of a method of transitioning a session state (2800), in accordance with the individual PDU Session-IDLE state transition procedure (2600). The method (2800) is performed by the AN 204. The method comprises the AN 204 determining that a session state transition is to be performed (2810). The determination (2810) may be made by the AN 204 receiving a UE-AN DRB suspend request (2610a), as described above. The determination (2810) may also be made by the AN 204 that is monitoring PDU session activities of all PDU sessions and detects no UL and DL packets (2610b) of a session after Session-Monitor-Timeout timer, as described above. The AN 204 then may send to the SMF 220, via the AMF 218, the AN-SMF Session-IDLE state transition request message (2620), as described above. Next, the AN 204 may receive from the SMF 220, via the AMF 218, the AN-SMF Session-IDLE state transition response message (2640), as described above. Other steps may be added to the method (2800), including the AN performing the AN-UE DRB suspend procedure (2650), as described above.

Figure 29:
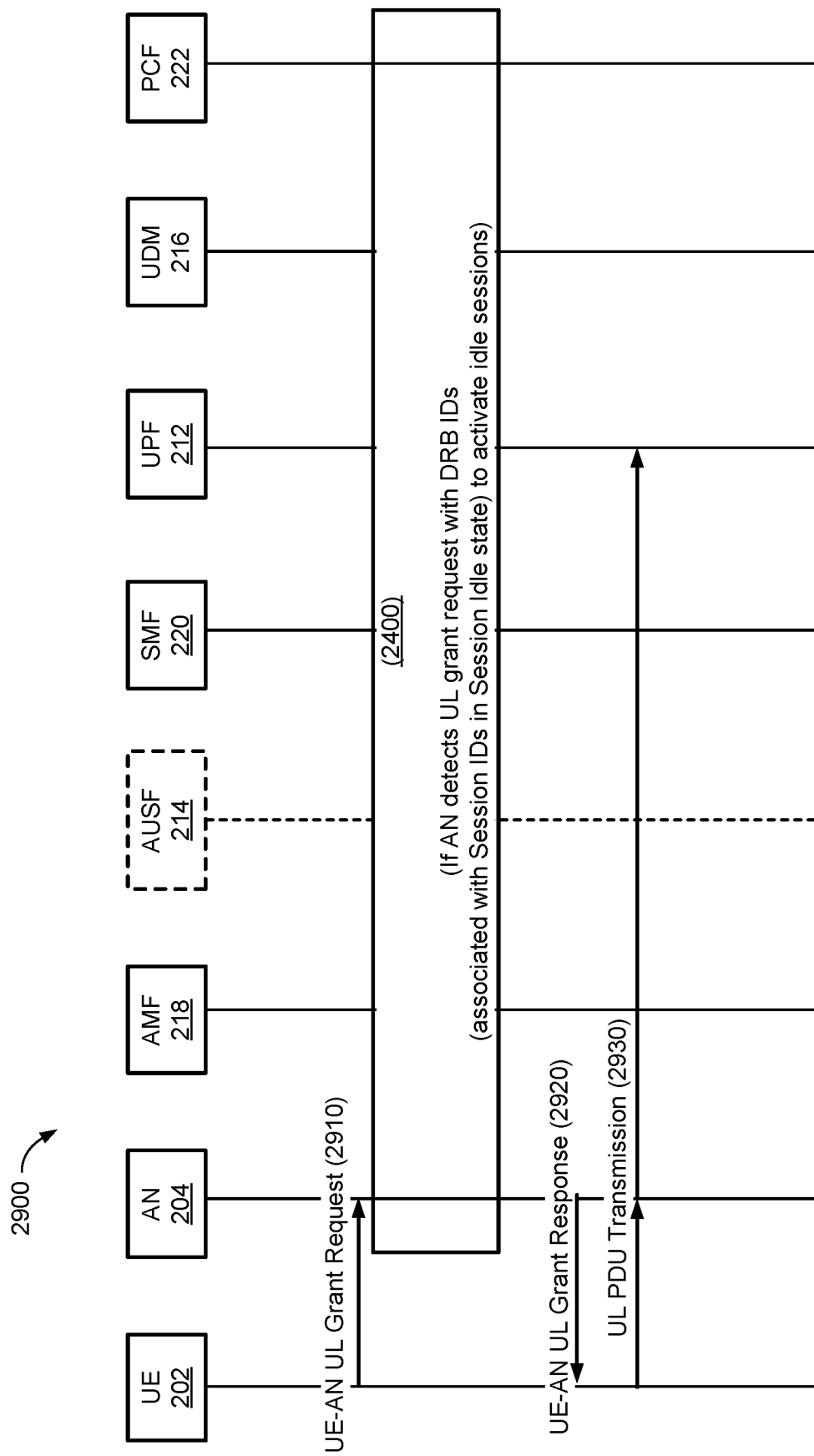
FIG. 29 illustrates, in a message flow diagram, another example of a PDU Session-ACTIVE state transition procedure, in accordance with an embodiment of the present invention.

FIG. 29 illustrates, in a message flow diagram, an example of a PDU Session-ACTIVE state transition procedure (2900), in accordance with an embodiment of the present invention. The procedure (2900) is triggered by a UE UL grant request when the UE 202 is in a RRC-CONNECTED state and has UL data to be sent on a suspended DRB. The UE 202 may send to the AN 204 a UE-AN UL grant request message (2910). The message may include the DRB ID(s). If a DRB is in a suspended state, then the UL grant request may imply a request to resume this DRB. If the sessions with session ID(s) associated with the DRB ID(s) is(are) in a Session-IDLE state, then the procedure (2400) may be followed, as described above. Next, the AN 204 may send to the UE 202 a UE-AN UL grant response message (2920), which may include the DRB ID(s) or session ID(s), and either an acknowledgment or a cause code for each DRB. In the case of a cause code being included for a DRB, the UE 202 may request a new session when the CN 206 cannot resume the idle session. Upon receiving an acknowledgement from the AN 204 in the UE-AN UL grant response message (2920), the UE 202 may send the UL packet to the AN 204 (2930) for the resumed DRB(s). The AN 204 may then forward UL packets (2930) to the UPF 212.

Figure 30:
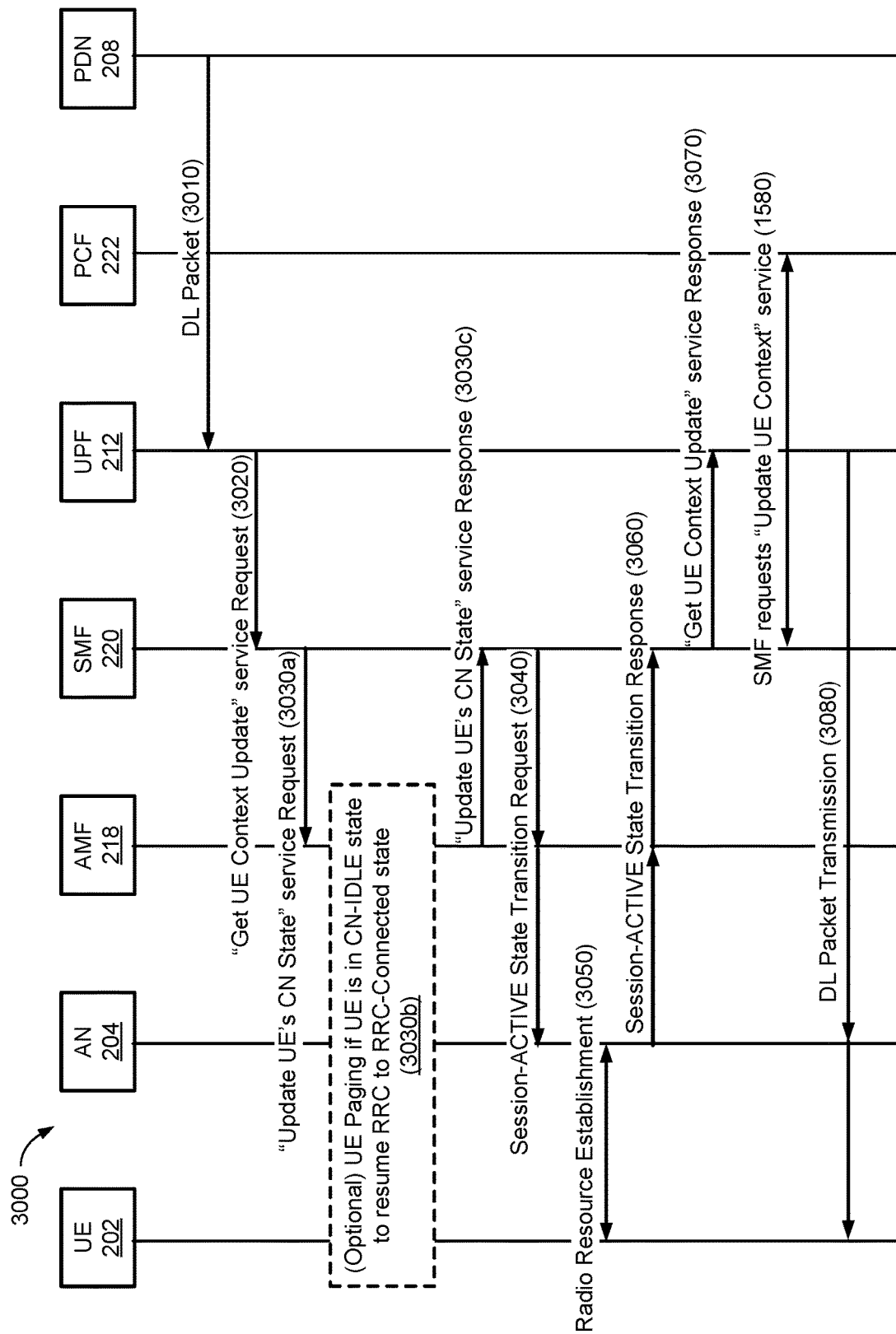
FIG. 30 illustrates, in a message flow diagram, an example of a PDU Session-ACTIVE state transition procedure, in accordance with an embodiment of the present invention.

FIG. 30 illustrates, in a message flow diagram, an example of a PDU Session-ACTIVE state transition procedure (3000), in accordance with an embodiment of the present invention. In this scenario, the current session connection state is in the Session-IDLE state. The UPF 212 may not have NG3 tunnel information in the UE context. The procedure (3000) may be triggered by the UPF 212 receiving a DL packet from a packet data network (PDN) 208. The packet may be buffered in the UPF 212. Next, the UPF 212 may send to the SMF 220a "Get UE Context Update" request message to obtain the NG3 tunnel endpoint ID. Next, the SMF 220 checks the state of the CN 206 in its UE context. If the UE 202 is in the CN-CONNECTED state, then the steps (3030a), (3030b), (3030c) may not be performed.

If the UE 202 is in the CN-IDLE state, the SMF 220 may send an "Update UE's CN State" request (3030a) to the AMF 218 so that the AMF 218 may page the UE paging function. The message (3030a) may include the temp UE ID. Next the AMF 218 may perform a UE paging procedure (3030b). This may involve a UE context handover procedure if the UE 202 is served by a new AN 204. If the AMF 218 successfully pages the UE 202, then the UE enters a CN-CONNECTED state. The AMF 218 may send to the SMF 220 an "Update UE's CN State" (3030c) service, which indicates that the UE 202 is in the CN-CONNECTED state.

Next, the SMF 220 may update the CN-CONNECTED state of the UE 202. The SMF 220 may send to the AN 204 a Session-ACTIVE state transition request (3040) message. The message may include the temp UE ID, the session ID the UE's PDU session context and the QoS profile. Next, the AN 204 may establish radio resources (3050) with the UE 202 for the PDU session. This step (3050) may include admission control, if required. Next, the AN 204 may send to the SMF 220 a Session-ACTIVE state transition response (3060) message which may include the SM-NSSAI, the temp UE ID, the session ID, and either an acknowledgement or a cause code for this session ID.

Next, the SMF 220 may send to the UPF 212 a "Get UE Context Update" service response (3070). If the SMF 220 received a cause code from the AMF 218, then the SMF 220 may send a cause code to the UPF 212 to release the UE context and drop received packets. The SMF 220 may also release the UE context. If the SMF 220 receives a cause code from the AN 204, then the SMF 220 may send a cause code to the UPF 212. The UPF 212 may then drop received packets. If the SMF 220 receives an acknowledgement in steps (3030) and (3060), then the SMF 220 may send to the UPF 212 a "Get UE Context Update" response (3070) which may include the UE ID, the session ID and the NG3 tunnel endpoint ID. Next, the SMF 220 and the PCF 222 perform the SMF-PCF UE context update procedure (1580), as describe above. The SMF 220 may request the PCF 222 to perform an "Update UE Context" service where the new session connection state may be sent to the PCF 222. The service request from the SMF 220 may include the UE ID, the session ID and the new session connection state.

Figure 31:
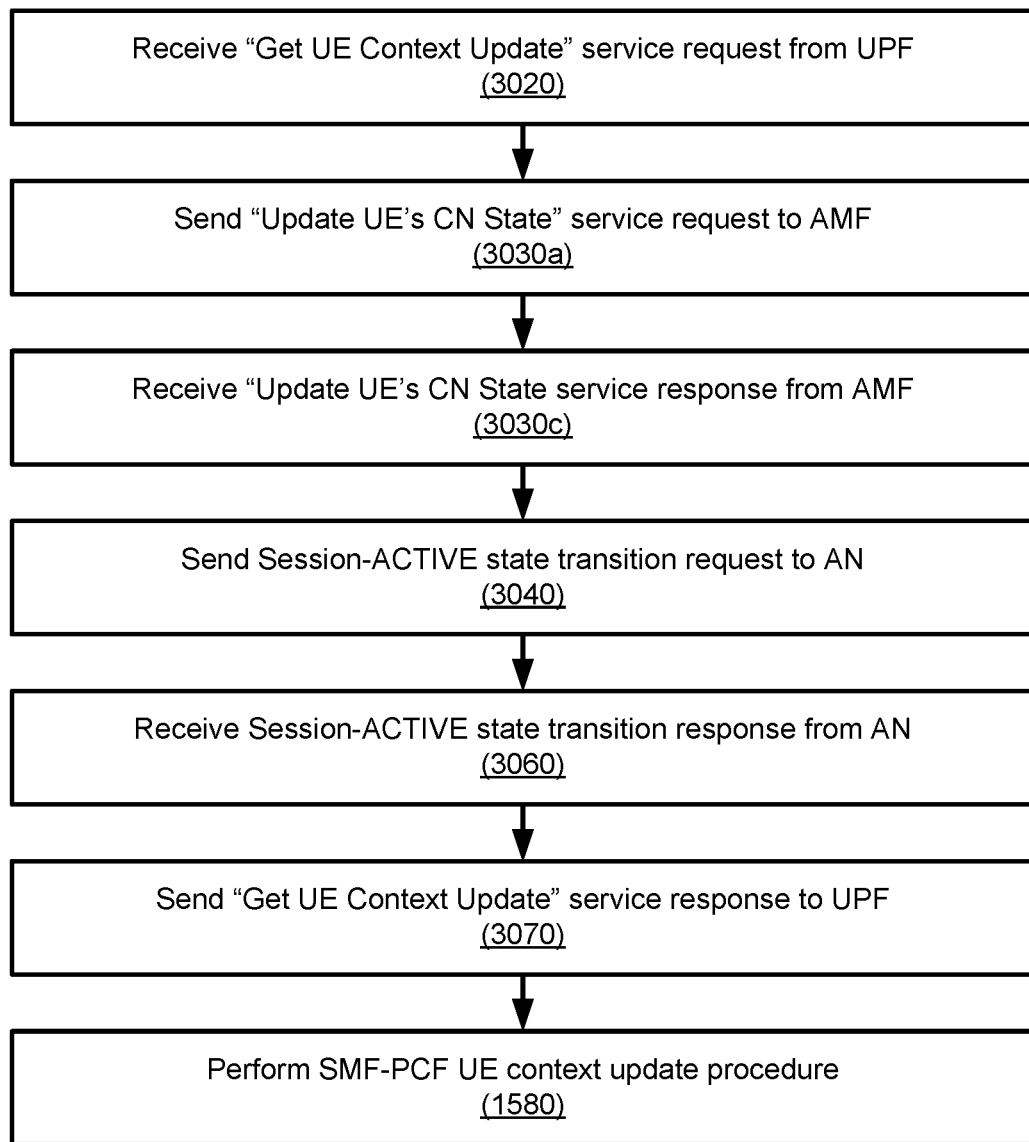
FIG. 31 illustrates, in a flowchart, an example of a method of performing a Session-ACTIVE state transition, in accordance with the PDU Session-ACTIVE state transition procedure.

FIG. 31 illustrates, in a flowchart, an example of a method of performing a Session-ACTIVE state transition (3100), in accordance with the PDU Session-ACTIVE state transition procedure (3000). The method (3100) may be performed by the SMF 220. The SMF 220 may be configured to receive a "Get UE Context Update" service request (3020) message from the UPF 212. The SMF 220 may send an "Update UE's CN State" service request (3030a) message to the AMF 218. Next, the SMF 220 may receive an "Update UE's CN State" service response (3030c). Next, the SMF 220 may send to the AN 204, via the AMF 218, a Session-ACTIVE state transition request (3040) message. Next, the SMF 220 may receive from the AN 204, via the AMF 218, a Session-ACTIVE state transition response (3060) message. Next, the SMF 220 may send to the UPF 212 a "Get UE Context Update" service response (3070) message. Next the SMF 220 may perform the SMF-PCF UE context update procedure (1580), as described above. Other steps may be added to the method (3100).

Figure 32:
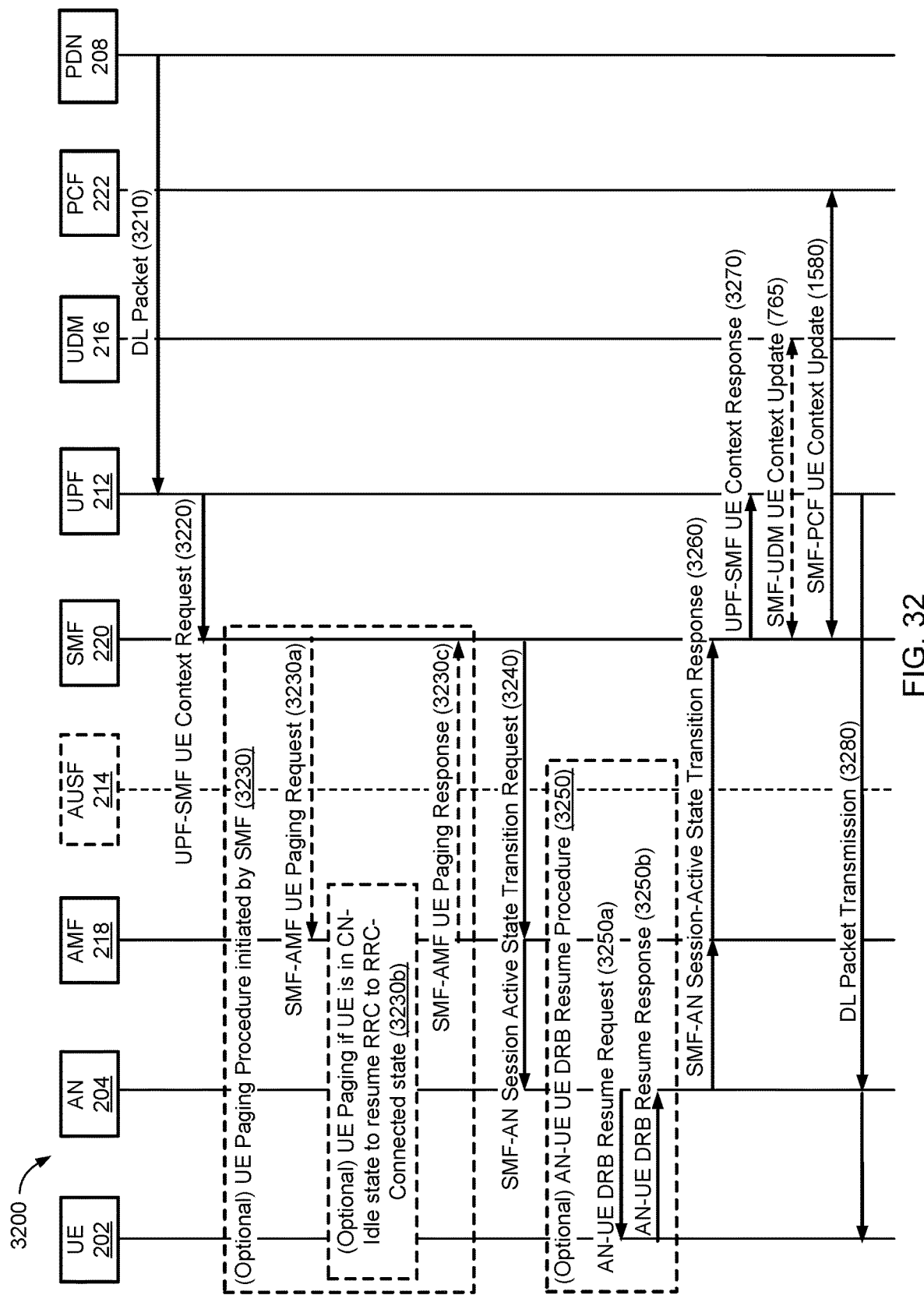
FIG. 32 illustrates, in a message flow diagram, an example of a PDU Session-ACTIVE state transition procedure, in accordance with an embodiment of the present invention.

FIG. 32 illustrates, in a message flow diagram, an example of a PDU Session-ACTIVE state transition procedure (3200), in accordance with an embodiment of the present invention. The procedure (3200) is triggered by a UPF 212 request when the PDU session is in the Session-IDLE state, and thus, the UPF 212 may not have the TFT for the DL packet of idle sessions. The UE's PDU context may be stored either in the SMF 220 or the UPF 212. The UPF 212 receives a DL packet from a packet data network (PDN) 208 (3210). The packet may be buffered in the UPF 212. The UPF 212 may send to the SMF 220 a UPF-SMF UE context request message (3220). If the UPF 212 does not have the UE context, the UPF 212 may identify and send the serving SMF 220 the UPF-SMF UE context request, which may include the packet header information. It is noted that some application servers may set up a tunnel with the UPF 212. This tunnel may be associated to sessions handled by a specific SMF 220. The UPF 212 may rely on the tunnel information to identify the service SMF 220.

The SMF 220 may check the CN state in UE context. If the UE 202 is in the CN-IDLE state (i.e., the UE 202 is in the RRC-IDLE state or RRC-Suspended state), then the SMF 220 may initiate a UE paging procedure (3230). The SMF 220 may send to the AMF 218 a SMF-AMF UE paging request message (3230a). The message may include the temp UE ID. The AMF 218 may then perform a UE paging procedure (3230b). This step may involve a UE context handover procedure if the UE 202 is served by a new AN 204. If the AMF 218 successfully pages the UE 202, then the UE 202 enters the CN-CONNECTED state. The AMF 218 may send to the SMF 220 a SMF-AMF UE paging response message (3230c), which may indicate that the UE 202 is in the CN-CONNECTED state.

The SMF 220 may update the UE 202 to be in the CN-CONNECTED state. The SMF 220 may send to the AN 204 a SMF-AN Session-ACTIVE state transition request message (3240). The message may include the temp UE ID, the session ID, and the Session-ACTIVE state parameter. Optionally, if the DRB is currently suspended, the AN 204 initiates an AN-UE DRB resume procedure (3224). The AN 204 may send to the UE 202 an AN-UE DRB resume request message (3224a). The message may include the DRB IDs. Then, the UE 202 resumes the suspended DRB. The UE 202 may send to the AN 204 an AN-UE DRB resume response message (3224b), which may include the DRB ID, and either an acknowledgment or a cause code. It is noted that in step (3224a), the AN-UE DRB resume request message may be implicitly carried in a DL channel grant message.

The AN 204 may send to the SMF 220 a SMF-AN Session-ACTIVE state transition response message (3260), which may include the SM-NSSAI, the temp UE ID, the session ID, and either an acknowledgement or a cause code for this session ID. If the SMF 220 receives a cause code from the AN 204, the SMF 220 may initiate the SM establishment procedure (700) triggered by the CN 206. Otherwise (the SMF 220 receives an acknowledgment from the AN 204), the SMF 220 may send to the UPF 212 a UPF-SMF UE context response message (3270), which may include a Session-ACTIVE state confirmation. If the UPF 212 does not have the UE context, the message may also include a complete UE context. The UPF 212 may setup UP resources to support the PDU sessions. Optionally, the SMF 220 and the UDM 216 may perform a SMF-UDM UE context update procedure (765), as described above. The SMF 220 and the PCF 222 may perform a SMF-PCF UE context update procedure (1580). The UPF 212 may then send DL packet to the UE 202 (3280).

Figure 33:
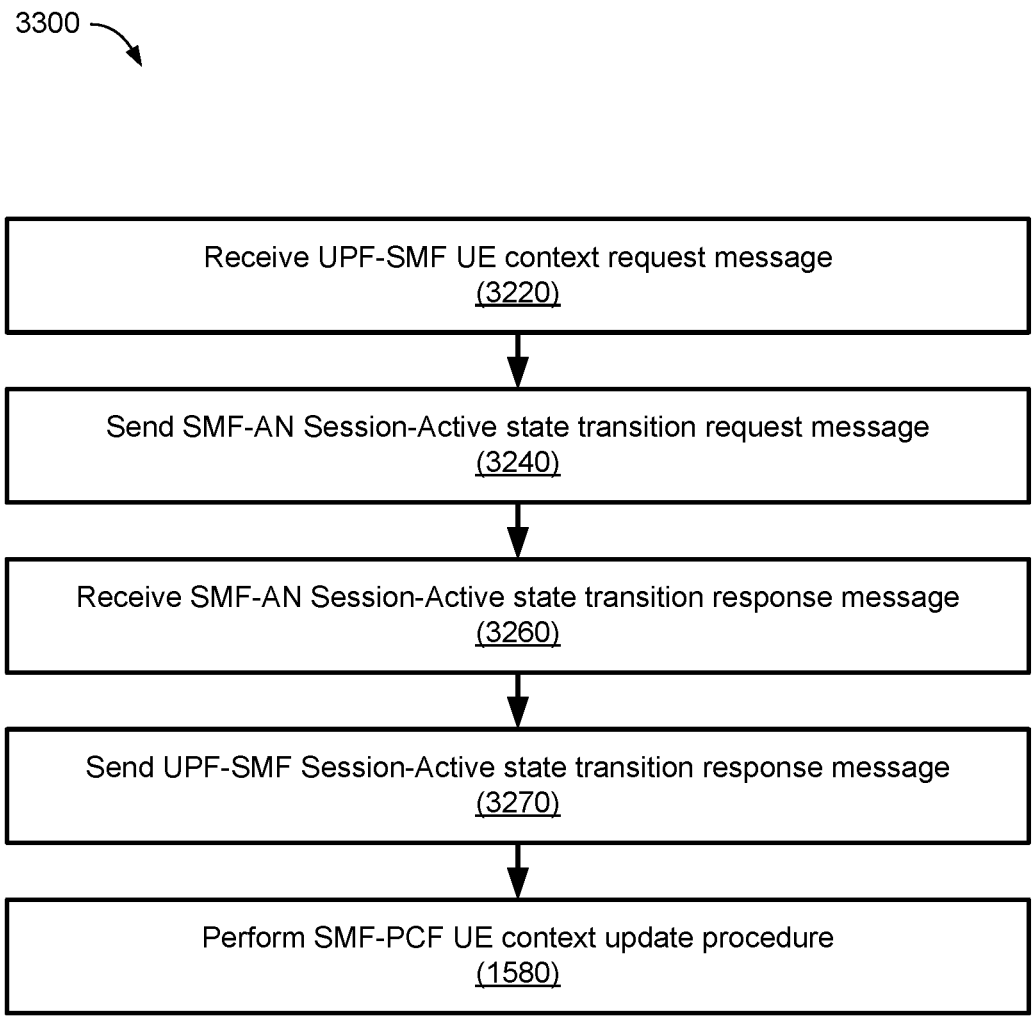
FIG. 33 illustrates, in a flowchart, an example of a method of transitioning a session, in accordance with the PDU Session-ACTIVE state transition procedure.

FIG. 33 illustrates, in a flowchart, an example of a method of transitioning a session (3300), in accordance with the PDU Session-ACTIVE state transition procedure (3210). The method comprises the SMF 220 configured to receive the UPF-SMF UE context request message (3220), as described above. Next, the SMF 220 may send to the AN 204, via the AMF 218, the SMF-AN Session-ACTIVE state transition request (3240), as described above. Next, the SMF 220 may receive from the AN 204, via the AMF 218, the SMF-AN Session-ACTIVE state transition response message (3260), as described above. Next, the SMF 220 may send to the UPF 212 the UPF-SMF UE context response message (3270), as described above. Next, the SFM 220 may perform a SMF-PCF UE context update procedure (1580), as described above. Other steps may be added to the method (3300), including the SMF 220 performing the SFM-UDM UE context retrieval procedure with the UDM 216, the SMF 220 initiating the UE paging procedure, and the SMF 220 performing the SMF-UDM UE context update procedure with the UDM 216, as described above.

Figure 34:
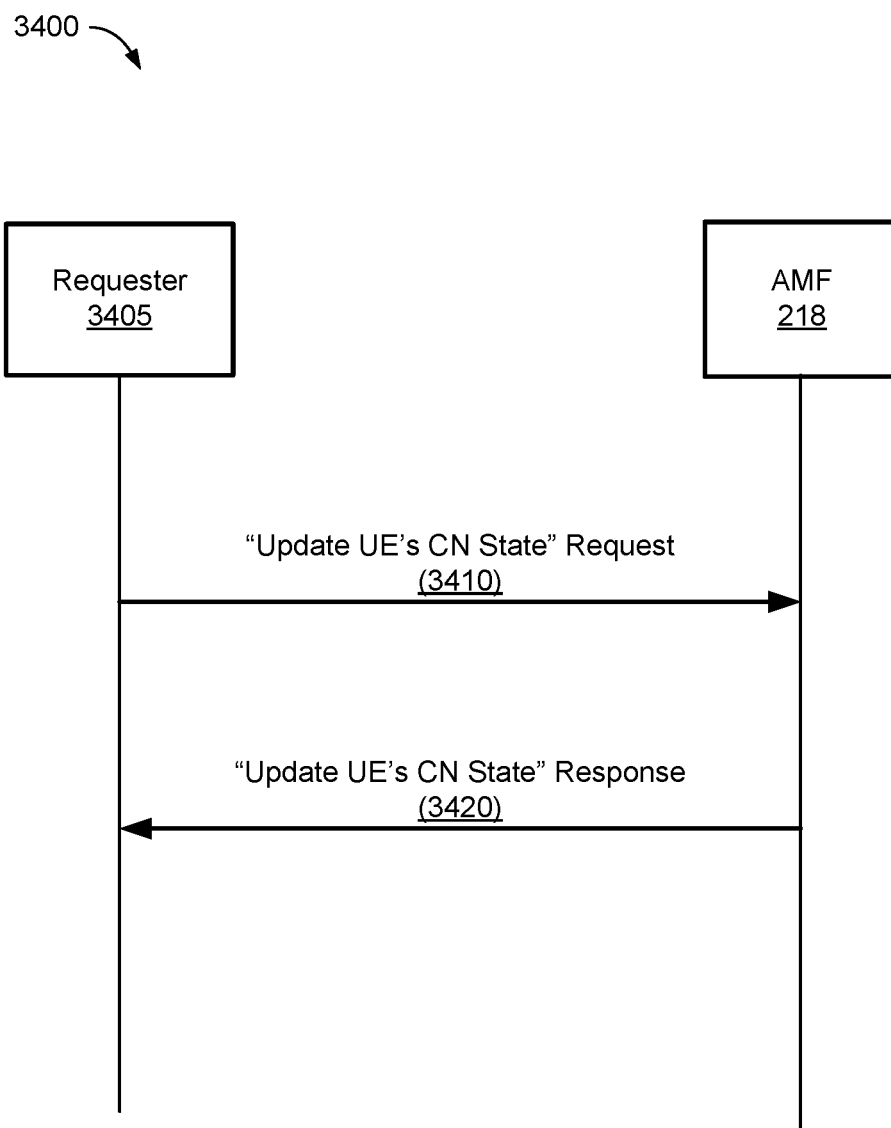
FIG. 34 illustrates, in a component diagram, an example of an "Update UE's CN State" service procedure.

FIG. 34 illustrates, in a component diagram, an example of an "Update UE's CN State" service procedure (3400). The AMF 218 may provide a service to page the UE 202 when the UE 202 is in the CN-IDLE state. The AMF 218 may maintain the UE context. A requester 3405 may send an "Update UE's CN State" request (3410) message to the AMF 218. The message may include the UE ID. The requester 3405 may be the SMF 220 as in step (3030a) above. The requester 3405 may also be any network function that may communicate with the AMF 218. Next, the AMF 218 may send to the requester 3405 an "Update UE's CN State" response (3420) message, which may include an acknowledgement of the UE's CN-CONNECTED state and the IP address of the AN 204. If a paging failure occurs, the response may include a cause code.

Figure 35:
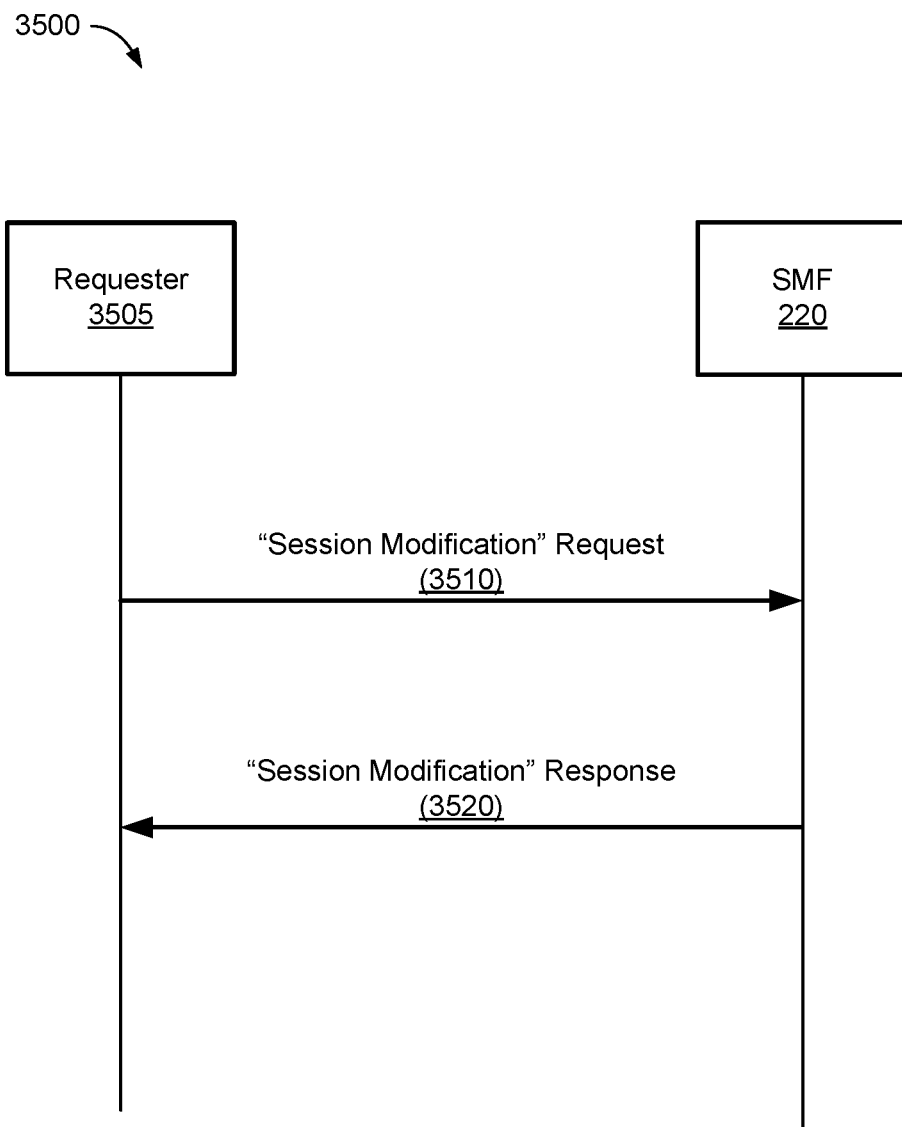
FIG. 35 illustrates, in a component diagram, an example of a "PDU Session Modification" service procedure.

FIG. 35 illustrates, in a component diagram, an example of a "PDU Session Modification" service procedure (3500). This service (3500) provides the PDU session modification service such as QoS parameters and charging parameters. The SMF 220 may maintain the UE context. A requester 3505 may send a "Session Modification" request (3510) message to the SMF 220. The message may include the UE ID, the PDU session ID and the new session parameters. The requester 3505 may be any network function that may communicate with the SMF 220. Next, the SMF 220 may send to the requester 3505 a "Session Modification" response (3520) message to confirm the completion of the service. The message (3520) may include an acknowledgement or a cause code.

Figure 36:
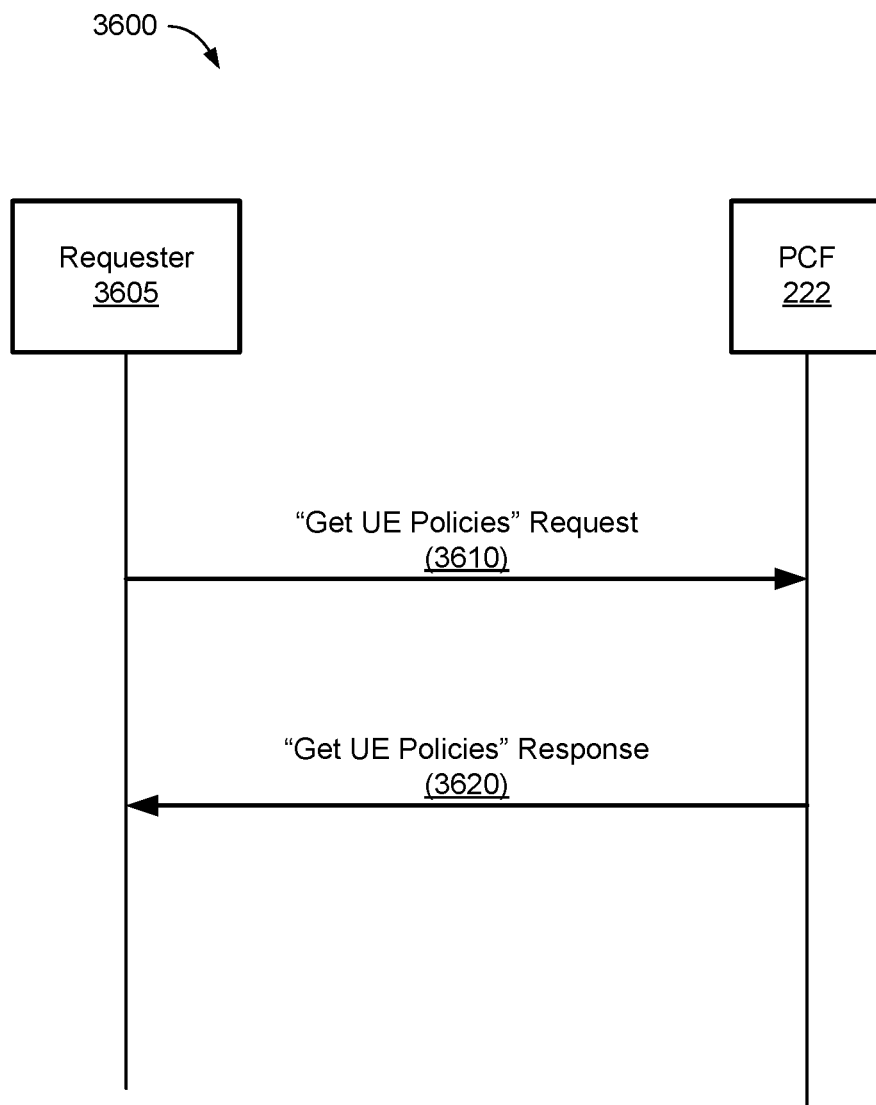
FIG. 36 illustrates, in a component diagram, an example of a "Get UE Policies" service procedure.

FIG. 36 illustrates, in a component diagram, an example of a "Get UE Policies" service procedure (3600). The PCF 222 may provide UE policies to a requester 3605. The PCF 222 may have policies for services, DN 208, time zone, and UE 202. A requester 3605 may send a "Get UE Policies" request (3610) message to the PCF 222. The message may include the type of PDU session, the DN name, the time zone of the UE 202, and the requested policy such as the SM policy, the access and mobility (AM) policy, the QoS policy and the charging policy. The requester 3605 may be any network function that may communicate with the PCF 222. Next, the PCF 222 may send to the requester 3605 a "Get UP Policies" response (3620) message, which may include the requested policy.

Figure 37:
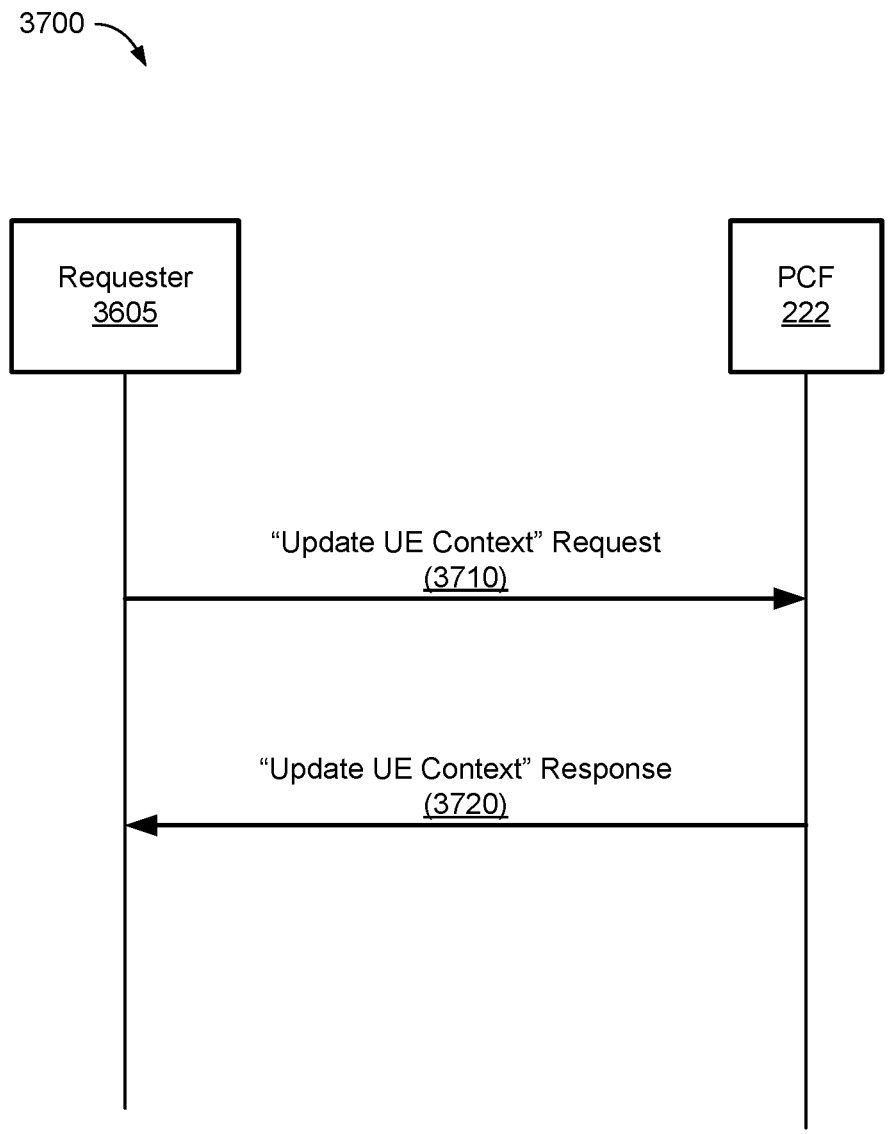
FIG. 37 illustrates, in a component diagram, an example of an "Update UE Context" service procedure.

FIG. 37 illustrates, in a component diagram, an example of an "Update UE Context" service procedure (3700). The PCF 222 may provide an update UE context service to the requestor 3605 for some scenarios, including dynamic policy. The PCF 222 may have policies for services, the DN 208, the time zone and the UE 202. A requester 3605 may send an "Update UE Context" request (3710) message to the PCF 222. The message may include the UE ID, the session ID(s), and a list of parameters and their corresponding new values. The requester 3605 may be the SMF 220 as in step (1580) above. The requester may also be any network function that may communicate with the PCF 222. Next, the PCF 222 may store new values of the parameters to the UE context. The PCF 222 may send to the requester 3605 an "Update UE Context" response (3720) message to confirm that the service has been performed or to report an error (via a cause code).

Figure 38:
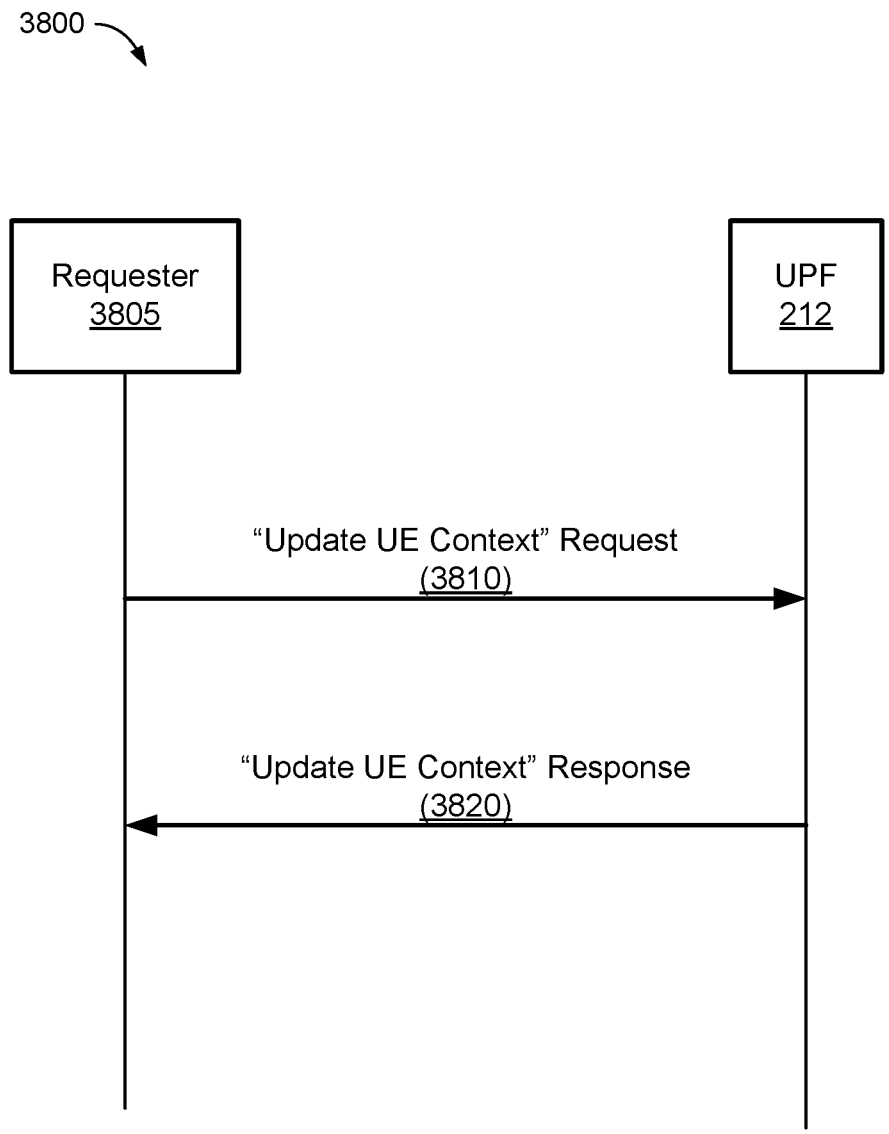
FIG. 38 illustrates, in a component diagram, an example of an "Update UE Context" service procedure.

FIG. 38 illustrates, in a component diagram, an example of an "Update UE Context" service procedure (3800). When a PDU session has been established, the UPF 212 may have the UE context. A requester 3805 may send to UPF(s) 212 that serve the PDU session an "Update UE Context" request (3810) message. The message may include the UE ID, the session ID(s) and a list of parameters and their corresponding new values. The new value may be the NULL value. If a new tunnel endpoint ID is NULL, the UPF 212 may contact the SMF 220 if the UPF 212 does not know how to forward the packet. The requester 3805 may be the SMF 220 as in step (3070) above. The requester 3805 may also be any network function that may communicate with the UPF 212. The UPF 212 may receive new session parameters, and check whether the new parameters may be supported. If the new parameters may be supported, then the UPF 212 may reconfigure or release it resources tat serve the PDU session. The UPF 212 may send to the SMF 220 the SMF-UPF session modification response (3820) message that may include an acknowledgement to confirm that the service has been performed or to report an error (via a cause code).

Figure 39:
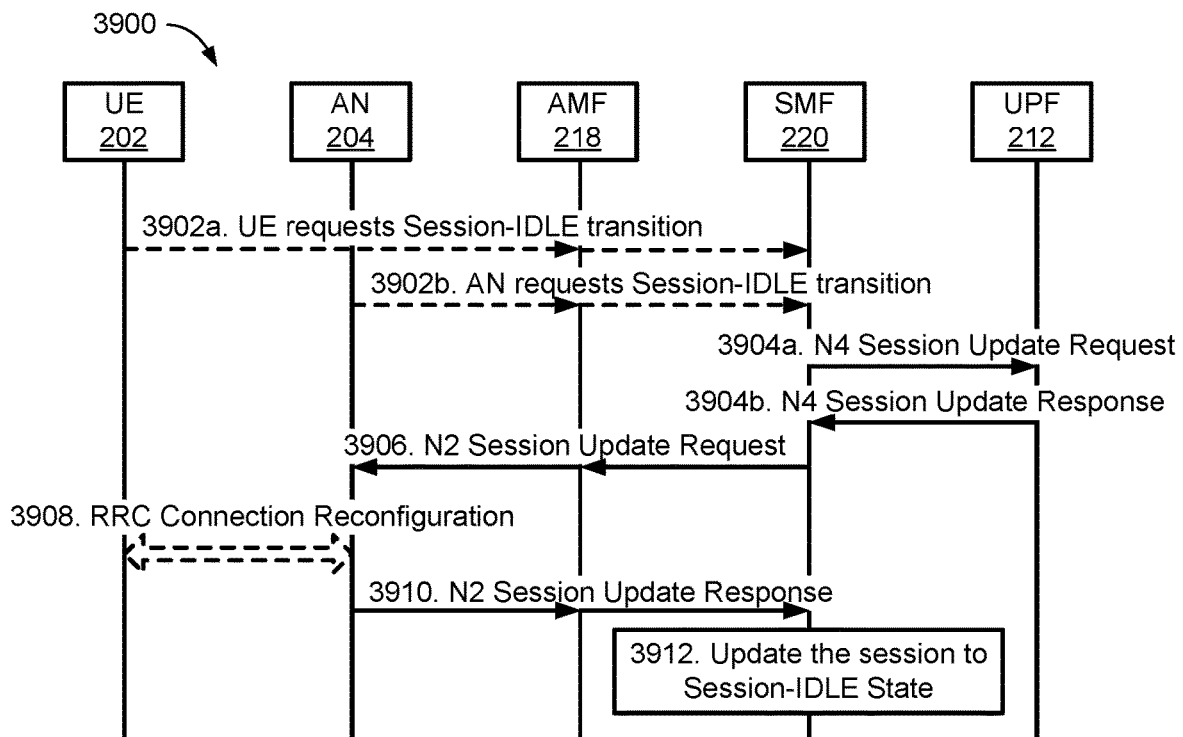
FIG. 39 is a message flow diagram illustrating an example method of an embodiment of the present invention.

FIG. 39 is a call flow diagram 3900 illustrating methods that can be carried out at a series of different nodes and functions for a Session-IDLE State Transition of a UE under a CM_Connected mode. As shown in FIG. 39, there can be a number of different triggers for the start of the session Connection State Transition procedure. As illustrated in FIG. 39, a UE 202 or an AN 204 can request the session IDLE transition. Those skilled in the art will appreciate that other triggers may be applicable as well. Either the UE 202 or the AN 204, can issue a session IDLE transition request (at 3902a and 3902b) towards the SMF 220. In some examples, the request message can include the UE Temp ID, the Session ID(s), a Session-IDLE state, or an AD ID as appropriate. There may be a difference in the information included within the message depending on the node or function that initiates the message. A special value of the Session ID (e.g. wildcard) can be used to denote all of the PDU sessions that meet the identifying requirements induced within the request. It should also be understood that the SMF 220 may initiate the session_idle state transition either in response to another external trigger, or in response to an internal condition being satisfied. The SMF 220 and UPF 212 communicate with each other to perform a session update. The SMF 220 can transmit a session Update Request (e.g. an N4 Session update request) 3904a towards the UPF 212. This request may serve as a request to the UPF 212 to release NG3 information associated with an AN from the UE's PDU session context (as identified by the UPF). This session information may include the tunnel endpoint ID of AN 204 and the AN IP address. In response to this request, the UPF212 can release the session and transmit an reply 3904b to the SMF 220 to confirm the completion of UE Context Update request. The SMF 220 can then send a session update request 3906 towards the AN 204, which may optionally be routed through the AMF 218. In some embodiments, this may take the form of an N2 session update request sent to the AN 204 via the AMF 208. The session update request can include information such as UE Temp ID, Session ID(s) and Session-IDLE state. In response to receipt of the session update request, the AN 204 and the UE 202 can perform an RRC Connection Reconfiguration procedure 3908 to release allocated resources for the session(s). The AN 204 can inform the UE 202 of the session state transition via the procedure. Those skilled in the art will appreciate that there may be further details to the interaction of the UE 202 and AN 204, but these implementation details may vary from solution to solution. Upon release of the context of the PDU session (or sessions), the AN 204 can send a response 3910 to the Session Update Request (a Session Update Response, such as an N2 Session Update Response). This response can be sent towards the SMF 220, and may optionally be sent through the AMF 208. The response may serve to confirm the completion of Session-IDLE state transition in the UE 202, and may include the UE Temp ID and Session ID. At this point, the SMF 220 may set the session connection state (at 3912) of the UE context to the Session-IDLE. Those skilled in the art will appreciate that other services may be called upon to transfer the session update request and response without departing from the intended method. It should also be understood that a Policy Control Function may be involved as well.

Figure 40:
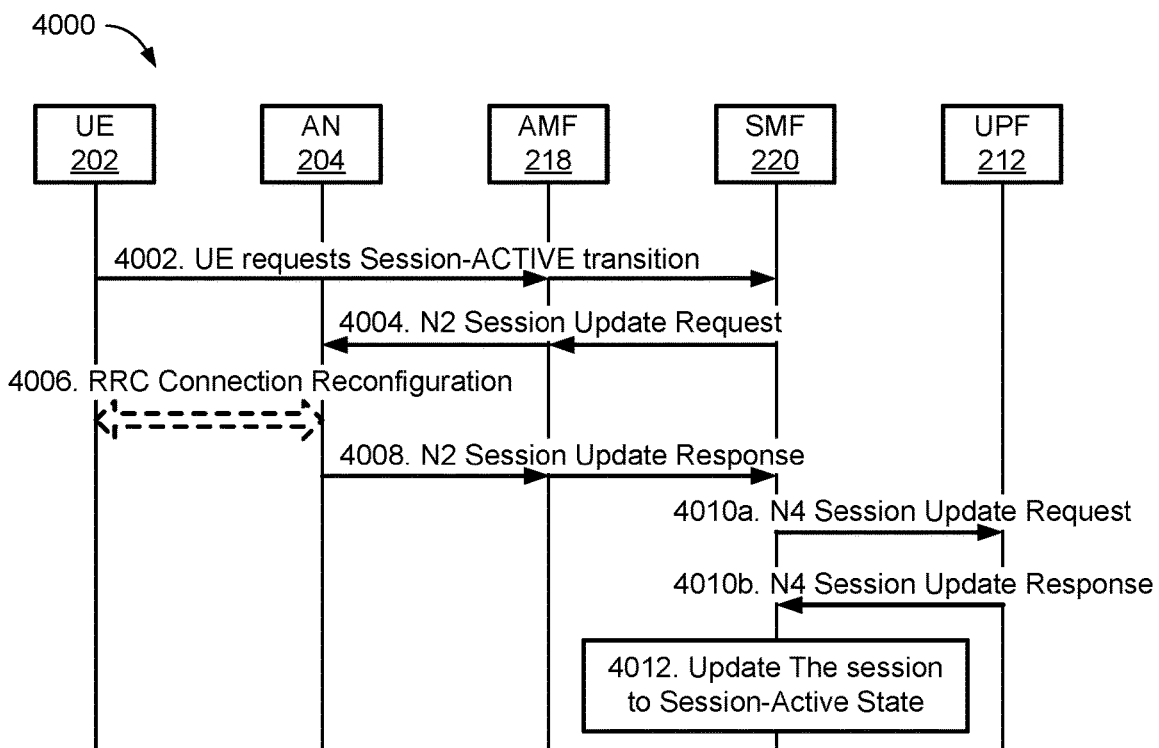
FIG. 40 is a message flow diagram illustrating an example method of an embodiment of the present invention.

FIG. 40 is a call flow diagram illustrating methods that can be carried out at a series of different nodes and functions for a Session-ACTIVE State Transition Triggered by UE under CM_Connected mode. As shown in the embodiment of FIG. 40, As shown in FIG. 40, the method can be initiated by a UE 202 transmitting, towards the SMF 220, a request for a transition to an active session. As shown in FIG. 40, step 4002, the UE 202 sends to the SMF 220 (optionally via the AMF 218) a Session-ACTIVE request. The message can include the UE Temp ID, Session ID(s), and Session-ACTIVE state. It should be understood that a special value of Session ID (e.g. wildcard) can be used to denote all of the PDU sessions that satisfy other conditions specified in the request. In response, the SMF 220 can send (at 4004) a session update request, such as an N2 Session Update Request, towards the AN 204, e.g. via the AMF. 218 The session update request message may include a UE Temp ID, a Session ID, a Session-ACTIVE state, and NG3 connection information. The AN 204 and the UE 202 can perform an RRC Connection Reconfiguration procedure (at 4006). In one embodiment, the RRC connection reconfiguration procedure may include the AN 204 assigning radio resources to serve the PDU session according to a QoS profile. If the QoS profile requires admission control, the AN 204 can perform admission control (or can invoke an admission control procedure). If there are insufficient radio resources to satisfy the needs of the PDU session, or if the AN 204 cannot otherwise support the session, the AN 204 can instruct or otherwise inform the UE 202 to release the PDU session. If there are sufficient radio resources, and the AN 204 can otherwise support the session, the AN 204 can send an RRC Connection Reconfiguration message to the UE 202 that indicates the radio resource allocation. In accordance with the RRC connection configuration, the UE 202 can set the session connection state to Session-ACTIVE. It will be understood by those skilled in the art that other steps may be taken as part of the RRC connection reconfiguration. The addition of these steps may vary from implementation to implementation and are thus not discussed herein. Upon configuring (or reconfiguring as the case may be) the RRC connection, the AN 204 can send a session update response message (at 4008) towards the SMF 220. Optionally this message may be sent to the AMF 218 for delivery to the SMF 220. In some embodiments, the message may be an N2 Session Update Response. The message can include the UE Temp ID and Session ID. The AN 204 may use this response message 4008 to notify the SMF 220 of either the successful completion of Session-ACTIVE state transition or a cause code associated with a failure to successfully complete the transition, e.g. lack of radio resources for to support the PDU session. If the SMF 220 is notified of a successful completion of the transition, it may transmit a request to the UPF 212 to update the UE session context. This may take the form of messages 4010a and 4010b in response. If the SMF 220 is not notified of a success (including the scenario in which it is notified of a failure) steps 4010a and 4010b may be omitted. As shown in 4010a, the SM 220 can transmit a request to the UPF 212 to update session information. This may take the form of a N4 session Update Request sent to the UPF 212 requesting the update of NG3 information associated with the AN 204 that is associated with the UE's PDU session context in UPF 212. The request message may include UE Temp ID, Session ID, and NG3 information, including the tunnel endpoint ID of AN and the AN IP address. In response, the UPF 212 can transmit a confirmation as shown in 4010b. This confirmation may take the form of an N4 Session update Response. If, the SMF 220 receives an indication from the AN 204 that the RRC connection reconfiguration was successful, the SMF 220 may set the session connection state (at 4012) in the UE context accordingly. If the session connection state transition is successful, the SMF 220 can set the session connection state to the Session-ACTIVE. If the session connection state transition is unsuccessful (e.g. the AN cannot support the PDU Session), the SMF 220 may initiate a Session Release procedure. As noted above, with respect to FIG. 39, the PCF may be involved during the session connection state transition procedures. It should also be understood that different services may be involved in the transfer of N2 messages.

The procedure of releasing a NAS signalling connection may be initiated by a 5G (R)AN 204 node or the AMF 218. The AMF 218 may inform the SMF 220 that the UE 202 enters CM-IDLE state so that the SMF 220 may inform the UPF(s) 212 to deactivate existing PDU sessions by releasing the N3 tunnel information (including (R)AN IP address and tunnel endpoint identifier) of UE context at the UPF 212. The UE 202 may consider the NAS signalling connection released if the UE detects the RRC connection is released. After the NAS signalling connection is released, the UE 202 and the AMF 218 may enter the CM-IDLE state.

When a UE 202 has multiple established PDU sessions, the activation of UP connections of the existing PDU sessions may cause a UE-CN user plane connection (i.e., data radio bearer and N3 tunnel) for a PDU session to be activated. For the UE 202 in the CM-IDLE state, either the UE 202 or a network-triggered service request procedure may support independent activation of UP connection of existing PDU session. For the UE 202 in the CM-CONNECTED state, independent activation and deactivation of UP connections of existing PDU sessions may be supported.

There may be different types of PDU session establishment procedures. One type of session establishment procedure may be a UE 202 initiated PDU session establishment procedure. Another type of session establishment procedure may be a network initiated PDU session establishment procedure. In the case of a network initiated procedure, the network may send the device trigger message to the application(s) on the UE side. The trigger payload included in a device trigger request message may include information on which application on the UE side is expected to trigger the PDU session establishment request. Based on that information, the application(s) on the UE side trigger the PDU session establishment procedure.

There may be different embodiments of PDU session deactivation. One type of session deactivation procedure may be that all PDU sessions of the UE 202 may be deactivated when the UE's CM state transits from the CM-CONNECTED state to the CM-IDLE state. Another type of session deactivation procedure may be the (R)AN 204 initiating all PDU session deactivation. The (R)AN 204 may inform the AMF 218 of the cause of the a RRC release, such as O&M intervention, unspecified failure, user inactivity, repeated RRC signalling integrity check failure, release due to UE 202 generated signalling connection release, etc. Another type of session deactivation procedure may be the AMF 218 initiating all PDU session deactivation due to authentication failure. Another type of session deactivation procedure may include the (R)AN 204 initiating a selective PDU session deactivation. The (R)AN 204 may inform the SMF 220, via the AMF 218, of the cause of the selective PDU session such as O&M intervention and user inactivity.

Figure 41:
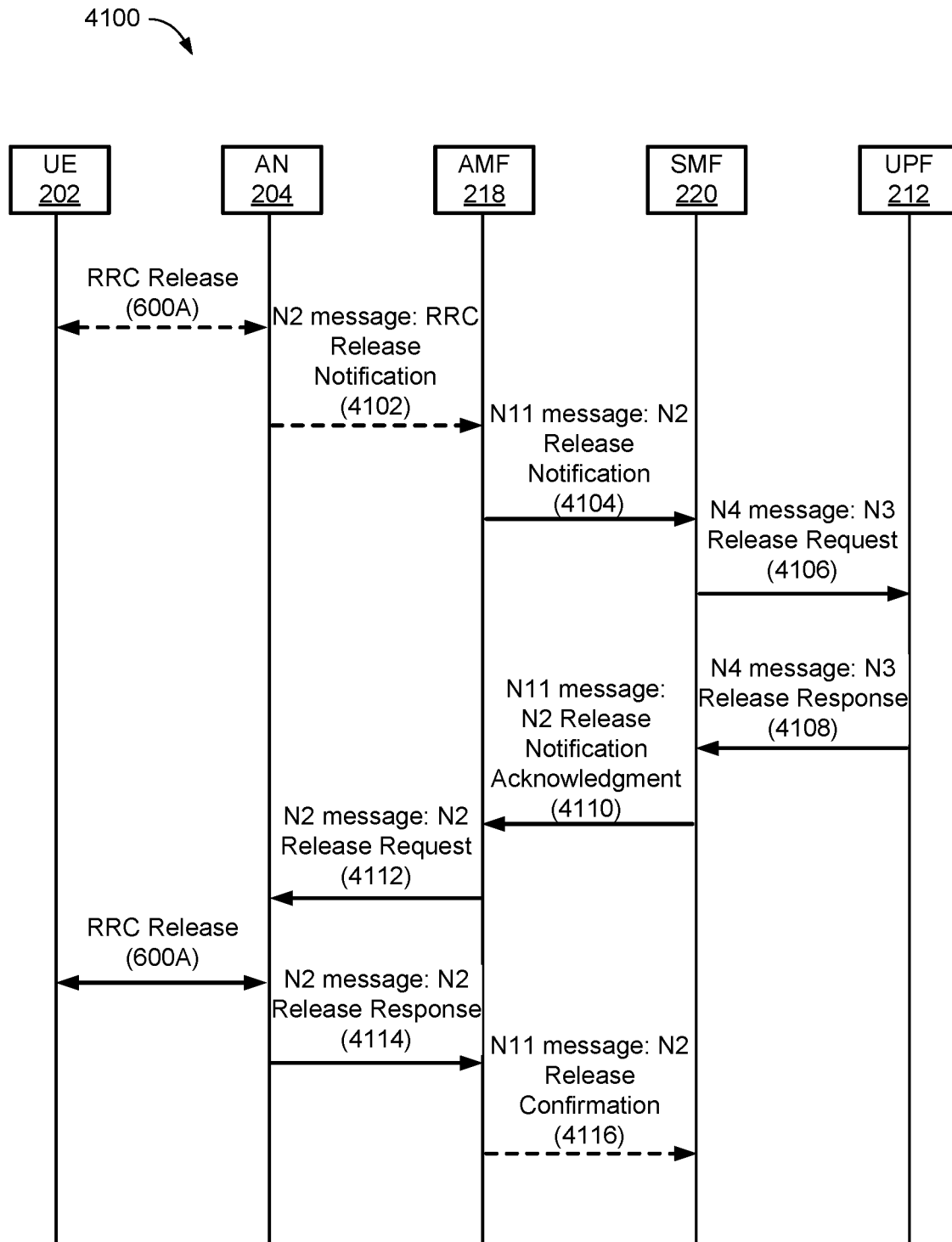
FIG. 41 illustrates, in a message flow diagram, an example of a N2 Release and PDU session deactivation procedure, in accordance with an embodiment of the present invention.

A procedure may be used to release a N2 connection and at the same time deactivate PDU sessions when the UE 202 enters the CM-IDLE state. FIG. 41 illustrates, in a message flow diagram, an example of a PDU session deactivation procedure (4100), in accordance with an embodiment of the present invention. The UE 202 and (R)AN 204 may perform a RRC Release (600A). If the RRC connection is released, the (R)AN 204 may interact with the UE 202 to release the RRC signalling connection. The UE 202 enters the CM-IDLE state and all PDU sessions may be deactivated. Thus, the UE 202 knows that the release of RRC implies deactivation of PDU sessions. Next, the (R)AN 204 may send (N2 message) a RRC Release Notification (4102) to the AMF 218. The message (4102) may include a cause code, such as O&M intervention, UE inactivity, etc. It is noted that in certain scenarios, step (600A) may be initiated before or in parallel with step (4102).

Next, the (R)AN 204 may create (N11 message) one or more N2 Release Notification message and send them (4104) via AMF 218 to the SMF(s) 220 that serve the PDU sessions to be deactivated. The message (4104) may include a UE ID to identify the UE (such as temporary UE ID or SUPI), a list of PDU session ID(s) to be deactivated, and a cause code. Alternatively, the message (4104) includes a UE ID to identify the UE (such as temporary UE ID or SUPI), the (R)AN information, list of PDU session ID(s) to be deactivated, PDU session ID and cause code. The (R)AN information indicates the (R)AN's IP address that releases the RRC connection. Next, the SMF 220 may send (N4 message) a N3 Release Request (4106) to the UPF(s) 212. The message (4106) may include a UE ID (such as temporary UE ID or SUPI) to identify the UE, and PDU session ID(s) to be deactivated. Next, the UPF 212 may drop all remaining packets of deactivated PDU sessions, if any. The UPF 212 may release the N3 tunnel information (such as (R)AN IP address and tunnel endpoint identifier) in the UE's PDU session context of PDU sessions to be deactivated. The UPF 212 may send (N4 message) a N3 Release Response (4108) to the SMF 220 confirming the release of N3 tunnel information.

The SMF 220 may send (N11 message) a N2 Release Notification Acknowledgment (4110) to the AMF 218 to confirm the receipt of the AMF's 218 notification (4104). The message (4110) may be sent before, after or in parallel with message (4106). Next, the AMF 218 may collect all the responses from the SMF(s) 220 that were notified (in step (4104)). Once all the acknowledgments from the SMF 220 are collected, the AMF 218 may send (N2 message) a N2 Release Request (4112) to the (R)AN 204 with a cause code. If step (600A) was not previously performed in the first step of the procedure (4210), the (R)AN 204 and UE 202 may perform the RRC Release procedure (600A). The (R)AN 204 may request the UE 202 to release the RRC connection. The UE 202 enters CM-IDLE state and all PDU sessions in the UE 202 may be deactivated. Upon receiving the RRC connection release confirmation from the UE 202, the (R)AN 204 removes the UE context.

Next, the (R)AN may send (N2 message) a N2 Release Response (4114) to the AMF 218. This message (4114) is to provide confirmation for step (4112). Upon receiving the N2 Release Response message (4114), the AMF 218 may set CM-IDLE state in the UE context and release the UE's N2 connection. Next, the AMF 218 may send (N11 message) a N2 Release Confirmation (4116) to the SMF(s) 220 to confirm the release of the N2 connection. Alternatively, the message (4116) may be omitted.

In another embodiment, if the RRC Release procedure (600A) has been performed in the first step of the procedure (44100), the messages 4112, 4114, and procedure RRC Release (600A) between steps that messages 4112 and 4114 may be omitted.

Figure 42:
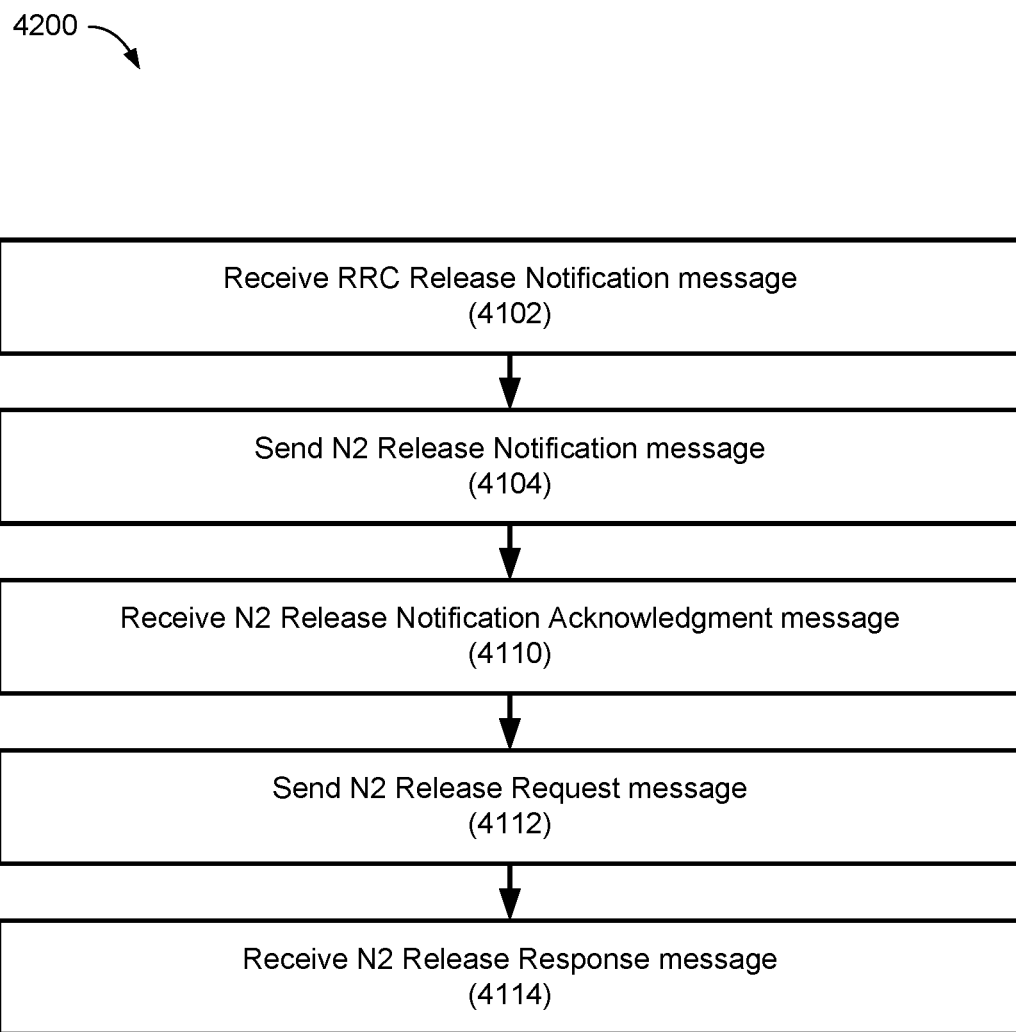
FIG. 42 illustrates, in a flowchart, an example of a method of releasing N2 connection and deactivating PDU sessions, in accordance with the N2 Release and PDU session deactivation procedure.

FIG. 42 illustrates, in a flowchart, an example of a method of releasing a N2 connection and deactivating a PDU session (4200), in accordance with the N2 Release and PDU Session Deactivation procedure (4100). The method (4200) may be performed by the AMF 218. The method (4200) comprises the AMF 218 configured to receive a RRC Release Notification message (4102). Next, the AMF 218 sends a N2 Release Notification message (4104) to the SMF 220. Next, the AMF 218 receives a N2 Release Notification Acknowledgment message (4110) from the SMF 220. Next, the AMF sends a N2 Release Request message (4112) to the (R)AN 204. Next, the AMF 218 receives a N2 Release Confirmation message (4114) from the (R)AN 204. Other steps may be added to the method (4200).

Figure 43:
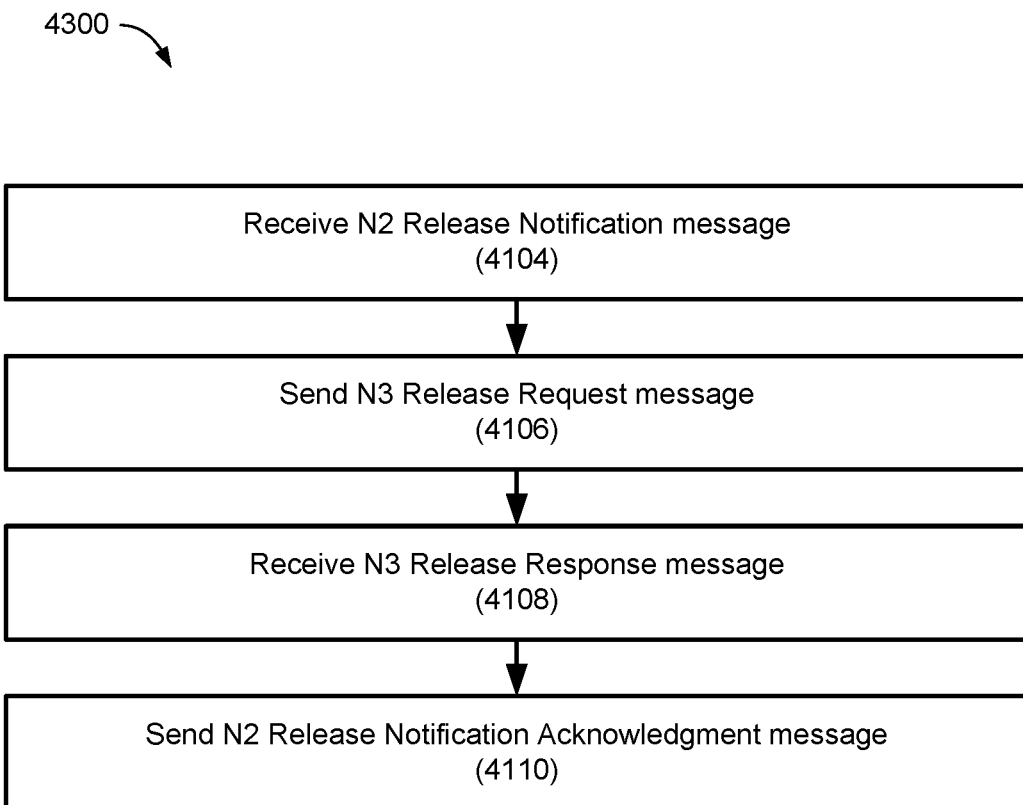
FIG. 43 illustrates, in a flowchart, another example of a method of deactivating a PDU session, in accordance with the PDU session deactivation procedure.

FIG. 43 illustrates, in a flowchart, another example of a method of releasing a N2 connection and deactivating a PDU session (4300), in accordance with the N2 Release and PDU Session Deactivation procedure (4100). The method (4300) may be performed by the SMF 220. The method (4300) comprises the SMF 220 configured to receive a N2 Release Notification message (4104) from the AMF 218. Next, the SMF 220 sends a N3 Release Request message (4106) to the UPF 212. Next, the SMF 220 receives a N3 Release Response message (4108) from the UPF 212. Next, the SMF 220 sends a N2 Release Notification Acknowledgment message (4110) to the AMF 218.

Figure 44:
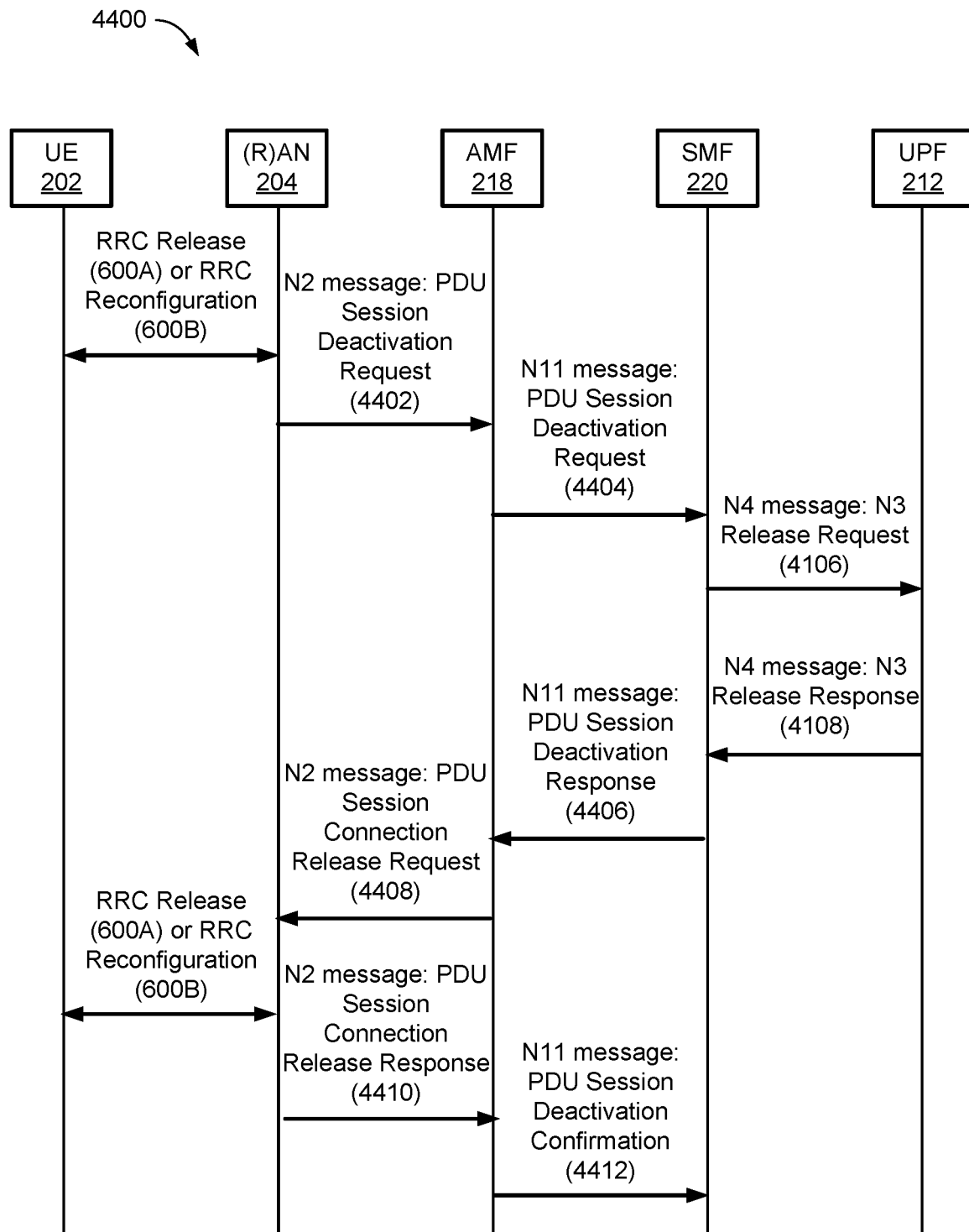
FIG. 44 illustrates, in a message flow diagram, another example of a PDU session deactivation procedure, in accordance with an embodiment of the present invention.

A procedure may be used to release a N2 connection when the UE 202 enters the CM-IDLE state or to deactivate PDU sessions when the (R)AN 204 triggers selective PDU session deactivation. FIG. 44 illustrates, in a message flow diagram, an example of a PDU session deactivation procedure (4400), in accordance with an embodiment of the present invention. The UE 202 and (R)AN 204 may perform a RRC Release procedure (600A) or a RRC Reconfiguration procedure (600B). If the RRC connection is released, the (R)AN 204 may interact with the UE to release the RRC signalling connection (procedure 600A). The UE enters CM-IDLE state and all PDU sessions are deactivated. If some PDU sessions are deactivated, then the (R)AN 204 may interact with the UE 202 to release DRB(s) belonging to the deactivated PDU sessions (procedure 600B). The UE 202 may know that the release of all DRBs belonging to a PDU session implies the deactivation of corresponding PDU sessions. The (R)AN may send (N2 message) a PDU Session Deactivation Request (4402) to the AMF 218. The message (4402) may include a PDU session ID(s), and a cause code. The cause code may be RRC release with a reason, such as O&M intervention, UE inactivity, etc. The cause code may also be PDU session inactivity. In the case of a RRC release, the PDU session deactivation request does not include a PDU session ID. In the case of PDU Session inactivity, the PDU session deactivation request (4402) may include a list of PDU session ID(s). It is noted that in certain scenarios, step (600A or 600B) may be initiated before or in parallel with step (4402).

Next, the AMF 218 may create (N11 message) one or more PDU Session Deactivation Request(s) and send them to the SMF(s) 220 that serve the PDU sessions to be deactivated (4404). The message (4104) may include an UE ID to identify the UE (such as temporary UE ID or SUPI), a list of PDU session ID(s) to be deactivated, and a cause code. Next, the SMF 220 may send (N4 message) a N3 Release Request (4106) to the UPF(s) 212. The message (4106) may include a UE ID (such as temporary UE ID or SUPI) to identify the UE 204, and PDU session ID(s). The UPF 212 may release the AN N3 tunnel information (i.e., (R)AN IP address and tunnel ID) in the UE's PDU session context of PDU sessions to be deactivated. The UPF 212 may send (N4 message) a N3 Release Response (4108) to the SMF 220 confirming the release of the N3 tunnel information.

Next, the SMF 220 may send (N11 message) a PDU session deactivation response (4406) to the AMF 218 to confirm the release of the N3 tunnel information in UPF(s) 212. Next, the AMF 218 may collect all the responses from the SMF(s) 220 that were requested to deactivate PDU sessions (in step (4404)). Once all the responses from the SMF 220 are collected, the AMF 218 may send (N2 message) a PDU Session Connection Release request (4408) to the (R)AN 204. In the case of the (R)AN 204 or AMF 218 initiated the deactivation of all PDU sessions, the message (4408) may include an indication to release the UE context (i.e., all UE 204 related information, including N3 tunnel information and N2 connection). If the case of selective PDU session deactivation, the message (4408) may include a list of PDU session IDs.

If step (600A or 600B) was not previously performed in the first step of the procedure (4400), the (R)AN 204 and UE 202 may perform the RRC Release (600A) or RRC reconfiguration procedure (600B). If the message in step (4408) included an indication to release the UE context, the (R)AN 204 may request the UE 202 to release the RRC connection (600A). The UE 202 enters CM-IDLE state and all PDU sessions in the UE 202 may be deactivated. Upon receiving the RRC connection release confirmation from the UE 202, the (R)AN 204 removes the UE context. If the message in step (4408) included an indication to deactivate a list of PDU sessions, the (R)AN 204 and UE perform a DRB release procedure (600B). The UE knows that the release of all DRBs belonging to a PDU session implies the deactivation of a corresponding PDU session. Upon receiving confirmation for DRB release from the UE 202, the (R)AN 204 removes the UE's PDU session context of deactivated PDU sessions.

Next, the (R)AN 204 may send (N2 message) a PDU Session Connection Release Response (4410) to the AMF 218. The message (4410) provides confirmation for step (4408). If the message in step (4408) indicated the release of the UE context, the AMF 218 may set CM-IDLE state in the UE context and release the UE's N2 connection. Next, the AMF 218 may create (N11 message) a PDU Session Deactivation Confirmation and send it (4412) to the SMF(s) 220 to confirm the deactivation of PDU sessions(s) at the (R)AN 204.

Figure 45:
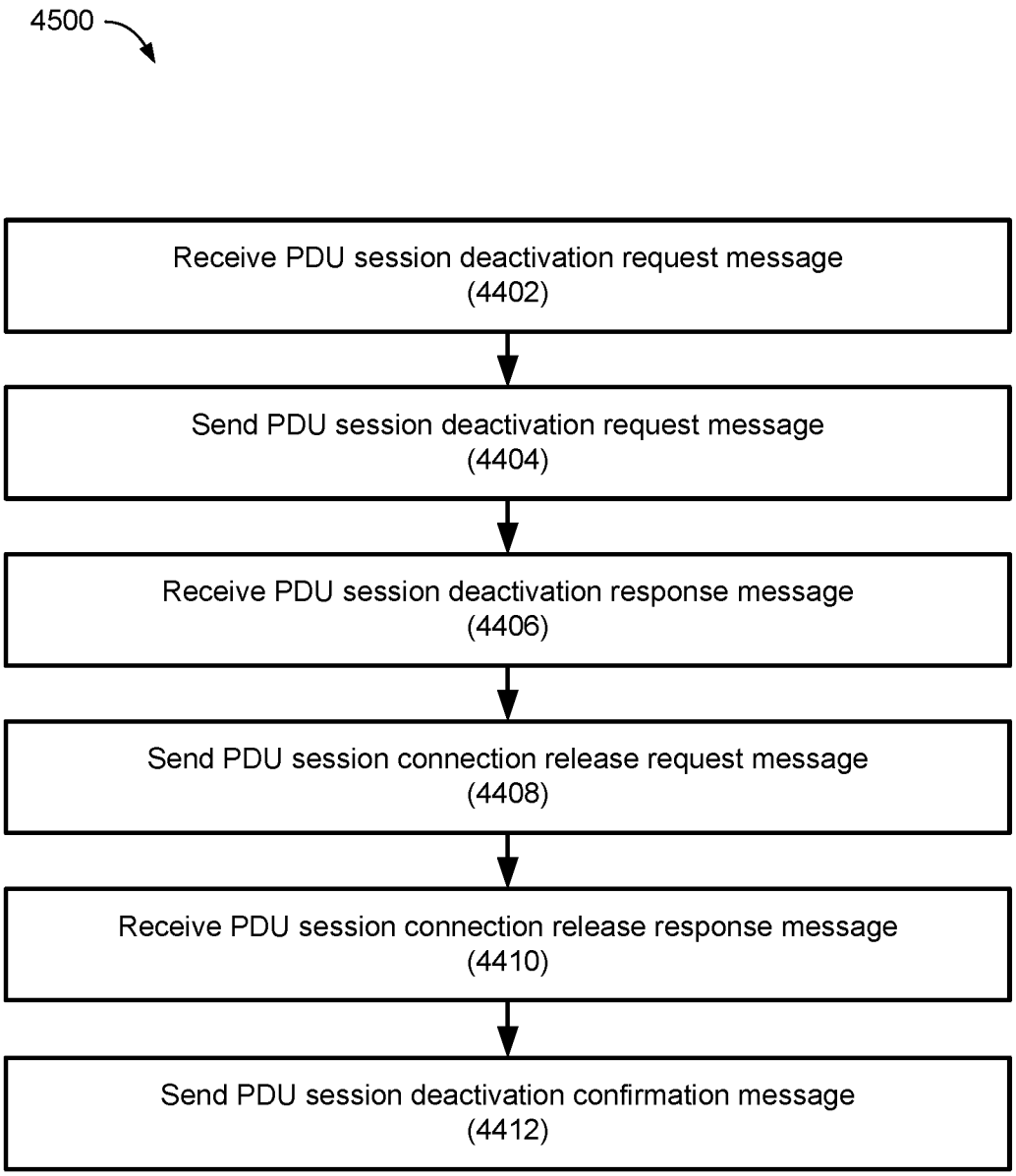
FIG. 45 illustrates, in a flowchart, an example of a method of deactivating a PDU session, in accordance with the PDU session deactivation procedure of FIG. 44.

FIG. 45 illustrates, in a flowchart, an example of a method of deactivating a PDU session (4500), in accordance with the PDU session deactivation procedure (4400). The method (4500) may be performed by the AMF 218. The method (4500) comprises the AMF 218 configured to receive a PDU Session Deactivation Request message (4402) from the (R)AN 204. Next, the AMF 218 may send a PDU Session Deactivation Request message (4404) to the SMF 220. Next, the AMF 218 may receive a PDU Session Deactivation Response message (4406) from the SMF 220. Next, the AMF 218 may send a PDU Session Connection Release message (4408) to the (R)AN 204. Next the AMF 218 may receive a PDU Session Connection Release response message (e) from the (R)AN 204. Next, the AMF 218 may send a PDU Session Deactivation Confirmation message (4412) to the SMF 220. Other steps may be added to the method (4500).

Figure 46:
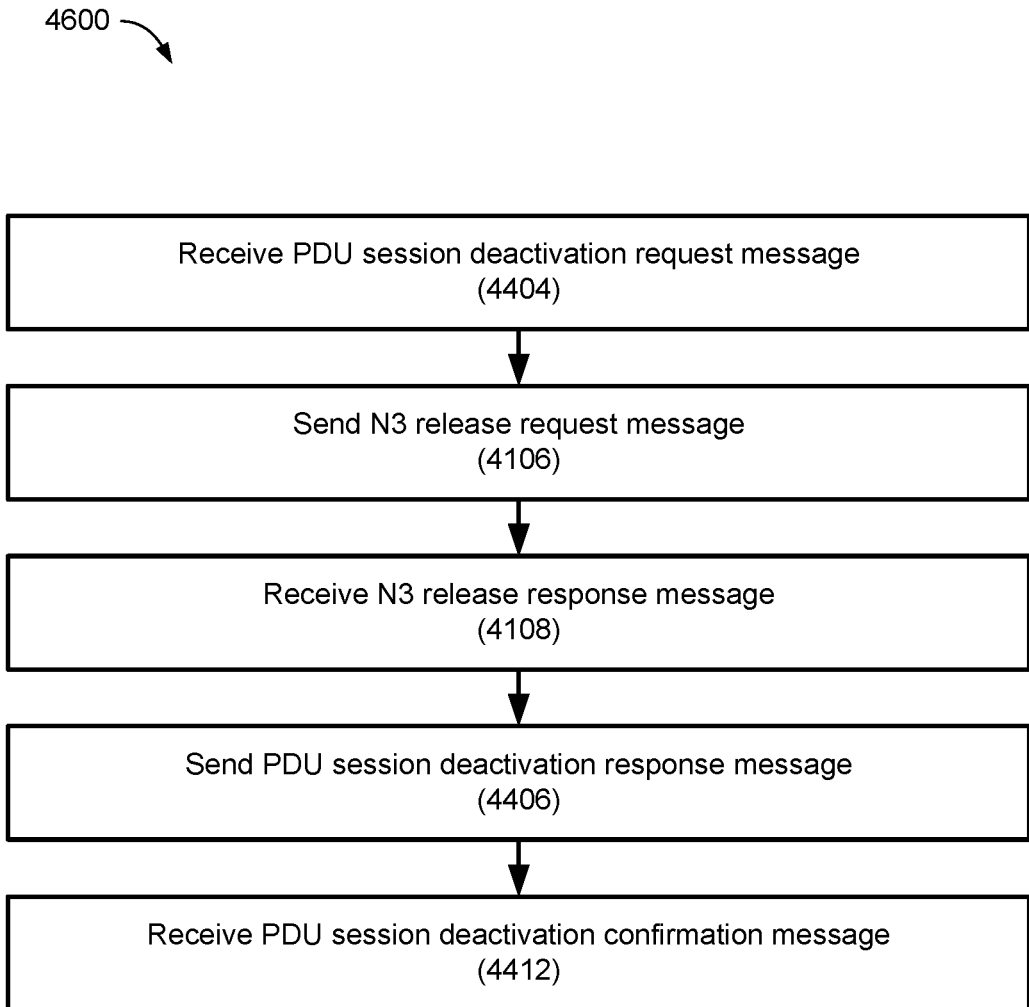
FIG. 46 illustrates, in a flowchart, another example of a method of deactivating a PDU session, in accordance with the PDU session deactivation procedure of FIG. 44.

FIG. 46 illustrates, in a flowchart, another example of a method of deactivating a PDU session (4600), in accordance with the PDU session deactivation procedure (4400). The method (4600) may be performed by the SMF 220. The method (4600) comprises the SMF 220 configured to receive a PDU Session Deactivation Request message (4404) from the AMF 218. Next, the SMF 220 sends a N3 release request message (4106) to the UPF 212. Next, the SMF 220 receives a N3 release response message (4108) from the UPF 212. Next, the SMF 220 sends a PDU session deactivation response message (4406) to the AMF 218. Next, the SMF 220 receives a PDU session deactivation confirmation message (4412) from the AMF 218. Other steps may be added to the method (4600).

A service request procedure may be used by a 5G UE 204 in the CM-IDLE state to request the establishment of a secure connection to an AMF 218. The UE 202 in the CM IDLE state may initiate the service request procedure in order to send uplink signalling messages, user data, or response to a network paging request. After receiving the service request message, the AMF 218 may perform authentication, and the AMF 218 may perform the security procedure. After the establishment of a secure signalling connection to an AMF 218, the UE 202 or network may send signalling messages, e.g., PDU session establishment from UE 202 to the network, or the SMF 220, via the AMF 218, may start the user plane resource establishment for the PDU sessions requested by network and/or indicated in the service request message. When the UE 202 is in the CM-CONNECTED state, the UE 202 may use another SM procedure to request user plane resource establishment for inactive PDU sessions.

Figure 47:
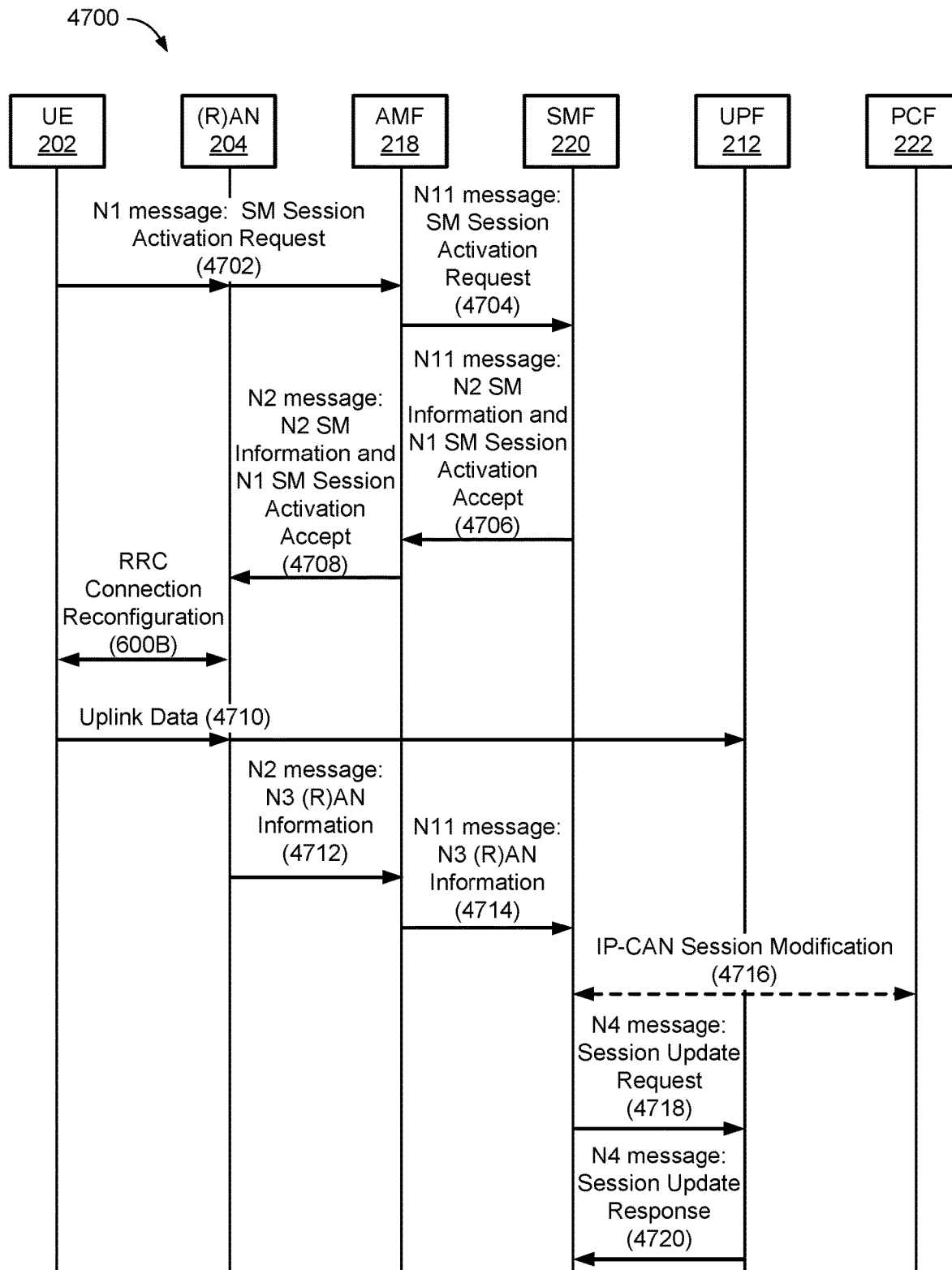
FIG. 47 illustrates, in a message flow diagram, another example of a session-ACTIVE state transition procedure, in accordance with an embodiment of the present invention.

FIG. 47 illustrates, in a message flow diagram, another example of a session-ACTIVE state transition procedure (4700), in accordance with an embodiment of the present invention. The UE 202 may send, in a N1 message, a SM Session Activation Request (4702) to the SMF 220. The message (4702) may include PDU Session ID(s) to be activated. The message (4702) may not need to include the list of PDU sessions available in the UE 202. The list of PDU sessions available in the UE 202 may be included if the UE 202 has released some PDU sessions but not informed the SMF 220. The (R)AN 204 may forward the N1 message SM Session Activation Request to the AMF 218 over the N2 interface. The (R)AN 204 does not need to include the UE 202 location, RAT type, and 5G UE temporary ID to the AMF 218. The AMF 218 may select the SMF 220 based on the PDU session ID and forward the SM session activation request (4704) to the serving SMF 220 over the N11 interface. The forwarded message (4704) may include an UE ID to identify UE, such as 5G temporary UE ID or SUPI, and PDU session ID(s).

The SMF 220 may use a "Message Transfer" service provided by the AMF 218 to send a N11 message (4706), which contains one N2 SM Information to be sent to the (R)AN 204 and one N1 SM Session Activation Accept NAS message to be sent to the UE over the N11 interface. The N11 message may include an UE ID to identify UE (such as 5G temporary UE ID or SUPI) and PDU Session ID(s). N2 SM Information message may include, PDU session ID(s), and the UE's PDU session context (QoS profile and UPF 212 terminating N3 tunnel information (UPF IP address and tunnel endpoint identifier)). Next, the AMF 218 may read the UE ID (such as 5G temporary ID or SUPI) and PDU session ID(s) to find the (R)AN 204. The AMF 218 transfers the content of N11 message (4706), which contains N2 SM Information and N1 SM Session Activation Accept NAS message received from the SMF in N2 message 4708 to the (R)AN over the N2 interface. Next, the (R)AN 204 and UE 202 may perform a RRC Connection Reconfiguration procedure (600B) according to the QoS profile for all the QoS flows of the PDU session activated provided in the N2 SM Information. If the (R)AN 204 can support the PDU session, the RRC connection reconfiguration message sent from the AN 204 to the UE 202 may indicate radio resource allocation for the PDU session(s); and the (R)AN 204 forwards the N1 SM Session Activation Accept NAS message provided in message (4708) to the UE. After the user plane radio resources are setup, the uplink data from the UE 202 can now be forwarded (4710) to the RAN 204. The 5G RAN 204 may send the uplink data (4710) to the UPF 212 address and tunnel ID provided in step (4706).

Next, the (R)AN 204 may send (N2 message) an N3 (R)AN Information (4712) to the SMF 220 via the AMF 218. The message (4712) may include the PDU session ID(s), a RAT type, a list of accepted QoS flows and a list of rejected QoS flows for the corresponding activated PDU session, and (R)AN N3 tunnel information ((R)AN IP address and tunnel ID). Next, the AMF 218 transfers (N11 message) the N3 (R)AN Information (4714) to the SMF 220 by reading the PDU session ID(s) over the N11 interface. The message (4714) may include the an UE ID to identify the UE (such as 5G temporary ID or SUPI), PDU session ID(s), the RAT type, a list of accepted QoS flows and a list of rejected QoS flows for the corresponding activated PDU session, and a (R)AN N3 tunnel information ((R)AN IP address and tunnel ID). Optionally, if dynamics PCC is deployed, the SMF 220 may initiate IP-CAN session modification (4716) and provide new location information of the UE 202 to the PCF 222.

In another embodiment, the (R)AN 204 can include the SMF Identifier in the message (4712). The AMF 218 may read the SMF ID, not the PDUS Session ID(s), in order to forward the (N2 message) N3 (R)AN Information (4714) to the SMF 220.

If in step (4712), the AN 204 notifies successful completion of a session activation, then the SMF 220 requests the UPF 212 to update the UE's PDU session context. In this case, the SMF 220 may send a N4 message Session Update Request (4718) to the UPF 212 to update N3 tunnel information of the (R)AN 204. The message (4718) may include an ID to identify UE (such as 5G temporary ID or SUPI), PDU session ID(s), and (R)AN tunnel information (IP address of the (R)AN 204 and N3 tunnel endpoint ID). Next, the UPF 212 may send a N4 message Session Update Response (4720) to the SMF 220 to confirm the completion of the session update request.

Figure 48:
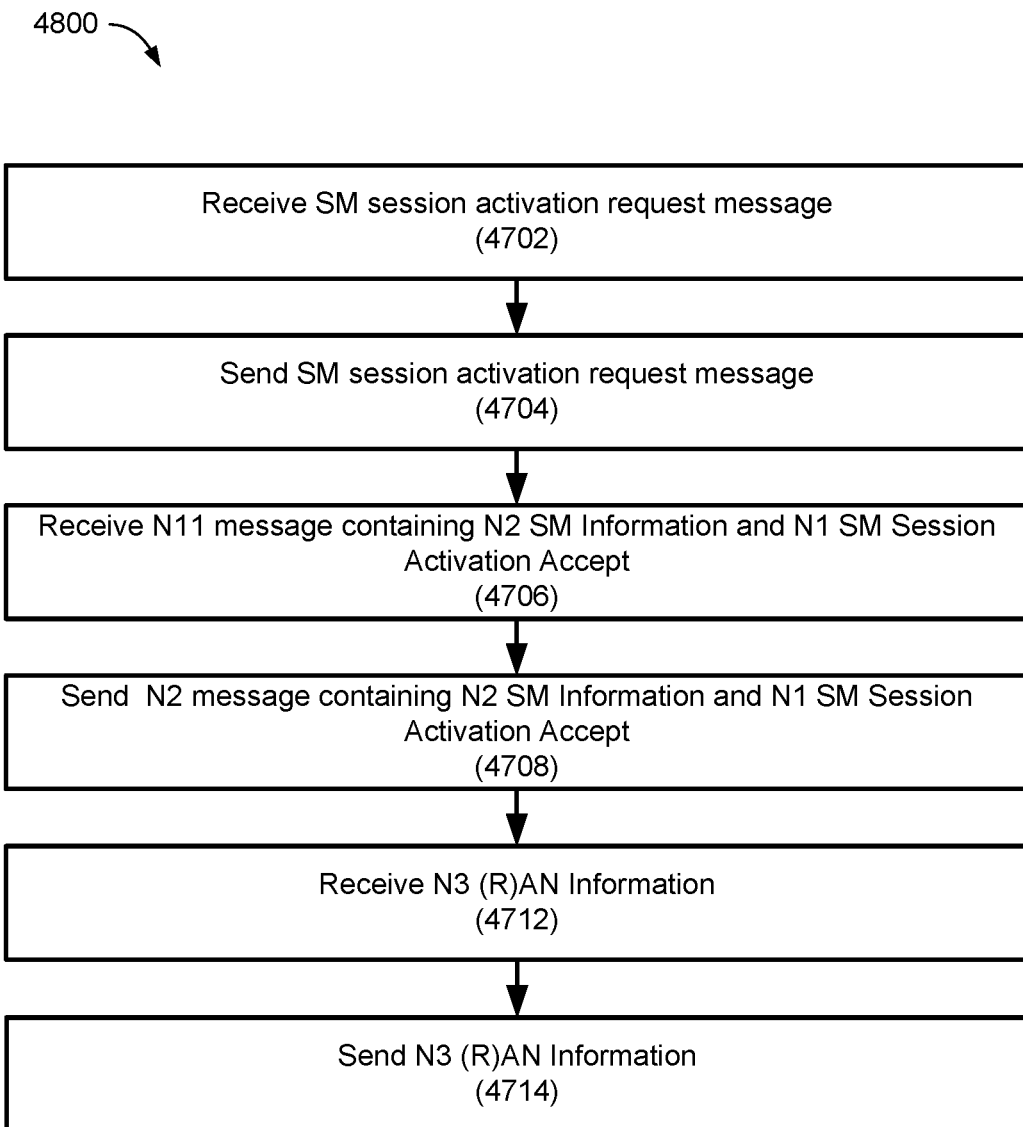
FIG. 48 illustrates, in a flowchart, an example of a method of transitioning a session, in accordance with the session-ACTIVE state transition procedure of FIG. 47.

FIG. 48 illustrates, in a flowchart, an example of a method of transitioning a session (4800), in accordance with the session-ACTIVE state transition procedure (4700) of FIG. 47. The method (4800) may be performed by the AMF 218. The method (4800) comprises the AMF 218 configured to receive a SM Session Activation Request message (4702) from the UE 202, via the AN 204. Next, the AMF 218 sends a SM Session Activation Request message (4704) to the SMF 220. Next, the AMF 218 receives a N11 message containing N2 SM Information and N1 SM Session Activation Accept (4706) from the SMF 220. Next, the AMF 218 sends a N2 message containing N2 SM Information and N1 SM Session Activation Accept (4708) to the AN 204. Next, the AMF 218 receives a N3 (R)AN Information message (4712) from the AN 204. Next, the AMF 218 sends a N3 (R)AN Information (4714) to the SMF 220. Other steps may be added to the method (4800).

Figure 49:
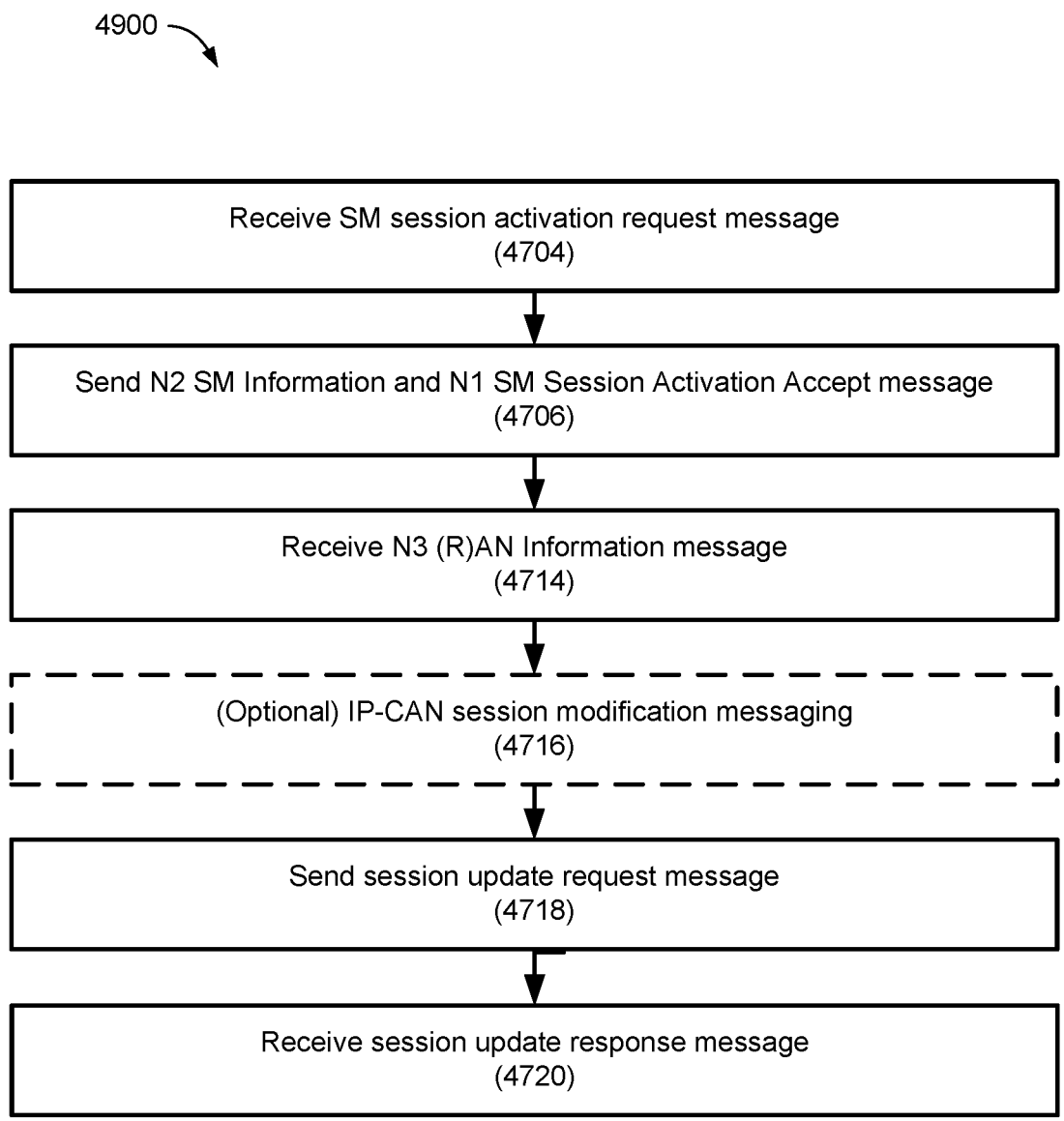
FIG. 49 illustrates, in a flowchart, another example of a method of transitioning a session, in accordance with the session-ACTIVE state transition procedure of FIG. 47.

FIG. 49 illustrates, in a flowchart, an example of a method of transitioning a session (4900), in accordance with the session-ACTIVE state transition procedure (4700) of FIG. 47. The method (4900) may be performed by the SMF 220. The method (4900) comprises the SMF 220 configured to receive a SM Session Activation Request message (4704) from the AMF 218. Next, the SMF 220 sends a N11 message containing N2 SM Information and N1 SM Session Activation Accept (4706) to the AMF 218. Next, the SMF 220 receives a N3 (R)AN Information message (4714) from the AMF 218. Next, the SMF 220 may optionally perform a IP-CAN session modification (4716) with the PCF 222. Next, the SMF 220 sends a Session Update Request message (4718) to the UPF 212. Next, the SMF 220 receives a Session Update Response message (4720) from the UPF 212. Other steps may be added to the method (4900).

Figure 50:
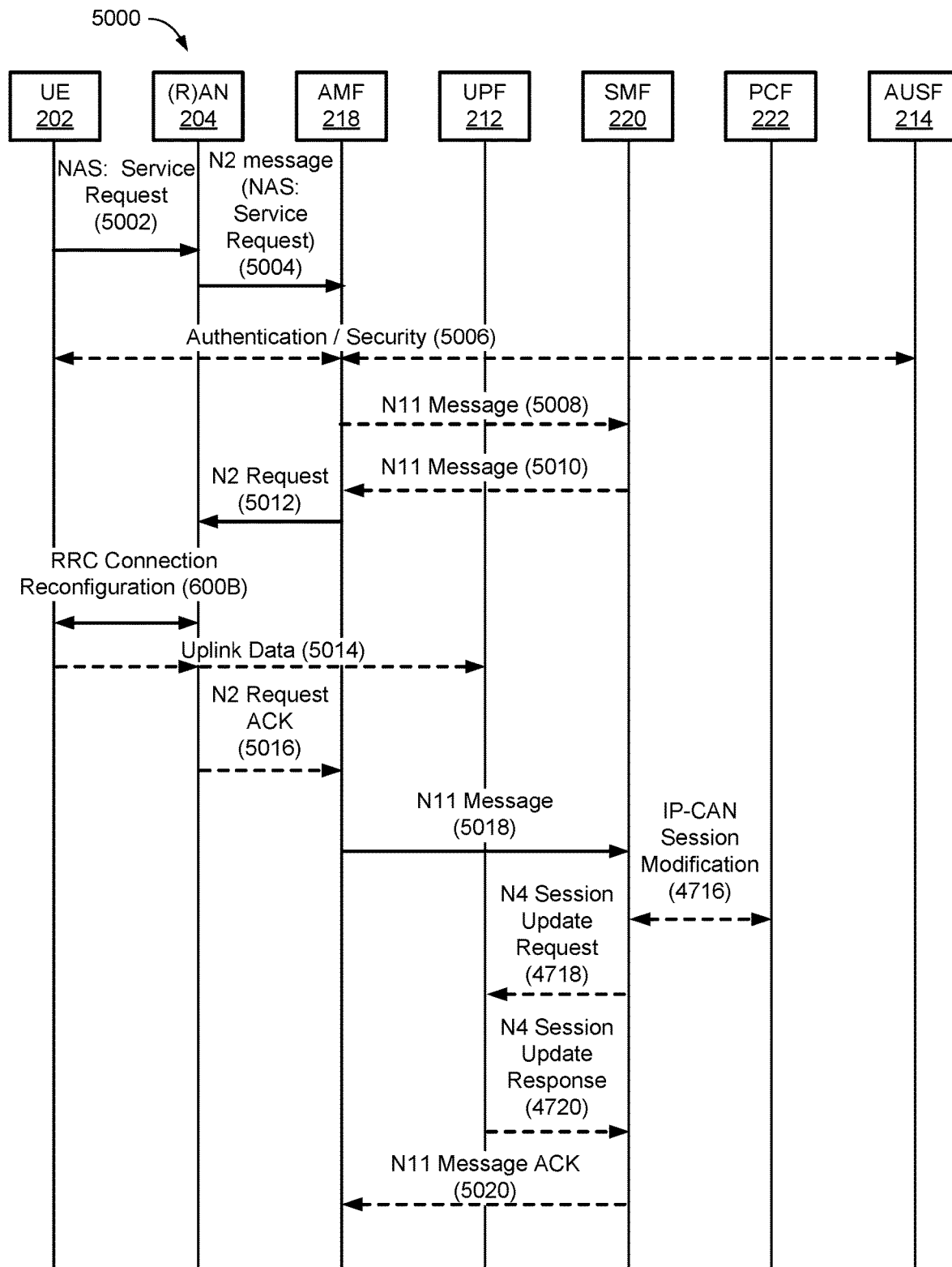
FIG. 50 illustrates, in a message flow diagram, an example of a service request procedure, in accordance with an embodiment of the present invention.

FIG. 50 illustrates, in a message flow diagram, an example of a service request procedure (5000), in accordance with an embodiment of the present invention. The UE 202 may send to the (R)AN 204 a MM NAS service request (5002). The message (5002) may include PDU session ID(s), security parameters, and PDU session status. The UE 202 may send NAS message service request towards the AMF 218 encapsulated in an RRC message to the RAN 204.

If the UE 202 is in the CM-IDLE state, then the UE 202 may send the MM NAS service request message (5002). The UE 202 may include the 5G temporary ID into the RRC message (5002) between the UE 202 and the (R)AN 204. The (R)AN 204 may route the MM NAS service request message to the correct AMF 218 according to the 5G temporary ID. If the UE 204 is in the CM-IDLE state, then the UE 202 may send the MM NAS service request (5002) message. The UE 202 may include security parameters in the NAS message (5002). The PDU session status may be included. Alternatively, the PDU session status may be included only if the UE 202 has released some PDU sessions but has not informed the SMF 220.

If the UE 202 is in the CM-CONNECTED state, the UE 202 may send the MM NAS service request (5002) message. The MM NAS service request message (5002) may be encrypted and integrity protected. The message (5002) may include PDU session ID(s) to be activated. The PDU session status may be included. Alternatively, the PDU session status may be included if the UE 202 has released some PDU sessions but has not informed the SMF 220.

If the UE 202 is triggered for user data, the UE 202 may include the PDU session ID(s) in the NAS service request message (5002) to indicate the PDU session that the UE 202 selects to activate. If the UE 202 is triggered for signalling only, the UE 202 may not send any PDU session ID. When this procedure (5000) is triggered for paging response, if the UE 202 needs to activate the PDU session(s), it includes the PDU session ID(s) in the MM NAS service request (5002) message to indicate the PDU session that the UE 202 needs to activate. Otherwise the UE 202 does not need to include any PDU session ID. The PDU session status may indicate the PDU sessions available in the UE 202.

Next, the (R)AN 204 may send to the AMF 218 a N2 Message (MM NAS service request (5004). The message (5004) may include a 5G temporary ID, location information, a RAT type, and a RRC establishment cause. If the AMF 218 cannot handle the service request (5004) it will reject it.

If the UE 202 is in the CM-IDLE state, then the 5G temporary ID may be obtained in a RRC procedure. The RAN 204 may select the AMF 218 according to the temporary ID. The location information and the RAT type relate to the cell in which the UE 202 is camping.

If the UE is in CM-CONNECTED state, the (R)AN 204 forwards the MM NAS Service Request message to the AMF 218 without adding the 5G temporary ID, location information, RAT type, or RRC establishment cause.

Based on the PDU session status, the AMF 218 may initiate a PDU session release procedure if the PDU session is not available in the UE 202.

Next, if the service request (5004) was not sent integrity protected, or integrity protection is indicated as failed, the AMF 218 may initiate NAS authentication/security procedure (5006) with the UE 202 and the AUSF 214. If the UE 202 is triggered to establish signalling connection, after the security exchange the UE 202 can send uplink signalling and the rest of this procedure are skipped. If the UE is in CM-CONNECTED state, step (5006) is skipped.

Next, the AMF 218 may conditionally send to the SMF 220 a N11 message (5008) that includes an UE identifier (SUPI) and PDU session ID(s). If the MM NAS service request (5004) message includes PDU session ID(s), or this procedure is triggered by SMF 220, the AMF 218 may send a N11 message (5008) to the SMF(s) 220 associated with the PDU session ID(s). Next, the SMF 220 may conditionally send to the AMF 218 a N11 message (5010) that includes N2 SM information (QoS profile, CN N3 tunnel information) and SM NAS Session Activation Accept (with PDU session IDs) to the AMF 218. After receiving the N11 message (5008), each SMF 220 may send a N11 message (5010) to the AMF 218 to establish the user plane(s) for the PDU sessions. The N2 SM Information may include information that the AMF 218 may provide to the RAN 204. The SM NAS Session Activation Accept message may include information that the AMF 218 may provide to the UE 202. The SMF 220 may use a "Message Transfer" service provided by the AMF 218 to send N2 SM information and SM NAS Session Activation Accept.

Next, the AMF 218 may conditional send to the (R)AN 204 a N2 request (5012) that includes N2 SM information and SM NAS session activation accept received from the SMF 220, a security context, an AMF 218 signalling connection ID, a handover restriction list, and a MM NAS service accept. If the service request (5000) was triggered by a UE 202 in the CM-IDLE state, the AMF 218 may include the security context, an AMF signalling connection ID, and a handover restriction list in the N2 request (5012). The RAN 204 may store the security context, AMF signalling connection ID, QoS information for the QoS flows of the PDU sessions that are activated and N3 tunnel IDs in the UE RAN context. If the service request (5000) was triggered when the UE 202 is in the CM-CONNECTED state, the AMF 218 may transfer the N2 SM Information (QoS profile, CN N3 tunnel information) and SM NAS Session Activation Accept to the (R)AN 204, without adding the security context, the AMF signalling connection ID, the handover restriction list, or the MM NAS service accept. If there are multiple PDU sessions that involve multiple SMFs 220, the AMF 218 may wait for responses from all SMFs 220 in step (5010) until it sends the N2 request (5012) to the RAN 204. The MM NAS service accept may include PDU session status in the AMF 218. If this procedure (5000) is triggered for signalling only, the MM NAS service accept can be sent to the UE 202 after step (5006).

Next, the (R)AN 204 and the UE 202 may perform a RRC connection reconfiguration (600B) depending on the QoS information for all the QoS flows of the PDU sessions activated. If the service request procedure (5000) was triggered by a UE 202 in the CM-IDLE state, the user plane security may be established at this step (600A). The RAN 204 may forward the MM NAS service accept and SM NAS Session Activation Accept to the UE 202. If the service request procedure (5000) was triggered by a UE in the CM-IDLE state, the UE 202 may remove the context of PDU sessions that are not available in the 5G CN.

After the user plane radio resources are setup, the uplink data from the UE may be forwarded (5014) to the RAN 204. The 5G RAN 204 may send the uplink data (5014) to the UPF 212 address and tunnel ID provided in the step (5008). Next, the (R)AN 204 may conditionally send to the AMF 218 a N2 request ACK (5016) that includes N2 SM information (RAN tunnel information, a list of accepted QoS flows for each of the PDU sessions activated, and a list of rejected QoS flows for each of the PDU sessions activated.

Next, the AMF 218 may conditionally send to the SMF 220 a N11 message (5018) that includes N2 SM information (RAN tunnel information), a RAT type, a list of accepted QoS flows, and a list of rejected QoS flows per accepted PDU session to the SMF 220. If the UE 202 time zone has changed compared to the last reported UE time zone, then the AMF 218 may include the UE time zone IE in this message (5018). For rejected QoS flows, the SMF 220 may send an SM NAS release QoS flows request to the UE 202. The message (5018) may include PDU session ID(s) and a list of rejected QoS flow for each PDU session. The UE 202 then may confirm the release of rejected QoS flows. Optionally, if dynamic PCC is deployed, SMF 220 may initiate an IP-CAN session modification (4716) and provide new location information to the PCF 222.

Next, the SMF 220 may conditionally send to the UPF 212 a N4 session update request (4718) that includes RAN tunnel information and a list of accepted QoS flows. If a user plane is to be setup or modified, the SMF 220 may initiate a N4 session modification procedure and provide RAN tunnel information. The UPF 212 may then conditionally send to the SMF 220 a N4 session update response (4720). Next, the SMF 220 may conditionally send to the AMF 218 a N11 message ACK (e).

When the network needs to signal (e.g., N1 signalling to a UE 202, Mobile-terminated SMS, PDU session radio resource establishment to deliver mobile terminating user data data) with a UE 202 in a 5G CM-IDLE state or a 5G CM-CONNECTED state, the network may initiate a network triggered service request procedure. If the UE 202 is in the 5G CM-IDLE state, the network triggered service request procedure may send a paging request to the (R)AN 204/UE 202. The paging request triggers the service request procedure in the UE 202. If the UE 202 is in the 5G CM-CONNECTED mode, no paging request will be sent to the (R)AN 204/UE 202.

Figure 51:
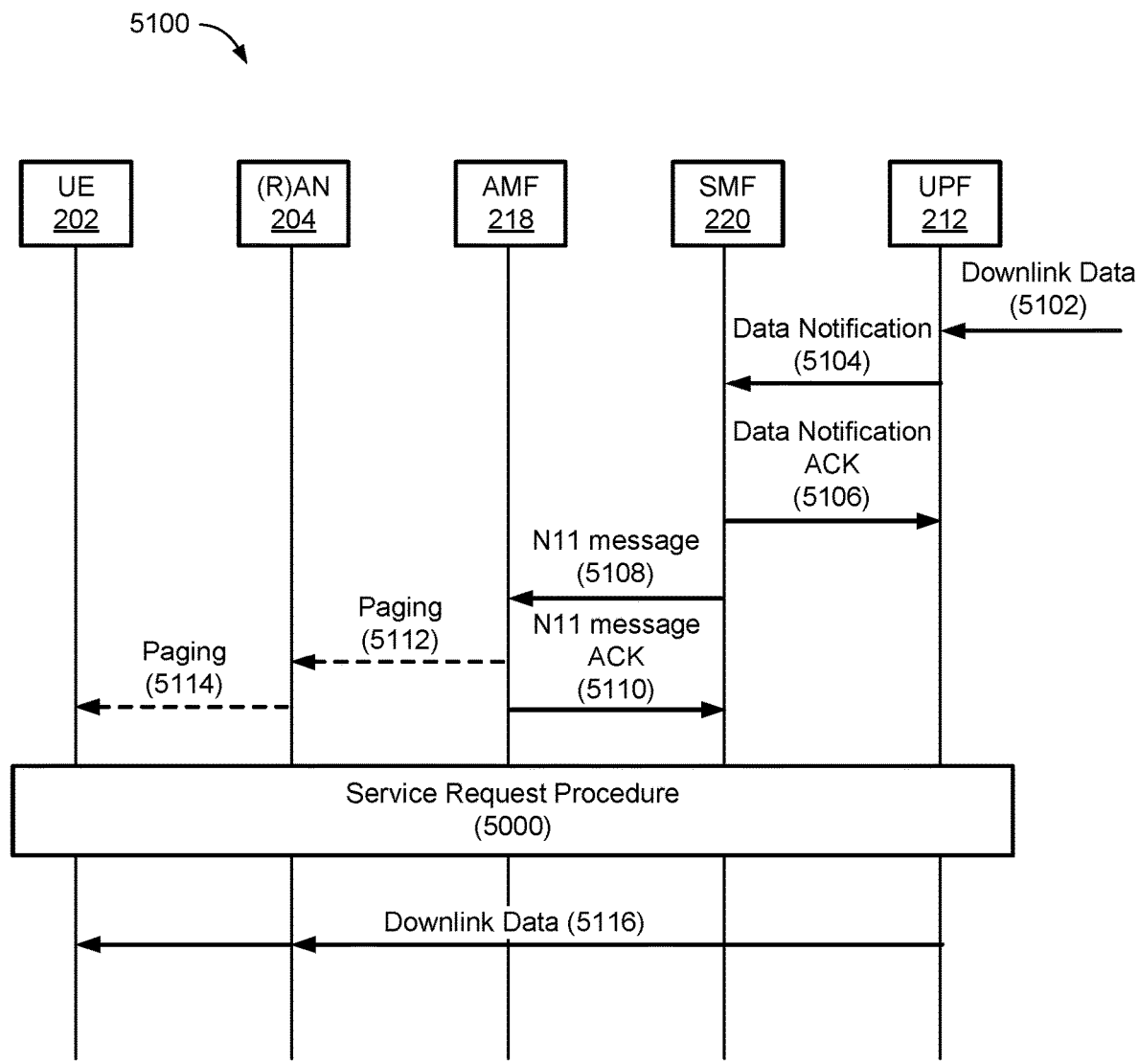
FIG. 51 illustrates, in a message flow diagram, an example of a service request procedure (5100), in accordance with an embodiment of the present invention.

FIG. 51 illustrates, in a message flow diagram, an example of a service request procedure (5100), in accordance with an embodiment of the present invention. When UPF 212 receives downlink data on a PDU session and there is no AN 204 tunnel information stored in UPF 212 for the PDU session, the UPF 212 may buffer the downlink data (e). The UPF 212 may then send to the SMF 220 a data notification (5104) that includes the PDU session ID, and priority. On arrival of the first downlink data packet, the UPF 212 may send the data notification (5104) message to the SMF 220. If the UPF 212 receives additional downlink data packets for a QoS flow in the same PDU session with the same or lower priority than the first data notification (5104) was sent for, the UPF 212 may buffer these downlink data packets and does not send a new data notification. If a paging policy differentiation feature is supported by the UPF 212 and if it is activated by the SMF 220 for this N4 session, the UPF 212 may also include the DSCP in TOS (IPv4)/TC (IPv6) value from the IP header of the downlink data packet. The SMF 220 may send to the UPF 212 a data notification acknowledgement (ACK) (5106).

Next, the SMF 220 may send a N11 message (5108) to the AMF 218, including a UE permanent ID, a PDU session ID, and a priority. The SMF 220 identifies the AMF 218 and sends it a N11 message (5108) including the UE permanent ID, the PDU session ID, the priority, and a paging policy indication. The priority and PDU session ID may be set according to step (5104). If the SMF 220, while waiting for the user plane to be established, receives an additional data notification message (5104) with higher priority than the first N11 message (5108) was sent for, the SMF 220 may send a new N11 message (5108) indicating the higher priority and PDU session ID to the AMF 218. If the SMF 220, while waiting for the user plane to be established, receives a N11 message from an AMF 218 other than the one it sent a N11 message (5108) to, the SMF 220 may re-send the N11 message (5108) only to the new AMF 218 from which it received the N11 message. If the registration procedure with the AMF 218 change is in progress when the old AMF 218 receives the N11 message (5108), the old AMF 218 may reject the N11 message with an indication that the N11 message has been temporarily rejected. When supporting paging policy differentiation, the SMF 220 may indicate in the N11 message (5108) that the paging policy indication related to the downlink data that triggered the data notification message. It is noted that the AMF 218 may receive request message(s) from other network functions which leads to signalling towards UE 202/RAN 204, e.g., network initiated detach, and SMF 220 initiated PDU session modification. If the UE 202 is in the 5G CM-CONNECTED state and the AMF 218 only delivers N1 message towards UE 202, the flow continues in step (5116) below.

The AMF 218 may respond to the SMF 220. If the UE 202 is in the 5G CM-IDLE state, and the AMF 218 considers that the UE 202 is not reachable for paging, the AMF 218 may send a response (5110) to the SMF 220, with cause code and information. The SMF 220 may deliver this further information to the UPF 212. If the UE 202 is in the 5G CM-CONNECTED state, the AMF 218 may send a response (5110) to the SMF 220 with an indication that the UE 202 is in the 5G CM-CONNECTED mode and then the SMF 220 may perform step (5010) to (5020) in the UE triggered service request procedure (5000) to establish the radio resources and N3 tunnel of the PDU session. The rest of this procedure is omitted.

If the UE 202 is registered in the AMF 218 and is in the 5G CM-IDLE but considered reachable for paging, the AMF 218 may send a paging message (5112) including a NAS ID for paging, a registration area, a paging DRX length, and a paging priority indication, to each (R)AN 204 node belonging to the registration area(s) in which the UE 202 is registered. When supporting paging policy differentiation, the AMF 218 may include paging policy indication in the paging request message (5112). Paging strategies may be configured in the AMF 218 for different combinations of DNN, paging policy indication, PDU session IDs from SMF 220 when available (see clause 4.9) and other PDU session context information identified by the PDU session ID received in the N11 message. Paging strategies may include a paging retransmission scheme (e.g., how frequently the paging is repeated or with what time interval); determining whether to send the paging message to the (R)AN 204 nodes during certain AMF 218 high load conditions; whether to apply sub-area based paging (e.g., first page in the last known cell-id or TA and retransmission in all registered TAs). The AMF 218 and the (R)AN 204 may support further paging optimizations in order to reduce the signalling load and the network resources used to successfully page a UE 202 by one or several following means: by the AMF 218 implementing specific paging strategies (e.g., the N2 paging message is sent to the (R)AN 204 nodes that served the UE 202 last); by the AMF 218 considering information on recommended cells and RAN nodes provided by the (R)AN 204 at transition to CN-IDLE. The AMF 218 may take the (R)AN 204 nodes related part of this information into account to determine the (R)AN 204 nodes to be paged, and may provide the information on recommended cells within the N2 paging message to each of these (R)AN 204 nodes; and by the (R)AN 204 considering the paging attempt count information provided by the AMF 218 at paging. If the UE radio capability for paging information is available in the AMF 218, the AMF 218 adds the UE radio capability for paging information in the N2 paging message (e) to the (R)AN 204 nodes. If the information on recommended cells and (R)AN 204 nodes for paging is available in the AMF 218, the AMF 218 may take that information into account to determine the (R)AN 204 nodes for paging and, when paging a (R)AN 204 node, the AMF 218 may transparently convey the information on recommended cells to the (R)AN 204 node. The AMF 218 may include in the N2 paging message(s) (5112) the paging attempt count information. The paging attempt count information may be the same for all (R)AN 204 nodes selected by the AMF 218 for paging.

Next, the (R)AN 204 node may conditionally page (5114) the UE 202. If the (R)AN 204 nodes receive paging messages (5112) from the AMF 218, the UE 202 is paged (5224) by the (R)AN 204 node. When the UE 202 is in the 5G CM-IDLE state, upon reception of a paging request, the UE 202 may initiate the UE triggered service request procedure (5000). In step (5008), the AMF 218 may send a N11 message to both SMF(s) 220 associated with the PDU session identified by PDU session ID(s) in MM NAS service request message, and to SMF(s) 220 from which it receives the N11 message in step (5006). The AMF 218 supervises the paging procedure with a timer. If the AMF 218 receives no response from the UE 202 to the paging request (5224) message, it may repeat the paging according to any applicable paging strategy described in step (5108). If the AMF 218 receives no response from the UE 202 after this paging repetition procedure, the AMF 218 may use the N11 message to notify the SMF 220 about the paging failure, if paging was triggered by a N11 message, unless the AMF 218 is aware of an ongoing MM procedure that prevents the UE 202 from responding (i.e., the AMF 218 receives a context request message indicating that the UE 202 performs TAU procedure with another AMF 218. When a downlink data notification reject message is received, SMF 220 informs the UPF 212, and the UPF 212 deletes the buffered packet(s). Next, the UPF 212 transmits the buffered downlink data (5116) toward the UE 202 via the (R)AN 204 node which performed the service request procedure. The network may send downlink signalling (5116) if the procedure is triggered due to a request from other network entities described in step (5108).

Figure 52A:
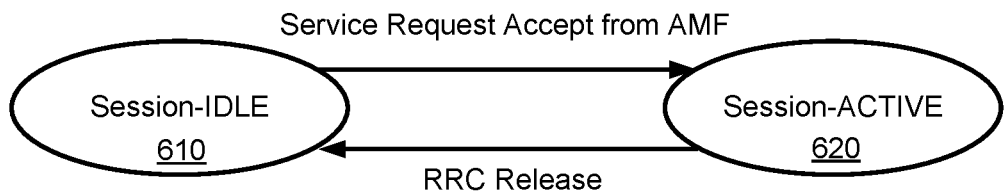
FIG. 52A illustrates, in a state diagram, an example of a session management state model in a UE, in accordance with an embodiment of the present invention.

FIG. 52A illustrates, in a state diagram, an example of a session management state model 5200A in a UE 202, in accordance with an embodiment of the present invention. The session state may transition from a Session-IDLE state 610A to a Session-ACTIVE state 620A when a service request is accepted from the AMF 218. The session state of the UE 202 may transition from the Session-ACTIVE state 620A to the Session-IDLE state 610A when the RRC is released.

FIG. 52A further illustrates, in a state diagram, an example of a session management state model 5200A in a UE 202, in accordance with embodiments of the present invention. When a new PDU session request is accepted, the PDU Session State is created as part of UE's PDU session context, and the PDU Session State is set to the Session-ACTIVE state 620A. When the RRC is released, the PDU Session State is set to the Session-IDLE state 610A. When the UE 202 sends a service request to transmit uplink data or to receive downlink data, and the UE 204 receives a Service Request Accept message from the AMF 218, and the PDU Session State is set to the Session-ACTIVE state 620A.

Figure 52B:
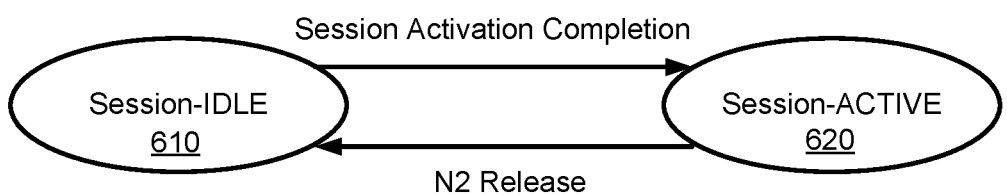
FIG. 52B illustrates, in a state diagram, an example of a session management state model in an AMF and/or a SMF, in accordance with an embodiment of the present invention.

FIG. 52B illustrates, in a state diagram, an example of a session management state model 5200B in an AMF 218 and/or a SMF 220, in accordance with an embodiment of the present invention. The session state may transition from a Session-IDLE state 610B to a session-ACTIVE state 620B after session activation completion. The session state may transition from the Session-ACTIVE state 620B to the Session-IDLE state 610B when the N2 connection is released.

The session state may be used to indicate that the UE 202 has activated a PDU session to send and receive data. Two session states include the Session-ACTIVE state and the Session-IDLE state. The UE 202, the serving AMF 218, and the serving SMF 220 maintain the session state.

When a PDU session is in the Session-IDLE state, the UP data connection between the UE 202 and the UPF 212 terminating N3 connection is not established. The UE 202 may not send or receive data. The (R)AN 204 may not have PDU session context. The UPF 212 terminating N3 connection may have the UE's PDU session context, but without (R)AN 204 N3 connection information (i.e., no address of (R)AN 204 and N3 tunnel endpoint identifier). The SMF 220 may keep the UE's PDU session context information relevant to the SMF 220, but without (R)AN 204 information. The AMF 218 may keep all UE's PDU session context information relevant to the AMF 218.

When a PDU session is in Session-ACTIVE state, the UE 202 may send and receive data. The Uu air interface between the UE 202 and (R)AN 204 may be established. The N3 connection may be established when the PDU session is activated. The UE 202 may have all PDU session context information, including DRB information. The AMF 218 may keep all UE's PDU session context information relevant to the AMF 218. The SMF 220 may keep all of the UE's PDU session context information relevant to the SMF 220. The (R)AN 204 may monitor the data activity of PDU sessions. An information element "Time of Last Data Activity" in the PDU session context at the (R)AN 204 may be used to record the last time the UE 202 had data activity. During a handover procedure, this information element may be transferred to the target (R)AN 204t and unmodified as part of the UE context. Each PDU session context may also have a Session Inactive Timer. During the handover procedure, the (R)AN 204 N3 connection information at the UPF 212 terminating N3 connection may be updated if the PDU session has data activity.

Another parameter, "N3 Status Flag", in UE's PDU session context at the (R)AN 204 may be used to indicate whether the (R)AN 204 information in the UPF 212 is updated or not. The N3 Status Flag in the (R)AN 204 may have two values: N3_AT_UPF_UPDATED and N3_NOT_AT_UPF_UPDATED. During the handover procedure, the target (R)AN 204t compares the duration that the UE 202 has no data activity (from the current time and Time of Last Data Activity parameter) and the Session Inactive Timer parameter. If the duration that the UE 202 has no data activity is longer, the target (R)AN 204t may conclude that the UE 202 has no data activity. Otherwise, the target (R)AN 204t may conclude that the UE 202 has data activity. The (R)AN N3 tunnel information at the UPF terminating N3 connection is updated only if the PDU session has data activity. When the PDU session information is sent to the (R)AN 204 during a session establishment procedure and a session request procedure, the N3 Status Flag in the (R)AN 204 may be set to N3_AT_UPF_UPDATED. The N3 Status Flag in the (R)AN 204 may be changed from N3_AT_UPF_UPDATED to N3_AT_UPF_NOT_UPDATED during the handover procedure, by the target (R)AN 204t if the PDU session has no data activity in a source (R)AN 204s. The N3 Status Flag in the (R)AN 204 may be changed from N3_AT_UPF_NOT_UPDATED to N3_AT_UPF_UPDATED if the PDU session has data activities.

During a handover process, the target (R)AN 204t may send to the AMF 218 a list of PDU sessions that are considered as having no data activity marked by the target (R)AN 204t in the path switch request. The target (R)AN 204t may include another list of the PDU sessions that have N3 Status Flag as N3_AT_UPF_NOT_UPDATED already set by the source (R)AN 204s. For each PDU session, the target RAN 204t may include the (R)AN 204 information of the PDU sessions, such as (R)AN type, (R)AN N3 address and (R)AN N3 tunnel endpoint identifier, and a list of accepted QoS flows and another list of QoS rejected flows. The AMF 218 may store the (R)AN information. The AMF 218 may inform the corresponding serving SMF 220 of the PDU session ID(s) that have no data activity marked by the target (R)AN 204t in the path switch request. The SMF 220 may send a message to the serving UPF 212 to release the (R)AN N3 tunnel information.

The AMF 218 and the SMF 220 may have a N3 Status Flag as part of their UE's PDU session context. When the PDU session is established or activated, the N3 Status Flag in the AMF 218 and SMF 220 may be set to N3_AT_UPF_UPDATED. The N3 Status Flag in AMF 218 and SMF 220 may be changed from N3_AT_UPF_UPDATED to N3_AT_UPF_NOT_UPDATED when receiving the message from the (R)AN 204 indicating that this PDU Session has no data activity. The N3 Status Flag in AMF 218 and SMF 220 may be changed from N3_AT_UPF_NOT_UPDATED to N3_AT_UPF_UPDATED when the UE 202 has data activity notified by the UPF 212 or the (R)AN 204.

Table 2 states the description of the session states session-ACTIVE and session-IDLE for various network entities.

TABLE 2

Description of Session State

| Network Entity | Session-ACTIVE | Session-IDLE |
| --- | --- | --- |
| UE (maintains Session State) | Has all PDU session context, including DRB information | Has PDU session context without DRB information |
| (R)AN (does not maintain Session State) | Has all PDU session context and DRB information | Has no PDU session context and no DRB information |
| UPF (does not maintain Session State) | Has all PDU session context information | Has PDU session context without (R)AN N3 connection information |
| AMF (maintains Session State) | Has all PDU session context information relevant to access and mobility management. | Has all PDU session context information relevant to access and mobility management. |
| SMF (maintains Session State) | Has all PDU session context information. However, depending on N3 Status Flag, the SMF may not have (R)AN information, such as (R)AN type and (R)AN N3 connection information, if on N3 Status Flag is N3_AT_UPF_NOT_UPDATED. | Has PDU session context without (R)AN information, such as (R)AN type and (R)AN N3 connection information. |

FIG. 52B further illustrates, in a state diagram, an example of a session management state model 5200B in an AMF 218 and/or a SMF 220, in accordance with embodiments of the present invention. When a new PDU session request is accepted, the PDU Session State is created as part of UE's PDU session context in the AMF 218 and in the SMF 220, and the PDU Session State is set to the Session-ACTIVE state 620A. When the N2 is released, the PDU Session State of all PDU sessions in the AMF 218 and the SMF 220 transition from the Session-ACTIVE state 620A to the Session-IDLE state 610A. When the UE 202 Service Request including the PDU Session Activation request is accepted, the PDU Session State of requested PDU Session transitions from the Session-IDLE state 610A to the Session-ACTIVE state 620A.

In the 3GPP TS 23.502, clause 4.2.3.2 on UE triggered Service Request in CM-IDLE state, a UE triggered Service Request in the CM-IDLE state procedure is described. Step 5 of that procedure pertains to the AMF 218 sending a N2 Request message to the (R)AN 204. It is noted that this message may include a Monitor Data Activity Flag in addition to a N2 SM information received from SMF 220, a security context, an AMF Signalling Connection ID, a Handover Restriction List, and a MM NAS Service Accept. The (R)AN 204 stores the Security Context, AMF Signalling Connection Id, QoS Information for the QoS Flows of the PDU Sessions that are activated, N3 Tunnel IDs, and the Monitor Data Activity Flag in the UE RAN context.

An Xn based inter NG (R)AN handover may take place with and without UPF 212 relocation. The handover may be based on a centralized deployment or on a local deployment. Separate call flows may be defined for roaming scenarios.

The AMF 218 analyzes the mobility pattern of the UE 202 and determines, based on the mobility pattern, whether to request the (R)AN 204 to monitor data activity of individual PDU sessions. If the AMF 218 requests the (R)AN 204 to monitor data activity of individual PDU sessions, then after the PDU session is established or activated, the (R)AN 204 records the last time a PDU session has data activity via a parameter named "Time of Last Data Activity". During the handover procedure, the Time of Last Data Activity parameter is transferred to the target (R)AN 204t and unmodified as part of the UE's PDU context. The target (R)AN 204t sends the Time of Last Data Activity parameter of PDU sessions in the list of PDU sessions that require a path switch in the Path Switch request.

Alternatively, the AMF 218 may inform the SMF 220 about the UE 202 mobility pattern during a Session Establishment procedure. The SMF 220 may then determine whether to monitor the data activity of individual PDU sessions. In this case, during the Session Establishment procedure, the SMF 220 requests the (R)AN 204 to monitor data activity of PDU session.

For each PDU session included in the path switch request, the SMF 220 decides whether or not to update the (R)AN tunnel information for the UPF 212 based on criteria. The criteria may include at least one of: the mobility patter of the UE 202, a PDU session type, the length of time that the UE 202 has no data activity, and whether there are other PDU session served by the same UPF 212. With the mobility pattern of the UE 202, only the UE 202 requesting handover is considered. The PDU session type may be stored as a part of the Attributes of a PDU session. How long the UE has no data activity is based on the Time of Last Data Activity reported by (R)AN 204 as instructed by the AMF 218.

The AMF 218 and the SMF 220 each have a parameter, named "N3 Connection status", as part of their UE's PDU session context. The N3 Connection Status has two values: N3_CONNECTED and N3_DISCONNECTED. When the PDU session is established or activated, the N3 Connection Status in the AMF 218 and the SMF 220 are set to N3_CONNECTED. The N3 Connection Status of a PDU session in the AMF 218 is changed from N3_CONNECTED to N3_DISCONNECTED when the AMF 218 receives a message from the SMF 220 indicating that the (R)AN information is not updated for this PDU Session during handover procedure. The N3 Connection Status of a PDU session in the SMF 220 is changed from N3_CONNECTED to N3_DISCONNECTED when the SMF 220 decides not to update the UPF 212 with (R)AN information during handover procedure. The N3 Connection Status in AMF 218 and SMF 220 is changed from N3_DISCONNECTED to N3_CONNECTED when the UE 202 has data activity notified by the UPF 212 or the (R)AN 204.

During the handover process, the target (R)AN 204t sends to the AMF 218 the list of PDU sessions to be switched and to be released in the path switch request. The PDU sessions to be switched are the PDU sessions that have UPF N3 tunnel information. For each PDU session to be switched, the target RAN 204t includes the Time of Last Data Activity parameter, and the target (R)AN information, such as the (R)AN type, the (R)AN address and the (R)AN N3 Tunnel Endpoint Identifier. The AMF 218 stores the (R)AN type. The AMF 218 informs the corresponding serving SMF 220 of the PDU Session ID(s) to be switched and to be released. For PDU sessions to be switched, the SMF 220 determines whether or not to update the (R)AN information for the UPF 212. If the SMF 220 determines to update (R)AN information for the UPF 212, the SMF 220 sends (R)AN N3 tunnel information to the UPF 212. If the SMF 220 determines not to update the (R)AN information, the SMF 220 sends a request message to the UPF 212 to delete the (R)AN N3 tunnel information. The SMF 220 informs the AMF 218 of its determination of whether or not to update the (R)AN information at the UPF 212. For the PDU sessions where the (R)AN information is updated in the UPF 212, the N3 Connection Status in the AMF 218 and the SMF 220 is set to N3_CONNECTED. Otherwise, the N3 Connection Status in the AMF 218 and the SMF 220 is set to N3_DISCONNECTED. During the N2 Release procedure, the AMF 218 sends a N2 Release Notification message to the SMF(s) 220 that serves PDU sessions that are in the Session-ACTIVE state and have the N3 Connection Status set to N3_CONNECTED.

Figure 53:
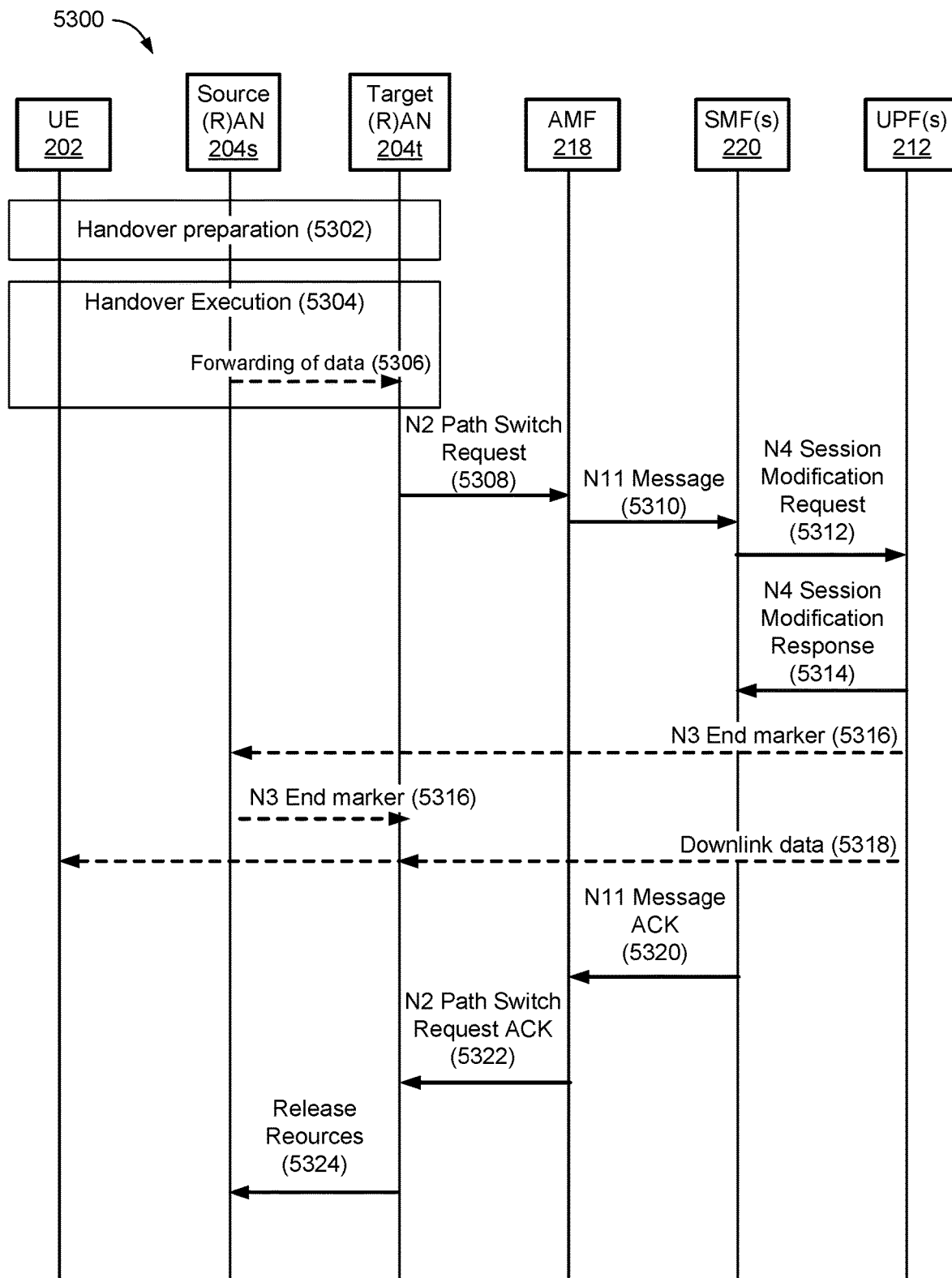
FIG. 53 illustrates, in a message flow diagram, an example of a Xn based inter NG RAN handover procedure without UPF relocation, in accordance with an embodiment of the present invention.

FIG. 53 illustrates, in a message flow diagram, an example of a Xn based inter NG RAN handover procedure (5300) without UPF 212 relocation, in accordance with an embodiment of the present invention. This procedure (5300) may be used to hand over a UE 202 from a source RAN 204 to target RAN 204t using Xn when the AMF 218 is unchanged and the SMF 220 decides to keep the existing UPF 212 (i.e., the UPF 212 which terminates the N3 interface in the NG Core Network (NGC). The presence of IP connectivity between the source UPF 212 and target UPF 212 is assumed.

The procedure (5300) includes handover preparation (5302) and handover execution (5304). The handover execution (5304) includes the forwarding of data (5306) from a source RAN 204s to a target RAN 204t. The target RAN 204t may check whether some PDU sessions having a N3 Status Flag "N3_AT_UPF_UPDATED" but having no data activity in the source RAN 204s by reading the parameter "Time of Last Data Activity" in the PDU session context. If the duration that a PDU has no data activity is longer than the parameter Session Inactive Timer, the PDU session is considered as having no data activity. The target RAN 204t may send an N2 path switch request message (5308) to an AMF 218 to inform that the UE 202 has moved to a new target cell, and a list of PDU sessions to be switched or removed, a list of PDU sessions that have no data activity marked by the target RAN 204t and a list of PDU sessions that have no data activity marked by the source RAN 204s. Depending on the type of target cell, the target RAN 204t may include appropriate information in this message (5308) for each PDU session, including RAN type, N3 RAN Address and N3 tunnel endpoint identifier. If the target RAN 204t cannot support some QoS flows of a PDU session, the N2 path switch request message (5308) may include the list of accepted QoS flows and the list of rejected QoS flows for this PDU session.

Next, the AMF 218 may send a N11 message (5310) to each SMF 220 associated with the lists of PDU sessions received in the N2 path switch request (5308). For the PDU sessions that require a path to be switched, upon receipt of the N11 message (5310), each of these SMFs 220 determines whether the existing UPF 212 can continue to serve the UE 202. If the existing UPF 212 cannot continue to serve the UE 202 and it is not a PDU session anchor, steps (5608) to (5624) of FIG. 56, as described below, are performed. Otherwise, the following steps (5312) to (5318) are performed by each of these SMFs 220 if their existing UPFs 212 can continue to serve the UE 202. For the PDU sessions that are in the list of PDU sessions having no data activity marked by the source RAN 204s and the list of PDU sessions having no data activity marked by target RAN 204t, the AMF 218 may store the RAN 204 information. For each PDU session in the list of PDU sessions having no data activity marked by the target RAN 204t, the AMF 218 may send the N11 message (5310) to the SMF 220 to forward the PDU Session ID to notify that the PDU session has no data activity.

Next, the SMF 220 may initiate a release of PDU sessions which are not requested by the target RAN 204t. For PDU sessions requested by the target RAN 204t, the SMF 220 may send an N4 session modification request (including RAN address, tunnel identifiers for downlink user plane, list of accepted flows if present) message (5312) to the UPF 212. For the PDU sessions where the RAN 204 information is to be released, the SMF 220 may send an N4 session modification request (5312) to the UPF 212 for these PDU sessions. The message (5312) may indicate the release of RAN N3 connection information (i.e., RAN address and tunnel identifier for the downlink user plane). Next, the UPF 212 returns an N4 session modification response (including tunnel identifiers for uplink traffic) message (5314) to the SMF 220 after the requested PDU sessions are switched or modified. In order to assist the reordering function in the target RAN 204t for PDU sessions requiring a path switched, the UPF 212 may send one or more "end marker" packets (5316) on the old path immediately after switching the path. The UPF 212 may start sending downlink packets (5318) to the target RAN 204t. It is noted that step (5318) can occur any time after receipt of the N4 session modification response (5314) at the SMF 2200. In the SMF 220, for PDU sessions having no data activity, the parameter N3 Status Flag of these PDU sessions may be changed from N3_AT_UPF_UPDATED to N3_AT_UPF_NOT_UPDATED. The SMF 220 may send an N11 message acknowledgement (ACK) (5320) (including CN tunnel information) to the AMF 212 for PDU sessions which have been switched or modified successfully.

After receiving the N11 message response (5320) from the SMFs 220, for PDU sessions having no data activity marked by the target RAN 204t, the AMF 218 may change the parameter N3 Status Flag of these PDU sessions from N3_AT_UPF_UPDATED to N3_AT_UPF_NOT_UPDATED. Once the N11 message response (5320) is received from all the SMFs 220, the AMF 218 may aggregate the received CN tunnel information from these responses and send this aggregated information as a part of N2 SM information in a N2 path switch request ACK (5322) to the target RAN 204t. If none of the requested PDP sessions have been switched successfully, the AMF 218 may send an N2 path switch request failure message to the target RAN 204t. In the target RAN 204t, for PDU sessions having no data activity marked by the target RAN 204t, the parameter N3 Status Flag of these PDU sessions may be changed from N3_AT_UPF_UPDATED to N3_AT_UPF_NOT_UPDATED. By sending a release resources message (5324) to the source RAN 204s, the target RAN 204t confirms success of the handover. It then triggers the release of resources with the source RAN 204s.

FIG. 53 further illustrates, in a message flow diagram, an example of a Xn based inter NG (R)AN handover procedure (5300) without user plane function relocation and with session deactivation, in accordance with embodiments of the present invention. The procedure (5300) provides an alternative solution that combines the handover procedure defined in clause 4.9.1.1 of TS 23.502 and the session deactivation signalling messages.

This procedure (5300) is used in a handover of a UE 202 from a source RAN 204s to target RAN 204t using Xn when the AMF 218 is unchanged and the SMF 220 determines to keep the existing UPF 212. The UPF 212 is the UPF which terminates the N3 interface in the NGC. The presence of IP connectivity between the source UPF 212s and the target UPF 212t is assumed. When the PDU is established, the SMF 220 sends to the (R)AN 204 a timer parameter, for example, named "Session_Inactivity_Timer". The source (R)AN 204s records the last time the PDU session has data activity using the "Time of Last Data Activity" parameter. The source (R)AN 204s sends the Session_Inactivity_Timer parameter and the Time of Last Data Activity parameter to the target (R)AN 204t as part of UE's PDU session context. If a PDU session does not have data activity for a period longer than the Session_Inactivity_Timer parameter, the target (R)AN 204t determines to initiate the PDU session deactivation procedure.

In the Handover Execution step, the target (R)AN 204t sends the UE 202 an RRC signalling message that indicates if the PDU sessions that are accepted, deactivated, or rejected. Then the target (R)AN 204t informs the SMF 220 (via the AMF 218) that the PDU sessions that are accepted, deactivated, or rejected. For PDU sessions that are accepted, the target (R)AN 204t includes the (R)AN N3 tunnel information, such as the (R)AN Address and the Tunnel Endpoint Identifier. For PDU sessions that are accepted, the SMF 220 requests the UPF 212 to update the (R)AN tunnel information. For PDU sessions that are deactivated, the SMF 220 sends a message requesting the UPF 212 to delete the (R)AN tunnel information. For PDU sessions that are released, the SMF 220 initiates the PDU Session Release procedure.

The target RAN 204t sends a N2 Path Switch Request (5308) message to an AMF 218 that indicates that the UE 202 has moved to a new target cell. The message (5308) includes a list of PDU Sessions to be switched, deactivated, or removed. Depending on the type of target cell, the target RAN 204t includes other information in this message. The PDU sessions to be switched are the PDU sessions having UPF N3 tunnel information. For each PDU session to be switched, the target (R)AN 204t includes the Time of Last Data Activity parameter, and the (R)AN information (such as the N3 (R)AN Address and the N3 tunnel endpoint identifier). If the target RAN 204t cannot support a QoS flow of a PDU session, the N2 Path Switch Request (5308) message includes the list of accepted QoS flows and the list of rejected QoS flows for this PDU session.

The AMF sends a N11 Message (5310) to each SMF 220 associated with the list of PDU Sessions received in the N2 Path Switch Request (5308) message. For the PDU sessions that require a path switch, upon receipt of the N11 Message (5310), each of these SMFs 220 determines whether or not the existing UPF 212 can continue to serve the UE 202. If the existing UPF 212 cannot continue to serve the UE 202, and it is not a PDU session anchor, steps 3-11 of clause 4.9.1.2 of TS 23.502 are performed. For each PDU session where a path switch is required, the SMF 220 determines whether or not the existing UPF 212 needs to be updated with the (R)AN 204 tunnel information, according to clause 5.6.X of TS 23.501.

The SMF 220 initiates release of PDU Sessions which are not requested by the target RAN 204t. For PDU sessions requested by the target RAN 204t, the SMF 220 sends a N4 Session Modification Request (6408) message to the UPF 212. The message (5312) includes the (R)AN address, the tunnel identifiers for the downlink user plane, and the list of accepted flows, if present. For the PDU sessions to be deactivated, the (R)AN information does not need to be updated. The SMF 220 sends a N4 Session Modification Request (5312) message to the UPF 212 for those PDU sessions. The message (5312) indicates the release of the (R)AN N3 tunnel information, such as the (R)AN Address and the Tunnel Endpoint Identifier for the downlink user plane. The UPF 212 returns a N4 Session Modification Response (5314) message to the SMF 220 after the requested PDU Sessions are switched or modified. The message (5314) includes the Tunnel identifiers for uplink traffic.

In order to assist the reordering function in the target RAN 204t for PDU sessions requiring a path switch, the UPF 212 sends one or more "end marker" packets (5316) on the old path immediately after switching the path. The UPF 212 starts sending downlink packets to the target RAN 204t. The SMF 220 sends a N11 Message ACK (5318) message to the AMF 218 for the PDU sessions which have been successfully switched or deactivated. The message (5318) includes the CN Tunnel Information and indicates whether the (R)AN N3 tunnel information is updated (e.g., path switched) or deleted (e.g., PDU sessions deactivated). In the SMF 220, for PDU sessions where the N3 (R)AN tunnel information is deleted from the UPF 212, the session state is set to Session-IDLE. It is noted that step (5318) can occur any time after receipt of N4 Session Modification Response (5314) message at the SMF 220.

In the AMF 218, upon receiving the N11 Message ACK (5318) message, the Session State of the deactivated PDU sessions is set to Session-IDLE. Once the N11 Message Response (5318) is received from all the SMFs 220, the AMF 218 aggregates received CN Tunnel Information from these responses and sends this aggregated information as a part of N2 SM Information in a N2 Path Switch Request ACK (5320) message to the target RAN 204t. The message (5320) includes an indication, for each PDU session, whether or not the UPF 212 is updated with (R)AN information. If none of the requested PDP Sessions have been successfully switched, the AMF 218 sends an N2 Path Switch Request Failure message to the target RAN 204t. In the target RAN 204t, for PDU sessions where the UPF 212 is not updated with the (R)AN information, the UPF N3 tunnel information is deleted. By sending a Release Resources (5322) message to the source RAN 204s, the target RAN 204t indicates success of the handover. It then triggers the release of resources with the source RAN 204s.

FIG. 53 further illustrates, in a message flow diagram, an example of a Xn based inter NG (R)AN handover procedure (5300) without UPF 212 relocation, in accordance with an embodiment of the present invention. This procedure (5300) may be used to hand over a UE 202 from a source (R)AN 204s to a target RAN 204t using Xn when the AMF 218 is unchanged and the SMF 220 determines to keep the existing UPF 212 (e.g., the UPF 212 which terminates the N3 interface in the NG Core Network (NGC)). The presence of IP connectivity between the source UPF 212 and target UPF 212 is assumed.

The procedure (5300) includes handover preparation (5302) and handover execution (5304). The handover execution (5304) includes the forwarding of data (5306) from a source (R)AN 204s to a target (R)AN 204t. The target (R)AN 204t sends an N2 path switch request message (5308) to the AMF 218 that includes an indication that the UE 202 has moved to a new target cell, and a list of PDU sessions to be switched or removed. Depending on the type of target cell, the target (R)AN 204t includes other information in the message (5308) for each PDU session to be switched, including the Time of Last Data Activity parameter, and (R)AN information such as the N3 (R)AN Address and the N3 tunnel endpoint identifier. If the target (R)AN 204t cannot support a QoS flows of a PDU session, the N2 path switch request message (5308) may include the list of accepted QoS flows and the list of rejected QoS flows for this PDU session.

Next, the AMF 218 sends a N11 Message (5310) to each SMF 220 associated with the lists of PDU sessions received in the N2 Path Switch Request (5308) message. For the PDU sessions that require a path switch, upon receipt of the N11 Message (5310), each of these SMFs 220 determine whether or not the existing UPF 212 can continue to serve the UE 202. If the existing UPF 212 cannot continue to serve the UE 202 and it is not a PDU session anchor, steps (5608) to (5624) of FIG. 56, as described below, are performed. Otherwise, the following steps (5312) to (5318) are performed by each of these SMFs 220 if their existing UPFs 212 can continue to serve the UE 202. For each PDU session where a path switch is required, the SMF 220 determines whether or not the existing UPF 212 is to be updated with the (R)AN tunnel information.

Next, the SMF 220 initiates a release of PDU sessions which are not requested by the target RAN 204t. For PDU sessions requested by the target RAN 204t, the SMF 220 sends a N4 Session Modification Request (5312) message to the UPF 212. The message (5312) includes the (R)AN address, tunnel identifiers for the downlink user plane, and a list of accepted flows if present. For the PDU sessions where the (R)AN 204 information does not need to be updated, the SMF 220 sends an N4 Session Modification Request (5312) message to the UPF 212 for these PDU sessions. The message (5312) indicates the release of RAN N3 tunnel information, such as the (R)AN address and Tunnel Endpoint Identifier for the downlink user plane. Next, the UPF 212 returns an N4 Session Modification Response (5314) message to the SMF 220 after the requested PDU sessions are switched or modified. The message (5314) includes tunnel identifiers for uplink traffic. In order to assist the reordering function in the target (R)AN 204t for PDU sessions requiring a path switched, the UPF 212 sends one or more "end marker" packets (5316) on the old path immediately after switching the path. The UPF 212 may start sending downlink packets (5318) to the target RAN 204t. It is noted that step (5318) can occur any time after receipt of the N4 Session Modification Response (5314) message at the SMF 2200. The SMF 220 sends an N11 message acknowledgement (ACK) (5318) message to the AMF 212 for PDU sessions which have been switched or successfully modified. The message (5318) includes CN tunnel information. The message (5318) indicates whether the (R)AN N3 tunnel information is updated (e.g., a path switch) or released (e.g., a path release). In the SMF 220, for PDU sessions where the N3 (R)AN tunnel information is not updated in the UPF 212, the N3 Connection Status parameter of these PDU sessions are changed from N3_CONNECTED to N3_DISCONNECTED.

In the AMF 218, upon receiving the N11 Message ACK (5318), the N3 Connection Status parameter of PDU sessions where the SMF 220 does not update the (R)AN information for the UPF 212 is changed from N3_CONNECTED to N3_DISCONNECTED. Once the N11 Message ACK (5318) is received from all the SMFs 220, the AMF 218 aggregates the received CN Tunnel Information from these responses and sends this aggregated information as a part of a N2 SM Information in a N2 Path Switch Request ACK (5320) to the target (R)AN 204t. The message (5320) includes an indication for each PDU session for whether or not the UPF 212 is updated with (R)AN information. If none of the requested PDP sessions have been successfully switched, the AMF 218 sends an N2 Path Switch Request Failure message to the target (R)AN 204t. In the target (R)AN 204t, for PDU sessions where the UPF 212 is not updated with (R)AN information, the UPF N3 tunnel information is deleted. By sending a Release Resources (5322) message to the source (R)AN 204s, the target (R)AN 204t confirms success of the handover. It then triggers the release of resources with the source (R)AN 204s.

FIG. 53 further illustrates, in a message flow diagram, an example of an Xn based inter NG RAN handover procedure (5300) without User Plane function relocation, in accordance with embodiments of the present invention. The Target (R)AN 204 may send an N2 Path Switch Request message (5308) to an AMF 218 to inform that the UE 202 has moved to a new target cell, and to provide a list of PDU Sessions to be switched. Depending on the type of target cell, the Target (R)AN 204t may include appropriate information in this message. For each to be switched to the Target (R)AN 204t, the N2 Path Switch Request message (5308) may include the list of accepted QoS flows.

The AMF 218 may then send N2 SM information by using an N11 Message (5310) to each SMF 220 associated with the list of PDU Sessions, and the list of accepted QoS flows for each PDU session, received in the N2 Path Switch Request (5308). For the PDU Sessions to be switched to the Target (R)AN 204t, upon receipt of the N11 Message, each of the SMFs 220 determine whether the existing UPF 212 can continue to serve the UE 202. If the existing UPF 212 cannot continue to serve the UE 202 and it is not a PDU session anchor, steps 3-11 of clause 4.9.1.2 TS. 23.502 are performed. Otherwise, the following steps are performed. For the activated PDU session(s) which are not included in the N2 Path Switch Request message, the AMF 218 may send separate request(s) to the relevant SMF(s) 220.

For PDU Sessions requested by the Target (R)AN 204t, the SMF 220 may send a N4 Session Modification Request message (5312) to the UPF 212. The message (5312) may include the (R)AN address, the tunnel identifiers for downlink User Plane, and the list of accepted QoS flows. For PDU Session that the Target (R)AN 204t cannot support, the SMF 220 may determine whether to release or keep, but not to be switched, this PDU session. If the PDU session is released, the SMF 220 may initiate the PDU Session Release procedure. If the PDU session is kept but not to be switched, the SMF 220 may send an N4 Session Modification Request (5312) to the UPF 212 to set the Session-AMBR of the PDU session to zero.

For a PDU session to be switched, the UPF 212 may return an N4 Session Modification Response message (5314) to the SMF 212 after the requested PDU Sessions are switched. The message (5314) may include the Tunnel identifiers for uplink traffic. For PDU session to not be switched, the UPF 212 may return an N4 Session Modification Response message (5314) accordingly.

For a PDU session to be switched, in order to assist the reordering function in the Target (R)AN 204t, the UPF 212 may send one or more "end marker" packets (5316) on the old path after switching the path. The UPF 212 may start sending downlink packets to the Target (R)AN 204t.

The SMF 220 may then send an N11 Message ACK message (5318) to the AMF 218 for PDU Sessions which have been switched successfully. The message (5318) may include the CN Tunnel Information. For a PDU session to not be switched, the SMF 220 may send a N11 Message ACK (5318) to the (R)AN 204 via the AMF 218. The message (5318) may include the N2 SM message that includes the PDU Session ID, and sets the Session-AMBR to 0. It is noted that step (5318) can occur any time after receipt of N4 Session Modification Response at the SMF 220.

Once the N11 Message Response (5318) is received from all the SMFs 220, the AMF 218 may aggregate the received CN Tunnel Information from these responses and send the aggregated information as a part of N2 SM Information in a N2 Path Switch Request ACK (5320) to the Target (R)AN 204t. If none of the requested PDP Sessions have been switched successfully, the AMF 218 may send an N2 Path Switch Request Failure message (5320) to the Target (R)AN. By sending a Release Resources message (5322) to the Source (R)AN 204s, the Target (R)AN 204t may confirm the success of the handover. It then may trigger the release of resources with the Source (R)AN 204s.

In an Inter NG-RAN node handover without Xn interface, a source (R)AN (S-RAN) 204s may initiate an N2-based handover to the target (R)AN (T-RAN) 204t. This can be triggered, for example, due to new radio conditions or load balancing, no Xn connectivity to the target (R)AN 204t, an error indication from the target (R)AN 204t after an unsuccessful Xn-based handover, or based on dynamic information learnt by the S-RAN 204s.

Figure 54:
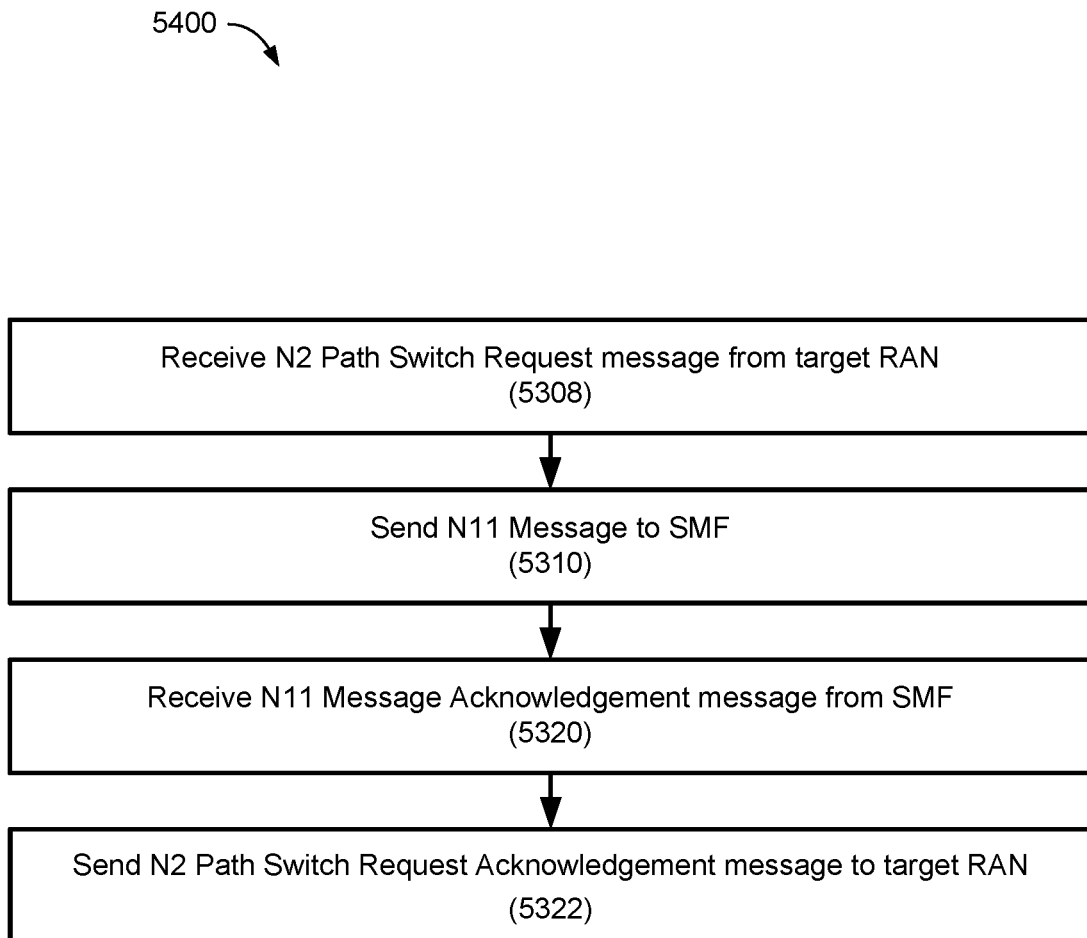
FIG. 54 illustrates, in a flowchart, an example of a method of handing over a UE from a source RAN to a target RAN, in accordance with the Xn based inter NG RAN handover procedure of FIG. 53.

FIG. 54 illustrates, in a flowchart, an example of a method (5400) of handing over a UE 202 from a source RAN 204s to a target RAN 204t, in accordance with the Xn based inter NG RAN handover procedure (5300) of FIG. 53. The method (5400) may be performed by the AMF 218. The method (5400) comprises the AMF 218 configured to receive the N2 path switch request (5308) message from the target RAN 204t. Next, the AMF 218 sends the N11 message (5310) to the SMF 220. Next, the AMF 218 receives the N11 message ACK (5318) from the SMF 220. Next, the AMF 218 sends the N2 path switch request ACK (5320) message to the target RAN 204t. Other steps may be added to the method (5400).

Figure 55:
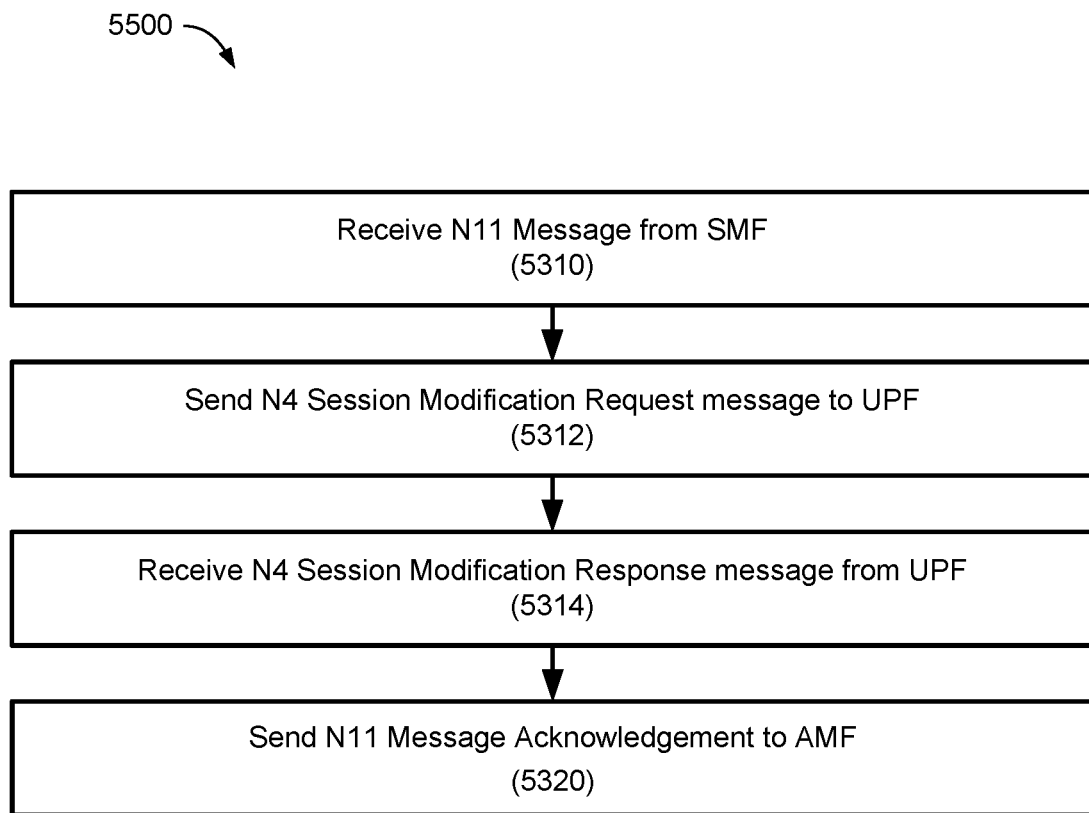
FIG. 55 illustrates, in a flowchart, another example of a method of handing over a UE from a source RAN to a target RAN, in accordance with the Xn based inter NG RAN handover procedure of FIG. 53.

FIG. 55 illustrates, in a flowchart, another example of a method (5500) of handing over a UE 202 from a source RAN 204s to a target RAN 204t, in accordance with the Xn based inter NG RAN handover procedure (5300) of FIG. 53. The method (5500) may be performed by the SMF 220. The method (5500) comprises the SMF 220 configured to receive the N1 message (5310) from the AMF 218. Next, the SMF 220 sends the N4 session modification request (5312) message to the UPF 212. Next, the SMF 220 receives the N4 session modification response (5314) from the UPF 212. Next, the SMF sends the N11 message ACK (5318) to the AMF 218. Other steps may be added to the method (5500).

Figure 56:
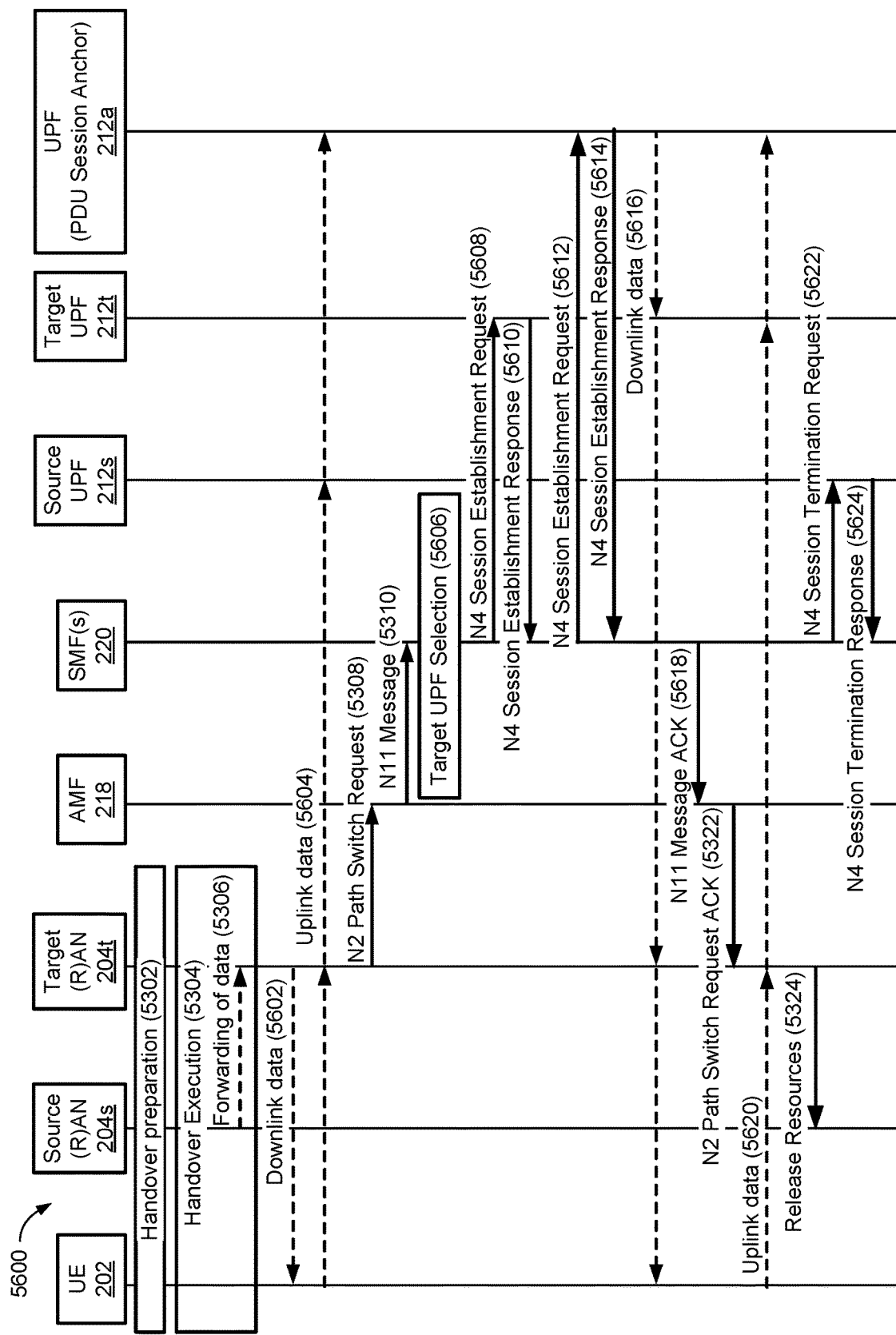
FIG. 56 illustrates, in a message flow diagram, an example of a Xn based inter NG RAN handover procedure with user plan function relocation, in accordance with an embodiment of the present invention.

FIG. 56 illustrates, in a message flow diagram, an example of a Xn based inter NG RAN handover procedure (5600) with user plan function relocation, in accordance with an embodiment of the present invention. The procedure (5600) may be used to hand over a UE 202 from a source RAN 204s to a target RAN 204t using Xn when the AMF 218 is unchanged and the SMF 220 decides that the source UPF 212s is to be released. The source UPF 212s is the UPF 212 which terminates a N3 interface in the NGC. The presence of an IP connectivity between the source UPF 212s and source RAN 204s, and between the target UPF 212t and target RAN 204t is assumed.

The procedure (5600) includes the handover preparation (5302) and the handover execution (5304). The handover execution (5304) includes the forwarding of data (5306) from a source RAN 204s to a target RAN 204t. The target RAN 204t may check whether some PDU sessions having a N3 Status Flag "N3_AT_UPF_UPDATED" but having no data activity in the source RAN 204s by reading the parameter "Time of Last Data Activity" in the PDU session context. If the duration that a PDU has no data activity is longer than the parameter Session Inactive Timer, the PDU session is considered as having no data activity. The target RAN 204t may send downlink data (5602) to the UE 202. The UE 202 may send uplink data (5604). The target RAN 204t may send an N2 path switch request message (5308) to an AMF 218 to inform that the UE 202 has moved to a new target cell, and a list of PDU sessions to be switched or removed, a list of PDU sessions that have no data activity marked by the target RAN 204t and a list of PDU sessions that have no data activity marked by the source RAN 204s. Depending on the type of target cell, the target RAN 204t may include appropriate information in this message (5308) for each PDU session, including RAN type, N3 RAN Address and N3 tunnel endpoint identifier. If the target RAN 204t cannot support some QoS flows of a PDU session, the N2 path switch request message (5308) may include the list of accepted QoS flows and the list of rejected QoS flows for this PDU session.

Next, the AMF 218 may send a N11 message (5310) to each SMF 220 associated with the lists of PDU sessions received in the N2 path switch request (5308). For the PDU sessions that require a path to be switched, upon receipt of the N11 message (5310), each of these SMFs 220 determines whether the existing UPF 212 can continue to serve the UE 202. If the existing UPF 212 cannot continue to serve the UE 202 and it is not a PDU session anchor, steps (5606) to (5624), as described below, are performed. Otherwise, the steps (5312) to (5318) of FIG. 53, as described above, are performed by each of these SMFs 220 if their existing UPFs 212 can continue to serve the UE 202. For the PDU sessions that are in the list of PDU sessions having no data activity marked by the source RAN 204s and the list of PDU sessions having no data activity marked by target RAN 204t, the AMF 218 may store the RAN 204 information. For each PDU session in the list of PDU sessions having no data activity marked by the target RAN 204t, the AMF 218 may send the N11 message (5310) to the SMF 220 to forward the PDU Session ID to notify that the PDU session has no data activity.

The SMF 220 may initiate the release of PDU sessions which are not requested by the target RAN 204t. The SMF 220 may then select a new target UPF 212t (5606) based on UPF Selection Criteria according to clause 6.3.3 of TS 23.501. The target UPF 212t IP address assignment and allocation of downlink and uplink tunnel identifiers may be performed by the SMF 220. An N4 session establishment request (including the target RAN 204t address, uplink and downlink tunnel identifiers) message (5608) may be sent to the target UPF 212t. The target UPF 212t may send an N4 session establishment response message (5610) to the SMF 220. The SMF 220 may start a timer, to be used in step (5622) below. The SMF 220 may send a N4 session modification request message (5612) to the PDU session anchor 212a. The PDU session anchor 212a may respond with a N4 session modification response message (5614). At this point, the PDU session anchor 212a may start sending downlink packets (5616) to the target RAN 204t using the address and tunnel identifiers of the target RAN 204t via the target UPF 212t.

The SMF 220 may send a N11 message ACK (5618) (including CN tunnel information) to the AMF 218. After receiving the N11 message response (5618) from the SMF 220, for PDU sessions having no data activity marked by the target RAN 204t, the AMF 218 may change the parameter N3 Status Flag of these PDU sessions from N3_AT_UPF_UPDATED to N3_AT_UPF_NOT_UPDATED. Once the N11 message response (5618) is received from all the SMFs 220, the AMF 218 may aggregate the received CN tunnel information from these responses and send this aggregated information as a part of N2 SM information in a N2 path switch request ACK (5320) to the target RAN 204t. If none of the requested PDP sessions have been switched successfully, the AMF 218 may send an N2 path switch request failure message to the target RAN 204t. In the target RAN 204t, for PDU sessions having no data activity marked by the target RAN 204t, the parameter N3 Status Flag of these PDU sessions may be changed from N3_AT_UPF_UPDATED to N3_AT_UPF_NOT_UPDATED. By sending a release resources message (5322) to the source RAN 204s, the target RAN 204t confirms success of the handover. It then triggers the release of resources with the source RAN 204s. The UE 202 may now send uplink data (5620). Once the timer has expired after step (5610), the SMF 220 may initiate a source UPF 212s release procedure by sending an N4 session termination request (5622) (including a release cause). The source UPF 212s may acknowledge with an N4 session termination response message (5624) to confirm the release of resources.

FIG. 56 further illustrates, in a message flow diagram, an example of a Xn based inter NG (R)AN handover procedure (5600) with user plan function relocation, in accordance with embodiments of the present invention. The procedure (5600) may be used to hand over a UE 202 from a source (R)AN 204s to a target (R)AN 204t using Xn when the AMF 218 is unchanged and the SMF 220 determines that the source UPF 212s is to be relocated. The source UPF 212s is the UPF 212 which terminates a N3 interface in the NGC. The presence of an IP connectivity between the source UPF 212s and source RAN 204s, and between the target UPF 212t and target RAN 204t, is assumed.

The procedure (5600) includes the handover preparation (5302) and the handover execution (5304). The handover execution (5304) includes the forwarding of data (5306) from a source (R)AN 204s to a target (R)AN 204t. The target (R)AN 204t sends an N2 path switch request message (5308) to the AMF 218 that includes an indication that the UE 202 has moved to a new target cell, and a list of PDU sessions to be switched or removed. Depending on the type of target cell, the target (R)AN 204t includes other information in the message (5308) for each PDU session to be switched, including the Time of Last Data Activity parameter, and (R)AN information such as the N3 (R)AN Address and the N3 tunnel endpoint identifier. If the target (R)AN 204t cannot support a QoS flows of a PDU session, the N2 path switch request message (5308) may include the list of accepted QoS flows and the list of rejected QoS flows for this PDU session.

Next, the AMF 218 sends a N11 Message (5310) to each SMF 220 associated with the lists of PDU sessions received in the N2 Path Switch Request (5308) message. For the PDU sessions that require a path switch, upon receipt of the N11 Message (5310), each of these SMFs 220 determine whether or not the existing UPF 212 can continue to serve the UE 202. If the existing UPF 212 cannot continue to serve the UE 202 and it is not a PDU session anchor, the following steps (7202608) to (5624) are performed. Otherwise, steps (5312) to (5318) of FIG. 53, as described above, are performed are performed by each of these SMFs 220 if their existing UPFs 212 can continue to serve the UE 202. For each PDU session where a path switch is required, the SMF 220 determines whether or not the existing UPF 212 is to be updated with the (R)AN tunnel information.

The SMF 220 initiates the release of PDU sessions which are not requested by the target RAN 204t. For PDU sessions to be switched, the SMF 220 then selects a new target UPF 212t (5606) based on the UPF Selection Criteria according to clause 6.3.3 of TS 23.501. The target UPF 212t IP address assignment and allocation of downlink and uplink tunnel identifiers may be performed by the SMF 220. The SMF 220 sends an N4 Session Establishment Request (5608) message to the target UPF 212t. The message (5608) includes the target RAN 204t address, and uplink and downlink tunnel identifiers. The target UPF 212t sends an N4 Session Establishment Response (5610) message to the SMF 220. The SMF 220 may start a timer, to be used in step (5590) below. The SMF 220 sends a N4 Session Modification Request (5550) message to the PDU session anchor 212a. The PDU session anchor 212a responds with a N4 Session Modification Response (5614) message. At this point, the PDU session anchor 212a may start sending downlink packets (5616) to the target RAN 204t using the address and tunnel identifiers of the target RAN 204t via the target UPF 212t.

The SMF 220 sends a N11 Message ACK (5618) to the AMF 218. The message (5618) includes the CN tunnel information. In the AMF 218, upon receiving the N11 Message ACK (5318), the N3 Connection Status parameter of PDU sessions where the SMF 220 does not update the (R)AN information for the UPF 212 is changed from N3_CONNECTED to N3_DISCONNECTED. Once the N11 Message ACK (5318) is received from all the SMFs 220, the AMF 218 aggregates the received CN Tunnel Information from these responses and sends this aggregated information as a part of a N2 SM Information in a N2 Path Switch Request ACK (5320) to the target (R)AN 204t. The message (5320) includes an indication for each PDU session for whether or not the UPF 212 is updated with (R)AN information. If none of the requested PDP sessions have been successfully switched, the AMF 218 sends an N2 Path Switch Request Failure message to the target (R)AN 204t. In the target (R)AN 204t, for PDU sessions where the UPF 212 is not updated with (R)AN information, the UPF N3 tunnel information is deleted. By sending a Release Resources (5322) message to the source (R)AN 204s, the target (R)AN 204t confirms success of the handover. It then triggers the release of resources with the source (R)AN 204s.

Once the timer has expired after step (7302610), the SMF 220 initiates a source UPF 212s release procedure by sending an N4 Session Termination Request (5622) message to the source UPF 212s. The message (5622) includes a release cause. The source UPF 212s acknowledges with an N4 Session Termination Response (5624) message that indicates the release of resources.

Figure 57:
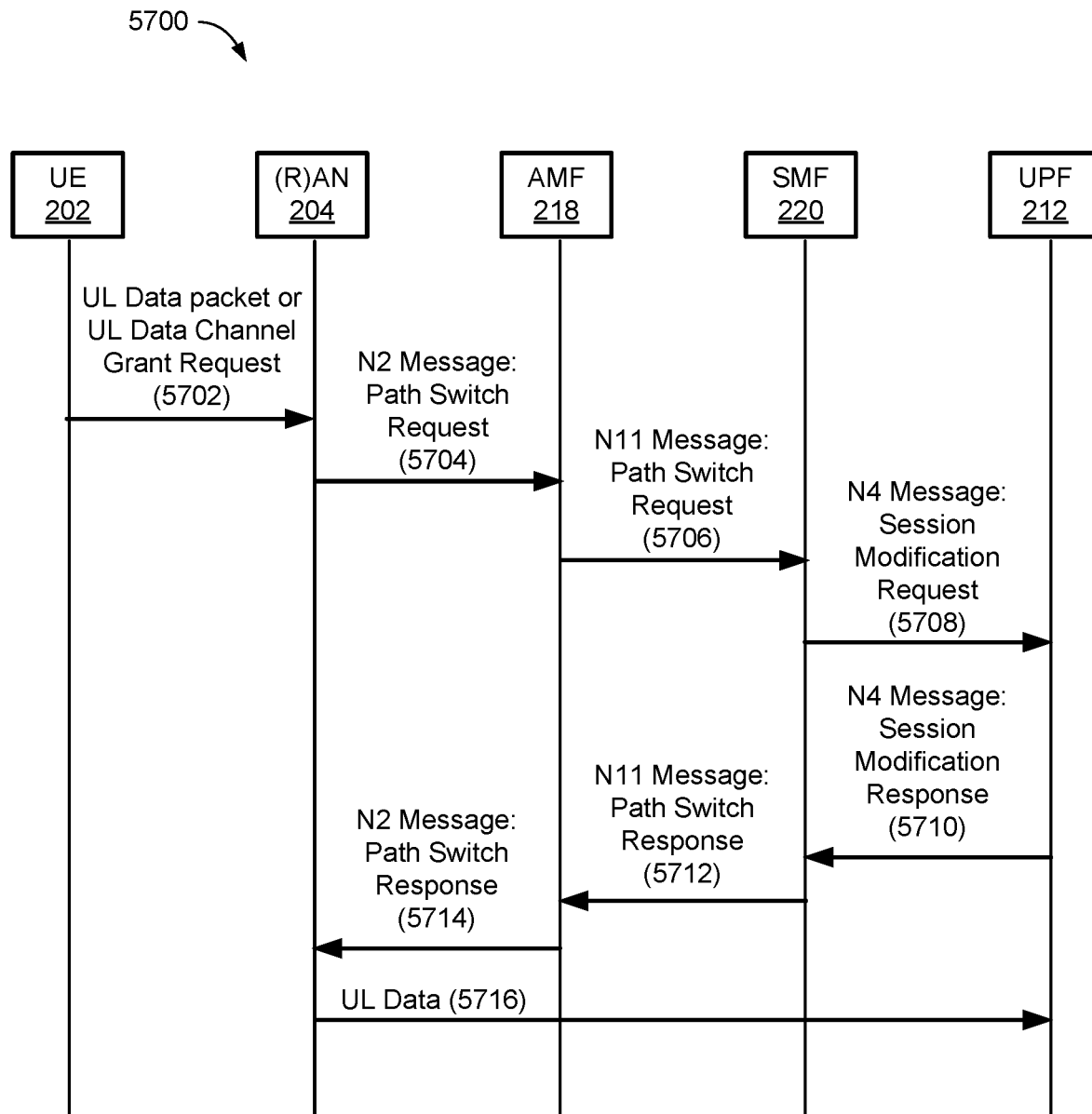
FIG. 57 illustrates, in a message flow diagram, an example of a N3 reconnection procedure triggered by UL data, in accordance with an embodiment of the present invention.

FIG. 57 illustrates, in a message flow diagram, an example of a N3 reconnection procedure (5700) triggered by UL data (i.e., a new UL data packet), in accordance with an embodiment of the present invention. This procedure (5700) may be used to trigger a path switch update for a PDU session that has N3 Status Flag as N3_AT_UPF_NOT_UPDATED in the (R)AN 204 when the uplink data arrives at the (R)AN 204. The UE 202 may send a UL data channel grant request or a UL data packet to the (R)AN 204 (5702). If the N3 Status Flag of the PDU session is N3_AT_UPF_NOT_UPDATED, the (R)AN 204 may send a N2 message Path Switch Request (5704) to the AMF 218. The message (5704) may include the PDU session ID (such as SUPI) and (R)AN information, including a (R)AN type, a N3 (R)AN Address and a N3 Tunnel Endpoint Identifier. Alternatively, the message (5704) may include the PDU Session ID only.

The AMF 218 may send a N11 message Path Switch Request (5706) to the SMF 220 to forward the N2 message (5704) received from the (R)AN 204. The message (5706) may also include an identifier to identify the UE 202 (such as 5G temporary ID or SUPI), and (R)AN information (such as (R)AN type, N3 (R)AN Address and the N3 Tunnel Endpoint Identifier). The SMF 220 may send a N4 message Session Modification Request (5708) to the UPF212. The message (5708) may include an identifier to identify the UE 202 (such as 5G temporary ID or SUPI), the PDU session ID, the (R)AN tunnel information (such as N3 (R)AN Address and the N3 Tunnel Endpoint Identifier). The UPF 212 may update the (R)AN 204 information for the requested PDU session. The UPF 212 may send a N4 message Session Modification Response (5710) to the SMF 220. The message (5710) may include the UE identifier (such as SUPI) and the PDU Session ID. The SMF 220 may change the N3 Status Flag of the PDU session to N3_AT_UPF_UPDATED. The SMF 220 may send a N11 message Path Switch Response (5712) to the ANT 218. The message (5712) may include the UE identifier (such as SUPI) and the PDU Session ID. The AMF 218 may change the N3 Status Flag of the PDU session to N3_AT_UPF_UPDATED. The AMF 218 may send a N2 message Path Switch Response (5714) to the (R)AN 204 to confirm the path switch is complete. The message (5714) may include the PDU Session ID. The (R)AN 204 may then send uplink data packets (5716).

FIG. 57 further illustrates, in a message flow diagram, an example of a late path switch procedure (5700) triggered by UL data without a UPF 212 relocation, in accordance with embodiments of the present invention. This procedure (5700) may be used to trigger a path switch update for a PDU session that has no UPF N3 tunnel information when the (R)AN 204 receives the UL grant request or UL data for a PDU session. The UPF 212 remains the same. The SMF 220 stores the CN tunnel information. The UE 202 sends a UL Data Channel Grant Request or a UL Data Packet to the (R)AN 204 for a PDU session (5702). If the UPF N3 tunnel information is not available, the (R)AN 204 sends a N2 Message Session Path Switch Request (5704) to the AMF 218. The message (5704) includes the PDU session ID and (R)AN tunnel information, such as a (R)AN N3 Address and a N3 Tunnel Endpoint Identifier.

The AMF 218 sends a N11 Message Session Path Switch Request (5706) to the SMF 220. The message (5706) includes an identifier to identify the UE 202 (such as a SUPI and PDU Session ID, and the (R)AN tunnel information (such as the (R)AN type, the N3 (R)AN Address and the downlink Tunnel Endpoint Identifier. The SMF 220 determines whether or not the existing UPF 212 can continue to serve the UE's PDU sessions. If the existing UPF 212 cannot continue to serve the UE 202 and it is not a PDU session anchor, steps (4) to (9) of clause 4.9.1.c of TS 23.502 are performed. If the existing UPFs 212 can continue to serve the UE 202, the SMF 220 sends a N4 Message Session Modification Request (5708) message to the UPF212. The message (5708) includes a UE identifier (such as a SUPI), the PDU session ID, and the N3 (R)AN tunnel information, such as a N3 (R)AN Address and the N3 Tunnel Endpoint Identifier. The UPF 212 updates the (R)AN 204 tunnel information for the requested PDU session. The UPF 212 sends a N4 Message Session Modification Response (5710) message to the SMF 220. The message (5710) includes the SUPI and the PDU session ID. The SMF 220 sends a N11 Message Path Switch Response (5712) to the AMF 218. The message (5712) includes the UE identifier (such as a SUPI), the PDU session ID, and the N2 SM Message that includes the CN tunnel information for the (R)AN 204. The SMF 220 changes the N3 Connection Status of the PDU session to N3_CONNECTED. The AMF 218 sends a N2 Message Path Switch Response (5714) message to the (R)AN 204 that indicates that the path switch is complete. The message (5714) includes the PDU Session ID, and the N2 SM Message received from the SMF 220. THE AMF 218 changes the N3 Connection Status of the PDU session to N3_CONNECTED. The (R)AN 204 updates the CN tunnel information and sends uplink data (5716) packets.

Figure 58:
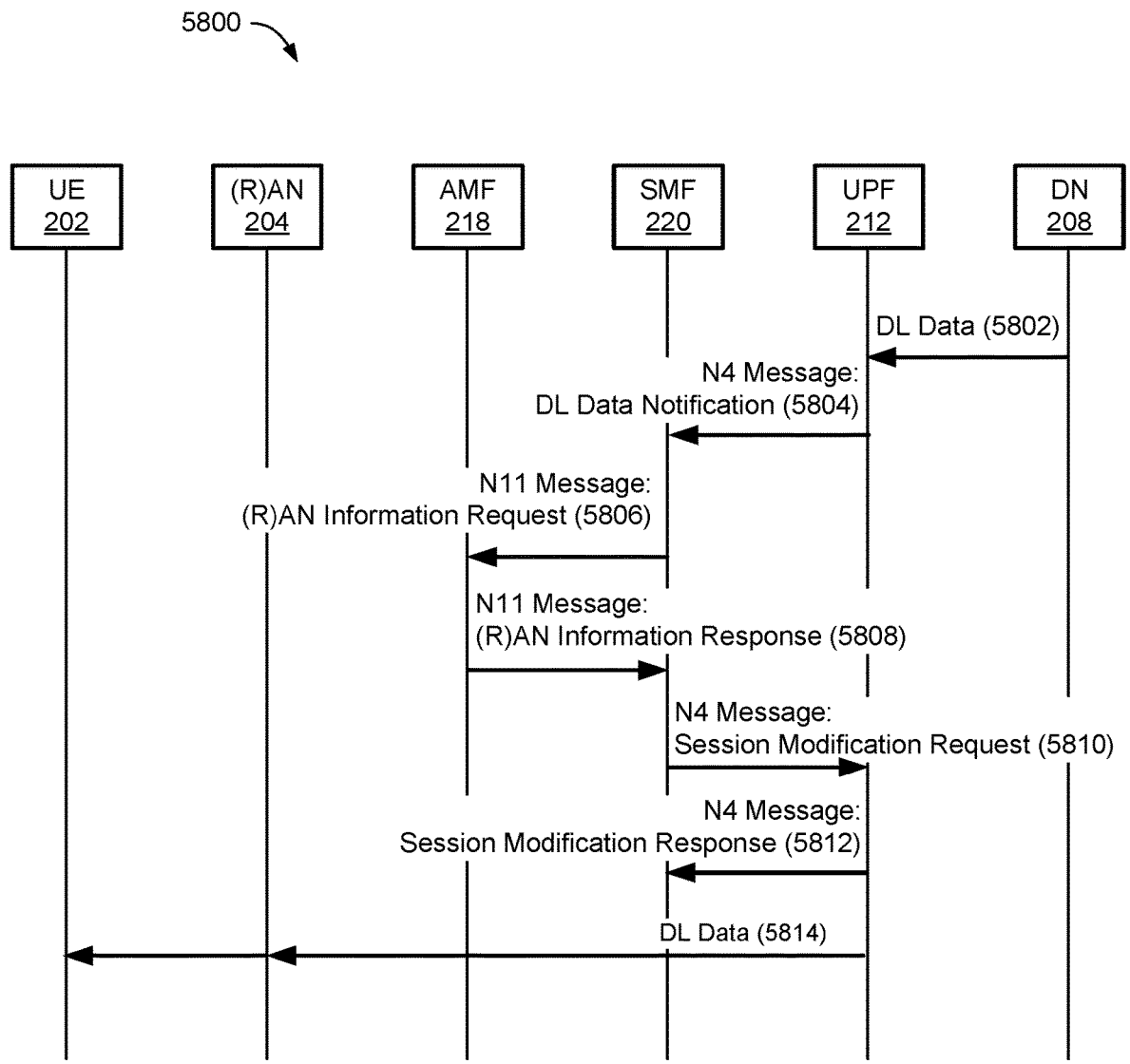
FIG. 58 illustrates, in a message flow diagram, an example of a N3 reconnection procedure triggered by DL data, in accordance with an embodiment of the present invention.

FIG. 58 illustrates, in a message flow diagram, an example of a N3 reconnection procedure (5800) triggered by DL data (i.e., a new DL data packet), in accordance with an embodiment of the present invention. This procedure (5800) may be used to trigger a path switch update at the UPF 212 for a PDU session that has the N3 Status Flag as N3_AT_UPF_NOT_UPDATED in the SMF 220 when the downlink data arrives at the UPF 212. The UPF 212 may receive downlink data packets from the DN 208 (5802). The UPF 212 may send N4 message DL data notification (5804) to the SMF 220. The message (5804) may include an identifier to identify the UE 202 (such as 5G temporary or SUPI) and a PDU Session ID.

Based on the N3 Status Flag currently set as N3_AT_UPF_NOT_UPDATED, the SMF 220 may send a N11 message (R)AN Information Request (5806) to the AMF 218. The message (5806) may include the UE Identifier (such as SUPI) and the PDU Session ID. The AMF 218 may change the N3 Status Flag of the PDU session to N3_AT_UPF_UPDATED. The AMF 218 may send a N11 message (R)AN Information Response (5808) to the SMF 220. The message (5808) includes an UE identifier (such as SUPI), the PDU session ID, and (R)AN information (including the (R)AN type, the N3 (R)AN address, and the N3 (R)AN tunnel endpoint identifier). The SMF 220 may send a N4 message Session Modification Request (5810) to the UPF 212. The message (5810) may include an identifier to identify the UE 202 (such as 5G temporary ID or SUPI), the PDU Session ID, the (R)AN information (such as N3 (R)AN Address and the N3 Tunnel Endpoint Identifier). The UPF 212 may update the (R)AN 204 information for the requested PDU session. The UPF 212 may send a N4 message Session Modification Response (5812) to the SMF 220. The message (5812) may include the UE identifier (such as SUPI) and the PDU Session ID. After receiving the message (5690), the SMF 220 may change the N3 Status Flag of the PDU session to N3_AT_UPF_UPDATED. The UPF 212 may send downlink data packets (5814) to the UE 202 via the (R)AN 204. It is noted that step (5814) may be performed before step (5812).

In an alternative implementation of FIG. 58, after receiving message (5806), the AMF 218 may send an N2 Notification message to the (R)AN 204 informing that the UPF 212 is updated with the (R)AN information. The message may include the PDU Session ID. The (R)AN 204 may change the N3 Status Flag of the PDU session to N3_AT_UPF_UPDATED. The (R)AN 204 may send a N2 message Notification Acknowledgment to the AMF 218 confirming the reception of the Notification message from the AMF 218.

In another alternative implementation of FIG. 58, after receiving message (5812), the SMF 220 may send an N2 message to the (R)AN 204 via the AMF 218 to notify the (R)AN 204 that the UPF 212 has updated (R)AN information. The message may include the PDU Session ID. After receiving this message, the (R)AN 204 may change the N3 Status Flag of the PDU session to N3_AT_UPF_UPDATED.

(R)AN-CN interactions include procedures that pertain to N2 (e.g., NG2) interactions, e.g., a N2 release procedure and potential procedures for a RRC Connected Inactive state.

An N2 Release procedure may be used to release the logical N2 signalling connection and all N3 connections for a UE 202. The procedure will transition the UE 202 from a CN-CONNECTED state to a CN-IDLE state in both the UE 202 and the AMF 218. That is, the UE context in the UE 202 and the AMF 218 will be changed accordingly. All UE related context information will be removed in the (R)AN 204.

When a N2 signalling connection is lost, for example, due to the loss of the signalling transport or because of a (R)AN failure, the N2 release procedure may be performed locally by the (R)AN 204 and the AMF 218. When the N2 release procedure is performed locally by the (R)AN 204 or the AMF 218, each node locally performs its actions as described in the procedure flow below without using or relying on any of the signalling shown directly between the (R)AN 204 and the AMF 218. It should be noted that when the N2 signalling connection is lost due to AMF 218 failure, it may be resolved through resolving the N2 stickiness and not result in a N2 release. The initiation of a N2 Release procedure may be either (R)AN-initiated with a cause, or AMF-initiated with a cause. The cause of a (R)AN-initiated procedure may be at least one of an O&M Intervention, an Unspecified Failure, User Inactivity, Repeated RRC signalling Integrity Check Failure, a Release due to a UE generated signalling connection release, an Inter-RAT Redirection, etc. The cause of an AMF-initiated procedure may be at least one of an authentication failure, a detach, etc.

Figure 59:
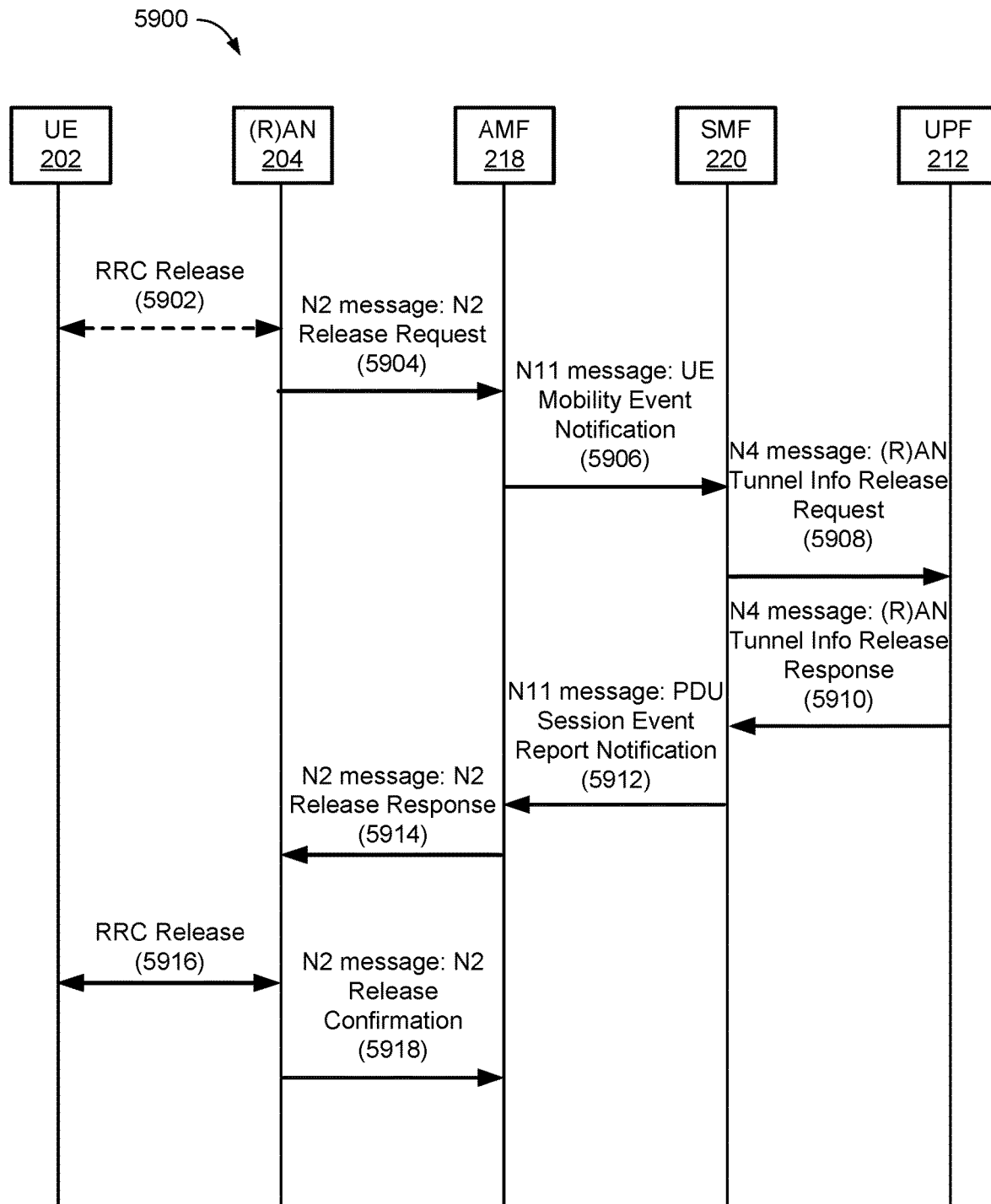
FIG. 59 illustrates, in a message flow diagram, an example of a N2 Release and PDU Session deactivation procedure, in accordance with embodiments of the present invention.

The N2 Release procedure may be used to release a N2 connection and at the same time deactivate PDU sessions when the UE 202 enters the CM-IDLE state. FIG. 59 illustrates, in a message flow diagram, an example of a N2 Release and PDU Session deactivation procedure (5900), in accordance with embodiments of the present invention. The procedure (5900) may begin with the (R)AN 204 and the UE 202 performing a RRC Release procedure (5902). The RRC Release procedure (5902) may be similar to the RRC Release procedure (600A) describe above. The (R)AN 204 interacts with the UE 202 to release the RRC signalling connection. The UE 202 enters the CM-IDLE state and deactivates all PDU sessions. The (R)AN 204 may send (N2 message) a N2 Release Request (5904) to the AMF 218. The message (5904) may include a cause code, such as an O&M intervention, UE inactivity, etc. Those skilled in the art will appreciate that, in certain scenarios, step (5902) can be initiated before or in parallel with step (5904). The AMF 218 may send (N11 message) a N2 Release Notification message (5906) to the SMF(s) 220 which have subscribed to the N2 Release Notification. The message (5906) may include a UE identifier (such as a SUPI), the RAN information, and the cause code. It should be noted that the SMF 220 may subscribe to a UE mobility Event Notification service of the AMF 218 by default when the PDU session is established or activated. In this message, the AMF 218 will notify the SMF 220 of the N2 Release event. The AMF 218 may track, or otherwise be aware of, the session state, i.e., whether or not the session is activated. The AMF 218 informs the SMF(s) 220 that serve activated PDU sessions of the session state.

The SMF 220 then sends (N4 message) a N3 Release Request (5908) to the UPF(s) 212. The message (5908) may include a UE SUPI and PDU Session ID(s) to be deactivated. The UPF 212 then releases the N3 (R)AN tunnel information (e.g., the (R)AN IP address and tunnel identifier) in the UE's PDU Session Context of PDU sessions to be deactivated. The UPF sends (N4 message) a N3 Release Response (5910) to the SMF 220 confirming the release of the N3 (R)AN tunnel information. The UPF 212 may begin to buffer downlink packets of the deactivated PDU sessions. The SMF 220 then sends (N11 message) a PDU Session Event Report Notification (5912) to the AMF 218 to inform the AMF 218 that the (R)AN tunnel information is deleted in the UPF 212. This message (5912) is to acknowledge the N2 release notification message (5906). The SMF 220 may then change the state of the PDU session to Session-IDLE.

The AMF 218 then collects all the responses from the SMF(s) 220 that were notified in (5906). Once all the acknowledgements from the SMF 220 are collected, and if step (5902) is not performed, the AMF 218 then sends (N2 message) a N2 Release Response (5914) to the (R)AN 204 with a cause code. The AMF 218 may change the session state of all PDU sessions of the UE 202 to Session-IDLE. If step (5902) was not performed, the RAN 204 and the UE 202 perform a RRC Release procedure (5916). The RRC Release procedure (5916) may be similar to the RRC Release procedure (600A) describe above. The (R)AN 204 sends a message to UE 202 to release the RRC connection. The UE 202 enters the CM-IDLE state and all PDU sessions in the UE 202 transition to the Session-IDLE state. Upon receiving RRC connection release confirmation from the UE 202, the (R)AN 204 removes the UE Context. Next, the (R)AN 204 sends (N2 message) a N2 Release Confirmation (5918) to the AMF 218. Upon receiving the N2 Release Response (5918) message, the AMF 218 sets the UE Context to the CM-IDLE state and releases the N2 connection. It should be noted that the AMF 218 may remove the subscription to UE Mobility Event Notification service of the AMF 218 for the SMF(s) service PDU sessions.

Figure 60:
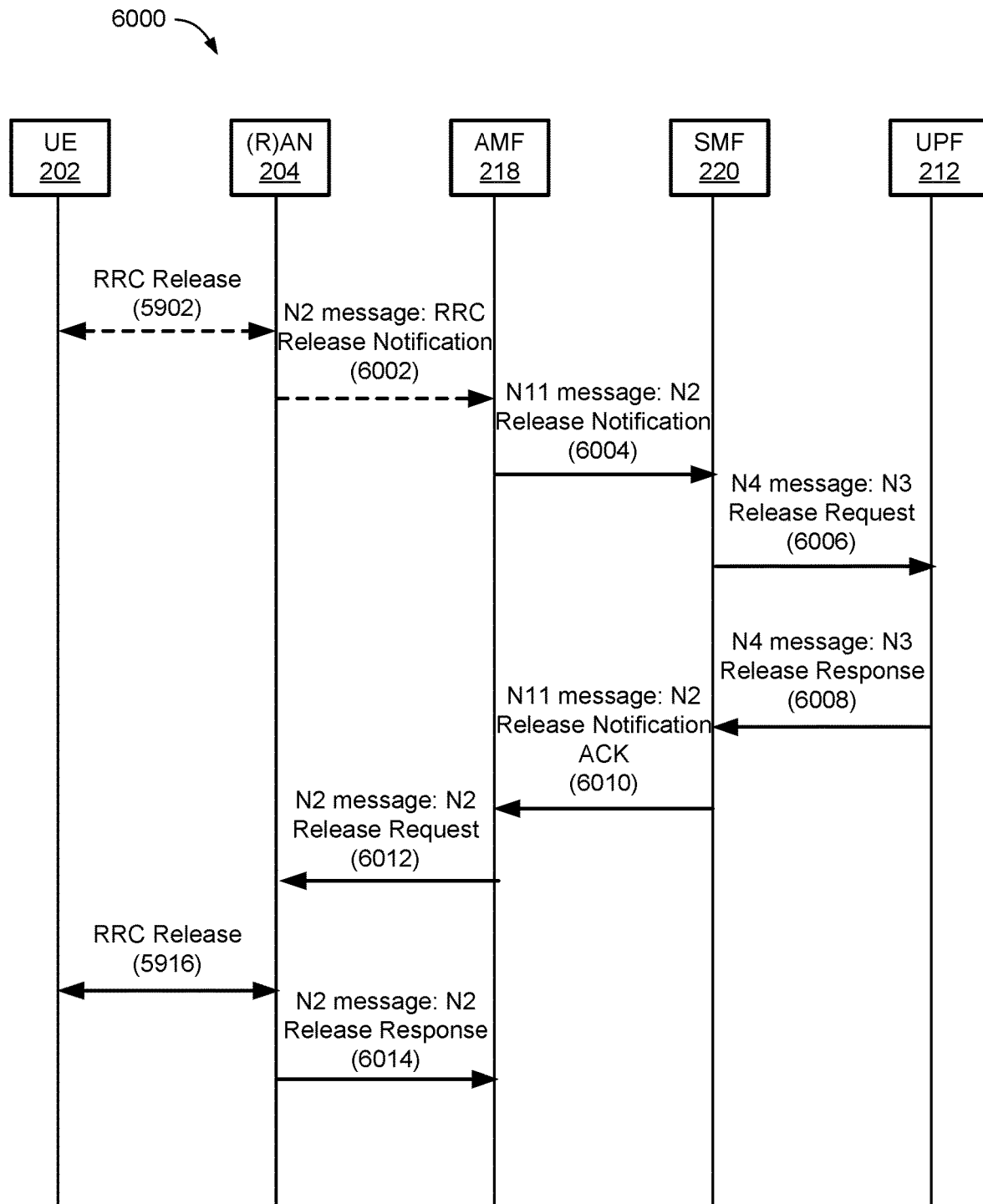
FIG. 60 illustrates, in a message flow diagram, another example of a N2 Release and PDU Session deactivation procedure, in accordance with embodiments of the present invention.

In a modification to the embodiment described with respect to FIG. 59, the N2 Release procedure may be used to release a N2 connection and at the same time deactivate PDU sessions when the UE 202 enters the CM-IDLE state. FIG. 60 illustrates, in a message flow diagram, another example of a N2 Release and PDU Session deactivation procedure (6000), in accordance with embodiments of the present invention. The procedure (6000) may begin with the (R)AN 204 and the UE 202 performing a RRC Release procedure (5902). The RRC Release procedure (5902) may be similar to the RRC Release procedure (600A) describe above. The (R)AN 204 interacts with the UE 202 to release the RRC signalling connection. The UE 202 enters the CM-IDLE state and deactivates all PDU sessions. The (R)AN 204 may send (N2 message) a RRC Release Notification (5904) to the AMF 218. The message (6002) may include a cause code, such as an O&M intervention, UE inactivity, etc. Those skilled in the art will appreciate that, in certain scenarios, step (5902) can be initiated before or in parallel with step (6002). The AMF 218 may send (N11 message) a N2 Release Notification message (6004) to the SMF(s) 220 which have subscribed to the N2 Release Notification. The message (6204) may include a UE identifier (such as SUPI), the RAN information, and the cause code. It should be noted that the SMF 220 may subscribe to a N2 Release Notification service by default when the PDU session is established or activated. The AMF 218 may track, or otherwise be aware of, the session state, i.e., whether or not the session is activated. The AMF 218 informs the SMF(s) 220 that serve activated PDU sessions of the session state.

The SMF 220 then sends (N4 message) a N3 Release Request (6006) to the UPF(s) 212. The message (6006) may include a UE identifier (such as SUPI) and PDU Session ID(s) to be deactivated. The UPF 212 then releases the N3 (R)AN tunnel information (e.g., the (R)AN IP address and tunnel endpoint identifier) in the UE's PDU Session Context of PDU sessions to be deactivated. The UPF sends (N4 message) a N3 Release Response (6008) to the SMF 220 confirming the release of the N3 tunnel information. The UPF 212 may begin to buffer downlink packets of the deactivated PDU sessions. The SMF 220 then sends (N11 message) a N2 Release Notification Acknowledgement (6010) message to the AMF 218 that acknowledges the release notification message (6004). The SMF 220 may then change the state of the PDU session to Session-IDLE.

The AMF 218 then collects all the responses from the SMF(s) 220 that were notified in (6004). Once all the acknowledgements from the SMF 220 are collected, and if step (5902) is not performed, the AMF 218 then sends (N2 message) a N2 Release Request (6012) message to the (R)AN 204 with a cause code. The AMF 218 changes the session state of all PDU sessions of the UE 202 to Session-IDLE. If step (5902) was not performed, the (R)AN 204 and the UE 202 perform a RRC Release procedure (5916). The RRC Release procedure (5916) may be similar to the RRC Release procedure (600A) describe above. The (R)AN 204 sends a message to UE 202 to release the RRC connection. The UE 202 enters the CM-IDLE state and all PDU sessions in the UE 202 transition to the Session-IDLE state. Upon receiving RRC connection release confirmation from the UE 202, the RAN 204 removes the UE Context. Next, the (R)AN 204 sends (N2 message) a N2 Release Response (6014) to the AMF 218. Upon receiving the N2 Release Response (6014) message, the AMF 218 sets the UE Context to the CM-IDLE state and releases the N2 connection.

Figure 61:
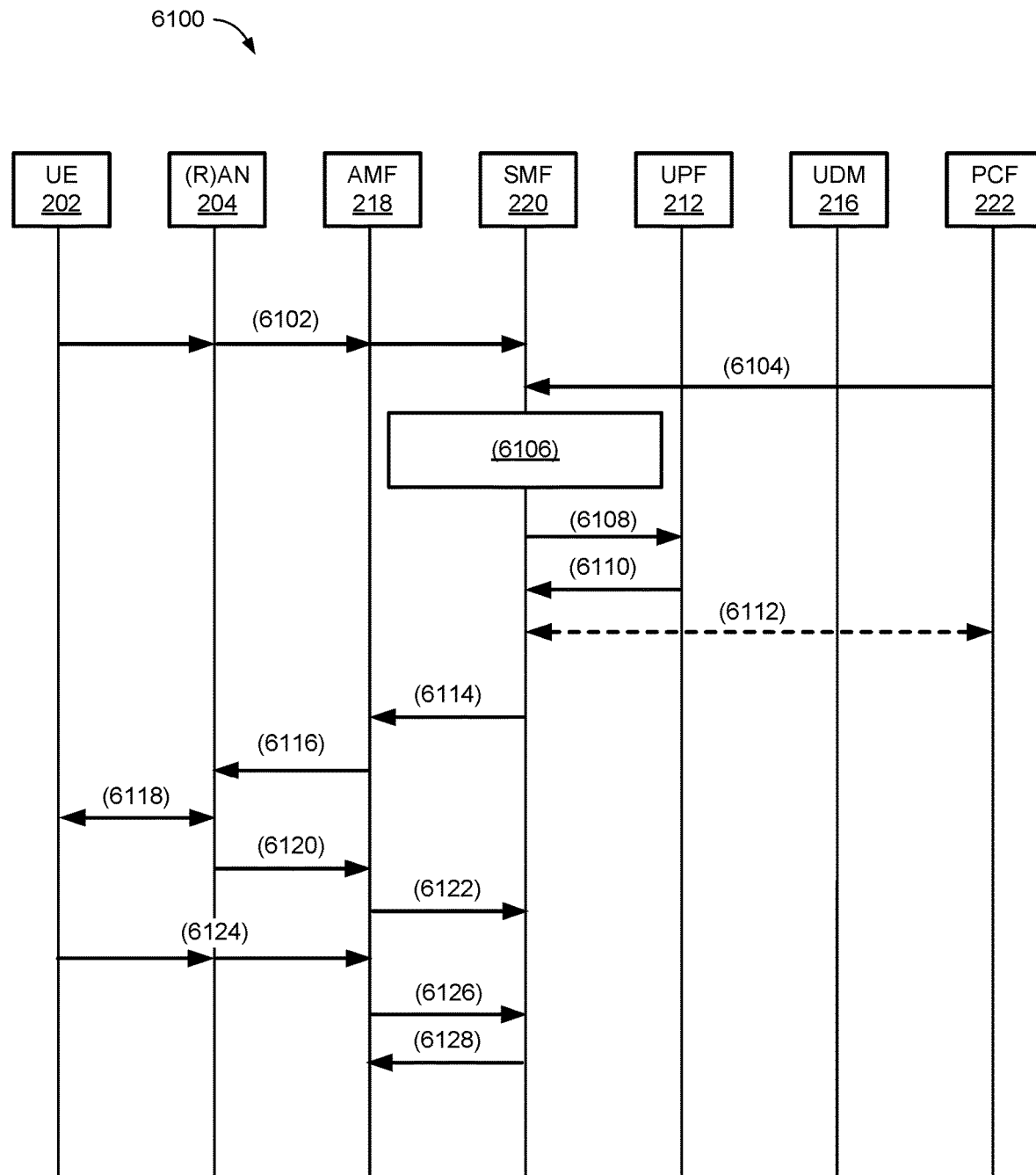
FIG. 61 illustrates, in a message flow diagram, an example of a PDU session release procedure triggered by the UE, PCF, or the SMF, in accordance with embodiments of the present invention.

A UE 202 or network requested PDU session release for non-roaming and roaming with local breakout procedure may be used to release a PDU session when the UE 202 is in the CM-CONNECTED state. FIG. 61 illustrates, in a message flow diagram, an example of a PDU session release procedure (6100) triggered by the UE 202, PCF 222, or the SMF 220, in accordance with embodiments of the present invention. One trigger for the PDU session release procedure (6100) occurs when the UE 202 sends to the SMF 220 the (N1 SM message) UE Session Release Request (6102) message. The message (6102) may include the PDU Session ID. The (R)AN 204 forwards the message over a logical interface, such as a N2 connection. The AMF 218 checks the PDU session ID and forwards the message to the SMF 220. The forwarded message from the AMF 218 to the SMF 220 includes a UE identifier (such as SUPI) and a N1 message PDU Session Release Request. Another trigger for the PDU session release procedure (6100) occurs when the PCF 222 sends to the SMF 220 a N7 message PCF Session Release Request (6104) message. Another trigger for the PDU session release procedure (6100) occurs when the SMF 220 determines to release a PDU sessions by its own logic, or by taking requests from at least one of the UE 202, AN 204 (e.g., congestion report), DN 208, and UPF 212.

Once the PDU session release procedure (6100) is triggered, the SMF 220 interacts with the UPF 212 to release the PDU Context at the UPF 212. The SMF 220 sends a N4 Message Session Release Request (6108) message to the UPF 212. The message (6108) may include at least one of a UE identifier (such as SUPI) and the PDU Session ID. The UPF 212 drops any remaining packets of the PDU session to be released and releases the UE's PDU Context. The UPF 212 then sends a (N4 message) Session Release Response (6110) message to the SMF 220. If a dynamic policy is implemented, the SMF 220 informs the PCF 222 to perform a PDU-CAN PDU Session Release procedure (6112) so that the PCF 222 will not provide any further session modification messages to the SMF 220 pertaining to the released PDU session. The SMF 220 knows whether or not the session state is activated. The SMF 220 sends a N11 Message (6202) to the AMF 218, which includes an UE ID (e.g., a SUPI), a N1 SM PDU Session Release Request to the UE 202, and a N2 SM PDU Session Release Request to the (R)AN 204 if the PDU session has been activated. The N1 SM PDU Session Release Request message may include the PDU Session ID(s) and the cause code(s). The N2 SM PDU Session Release Request message may include the PDU Session ID(s). The N1 SM and N2 SM messages may be encapsulated in a container. The SMF 220 may use a Message Transfer service of the AMF 218, as defined in clause 5.2.2.4 of TS 23.502, to send the N1 SM and N2 SM messages to the UE 202 and (R)AN 204.

The AMF 218 then transfers (6116) the message received from the SMF 220 to the (R)AN 204 via a logical interface, such as the N2 connection. If the (R)AN 204 receives the N1 SM PDU Session Release Request only, the (R)AN 204 forwards (6118) this message to the UE 202. If (R)AN 204 receives the N1 SM PDU Session Release Request and the N2 SM PDU Session Release Request, the (R)AN 204 performs a RRC Connection Reconfiguration with the UE 202. During this reconfiguration procedure, the (R)AN 204 forwards the N1 SM message PDU Session Release Request to the UE 202. The (R)AN 204 and the UE 202 release the radio resource(s) for the released PDU session(s). The UE 202 and AN 204 release the PDU session context. If the (R)AN 204 receives the N2 SM PDU Session Release Request in step (6224), the (R)AN 204 sends to the SMF 220 an N2 SM PDU Session Release Response (6120) via the AMF 218. The message (6120) may include the PDU session ID(s). The AMF 218 sends a N11 Message (6122) to forward the N2 SM PDU Session Response to the SMF 220. The message (6122) includes a UE identifier (such as a SUPI) and the N2 SM PDU Session Response received from the (R)AN 204. After the UE 202 receives the N1 SM message PDU Session Release Request in step (6118), the UE 202 releases the resources serving the released PDU sessions and deletes the PDU session context. The UE 202 sends the N1 SM PDU Session Release Response (6124) to the SMF 220. The message includes the PDU Session ID(s). The (R)AN 204 transfers this message to the AMF 218 via a logical interface, such as the N2 connection. The AMF 218 sends a N11 Message to forward (6126) the N1 SM PDU Session Release Response received in step (6124) to the SMF 220. The N11 Message may include at least one of a UE identifier (such as a SUPI) and the N1 SM PDU Session Release Response received in step (6122). After receiving messages in steps (6122) and (6126), the SMF 220 sends a N11 Message PDU Session Event Report Notification (62046128) message, as defined in Clause 5.2.8.1 of TS 23.502, to the AMF 218 with the event trigger being a PDU session release. The SMF 220 and AMF 218 delete their PDU session context of the released PDU session.

As noted above, the procedure (6100) can be used to perform a PDU session release triggered by the UE 202. Alternatively, the procedure (6100) may be used, with some modifications, as a network requested PDU session release procedure for non-roaming and roaming with local breakout to release a PDU session when the UE 202 is in the CM-IDLE state. For example, if the UE 202 is in the CM-IDLE state, the AMF 218 will send a paging message to the UE 202, carrying a notification to release the PDU session and the PDU session ID to be released. Remaining steps are similar to the procedure (6100). For example, the UE 202 sends a N1 SM PDU Session Release Request to the SMF 220.

Figure 62:
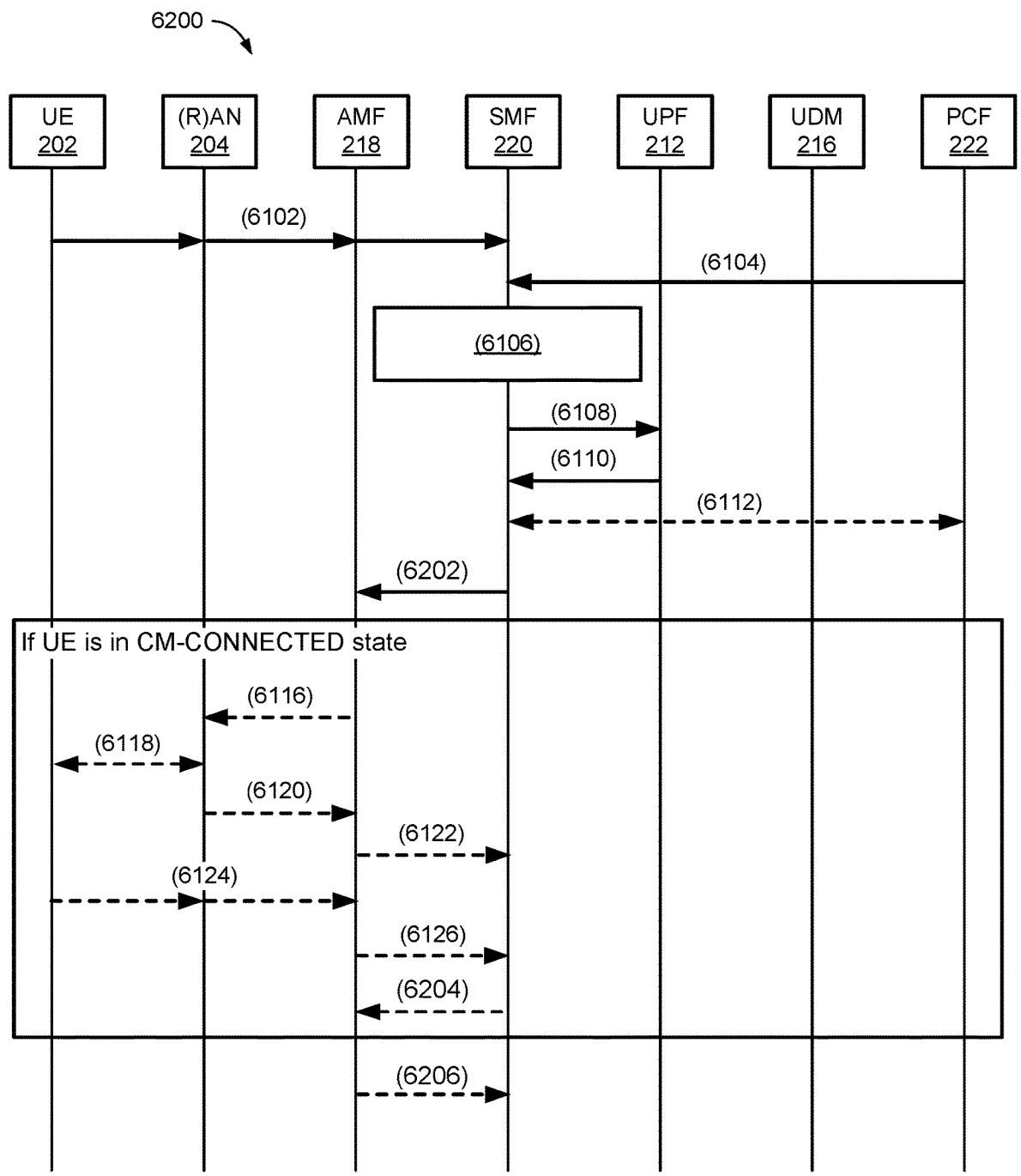
FIG. 62 illustrates, in a message flow diagram, another example of a PDU session release procedure triggered by the UE or the SMF, in accordance with embodiments of the present invention.

In a modification to the embodiment described with respect to FIG. 61, a UE 202 or network requested PDU session release for non-roaming and roaming with local breakout procedure may be used to release a PDU session when the UE 202 is in the CM-CONNECTED state or the CM-IDLE state. The SMF 220 may be unaware of UE's connection management state, but knows whether or not the PDU session is activated. If the UE 202 is in the CM-IDLE state, the AMF 220 may send the PDU session status in the AMF 218 to the UE 202 for synchronization when the service request procedure takes place. FIG. 62 illustrates, in a message flow diagram, another example of a PDU session release procedure (6200) triggered by the UE 202 or the SMF 220, in accordance with embodiments of the present invention. One trigger for the PDU session release procedure (6200) occurs when the UE 202 sends to the SMF 220 the (N1 SM message) UE Session Release Request (6102) message. The message (6102) may include the PDU Session ID. The (R)AN 204 forwards the message over a logical interface, such as a N2 connection. The AMF 218 checks the PDU session ID and forwards the message to the SMF 220. The forwarded message from the AMF 218 to the SMF 220 includes a UE identifier (such as a SUPI) and a N1 message PDU Session Release Request. Another trigger for the PDU session release procedure (6200) occurs when the PCF 222 sends to the SMF 220 a N7 message PCF Session Release Request (6104). Another trigger for the PDU session release procedure (6100) occurs when the SMF 220 decides to release a PDU sessions by its own logic, or by taking requests from the UE 202, AN 204 (e.g., congestion report), DN 208, and UPF 212.

Once the PDU session release procedure (62006200) is triggered, the SMF 220 interacts with the UPF 212 to release the PDU Context at the UPF 212. The SMF 220 sends a N4 Message Session Release Request (6108) to the UPF 212. The message (6108) may include at least one of a UE identifier (such as a SUPI) and the PDU Session ID. The UPF 212 drops any remaining packets of the PDU session to be released and releases the UE's PDU Context. The UPF 212 then sends a (N4 message) Session Release Response (6110) to the SMF 220. If a dynamic policy is implemented, the SMF 220 informs the PCF 222 to perform a PDU-CAN PDU Session Release procedure (6112). The SMF 220 knows whether or not the session state is activated. The SMF 220 sends a N11 Message Session Release Notification (6202) to the AMF 218, which includes an UE ID (e.g., SUPI), a N1 SM PDU Session Release Request to the UE 202, and a N2 SM PDU Session Release Request to the (R)AN 204 if the PDU session has been activated. The N1 SM PDU Session Release Request message may include the PDU Session ID(s) and the cause code(s). The N2 SM PDU Session Release Request message may include the PDU Session ID(s)). The N1 SM and N2 SM messages may be encapsulated in a container. The SMF 220 may use a Message Transfer service of the AMF 218 to send the N1 SM and N2 SM messages to the UE 202 and (R)AN 204.

If the UE is in the CM-CONNECTED state, then the AMF 218 transfers (6116) the message received from the SMF 220 to the (R)AN 204 via a logical interface, such as the N2 connection. If the (R)AN 204 receives the N1 SM PDU Session Release Request only, the (R)AN 204 forwards (6118) this message to the UE 202. If (R)AN 204 receives the N1 SM PDU Session Release Request and the N2 SM PDU Session Release Request, the (R)AN 204 performs a RRC Connection Reconfiguration with the UE 202. During this reconfiguration procedure, the (R)AN 204 forwards the N1 SM message PDU Session Release Request to the UE 202. The (R)AN 204 and the UE 202 release the radio resource(s) for the released PDU session(s). The UE 202 and (R)AN 204 release the PDU session context. If the (R)AN 204 receives the N2 SM PDU Session Release Request in step (6116), the (R)AN 204 sends to the SMF 220 an N2 SM PDU Session Release Response (6120) via the AMF 218. The message (6120) may include the PDU session ID(s). The AMF 218 sends a N11 Message (6275) to forward the N2 SM PDU Session Response to the SMF 220. The message (6275) includes the UE identifier (such as a SUPI) and the N2 SM PDU Session Response received from the (R)AN 204. If the UE 202 receives the N1 SM message PDU Session Release Request in step (6118), then the UE 202 releases the resources serving the released PDU sessions and deletes the PDU session context. The UE 202 sends the N1 SM PDU Session Release Response (6122) to the SMF 220. The message includes the PDU Session ID(s). The (R)AN 204 transfers this message to the AMF 218 via a logical interface, such as the N2 connection. The AMF 218 sends a N11 Message to forward (6124) the N1 SM PDU Session Release Response received in step (6122) to the SMF 220. The N11 Message may include at least one of a UE identifier (such as a SUPI) and the N1 SM PDU Session Release Response received in step (6122). After receiving messages in steps (6275) and (6124), the SMF 220 sends a N11 Message Session Release Confirmation (6204) to the AMF 218. The SMF 220 and AMF 218 delete their PDU session context of the released PDU session.

If the UE 202 is in the CM-IDLE state, the messages 6224, 6118, 6120, 6275, 6122, 6124, and 6204 are skipped. The AMF 218 sends a N11 Message PDU Session Release Acknowledgment (6206) to the SMF 220.

A Service Request procedure may be used by a 5G UE 202 in the CM-IDLE state to request the establishment of a secure connection to an AMF 218. The UE 202 in the CM-IDLE state may initiate the Service Request procedure to send uplink signalling messages, user data, or a response to a network paging request. After receiving the Service Request message, the AMF 218 may perform authentication, and the security procedure. After the establishment of a secure signalling connection to an AMF 218, the UE 202 or network may send signalling messages, e.g., PDU session establishment from UE 202 to the core network 206, or the SMF 220, via the AMF 220, may start the user plane resource establishment for the PDU sessions requested by the network and/or indicated in the Service Request message.

For any Service Request, the AMF 218 may respond with a Service Response message to synchronize PDU session status between the UE 202 and the core network 206. The AMF 218 may also respond with a Service Reject message to the UE 202, if the Service Request cannot be accepted by the network. For a Service Request due to user data, a network may take further actions if a user plane resource establishment is not successful. It should be noted that the service request procedure discussed in FIG. 63 below is not applicable to an access network, such as a WiFi network, (once the UE 202 is registered in the network) in which the UE 202 is always considered as in the CM-CONNECTED state and in which the user plane resource is always considered established for an active PDU session.

Figure 63:
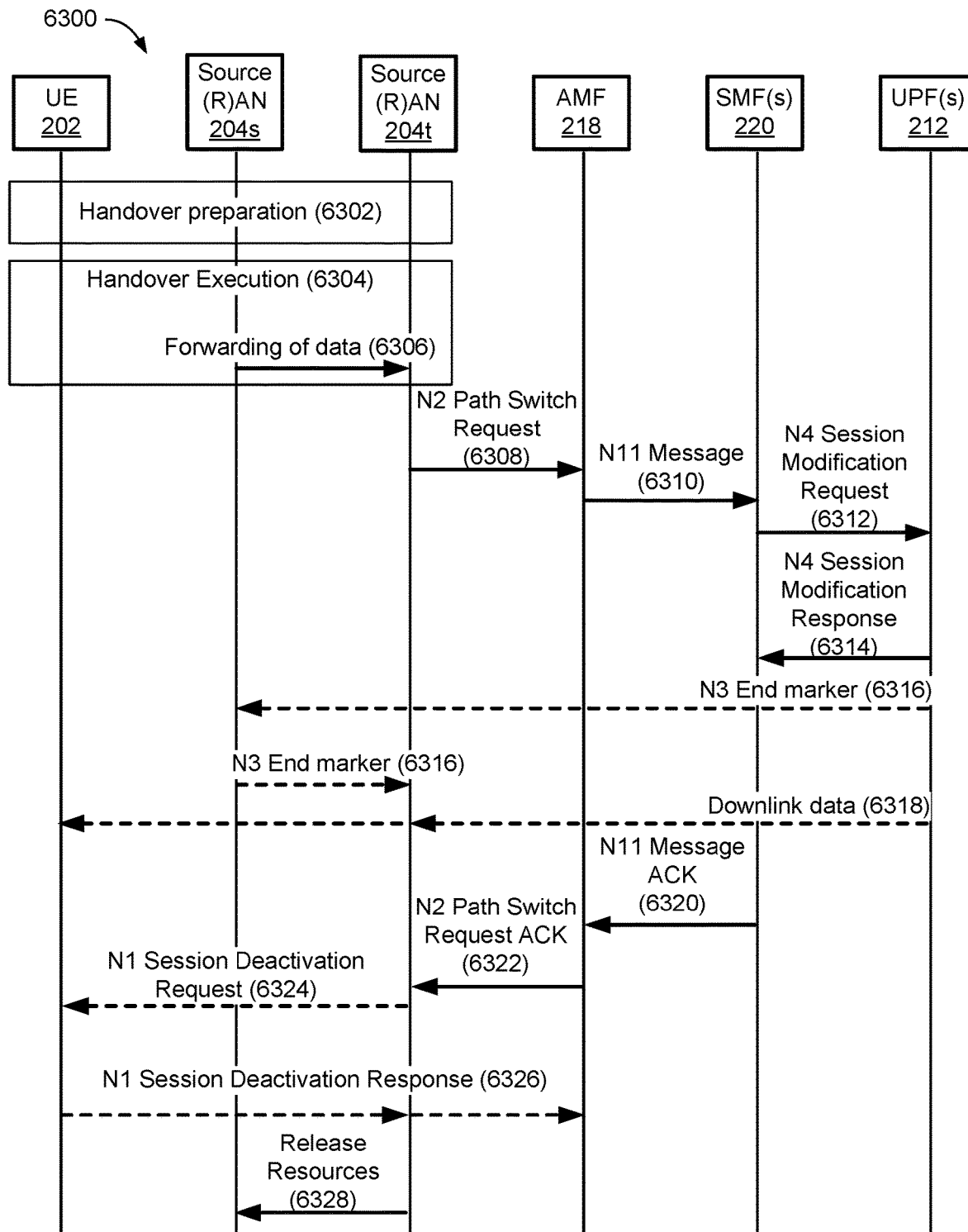
FIG. 63 illustrates, in a message call diagram, an example of a Xn based inter NG (R)AN handover procedure without user plane function relocation and with session deactivation, in accordance with embodiments of the present invention.

FIG. 63 illustrates, in a message call diagram, an example of a Xn based inter NG (R)AN handover procedure (6300) without user plane function relocation and with session deactivation, in accordance with embodiments of the present invention. The procedure (6300) combines the handover procedure defined in clause 4.9.1.1 of TS 23.502 and the session deactivation signalling messages. The procedure (6300) includes handover preparation (6302) and handover execution (6304). The handover execution (6304) includes the forwarding of data (6306) from a source (R)AN 204s to a target (R)AN 204t.

The target (R)AN 204t sends an N2 Path Switch Request (6308) message to an AMF 218 that includes an indication that the UE 202 has moved to a new target cell, and a list of PDU Sessions to be switched or removed. Depending on the type of target cell, the target (R)AN 204t includes appropriate information in this message. The PDU sessions to be switched are the PDU sessions having UPF N3 tunnel information. For each PDU session to be switched, the target (R)AN 204t includes the Time of Last Data Activity parameter, and (R)AN information, such as the N3 (R)AN Address and the N3 tunnel endpoint identifier. If the target (R)AN 204t cannot support some QoS flows of a PDU session, then the N2 Path Switch Request (6308) message includes the list of accepted QoS flows and the list of rejected QoS flows for this PDU session.

The AMF 218 then sends a N11 Message (6310) to each SMF 220 associated with the list of PDU Sessions received in the N2 Path Switch Request (6308) message. For the PDU Sessions that require a path switch, upon receipt of the N11 Message (6310), each of the SMFs 220 determines whether or not the existing UPF 212 can continue to serve the UE 202. If the existing UPF 212 cannot continue to serve the UE 202, and it is not a PDU session anchor, steps 3-11 of clause 4.9.1.2 of TS 23.502 are performed. Otherwise, the following steps (6312) to (6322) are performed by each of the SMFs 220 if their existing UPFs 212 can continue to serve the UE 202. For each PDU session that the path switch is required, the SMF 220 determines whether or not to deactivate the session.

The SMF 220 initiates the release of PDU Sessions which are not requested by the target (R)AN 204t. For PDU Sessions requested by the target (R)AN 204t, the SMF 220 sends to the UPF 212 an N4 Session Modification Request (6312) including the (R)AN address, tunnel identifiers for the downlink user plane, and a list of accepted flows if present. For the PDU sessions to be deactivated, the SMF 220 sends to the UPF 212 the N4 Session Modification Request (6312) message for these PDU sessions. The message (6312) indicates the release of (R)AN N3 tunnel information including (R)AN Address and a Tunnel Endpoint Identifier for the downlink user plane. The UPF 212 returns an N4 Session Modification Response (6314) message to the SMF 212 after the requested PDU Sessions are switched or modified. The message (6314) includes tunnel identifiers for uplink traffic. In order to assist the reordering function in the target (R)AN 204t for the PDU sessions requiring a path switch, the UPF 212 sends one or more "end marker" packets (6316) on the old path immediately after switching the path. The UPF 212 starts sending downlink packets (6318) to the target (R)AN 204t.

The SMF 220 sends to the AMF 218 an N11 Message ACK (6320) message for PDU Sessions which have been successfully switched. The message (6320) includes CN Tunnel Information, and indicates whether the (R)AN N3 tunnel information is updated (e.g., path switched) or deactivated (e.g., path released). The N11 Message ACK (6320) includes the N2 SM Message, including PDU session ID(s), for the (R)AN 204 to deactivate the PDU Sessions. In the SMF 220, for PDU sessions that are deactivated, the Session State parameter is changed to Session-IDLE. It should be noted that step (6320) can occur any time after receipt of the N4 Session Modification Response (6314) message at the SMF 220.

Upon receiving the N11 Message ACK (6320), the AMF 218 sets the session state of PDU sessions accordingly. Once the N11 Message ACK (6320) response is received from all the SMFs 220, the AMF 218 aggregates the received CN Tunnel Information from these responses and sends this aggregated information as a part of a N2 SM Information and N1 Message Session Deactivation Request (including PDU Session ID(s) to be deactivated) in N2 Path Switch Request ACK (6322) message to the target RAN 204t. If none of the requested PDP Sessions have been switched successfully, the AMF 218 sends an N2 Path Switch Request Failure message as the message (6322) to the target (R)AN 204t. In the target (R)AN 204t, for PDU sessions to be deactivated, the UPF N3 tunnel information is deleted. The (R)AN 204t forwards a N1 Message Session Deactivation Request (6324) message to the UE 202 in a RRC message. The UE 202 sets the Session State of the PDU sessions indicated in the N1 SM Message to Session-IDLE. The UE 202 releases the radio context of the deactivated PDU sessions. The UE 202 sends a N1 Message Session Deactivation Response (6326) message to the AMF 218, via the target (R)AN 204t. By sending a Release Resources message (6328) to the source RAN 204s, the target (R)AN 204t confirms success of the handover. It then triggers the release of resources with the source RAN 204s.

Figure 64:
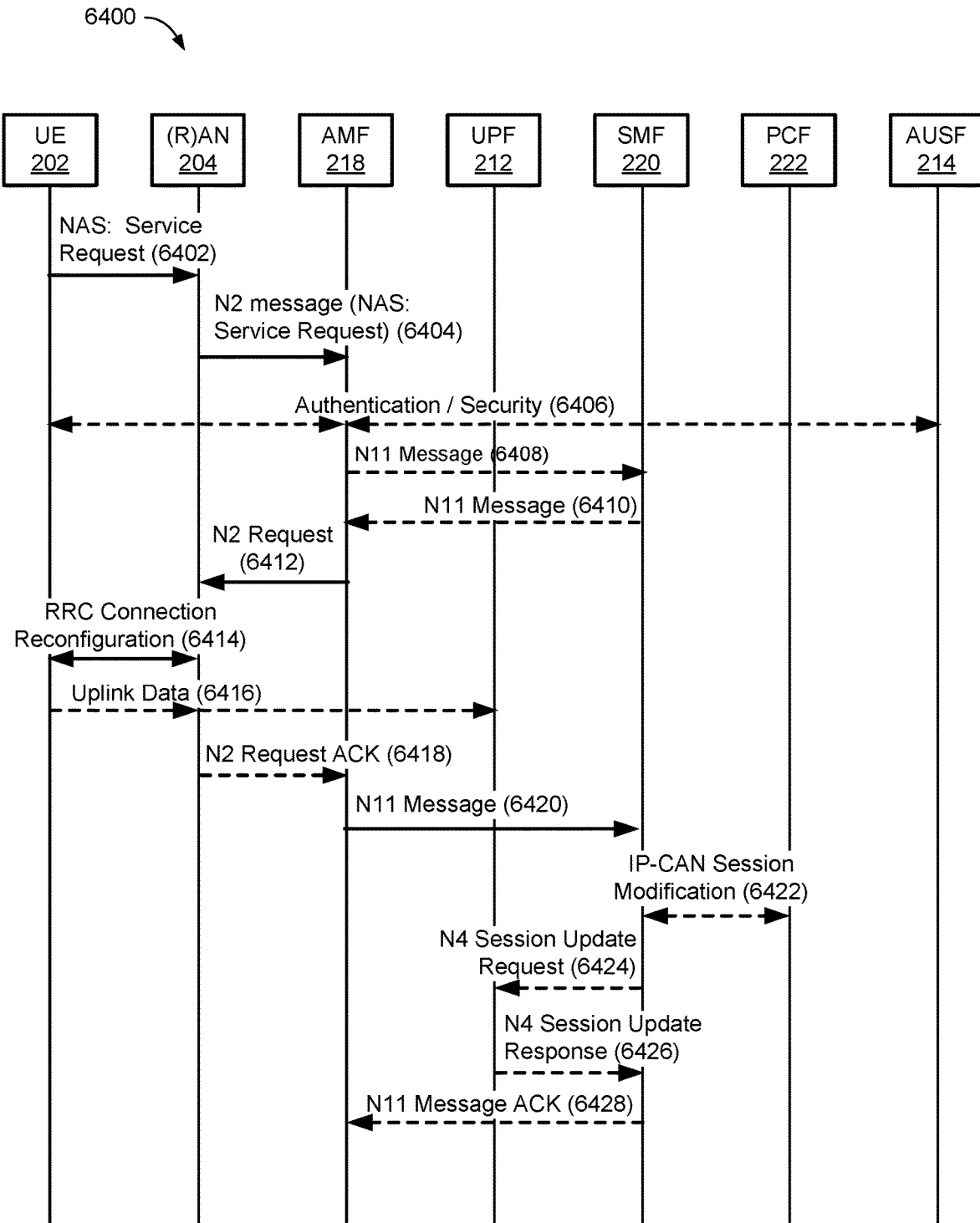
FIG. 64 illustrates, in a message flow diagram, an example of a UE-triggered Service Request procedure, in accordance with embodiments of the present invention.

FIG. 64 illustrates, in a message flow diagram, an example of a UE-triggered Service Request procedure (6400), in accordance with embodiments of the present invention. The UE 202 may send to the (R)AN 204 a MM NAS Service Request (6402) message that includes PDU session ID(s), security parameters, and a PDU session status. The UE 202 sends a NAS message Service Request towards the AMF 218 encapsulated in an RRC message to the RAN 204. If the Service Request is triggered for user data, the UE 202 includes the PDU session ID(s) in the NAS Service Request message (6402) to indicate the PDU session(s) that the UE 202 is requesting to use. If the Service Request is triggered for signalling only, the UE 202 does not need to include any PDU session ID. When this procedure (6400) is triggered for a paging response, if the UE 202 needs to use some PDU session(s), the UE 202 includes those PDU session ID(s) in the MM NAS Service Request message (6402). Otherwise the UE 202 does not need to include any PDU session ID. The PDU session status indicates the PDU sessions available in the UE 202. The PDU session status is included if the UE 202 has released some PDU sessions but has not informed the AMF 218 when the UE 202 is in the CM-IDLE state.

The (R)AN 204 then sends to the AMF 218 a N2 Message (6404) that includes the MM NAS Service Request, a 5G Temporary ID, location information, a RAT type, and a RRC establishment cause. If the AMF 218 is not able to handle the Service Request, it will reject it. A 5G Temporary ID is obtained in a RRC procedure. The RAN 204 selects the AMF 218 according to this Temporary ID. The location information and the RAT type relates to the cell in which the UE 202 is camped. Based on the PDU session status, the AMF 218 may initiate the PDU session release procedure if the PDU session is not available in the UE 202.

If the Service Request was not sent integrity-protected, or if integrity protection is indicated as having failed, the AMF 218 may initiate a NAS authentication/security procedure (6406). If the UE 202 triggered the Service Request to establish a signalling connection only, then after the security exchange, the UE 202 and the network can send signalling.

If the MM NAS Service Request message includes PDU session ID(s), or if this procedure (6400) is triggered by the SMF 220 but the PDU session IDs from the UE 202 correlates to other SMFs 220 than the one triggering the procedure, the AMF 218 sends a N11 message (6408) to SMF(s) 220 associated with the PDU session ID(s). After receiving the N11 Message (6408), each SMF 220 sends a N11 Message (6410) to the AMF 218 to establish the user plane(s) for the PDU sessions. The message (6410) includes N2 SM information such as a QoS profile, and CN N3 tunnel information). The N2 SM information includes information that the AMF 220 may provide to the RAN 204.

The AMF 218 may send to the (R)AN 204 a N2 Request (6412) message that includes the N2 SM information received from the SMF 220, a security context, an AMF Signalling Connection ID, a Handover Restriction List, and a MM NAS Service Accept. The RAN 204 stores the Security Context, AMF Signalling Connection Id, QoS Information for the QoS Flows of the PDU Sessions that are activated, and N3 Tunnel IDs in the UE RAN context. The MM NAS Service Accept includes the PDU session status in the AMF 218. The PDU session status is included if the core network has released some PDU sessions but has not informed the UE 202 when the UE 202 is in the CM-IDLE state. The AMF 218 may include at least one N2 SM information element from the SMF 220 if the procedure (6400) is triggered for PDU session user plane setup. The AMF 218 may send additional N2 SM information from the SMFs 220, if any, in separate N2 message(s), such as a N2 tunnel setup request. Alternatively, if multiple SMFs 220 are involved, the AMF 218 may send one N2 Request message to the (R)AN 204 after all the N11 messages from the SMFs 220 are received. In such a scenario, the N2 Request message includes the N2 SM information received in each of the N11 messages, and information to enable the AMF 218 to associate responses to the relevant SMF 220.

The (R)AN 204 may perform a RRC Connection Reconfiguration (6414) procedure with the UE 202 depending on the QoS information for all the QoS flows of the PDU sessions activated and the DRBs. The user plane security is established at this step. The (R)AN 204 forwards the MM NAS Service Accept to the UE 202. The UE 202 locally deletes the context of the PDU sessions that are not available in the 5G CN 206.

After the user plane radio resources are setup, the uplink data from the UE 202 may now be forwarded (6416) to the (R)AN 204. The 5G RAN 204 sends the uplink data to the UPF 212 address and Tunnel ID provided in steps (6408) and (6410). The (R)AN 204 may send to the AMF 218 a N2 Request ACK (6418) that includes the N2 SM information such as (R)AN Tunnel information, the List of accepted QoS Flows for the PDU Sessions activated, and the List of rejected QoS Flows for the PDU Sessions activated). The message (6418) may include the N2 SM information element(s), e.g., RAN tunnel information. The (R)AN 204 may send the N2 SM information with separate N2 messages, such as a N2 tunnel setup response, if the AMF 224 sends separate N2 messages in step (6412). If multiple N2 SM information elements are included in the N2 Request message (6412), the N2 Request ACK (6418) may include multiple N2 SM information elements, and information to enable the AMF 218 to associate the responses to the relevant SMF 220. The AMF 218 may send to the SMF a N11 Message (6420) that includes the N2 SM information, such as RAN Tunnel information and the RAT Type, per accepted PDU Session to the SMF 220. If the AMF 218 received the N2 SM information (one or multiple elements) in step (6418), then the AMF 218 forwards the N2 SM information to the relevant SMF 220. If the UE Time Zone has changed, as compared to the last reported UE Time Zone, then the AMF 218 includes the UE Time Zone IE in this message (6420). If dynamic PCC is deployed, the SMF 220 may optionally initiate an IP-CAN Session Modification (6422) and provides new location information to the PCF 222.

The SMF 220 may send to the UPF 212 a N4 Session Update Request (6424) message that includes RAN tunnel information. If a user plane is to be setup or modified, the SMF 220 initiates the N4 Session Modification procedure and provides the RAN Tunnel information. The UPF 212 may then send to the SMF 220 a N4 Session Update Response (6426) message. The SMF 220 may then send to the AMF a N11 Message ACK (6426) message.

A session state may be used to indicate that the UE 202 has activated a PDU session to send and receive data. Two types of session states include an active state (sometimes named the "Session-ACTIVE" state) and an idle state (sometimes named the "Session-IDLE" state). The UE 202, the serving AMF 218, and the serving SMF 220 may locally maintain the session state status.

When a PDU session is in the Session-IDLE state, the UP data connection between the UE 202 and the UPF 212 terminating N3 tunnel is not established. The UE does not send or receive data in the Session-IDLE state. The (R)AN 204 does not have PDU session context in the Session-IDLE state. The UPF 212 terminating N3 connection has the UE's PDU session context, but without (R)AN N3 connection information (e.g., no IP address of (R)AN 204 and no N3 tunnel endpoint identifier). The SMF 220 may store the UE's PDU session context information relevant to the SMF 220, but without (R)AN 204 information. The AMF 218 may store all UE's PDU session context information relevant to the AMF 218.

When a PDU session is in the Session-ACTIVE state, the UE 202 may send and receive data. The Uu interface between the UE 202 and (R)AN 204 is established in the Session-ACTIVE state. The N3 connection is be established when the PDU session is activated. The UE 202 has access to all PDU session context information, including DRB information. The AMF 218 stores all UE's PDU session context information relevant to the AMF 218. The SMF 220 stores all UE's PDU session context information relevant to the SMF 220.

Table 3 provides a description of the Session-ACTIVE and Session-IDLE states for various network entities.

TABLE 3

Description of Session State

| Network Entity | Session-ACTIVE | Session-IDLE |
|---|---|---|
| UE 202 (maintains the Session State) | Has all NAS and AS PDU session context information | Has NAS and AS PDU session context information without DRB information |
| (R)AN 204 (does not maintain the Session State) | Has all PDU session context information. However, depending on the UE's data activity, the (R)AN 204 may not have the UPF N3 connection information. | Has no PDU session context |
| UPF 212 (does not maintain the Session State) | Has all PDU session context information. However, depending on data activity, the UPF 212 may not have the (R)AN N3 connection information. | Has PDU session context without (R)AN N3 connection information |
| AMF 218 (maintains the Session State and the N3 Connection Status) | Has all PDU session context information relevant to access and mobility management. | Has all PDU session context information relevant to access and mobility management. |
| SMF 220 (maintains the Session State and the N3 Connection Status) | Has all PDU session context information. However, depending on the N3 Status Flag, the SMF 220 may not have (R)AN information if the N3 Connection Status is N3_DISCONNECTED. | Has PDU session context without (R)AN information |

FIG. 64 further illustrates, in a message flow diagram, an example of a UE-triggered Service Request procedure (6400) in the CM-IDLE state, in accordance with embodiments of the present invention. The UE 202 may send to the (R)AN 204 a MM NAS Service Request (6402) message that includes PDU session ID(s), security parameters, and a PDU session status. The UE 202 may send a NAS message Service Request (6402) towards the AMF 218 encapsulated in an RRC message to the RAN 204. The RRC message(s) that can be used to carry the 5G Temporary ID. If the Service Request is triggered for user data, the UE 202 may include the PDU session ID(s) in the NAS Service Request message (6402) to indicate the PDU session(s) that the UE 202 is requesting to use. If the Service Request is triggered for signalling only, the UE 202 does not need to include any PDU session ID. When this procedure (6400) is triggered for a paging response, if the UE 202 needs to use some PDU session(s), the UE 202 may include those PDU session ID(s) in the MM NAS Service Request message (6402). Otherwise the UE 202 does not need to include any PDU session ID. The PDU session status indicates the PDU sessions available in the UE 202.

The (R)AN 204 may then send to the AMF 218 a N2 Message (6404) that includes the MM NAS Service Request, a 5G Temporary ID, location information, a RAT type, and a RRC establishment cause. If the AMF 218 is not able to handle the Service Request, it will reject it. A 5G Temporary ID is obtained in a RRC procedure. The RAN 204 may selects the AMF 218 according to this Temporary ID. The location information and the RAT type relates to the cell in which the UE 202 is camped. Based on the PDU session status, the AMF 218 may initiate the PDU session release procedure if the PDU session is not available in the UE 202.

If the Service Request was not sent integrity-protected, or if integrity protection is indicated as having failed, the AMF 218 may initiate a NAS authentication/security procedure (6406). If the UE 202 triggered the Service Request to establish a signalling connection only, then after the security exchange, the UE 202 and the network can send signalling.

If the MM NAS Service Request message includes PDU session ID(s), or if this procedure (6400) is triggered by the SMF 220 but the PDU session IDs from the UE 202 correlates to other SMFs 220 than the one triggering the procedure, the AMF 218 sends a N11 message (6408) to SMF(s) 220 associated with the PDU session ID(s). After receiving the N11 Message (6408), each SMF 220 sends a N11 Message (6410) to the AMF 218 to establish the user plane(s) for the PDU sessions. The message (6410) includes N2 SM information such as a QoS profile, and CN N3 tunnel information). The N2 SM information includes information that the AMF 220 may provide to the RAN 204.

The AMF 218 may send to the (R)AN 204 a N2 Request (6412) message that includes the N2 SM information received from the SMF 220, a security context, an AMF Signalling Connection ID, a Handover Restriction List, and a MM NAS Service Accept. The RAN 204 may store the Security Context, AMF Signalling Connection Id, QoS Information for the QoS Flows of the PDU Sessions that are activated, and N3 Tunnel IDs in the UE RAN context. The MM NAS Service Accept includes the PDU session status in the AMF 218. The AMF 218 may include at least one N2 SM information element from the SMF 220 if the procedure (6400) is triggered for PDU session user plane setup. The AMF 218 may send additional N2 SM information from the SMFs 220, if any, in separate N2 message(s), such as a N2 tunnel setup request. Alternatively, if multiple SMFs 220 are involved, the AMF 218 may send one N2 Request message to the (R)AN 204 after all the N11 messages from the SMFs 220 are received. In such a scenario, the N2 Request message includes the N2 SM information received in each of the N11 messages, and information to enable the AMF 218 to associate responses to the relevant SMF 220.

The (R)AN 204 may perform a RRC Connection Reconfiguration (6414) procedure with the UE 202 depending on the QoS information for all the QoS flows of the PDU sessions activated and the DRBs. The user plane security is established at this step. The (R)AN 204 may forward the MM NAS Service Accept to the UE 202. The UE 202 may locally delete the context of the PDU sessions that are not available in the 5G CN 206. If the (R)AN 204 accepts at least one of QoS flow, the UE 202 may store the activated state of PDU session. Otherwise, the UE 202 considers the Service Request as not accepted by the (R)AN 204.

After the user plane radio resources are setup, the uplink data from the UE 202 may now be forwarded (6416) to the (R)AN 204. The 5G RAN 204 sends the uplink data to the UPF 212 address and Tunnel ID provided in steps (6408) and (6410). If the (R)AN 204 accepts at least one QoS flow, the message from the (R)AN 204 may send to the AMF 218 a N2 Request ACK (6418) that includes the N2 Reject ACK (including the PDU Session ID, N2 SM information such as (R)AN Tunnel information, the List of accepted QoS Flows for the PDU Sessions activated, and the List of rejected QoS Flows for the PDU Sessions activated). The message (6418) may include the N2 SM information element(s), e.g., RAN tunnel information. The (R)AN 204 may send the N2 SM information with separate N2 messages, such as a N2 tunnel setup response, if the AMF 224 sends separate N2 messages in step (6412). If multiple N2 SM information elements are included in the N2 Request message (6412), the N2 Request ACK (6418) may include multiple N2 SM information elements, and information to enable the AMF 218 to associate the responses to the relevant SMF 220. If the (R)AN 204 does not accept the PDU session, the (R)AN 204 may send a N2 Request ACK message (6418) that indicates to the AMF 218 that the N2 SM Request is not Accepted and a cause code. The message (6418) may include the PDU Session ID, the N2 SM information (including the PDU Session Reject, and the cause code).

The AMF 218 may send to the SMF a N11 Message (6420) that includes the PDU Session ID, the N2 SM information such as RAN Tunnel information, and the RAT Type, per accepted PDU Session to the SMF 220. If the AMF 218 received the N2 SM information (one or multiple elements) in step (6418), then the AMF 218 forwards the N2 SM information to the relevant SMF 220. If the UE Time Zone has changed, as compared to the last reported UE Time Zone, then the AMF 218 includes the UE Time Zone IE in this message (6420). If the PDU session is accepted, and if dynamic PCC is deployed, the SMF 220 may optionally initiate an IP-CAN Session Modification (6422) and provides new location information to the PCF 222. The SMF 220 may send to the UPF 212 a N4 Session Update Request (6424) message that includes RAN tunnel information. If a user plane is to be setup or modified, the SMF 220 initiates the N4 Session Modification procedure and provides the RAN Tunnel information. The UPF 212 may then send to the SMF 220 a N4 Session Update Response (6426) message. The SMF 220 may then send to the AMF a N11 Message ACK (6426) message. The message (6426) may include the PDU Session ID and the PDU session state. The SMF 2225 may indicate the PDU session state (Activated or Deactivated) to the AMF 218.

Figure 77:
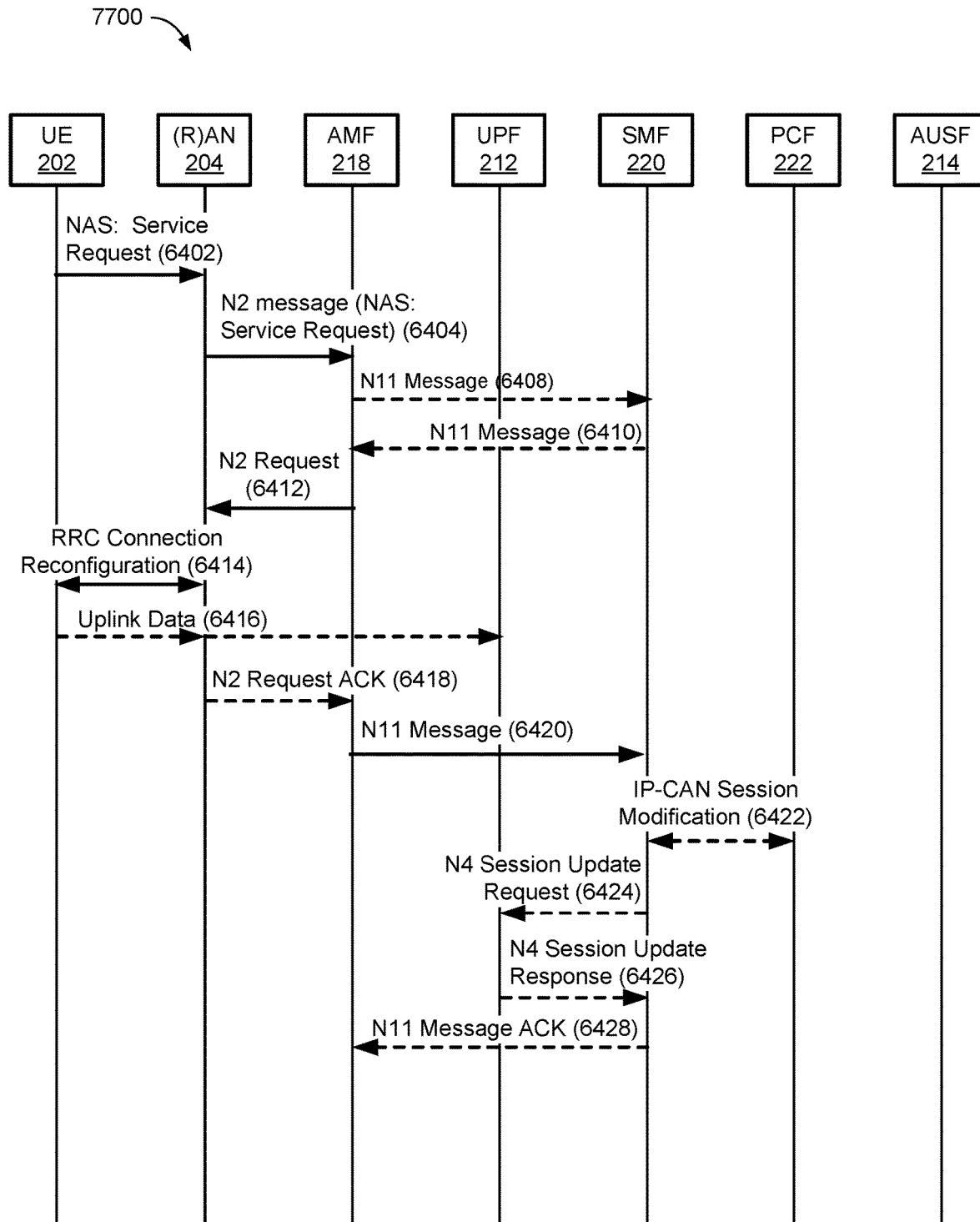
FIG. 77 illustrates, in a message flow diagram, an example of a UE triggered Service Request procedure in CM-CONNECTED state, in accordance with embodiments of the present invention.

A UE triggered Service Request in CM-CONNECTED state procedure may be used by a 5G UE 202 in the CM-CONNECTED state to request the establishment of User Plane resources for the PDU sessions. The network may take further actions if the User Plane resource establishment is not successful. It is noted that the procedure shown in FIG. 77 is not applicable for an access network (once the UE 202 is registered in the network) in which the UE 202 is always considered as in the CM-CONNECTED state, and in which the User Plane resource is always considered established for an active PDU session.

Figure 65:
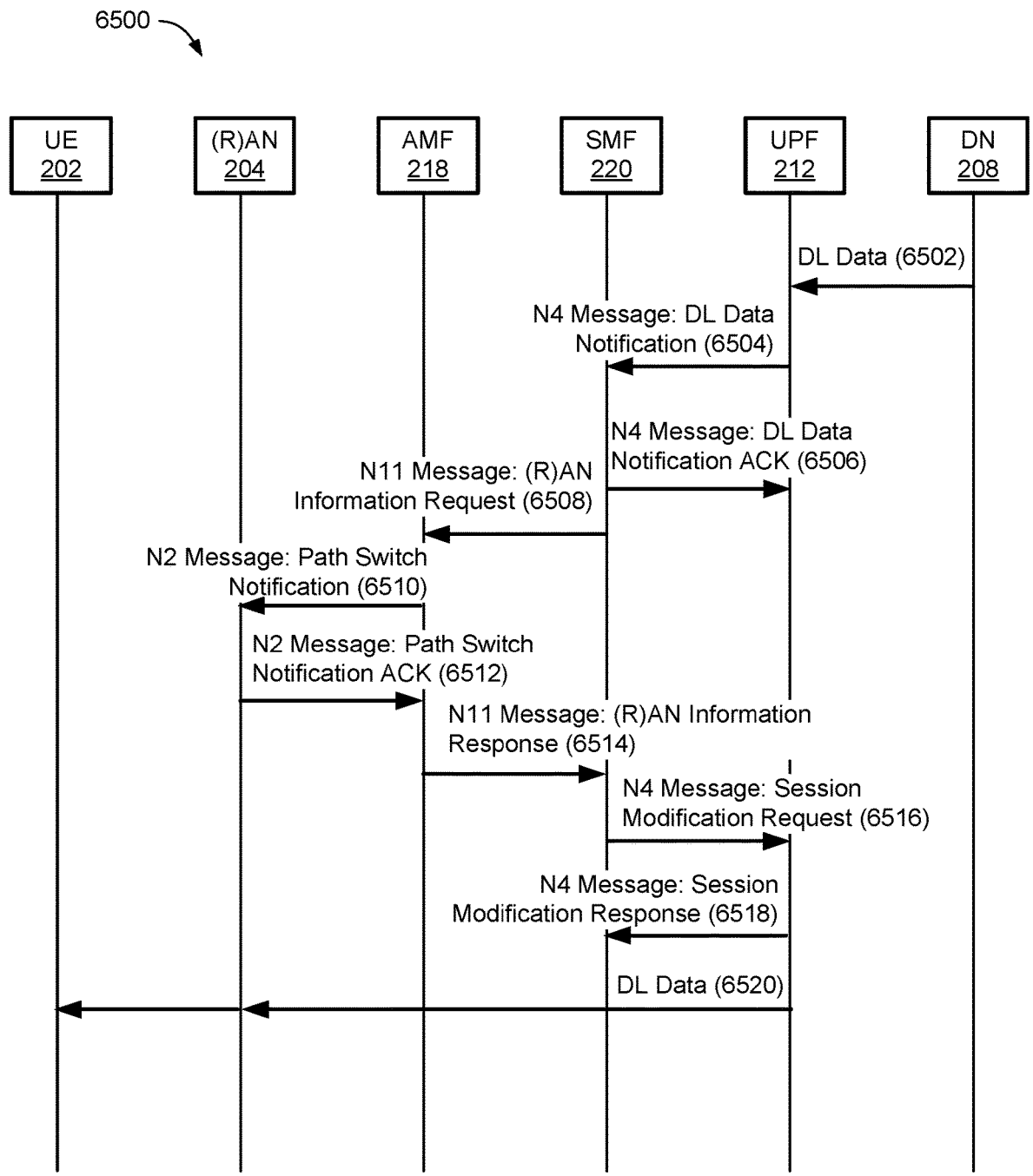
FIG. 65 illustrates, in a message flow diagram, an example of a late path switch procedure triggered by DL data without a UPF relocation, in accordance with embodiments of the present invention.

FIG. 65 illustrates, in a message flow diagram, an example of a late path switch procedure (6500) triggered by DL data without a UPF 212 relocation, in accordance with embodiments of the present invention. This procedure (6500) may be used to trigger a path switch update when the DL data arrives at the UPF 212 and the UPF 212 does not have DL tunnel information. The UPF 212 receives downlink data packets (6502) from the DN 208. If the (R)AN N3 tunnel information is not available, the UPF 212 sends a N4 Message DL Data Notification (6504) message to the SMF 220. The message (6504) includes a UE identifier (such as a SUPI) and a PDU Session ID. The SMF 220 sends a N4 Message DL Data Notification Acknowledgement (6506) message to the UPF 212. Alternatively, the acknowledgement (6506) may be performed by a transport network message protocol.

If the N3 Connection Status is currently set to N3_DISCONNECTED, the SMF 220 sends a N11 Message (R)AN Information Request (6508) message to the AMF 218. The message (6508) includes a UE identifier (such as a SUPI), a PDU Session ID, and the N2 SM Message including the CN tunnel information (such as UPF Address and UPF N3 Tunnel Endpoint Identifier) for the (R)AN 204. The AMF 218 sends to the (R)AN a N2 Message Path Switch Notification (6510) message that includes the PDU Session ID and the N2 SM Message. The (R)AN 204 updates the CN tunnel information. The (R)AN 204 sends a N2 Message Path Switch Notification Acknowledgment (6512) message to the AMF 218. The message (6512) includes a PDU Session ID and (R)AN tunnel information such as the (R)AN Address and the Tunnel Endpoint Identifier. The AMF 218 sends a N11 Message (R)AN Information Response (6514) message to the UPF 212. The message (6514) includes the UE identifier (such as a SUPI), the PDU Session ID, and the (R)AN tunnel information that includes the (R)AN type, the N3 (R)AN Address, and the N3 Tunnel Endpoint Identifier. The AMF 218 changes the N3 Connection Status of the PDU session to N3_CONNECTED.

The SMF 220 sends a N4 Message Session Modification Request (6516) message to the UPF 212. The message (6516) includes the UE identifier (such as a SUPI), the PDU Session ID, and the (R)AN N3 tunnel information such as the (R)AN N3 Address and the downlink Tunnel Endpoint Identifier. The UPF 212 updates the (R)AN tunnel information for the requested PDU session. The UPF 212 sends a N4 Message Session Modification Response (6518) to the SMF 220. The message (6518) includes a UE identifier and a PDU Session ID. The SMF 220 changes the N3 Connection Status of the PDU session to N3_CONNECTED. The UPF 212 may send downlink data packets to the UE 202 via the (R)AN 204 before or after steps (6516) and (6518).

Figure 66:
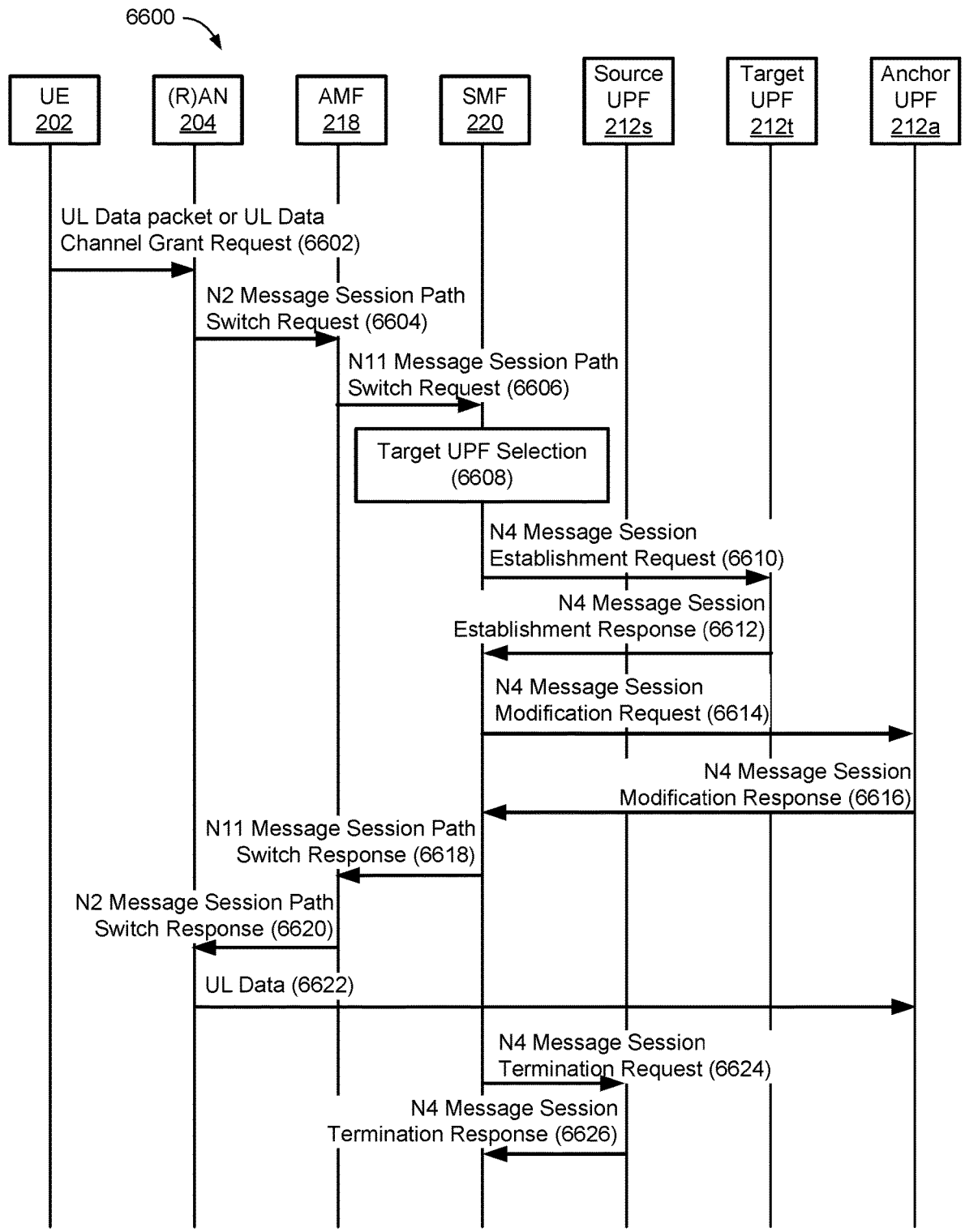
FIG. 66 illustrates, in a message flow diagram, an example of a late path switch procedure triggered by UL data with UPF reselection, in accordance with embodiments of the present invention.

FIG. 66 illustrates, in a message flow diagram, an example of a late path switch procedure (6600) triggered by UL data with UPF 212 reselection, in accordance with embodiments of the present invention. This procedure (6600) may be used to trigger a path switch update when the UE 202 requests to send UL data. The UPF 212 may or may not be reselected. This procedure (6600) may be separated into two procedures: one for a late path switch triggered by uplink data as defined in FIG. 57, and one for a UPF 212 relocation as defined in FIG. 68.

The UE 202 sends a UL Data Channel Grant Request message or a UL Data Packet (6602) to the (R)AN 204 for a PDU session. If the UPF N3 tunnel information is not available in the (R)AN 204, the (R)AN 204 sends the N2 Message Session Path Switch Request (6604) message to the AMF 218. The message (6604) includes the PDU Session ID and the (R)AN tunnel information, such as the (R)AN Address and the (R)AN N3 Tunnel Endpoint Identifier. The AMF then sends a N11 Message Session Path Switch Request (6606) message to the SMF 220, including the UE identifier (such as a SUPI), the PDU Session ID, and the (R)AN tunnel information such as the (R)AN type, the N3 (R)AN Address and the downlink Tunnel Endpoint Identifier.

The SMF 220 selects the target UPF 212*t* to serve the PDU session based on criteria in Clause 6.3.3 of TS 23.502 (6608). The SMF 220 assigns the N3 tunnel information, such as the N3 uplink Tunnel Endpoint Identifier. The SMF 220 sends a N4 Message Session Establishment Request (6610) message to the target UPF 212*t*. The message (6610) includes the PDU Session ID, the QoS policy, the charging policy, and (R)AN tunnel information. The (R)AN tunnel information may include the (R)AN Address, the downlink tunnel endpoint identifier, and the N3 and N9 downlink tunnel information such as the Anchor UPF Address and the N9 downlink Tunnel Endpoint Identifier. The target UPF 212*t* updates the (R)AN tunnel information and anchor UPF 212*a* tunnel information. The target UPF 212*t* sends a N4 Message Session Establishment Response (6612) message to the SMF 220. The message (6612) includes the UE identifier (such as a SUPI) and the PDU Session ID.

The SMF 220 sends a N4 Message Session Modification Request (6614) message to the anchor UPF 212*a* (such as the session anchor UPF). The message (6614) includes the UE identifier (such as a SUPI), and the N9 Target UPF tunnel information such as the target UPF Address and the N9 uplink Tunnel Endpoint Identifier. The anchor UPF 212*a* updates the target UPF tunnel information. The anchor UPF 212*a* sends a N4 Message Session Modification Response (6616) message to the SMF 220. The SMF 220 sends a N11 Message Session Path Switch Response (6618) message to the AMF 218. The message (6618) includes the UE identifier (such as a SUPI), the PDU Session ID, and the N2 SM Message that includes the N3 CN Tunnel Information for the (R)AN 204. The SMF 220 changes the N3 Connection Status of the PDU session to N3_CONNECTED. The SMF 220 starts a timer, to be used in step (6624).

The AMF 218 sends a N2 Message Session Path Switch Response (6620) message to the (R)AN 204 that indicates that the path switch is completed. The message (6620) includes the PDU Session ID, and the N2 SM Message received from the SMF 220. The AMF 218 changes the N3 Connection Status of the PDU session to N3_CONNECTED. The (R)AN 204 updates the CN tunnel information and sends uplink data packets (6622). Once the timer set in step (6618) expires, the SMF 220 sends a N4 Message Session Termination Request (6624) message to the source UPF 212*s*. The message (6624) includes the UE identifier (such as a SUPI) and the PDU Session ID. The source UPF 212*s* deletes the PDU session context. The source UPF 212*s* sends a N4 Message Session Termination Response (6626) to the SMF 220.

Figure 67:
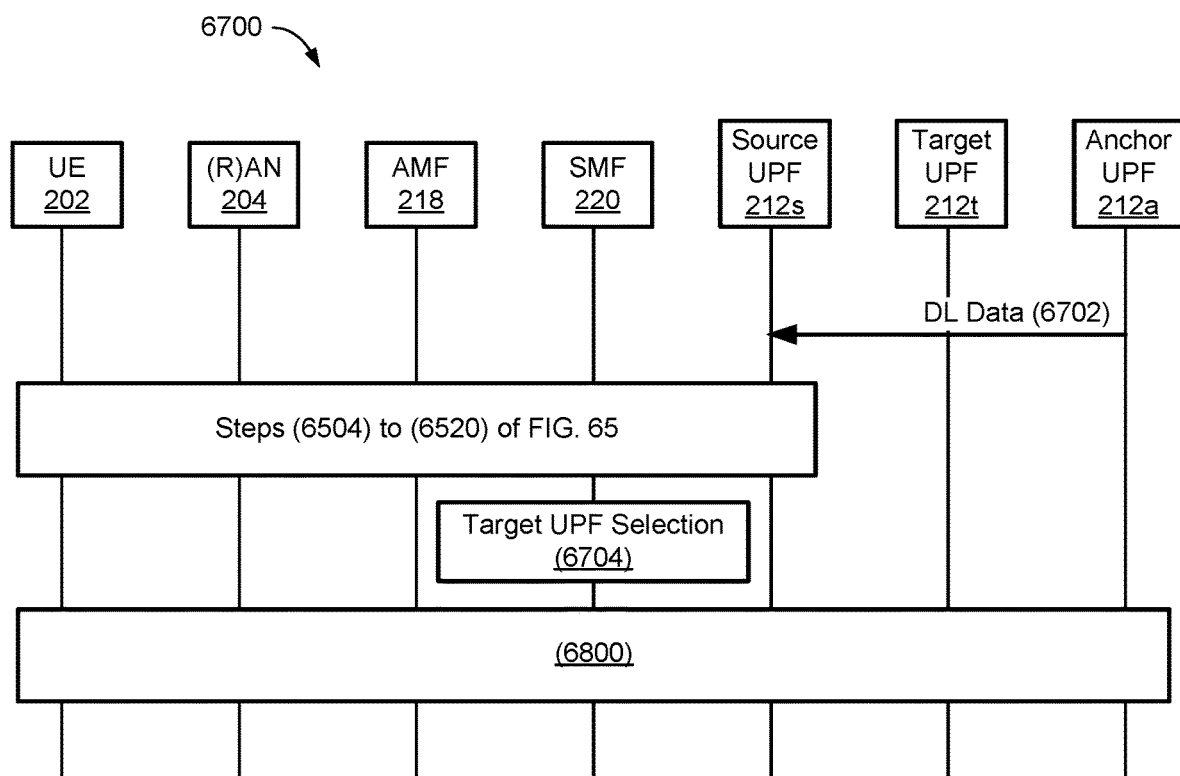
FIG. 67 illustrates, in a message flow diagram, an example of a late path switch procedure triggered by DL data with UPF reselection, in accordance with embodiments of the present invention.

FIG. 67 illustrates, in a message flow diagram, an example of a late path switch procedure (6700) triggered by DL data with UPF 212 reselection, in accordance with embodiments of the present invention. This procedure (6700) may be used for a late path switch triggered by DL data arriving at the UPF 212. First the CN performs a path switch procedure without UPF 212 reselection. After that, if the SMF 220 determines that the UPF 212 needs to be relocated, the SMF 220 performs the UPF 212 reselection procedure.

The anchor UPF 212*a* for the PDU session sends downlink data packets (6702) to the source UPF 212*s*. Next, steps (6504) to (6520) of the late path switch procedure (6500) triggered by DL data without UPF 212 reselection is performed. The SMF 212 selects a new UPF 212 (6704). If a new UPF 212 is selected (6704), a UPF 212 reselection procedure (6800) is performed.

Figure 68:
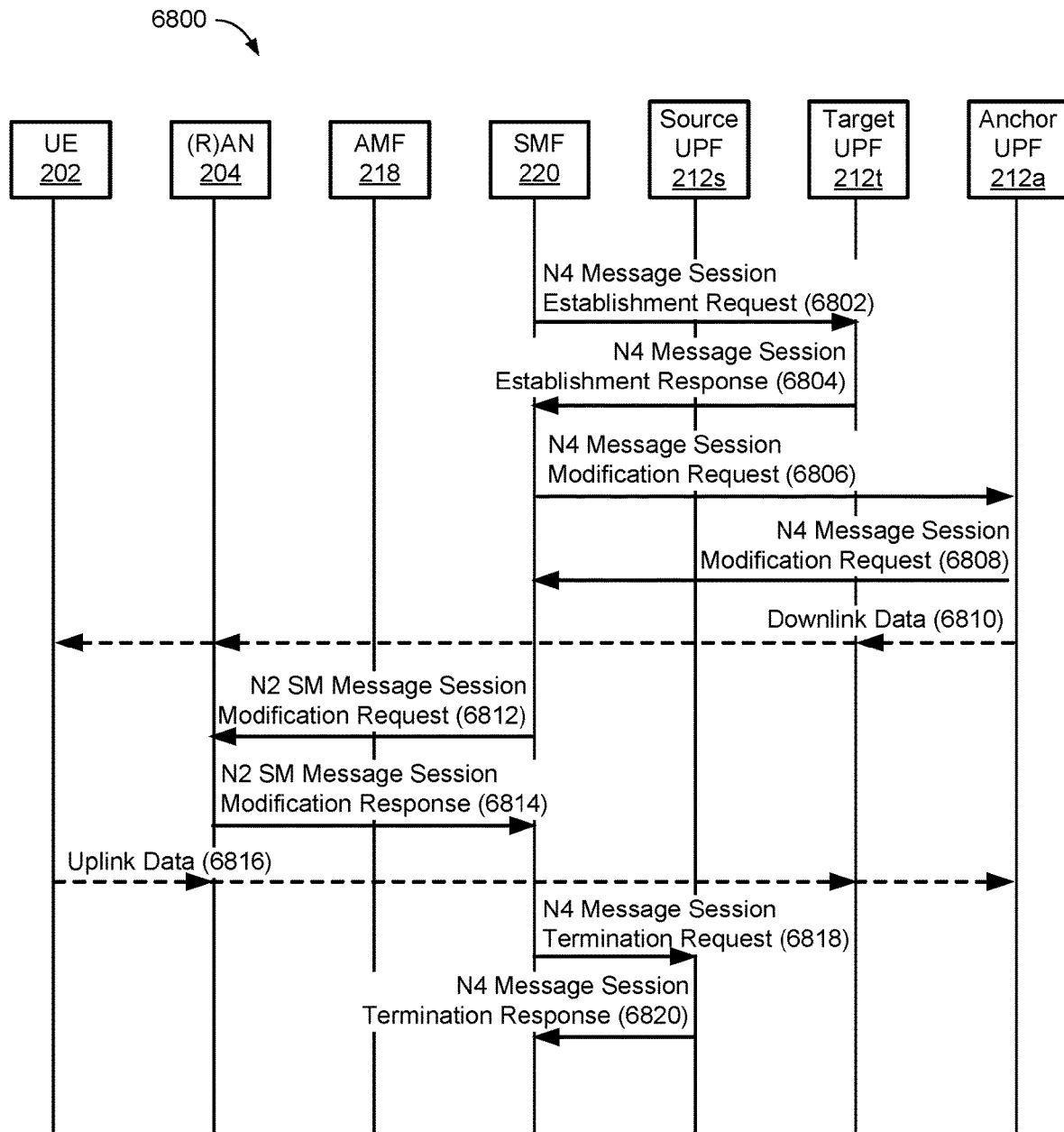
FIG. 68 illustrates, in a message flow diagram, an example of a UPF reselection procedure, in accordance with embodiments of the present invention.

FIG. 68 illustrates, in a message flow diagram, an example of a UPF 212 reselection procedure (6800), in accordance with embodiments of the present invention. This procedure (6800) may be used to establish a new UPF 212 that terminates the N3 connection. The SMF 220 selects the target UPF 212*t* to serve the PDU session based on criteria in Clause 6.3.3 of TS 23.502. The SMF 220 assigns N3 tunnel information (such as the N3 uplink Tunnel Endpoint Identifier), and the N9 tunnel information (such as the N9 Anchor UPF Address and the N9 uplink Tunnel Endpoint Identifier). The SMF 220 sends a N4 Message Session Establishment Request (6802) message to the target UPF 212*t*. The message (6802) includes the PDU Session ID, the QoS policy, the charging policy, and the (R)AN tunnel information such as the (R)AN Address, the downlink Tunnel Endpoint Identifier, and the N3 and N9 tunnel information. The target UPF 212*t* updates the (R)AN, N3, and N9 tunnel information. The target UPF 212*t* sends a N4 Message Session Establishment Response (6804) message to the SMF 220. The message (6804) includes the UE identifier (such as a SUPI) and the PDU Session ID.

The SMF 220 sends a N4 Message Session Modification Request (6806) message to the anchor UPF 212*a* (such as the Session Anchor UPF). The message (6806) includes the UE identifier (such as a SUPI), and the N9 Target UPF tunnel information such as the Target UPF Address and the N9 downlink Tunnel Endpoint Identifier. The anchor UPF 212*a* updates the target UPF 212*t* tunnel information. The anchor UPF 212*a* sends a N4 Message Session Modification Response (6808) message to the SMF 220. The anchor UPF 212*a* can send downlink data (6810) to the UE 202 via the target UPF 212*t*. The SMF 220 sends a N2 SM Message Session Modification Request (6812) message to the (R)AN 204 by using a message transfer service of the AMF 218. The message (6812) to the AMF 218 includes the UE identifier (such as a SUPI), and the N2 SM Message Session Modification Request message to the (R)AN 204 that includes the PDU Session ID, and the N3 tunnel information (such as the UPF Address and the Tunnel Endpoint Identifier. The (R)AN 204 stores the N3 tunnel information and sends a N2 SM Message Session Modification Response (6814) message to the SMF 220 via the AMF 218. The message (6814) includes the PDU Session ID. The AMF 218 adds the UE identifier (such as a SUPI) and forwards the N2 SM Message Session Modification Response message to the SMF 220. The UE 202 and (R)AN 204 may send UL data (6816) to the target UPF 212*t* and the anchor UPF 212*a*. The SMF 220 sends a N4 Message Session Termination Request (6818) message to the source UPF 212*s*. The source UPF 212*s* sends a N4 Message Session Termination Response (6820) message to the SMF 220.

If a N2 UE Context Release Request is performed immediately after the SMF 220 deactivates the PDU session, the (R)AN 204 can release N3 interface and radio interface (including Uu) information before the UPF 212 receives instruction from the SMF 220 to start buffering downlink packets. It is thus possible that the UPF 212 can forward some downlink packets to the (R)AN 204 where the (R)AN 204 has no UE context information. Hence, the (R)AN 204 may drop those packets which may lead to important information being lost when the packets are dropped, and/or incorrect billing since the UPF 212 is not aware that the packets were dropped. To avoid this situation, the ANT 218 may collect all the responses from SMF(s) 220 confirming session deactivation was complete before requesting the (R)AN 204 to release the UE context.

Figure 69:
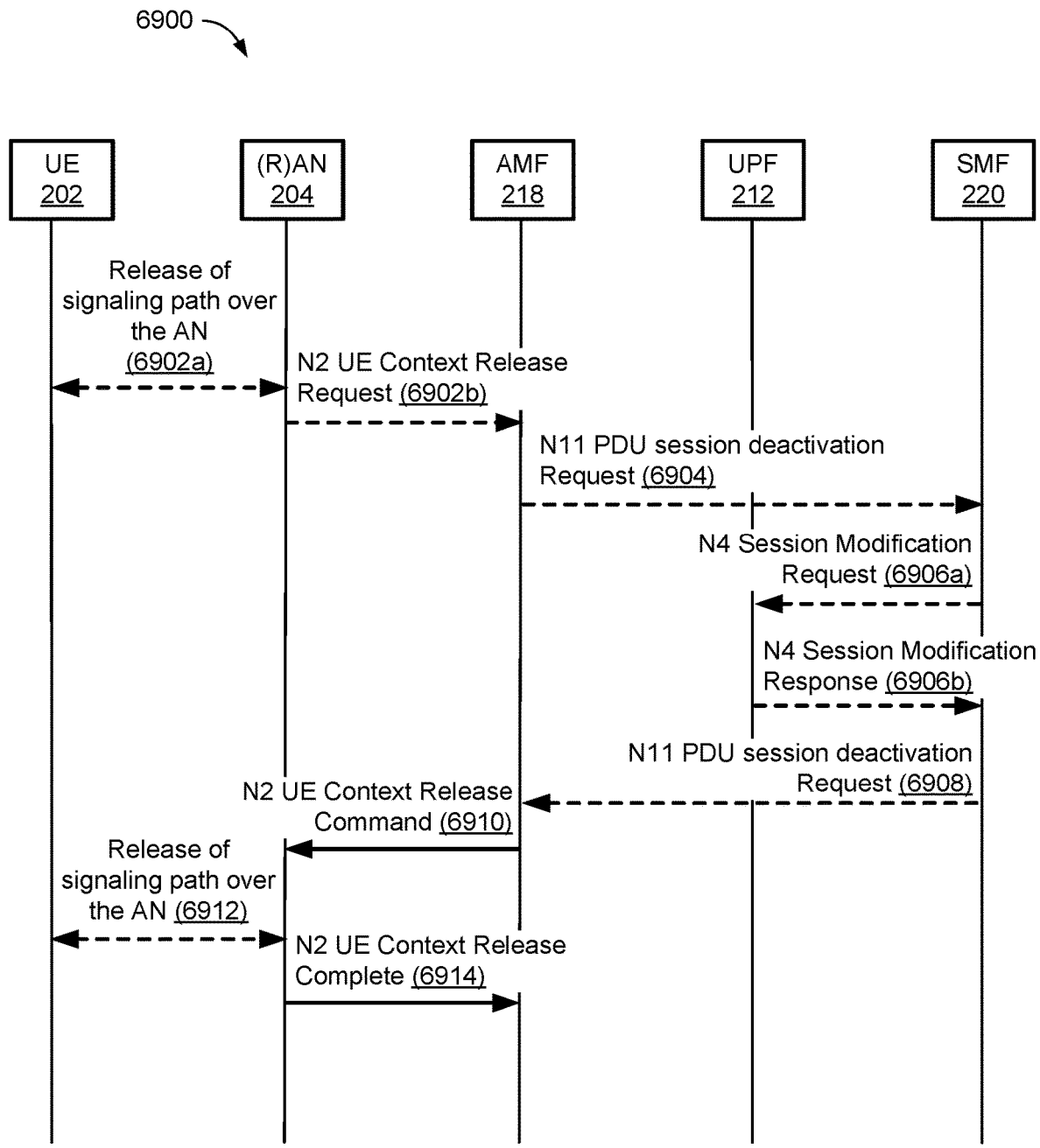
FIG. 69 illustrates, in a message flow diagram, an example of a procedure for a UE context release in an AN, in accordance with embodiments of the present invention.

FIG. 69 illustrates, in a message flow diagram, an example of a procedure for a UE context release in an AN (6900), in accordance with embodiments of the present invention. This procedure (6900) may be used to release the logical N2-AP (Application Protocol) signalling connection and the associated N3 User Plane connections. When the N2-AP signalling connection is lost due to (R)AN 204 or AMF 218 failure, the UE context release in the AN procedure (6900) may be performed locally by the AMF 218 or the (R)AN 204 as described in the procedure flow below without using or relying on any of the signalling shown between (R)AN 204 and AMF 218. The UE context release in the AN procedure (700) may result in all PDU sessions of the UE 202 to be deactivated.

The initiation of UE context release in the AN procedure (6900) may be (R)AN-initiated with a cause, e.g., O&M Intervention, Unspecified Failure, AN (e.g., Radio) Link Failure, User Inactivity, Release due to UE generated signalling connection release (6902a), etc. The initiation of the procedure (6900) may also be AMF-initiated (6902b) with a cause, e.g. Unspecified Failure, etc. Both the (R)AN-initiated and the AMF-initiated steps of the UE context release in the AN procedure (6900) are shown in FIG. 69.

If there are confirmed AN conditions (e.g., Radio Link Failure) or for other (R)AN 204 internal reasons, the (R)AN 204 may initiate the UE context release in the AN procedure (6900). In this case, the (R)AN 204 sends a N2 UE Context Release Request message (6902b) to the AMF 218. The message may include a Cause (or a cause code) that indicates (or represents) the reason for the release (e.g., AN Link Failure, O&M intervention, unspecified failure, etc.). The initiation of a UE context release in the AN procedure (6900) may also be triggered by an internal AMF 218 event.

The AMF 218 may send one message to each SMF 220 serving multiple activated PDU sessions to request deactivation of these PDU sessions. For each of the SMF serving activated PDU sessions, the AMF 218 may request the SMF 220 to deactivate the PDU sessions: the AMF 218 may send a N11 PDU session deactivation Request message (6904) to the SMF 220. The message (6904) may include an UE identifier (such as SUPI), a (R)AN identifier (such as (R)AN Address), and a Release Cause (or cause code). The AMF 218 may also store the deactivated state of the PDU session. It is noted that this step (6904) could also be via a service of AMF: Namf_UE Mobility Event Notification (SMF). In this case, the AMF 218 may send (via a N11 message) a UE Mobility Event Notification, which indicates the N2 Release event, to the SMF(s) 220 that serve active PDU session(s) of the UE 202 as defined in Clause 5.2.2.2 of TS 23.502. The message may include the a UE identifier (such as SUPI), the (R)AN identifier information (such as (R)AN address), and the cause code. The (R)AN identifier information may be used to distinguish between multiple (R)ANs in the case where a UE is connected to multiple (R)ANs.

Next, the SMF 220 may send to the UPF 212 a N4 Session Modification Request message (6906a). This message (6906a) may include the AN tunnel information to be removed. Thus, the SMF initiates a N4 Session Modification procedure (6906a) indicating the need to remove AN Tunnel Information. A buffering command may indicate whether the UPF 212 is to buffer an incoming DL PDU. It is noted that the request (6906a) includes a "Buffering command", then the UPF 212 may start buffering downlink PDUs received for the UE 202, and initiate the "Network Triggered Service Request" procedure, described in clause 4.2.3.3 of TS 23.502, if downlink PDU arrives for the PDU session. Next, the UPF 212 may send to the SMF 220 a N4 Session Modification Response message (6906b) acknowledging the SMF 220 request. The SMF 220 may store the deactivated state of PDU session.

Next, the SMF 220 may send to the AMF 218 a N11 PDU session deactivation Response message (6908). It is noted that this step (6908) could also be implemented by using a service of SMF: Nsmf_PDU Session Event Report Notification (AMF). The SMF 220 may send (via a N11 message) a PDU Session Event Report Notification as defined in Clause 5.2.8.1 of TS 23.502. The notification may include a UE Identifier (such as a SUPI), PDU Session ID(s), and an event trigger (such as the deletion of (R)AN tunnel information). After the AMF 218 collects all the PDU session deactivation Response in step (6908) from the SMF(s) 220 that were notified in Step (6904), the AMF 218 may send to the (R)AN 204 a N2 UE Context Release Request message (6910).

If the AN connection (e.g., a RRC connection) with the UE 202 is not already released (step 6902a), the (R)AN 204 requests the UE 202 to release the AN connection (6912). Upon receiving an AN connection release confirmation from the UE 202, the (R)AN 204 may delete the UE's context. The (R)AN 204 may confirm the N2 Release by returning an N2 UE Context Release Complete ( ) message (6914) to the AMF 218. With this, the signalling connection between the AMF 218 and the (R)AN 204 for that UE 202 is released. It is noted that, during this procedure, the AN may provide location information to the AMF 218.

A PDU session release procedure may be used to release all resources associated with a PDU session. Such resources may include the IP address/Prefixes allocated for an IP-based PDU session, which may include the release of multiple Prefixes in case of Multi-homing (as defined in TS 23.501). Such resources may also include any UPF 212 resource (including N3/N9 termination) that was used by the PDU session. The SMF 220 may notify any entity associated with the PDU session of a PDU session release. Such entities include the PCF 222, and the DN 208 (e.g., when DN 208 authorization has taken place during the PDU session establishment).

In some implementations, for deactivated PDU sessions, the SMF 220 may send an Asynchronous Session Release (ASR) Flag and the PDU Session ID to inform the AMF 218 about a session release request and to indicate whether or not the PDU session release procedure can be asynchronously performed. If the ASR Flag is set to FALSE, the PDU session may be release immediately, regardless of the CM state of the UE 202. If the ASR Flag is set to TRUE, the PDU session release can be performed when the UE 202 is in CM-CONNECTED state. The ASR Flag and PDU Session ID in the message from the SMF 220 to the AMF 218 may be included according to the following:

For an activated PDU session, if the UE 202 is in a CM-CONNECTED state, the PDU session may be released immediately. Hence, the SMF 220 does not need to send an ASR Indication to the AMF 218.

For a deactivated PDU session, the SMF 220 may send the ASR Flag and PDU Session ID in the message to the AMF 218. If the ASR Flag is set to FALSE, the AMF 218 may send N1 SM Information (PDU Session Release Request) to the UE 202 immediately. If the UE 202 is in the CM-IDLE state, the AMF 218 may page the UE 202 to enter the CM-CONNECTED state. If the UE 202 receives the paging, the AMF 218 may send to the UE 202 the N1 SM Information (PDU Session Release Request). If the UE 202 cannot receive the paging, the AMF 218 may send an "undelivered error message" to the SMF 220, indicating the cause code (e.g., UE Unreachable). The SMF 220 and AMF 218 may then release the PDU session. The session status in the AMF 218 and UE 202 may be synchronized when the UE 202 performs a Service Request or Registration procedures. If the ASR Flag is set to TRUE, the PDU session in the UE 202 may be released if the UE 202 is in the CM-CONNECTED state. If the UE 202 is in the CM-IDLE state, the PDU session status in the UE 202 and CN 206 may be synchronized when the UE 202 performs Service Request or Registration procedures.

Figure 70:
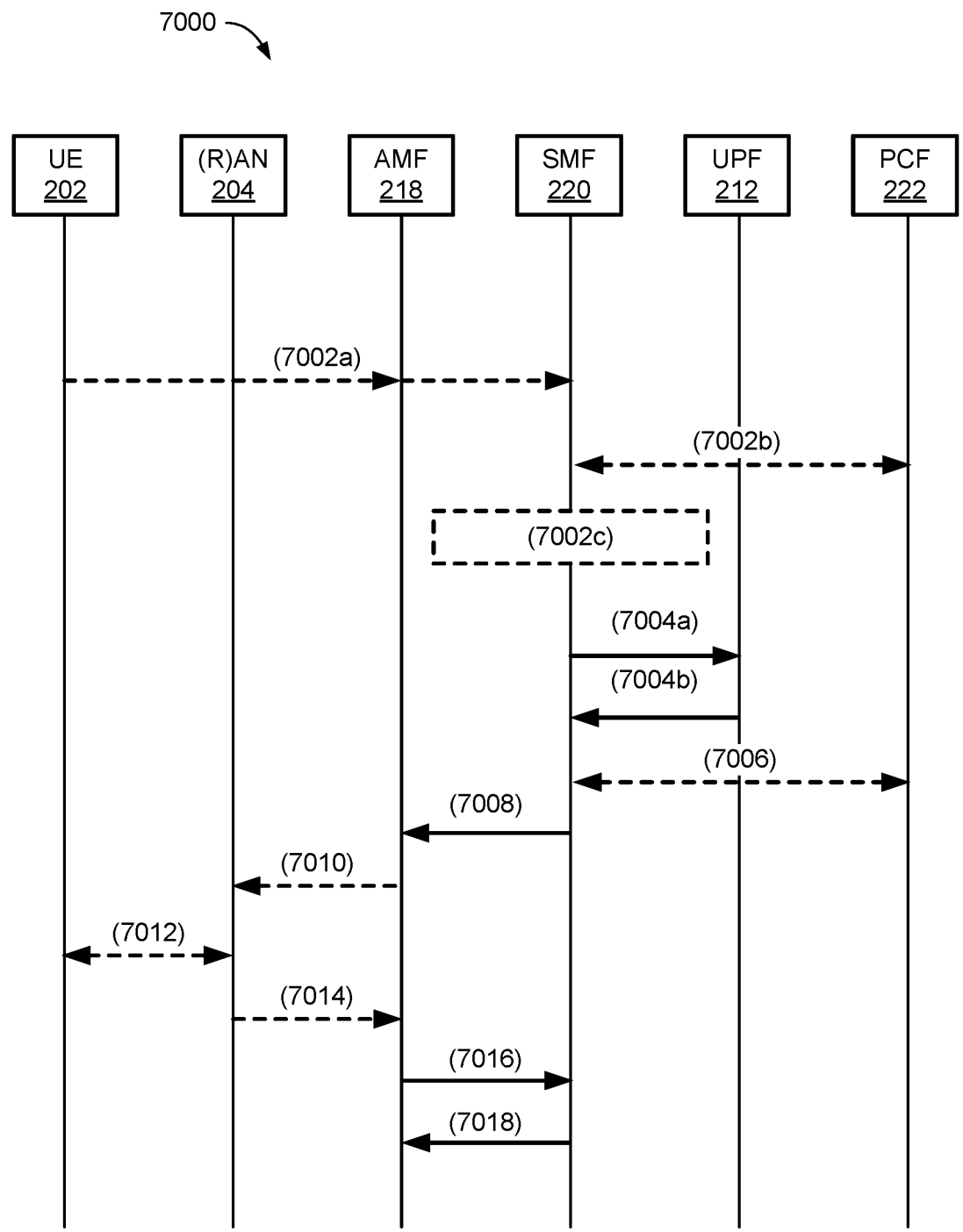
FIG. 70 illustrates, in a message flow diagram, an example of a procedure for a UE or CN requested PDU session release for Non-Roaming and Roaming with Local Breakout, in accordance with embodiments of the present invention.

FIG. 70 illustrates, in a message flow diagram, an example of a procedure for a UE 202 or CN 206 requested PDU session release for Non-Roaming and Roaming with Local Breakout (7000), in accordance with embodiments of the present invention. FIG. 70 illustrates both the UE requested PDU session release procedure and the network requested PDU session release procedure. The procedure (7000) allows the UE 202 to request the release of one PDU session. The procedure (7000) also allows the SMF 220 or PCF 222 to initiate the release of a PDU session. In the case of Local BreakOut (LBO), the procedure (7000) is as in the case of non-roaming with the difference that the SMF 220, the UPF 212 and the PCF 222 are located in a visited network.

The procedure (7000) may be triggered by the UE 202, the PCF 222 or by the SMF 220. The UE 202 may initiate the procedure (7000) via a transmission of a N1 SM PDU Session Release Request message (7002*a*) to the SMF 220. The message (7002*a*) may include the PDU Session ID, and may be relayed by (R)AN 204 to the AMF 218 corresponding to the PDU Session ID over N2 interface and the relayed by the AMF 218 over N11 interface to the SMF 220. Depending on the access type, when the UE 202 is in a CM-IDLE state, the UE 202 can trigger a Service Request procedure before being able to release the PDU session. The PCF may initiate the procedure (7000) by initiating a PDU-CAN Session modification procedure (7002*b*) to request the release of the PDU session. The SMF 220 may initiate the procedure (7000) by releasing a PDU session (7002*c*), for example, based on a request from the DN 208 (e.g., cancelling the UE 202 authorization to access to the DN 208), or based on a request from the UDM (e.g., a subscription change) or from the Online Charging System (OCS). The release procedure (7002*c*) also may be triggered based on locally configured policy. For example, the release procedure (7002*c*) may be related with the UPF 212 relocation for service and session continuity (SSC) mode 2/mode 3. If the SMF 220 receives one of the triggers in step (7002*a*) to (7002*c*), the SMF 220 may start the PDU session release procedure (7000).

The SMF 220 may release the IP address/Prefix(es) that were allocated to the PDU session, and may also releases the corresponding User Plane resources. The SMF 220 may send an N4 Session Release Request message (7004*a*) to the UPF 212. The message (7004) may include the N4 Session ID. The UPF 212 may drop any remaining packets of the PDU session and release all tunnel resource and contexts associated with the N4 Session. The UPF 212 may acknowledge the N4 Session Release Request by the transmission of an N4 Session Release Response message (7004*b*) to the SMF 220. The message (7004*b*) may include the N4 Session ID. If there are multiple UPFs 212 associated with the PDU session, steps (7004*a*) and (7004*b*) may be performed for each UPF 212. If Dynamic PCC applied to this session, the SMF 220 may initiate the PDU-CAN session termination procedure (7006). If it is the last PDU session that the SMF 220 is handling for the UE 202, the SMF 220 may release the association with the UDM.

The SMF 220 may send an N11 Request message (7008) to the AMF 218. The message (7008) may include the N2 SM Resource Release request, and N1 SM Information such as the PDU Session Release Command. The SMF 220 may create the N1 SM Information including the PDU Session Release Command message that includes the PDU Session ID, and a Cause (or a cause code). The Cause may indicate a trigger to establish a new PDU session with the same characteristics (e.g., when procedures related with SSC mode 2 are invoked). It is noted that SSC mode 2 is defined in TS 23.502 clause 5.6.9.

In some implementations, an asynchronous communication type "ACM" Indication is used as described below. If the UP connection of the PDU session is active, the SMF 220 may also create an N2 SM request to release the (R)AN 204 resources associated with the PDU session. This N2 SM request may include a N2 Resource Release request that includes the PDU Session ID. The SMF 220 may send an N11 message (7008) to the AMF 218. The message (7008) may include the N2 SM Resource Release request, and a N1 SM Container that includes the PDU Session Release Command. If the PDU session is deactivated, the "ACM" Indication indicates to the AMF 218 whether it may skip sending the N1 SM container to the UE 202 (e.g., when the UE 202 is in CM-IDLE mode). If the UE 202 is in CM-IDLE state, and the "ACM" Indication is included in the N11 message, steps (7010) to (7014) may be skipped. Otherwise, if the UE 202 is in CM-IDLE state and "ACM" is not indicated, the AMF 218 may initiate the network triggered Service Request procedure to transmit the N1 SM Information to the UE 202. If the UE 202 is in the CM-CONNECTED state, then the AMF 218 may transfer the message received from the SMF 218 in step (7008) to the (R)AN 204. This may be performed by sending a N2 SM Resource Release request message (7010) to the (R)AN 204, where the message (7010) may include N1 SM Information. It should be noted that the UE 202 and the 5G Core (e.g., CN 206) will get synchronized with respect to the status (e.g., released) of the PDU session at the next Service Request or Registration procedure. When the (R)AN 204 has received an N2 SM request (7010) to release the AN resources associated with the PDU session, the (R)AN 204 issues AN specific signalling exchange(s) (7012) with the UE 202 to release the corresponding AN resources. In case of a 3GPP RAN, an RRC Connection Reconfiguration may take place with the UE 202 releasing the (R)AN 204 resources related to the PDU session. During this procedure, the (R)AN 204 may send any NAS message (such as a N1 SM PDU Session Release Command) received from the AMF 218 in step (7010). The UE 202 may acknowledge the PDU Session Release Command by sending a PDU Session Release ACK message (7012) via N1 SM signalling sent over the (R)AN 204. If the (R)AN 204 had received a N2 SM request to release the AN resources (7010), the (R)AN 204 may acknowledge the N2 SM Resource Release Request by sending an N2 SM Resource Release ACK message (7014) to the AMF 218. The message (7014) may include the N1 SM Information that includes the PDU Session Release Ack. Otherwise, the (R)AN 204 may forward the N1 SM Information that includes the PDU Session Release ACK from the UE 202 to the AMF 218. If the UE 202 is in a CM-CONNECTED state, the AMF 218 may send a N11 Response message (7018) to the SMF 220. The message (7018) may include the N1 SM Information that includes the PDU Session Release Ack. Otherwise, if the UE 202 is in the CM-IDLE state, the AMF 218 may notify the SMF 220 of the undelivered N1 SM message with a cause code indicating the N2 has been released or the UE 202 is in the CM-IDLE state.

In other implementations, an Asynchronous Session Release (ASR) Flag together with PDU Session ID are used, as described below. If the UP connection of the PDU session is active, the SMF 220 may also create an N2 SM request to release the (R)AN 204 resources associated with the PDU session. This N2 SM request may include a (R)AN Resource Release request that includes the PDU Session ID. The SMF 220 may send an N11 message (7008) to the AMF 218. The message (7008) may include the N2 SM Resource Release request, and the N1 SM Container (that includes the PDU Session Release Command). The N11 message (7008) may further include the ASR Flag and the PDU Session ID. The ASR Flag may provide an indication to the AMF 218 about the session release notification and whether it may skip sending the N1 SM container to the UE 202 (e.g., when the UE 202 is in the CM-IDE mode). If the UE 202 is in CM-IDLE state, and an ASM Flag set to TRUE is included in the N11 message, the AMF acknowledges that steps (7010) to (7014) may be skipped. Otherwise, if the UE 202 is in CM-IDLE state and the ASR Flag is set to FALSE, the AMF 218 may initiate the network triggered Service Request procedure to transmit the N1 SM Information to the UE 202. If the UE 202 receives the paging, the AMF 218 may send to the UE 202 the N1 SM Information (including the PDU Session Release Request). The paging message may also carry the N1 SM Information (including the PDU Session Release Request). If the UE cannot receive paging, the AMF 218 may send to the SMF 220 an "undelivered error message" with a cause indicating that the UE is unreachable in step (7018). If the UE 202 is in the CM-CONNECTED state, then the AMF 218 may transfer the message received from the SMF 218 in step (7008) to the (R)AN 204. This may be performed by sending a N2 SM Resource Release request message (7010) to the (R)AN 204, where the message (7010) may include N1 SM Information. It should be noted that the UE 202 and the 5G Core (e.g., CN 206) will get synchronized with respect to the status (e.g., released) of the PDU session at the next Service Request or Registration procedure. When the (R)AN 204 has received an N2 SM request (7010) to release the AN resources associated with the PDU session, the (R)AN 204 issues AN specific signalling exchange(s) (7012) with the UE 202 to release the corresponding AN resources. In case of a 3GPP RAN, an RRC Connection Reconfiguration may take place with the UE 202 releasing the (R)AN 204 resources related to the PDU session. During this procedure, the (R)AN 204 may send any NAS message (such as a N1 SM PDU Session Release Command) received from the AMF 218 in step (7010). The UE 202 may acknowledge the PDU Session Release Command by sending a PDU Session Release ACK message (7012) via N1 SM signalling sent over the (R)AN 204. If the (R)AN 204 has received a N2 SM request to release the AN resources (7010), the (R)AN 204 may acknowledge the N2 SM Resource Release Request by sending an N2 SM Resource Release ACK message (7014) to the AMF 218. The message (7014) may include the N1 SM Information that includes the PDU Session Release Ack. Otherwise, the (R)AN 204 may forward the N1 SM Information that includes the PDU Session Release ACK from the UE 202 to the AMF 218. If the UE 202 is in the CM-IDLE state and the ASR Flag is set to TRUE in step (7008208), the AMF 218 may acknowledge the SMF 220 message (7008) and step (7018) is skipped. The SMF 220 and the AMF 218 may release the PDU session. The PDU session status in the AMF 218 and the UE 202 may be synchronized when the Service Request or Registration procedures are performed. If the UE 202 is in the CM-IDLE state and the ASR Flag is set to FALSE in step (7008), the AMF 218 may fail to page the UE 202 and the AMF may send an "undelivered error" message that includes the PDU Session Release Indication, the PDU Session ID and the cause code (e.g., UE Unreachable). Step (7018) is skipped. The SMF 220 and the AMF 218 may release the PDU session. The session status in the AMF 218 and the UE 202 may be synchronized when the UE 202 performs a Service Request or Registration procedures. Otherwise, the AMF 218 may send an N11 Response message to the SMF 220, with the message including the N1 SM Information (such as the PDU Session Release ACK).

In yet other implementations using a Session Release Indication is used as described below. If the PDU session is deactivated, the SMF 220 may send a Session Release indication and PDU Session ID to the AMF 218. The SMF 220 may send an N11 message (7008) to the AMF 218. The message (7008) includes the N2 SM Resource Release request, the N1 SM Container (including the PDU Session Release Command), the PDU Session Release Indication, and the PDU Session ID. The N2 SM Resource Release request message may include N1 SM Container. The PDU Session Release Indication indicates to the AMF 218 about the PDU session release notification. If the PDU session is deactivated, the SMF shall may the PDU Session Release Indication and PDU Session ID in message 7008. The AMF 218 may skip sending the N1 SM container to the UE 202 when the UE 202 is in the CM-IDLE state. If the UE 202 is in the CM-IDLE state, the AMF 218 may acknowledge step (7008) in step (7018), and steps (7010) to (7014) and (7018) are skipped. The AMF 218 may release all PDU session contexts. It is noted that the UE 202 and the 5G Core, such as AMF 218, 206 will get synchronized about the status (e.g., released) of the PDU session at the next Service Request or Registration procedure. If the UE 202 is in the CM-CONNECTED state, the PDU Session Release Indication and PDU Session ID are not included in the message in step (7008), then the AMF 218 may transfer the message received from the SMF 220 in step (7008). If the (R)AN 204 receives an N2 SM Resource Release request message (7010) to release the AN resources associated with the PDU session, it may issue AN specific signalling exchange(s) (7012) with the UE 202 to release the corresponding AN resources. In case of a 3GPP RAN, an RRC Connection Reconfiguration may take place with the UE 202 releasing the (R)AN 204 resources related to the PDU session. During this procedure (7000), the (R)AN 204 may send any NAS message (e.g., N1 SM PDU Session Release Command) received from the AMF 218 in step (7010). If the (R)AN 204 receives only the N1 SM Container (including the PDU Session Release Command), the (R)AN 204 may forward this message to the UE 202. The UE 202 acknowledges the PDU Session Release Command by sending a PDU Session Release ACK message via N1 SM signalling sent over the (R)AN 204. If the (R)AN 204 has received an N2 SM request to release the AN resources, the (R)AN 204 may acknowledge the N2 SM Resource Release Request by sending an N2 SM Resource Release ACK (including the N1 SM Information including the PDU Session Release ACK) message (7014) to the AMF 218. Otherwise, the (R)AN 204 may forward the N1 SM Information (including the PDU Session Release ACK) from the UE 202 to the AMF 218. If the UE 202 is in the CM-CONNECTED state, the AMF 218 may send the N11 message (7018) to forward messages received from (R)AN 204 in step (7014) to the SMF 220. If the UE 202 is in the CM-IDLE state, the AMF 218 may send to the SMF 220 an N11 message (including the Session Release Acknowledgment, and an identifier for the PDU session such as PDU Session ID). The SMF 220 may release all PDU session contexts and step (7018) is skipped.

The SMF 220 may notify the AMF 218 that the PDU session is released via a N11 message (7018). The AMF 218 and SMF 220 may remove all contexts (including the PDU session ID) associated with the PDU session. An example for step (7018) may be the SMF 220 sending to the AMF 218, via a N11 Message, a PDU Session Event Report Notification as defined in Clause 5.2.8.1 of TS 23.502. In this example, the event trigger is a PDU session release. It should be noted that, in some embodiments, the order with which the SMF 220 releases the resources may be implementation dependant.

In another example of the PDU Session Release procedure (7000), the SMF 220 knows the UE connection management (CM) state (e.g., CM-IDLE or CM-CONNECTED). The SMF 220 serving the PDU session subscribes to the UE mobility event notification service of the AMF 218. When the UE changes the CM state, the AMF 218 may notify the SMF 220.

If the PDU session is activated, in step (7008), the SMF 220 sends an N11 Request message to the AMF 218. The message includes the N2 SM Resource Release request, and N1 SM Information (including the PDU Session Release Command). The SMF 220 creates an N1 SM Information including the PDU Session Release Command message (that includes the PDU Session ID and the Cause). The Cause may indicate a trigger to establish a new PDU session with the same characteristics (e.g., when procedures related with SSC mode 2 are invoked).

If the PDU session is deactivated (deactivated UP) and the UE 202 is in the CM-IDLE state, in step (7008), the SMF 220 sends an N11 Request message to the AMF 218. The message includes the PDU Session Release Indication and the PDU Session ID.

In step (7010), if the UE 202 is in the CM-CONNECTED state, the AMF 218 forwards the message received in step (7008) to the (R)AN 204 via the N2 interface. If the UE 202 is in the CM-IDLE state, steps (7010) to (7012) and (7018) are skipped. The AMF 218 releases all the PDU session contexts locally. The PDU session status in the UE 202 and in the 5G Core network (such as AMF 218) are synchronized in the next Service Request or Registration procedure.

In step (7012), if the (R)AN 204 receives an N2 SM request to release the (R)AN resources associated with the PDU session, it issues (R)AN specific signalling exchange (s) with the UE 202 to release the corresponding (R)AN resources. In case of a 3GPP (R)AN 204, an RRC Connection Reconfiguration may take place with the UE 202 releasing the (R)AN 204 resources related to the PDU session. During this procedure, the (R)AN 204 sends any NAS message (e.g., N1 SM PDU Session Release Command) received from the AMF 218 in step (7010).

In step (7012), if the (R)AN 204 receives an N1 SM Information only, the (R)AN 204 forwards this message to the UE 202. The UE 202 acknowledges the PDU Session Release Command by sending a PDU Session Release Ack message via N1 SM signalling sent over the (R)AN 204.

In step (7014), if the (R)AN 204 has received a N2 SM request to release the (R)AN resources in step (7010), the (R)AN 204 acknowledges the N2 SM Resource Release Request by sending an N2 SM Resource Release Ack (including the N1 SM Information (PDU Session Release Ack) Message to the AMF 218. Otherwise, if the (R)AN 204 has received only an N1 SM information in step (7010), the (R)AN 204 may forward the N1 SM Information (PDU Session Release Ack) from the UE 202 to the AMF 218.

In step (7018), if the UE 202 is in the CM-CONNECTED state, the AMF 218 sends the N11 Response message to forward the message received from (R)AN 204 in step (7014), which includes the N1 SM Information (including the PDU Session Release Ack), to the SMF 220.

In step (7018), if the UE 202 is in the CM-IDLE state, the AMF 218 sends the N11 message (including the PDU Session Release Acknowledgment, and the PDU Session ID) to the SMF 220 in response to the SMF 220 message in step (7008). Step (7018) is skipped. The SMF 220 releases all PDU Session Contexts of the released PDU session.

In Step (7018), the SMF 220 notifies the AMF 218 that the PDU session is released. The AMF 218 and SMF 220 may remove all contexts (including the PDU session ID) associated with the PDU session.

Figure 71:
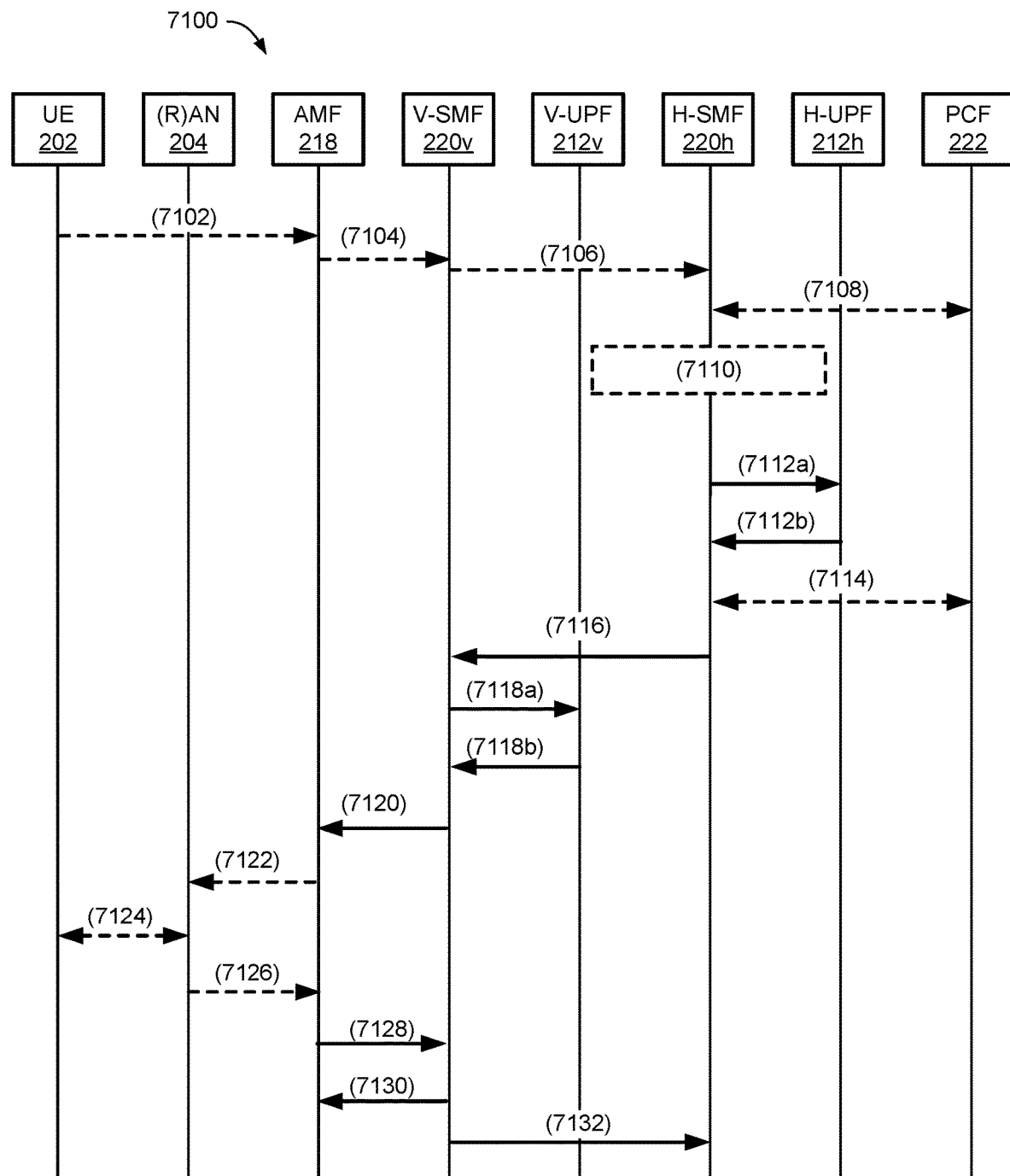
FIG. 71 illustrates, in a message flow diagram, an example of a procedure for a UE or CN requested PDU session release for Home-routed Roaming, in accordance with embodiments of the present invention.

FIG. 71 illustrates, in a message flow diagram, an example of a procedure for a UE 202 or CN 206 requested PDU session release for Home-routed Roaming (7100), in accordance with embodiments of the present invention. This procedure (7100) is used in case of home-routed roaming scenarios. Some of the steps in the PDU session release for Home-routed Roaming procedure (7100) are similar to steps in the PDU session release for Non-Roaming and Roaming with Local Breakout procedure (7000).

The PDU session release for Home-routed Roaming procedure (7100) may be triggered by the UE 202, the PCF 222 or by the SMF in the HPLMN (H-SMF) 220*h*. The UE 202 may initiate the procedure (7100) via a transmission of a SM PDU Session Release Request message (7102) to the AMF 220. The message (7102) may include the PDU Session ID, and may be relayed (7104) to the SMF in the VPLMN (V-SMF) 220*v* corresponding to the PDU Session ID via N11 and the AMF 218. The V-SMF 220*v* then may send a Release PDU Session Request message (7106) Depending on the access type, when the UE 202 is in a CM-IDLE state, the UE 202 can trigger a Service Request procedure before being able to release the PDU session. The PCF 222 may initiate the procedure (7100) by initiating a PDU-CAN Session modification procedure (7108) to request the release of the PDU session. The H-SMF 220*h* may initiate the procedure (7100) by releasing a PDU session (7110), as described above in step (7002*c*) of FIG. 70. If the H-SMF 220 receives one of the triggers in steps (7106) to (7110), the H-SMF 220 may start the PDU session release procedure (7100).

The H-SMF 220 may release the IP address/Prefix(es) that were allocated to the PDU session, and may also release the corresponding User Plane resources. The H-SMF 220 may send an N4 Session Release Request message (7112*a*) to the UPF 212. The message (7112*a*) may include the N4 Session ID. The UPF 212 may drop any remaining packets of the PDU session and release all tunnel resource and contexts associated with the N4 Session. The UPF 212 may acknowledge the N4 Session Release Request by the transmission of an N4 Session Release Response message (7112*b*) to the H-SMF 220. The message (7112*b*) may include the N4 Session ID. If there are multiple UPFs 212 associated with the PDU session, steps (7112*a*) and (7112*b*) may be performed for each UPF 212. If Dynamic PCC applied to this session, the H-SMF 220 may initiate the PDU-CAN session termination procedure (7114). If it is the last PDU session that the H-SMF 220 is handling for the UE 202, the H-SMF 220 may release the association with the UDM.

Next, the H-SMF 220h may send a Release PDU Session Command message (7116) to the V-SMF 220v. This message (7116) may include the Subscriber Permanent Identity, the PDU Session ID, and the NAS message. Next, the V-SMF 220v may release the corresponding User Plane resources using steps (7118a) and (7118b). This may include the same procedure as in steps (7112a) and (7112b), but controlled from the SMF in the VPLMN (V-SMF 220v). Steps (7120) to (7130) are similar to (7008) to (7018) as described above with reference to FIG. 70, with the SMF being the H-SMF 220h. Next, the V-SMF 220v may send a Release PDU Session Confirm message (7132) to the H-SMF 220h. The message (7132) may include the Subscriber Permanent Identity, and the PDU Session ID. The H-SMF 220h may remove all contexts associated with the PDU session.

Figure 72:
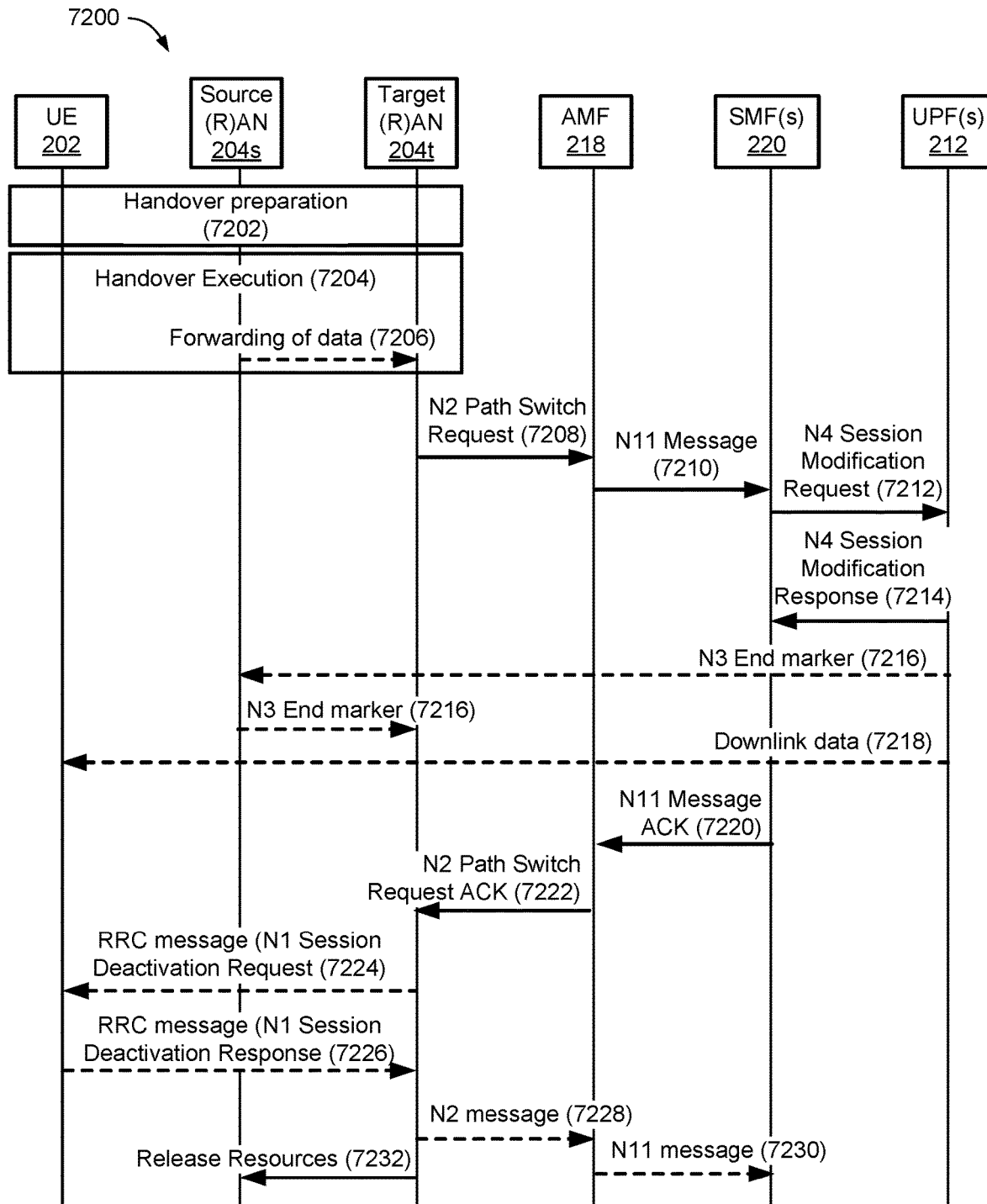
FIG. 72 illustrates, in a message flow diagram, an example of a Xn based inter NG (R)AN handover procedure without user plane function relocation, in accordance with embodiments of the present invention.

FIG. 72 illustrates, in a message flow diagram, an example of a Xn based inter NG (R)AN handover procedure (7200) without user plane function relocation, in accordance with embodiments of the present invention. This procedure (7200) may be used to hand over a UE 202 from a source (R)AN 204 to target (R)AN 204t using Xn interface when the AMF 218 is unchanged and the SMF 220 decides to keep the existing UPF 212 (e.g., the UPF 212 which terminates the N3 interface in the NG Core Network (NGC). The presence of IP connectivity between the source UPF 212 and target UPF 212 is assumed.

The procedure (7200) includes handover preparation (7202) and handover execution (7204). The handover execution (7204) includes the forwarding of data (7206) from a source (R)AN 204s to a target (R)AN 204t. The target (R)AN 204t may send an N2 Path Switch Request (7208) message to an AMF 218 that includes an indication that the UE 202 has moved to a new target cell, and a list of PDU Sessions to be switched. Depending on the type of target cell, the target (R)AN 204t includes appropriate information in this message. For the QoS flows to be switched to the target (R)AN 204t, the N2 Path Switch Request message (7208) may include the list of accepted QoS flows.

The AMF 218 may send a N2 SM information via a N11 Message (7210) to each SMF 220 associated with the list of PDU Sessions and the list of accepted QoS flows of each PDU session received in the N2 Path Switch Request (7208). For the PDU Sessions to be switched to the Target (R)AN 204t, upon receipt of the N11 Message (7210), each of the SMFs 220 may determine whether the existing UPF 212 can continue to serve the UE 202. If the existing UPF 212 cannot continue to serve the UE 202 and it is not a PDU session anchor, steps 3-11 of clause 4.9.1.2 of TS 23.502 (version 0.3.0, published in March 2017), are performed. Otherwise, the following steps (7212) to (7220) may be performed by each of the SMFs 220 if their existing UPFs 212 can continue to serve the UE 202. For the activated PDU session(s) which are not included in the N2 Path Switch Request message (7208), the AMF 218 may send separate request(s) to the relevant SMF(s) 220 to notify that the Target (R)AN 204t does not support this PDU Session.

For PDU Sessions requested (accepted) by the Target (R)AN 204t, the SMF 220 may send an N4 Session Modification Request message (7212) to the UPF 212. The message (7212) may include the (R)AN address, and tunnel identifiers for downlink User Plane. For PDU Sessions rejected by the Target (R)AN 204t, the SMF 218 may either release or deactivate the PDU sessions. For the PDU sessions to be released, the SMF 218 may initiate the PDU Session Release procedure as defined in Clause 4.3.4 of TS 23.502. For the PDU sessions to be deactivated, the SMF 218 may send an N4 Session Modification Request (7212) to the UPF 212 for these PDU sessions. The message (7212) indicates the release of (R)AN N3 tunnel information such as the (R)AN Address and Tunnel Endpoint Identifier for the downlink user plane, a Buffering Command, and a Reactivation Timer, and cause code (e.g. Handover rejected, or No Data Activity). It is noted that the Buffering Command may be used to indicate whether the UPF 212 shall buffer the incoming downlink packets. It is also noted that the Reactivation Timer may indicate a duration that the UP of a deactivated PDU session remains in deactivated state after the UPF 212 removes the (R)AN N3 tunnel information. Before the Reactivation Timer expires, the UPF 214 may buffer the downlink packets according to the Buffering Command. After the Reactivation Timer expires, the UPF 212 may buffer the downlink packets according to the Buffering Command. If the UPF 212 receives downlink packets before or after the Reactivation Timer expires, the UPF 212 may send a downlink packet notification to the SMF 220 to initiate a Network Triggered Service Request.

The UPF 212 may returns an N4 Session Modification Response message (7214) to the SMF 220 after the requested PDU Sessions are switched or modified/deactivated. The message (7214) may include the Tunnel identifiers for uplink traffic. In order to assist the reordering function in the Target (R)AN 204t for PDU sessions requiring a path switch, the UPF 212 may send one or more "end marker" packets (7216) on the old path immediately after switching the path. The UPF 212 may starts sending downlink packets to the Target (R)AN 204t (7218). The SMF 220 may send an N11 Message ACK (7220) to the AMF 218 for PDU Sessions which have been switched or deactivated successfully. The message (7220) may include the CN Tunnel Information, and may indicate whether the (R)AN N3 tunnel information is updated for PDU session to be switched UP path switched, or PDU session is deactivated (UP deactivation, the UP path released). For deactivated PDU sessions, the SMF 220 may store the deactivation state of deactivated PDU session(s). The N11 Message ACK (7220) may include the N2 SM Message for the (R)AN 204 to deactivate the PDU Sessions, and a N1 SM Message Container. The N2 SM Message may include the PDU Session ID(s). The N1 SM Message Container may include the Session Deactivation Request that includes the PDU Session ID(s). It is noted that if the AMF 218 sends the Session Deactivation Request to the UE 202, then the SMF need only inform the AMF 218 about its session deactivation decision, and the SMF 220 does not need to send the N1 SM Message Container to the UE 202. It is also noted that step (7220) can occur any time after receipt of N4 Session Modification Response message (7214) at the SMF 220.

It is noted that for PDU sessions that Target (R)AN 204t rejects, the Target (R)AN 204t may remove all PDU session contexts before sending the path switch request 7208 to the AMF 218. In this case, the N11 Message ACK 7220 from the SMF 220 to the AMF 218 may include the N1 SM message to be forwarded to the UE 202 only.

Once the N11 Message ACK (7220) is received from all the SMFs 220, the AMF 218 may aggregate the received CN Tunnel Information from these responses and send this aggregated information as a part of N2 SM Information in a N2 Path Switch Request ACK (7222) to the Target (R)AN 204t. The message (7222) may include an indication for each PDU session as to whether the N3 connection is switched, and the N2 SM Session Deactivation Request and the N1 Message Container. If none of the requested PDP Sessions have been switched successfully, the AMF 218 may send an N2 Path Switch Request Failure message to the Target (R)AN 204t.

It is noted that the AMF may collect N11 Message ACK (7220) from the SMFs 220 that handles the path switched request and may send to the Target (R)AN 204t in a separate message. This will reduce the handover time for the accepted PDU sessions. The AMF 218 may collect N11 Message ACK (7220) from the SMF 220 for deactivated PDU sessions and forward the N2 SM Session Deactivation Requests and N1 SM Session Deactivation Requests in a separate message to the Target (R)AN 204t. The AMF 218 may combine all N2 SM Session Deactivation Requests in one message and send to Target (R)AN 204t. The AMF 218 may combine all N1 SM Session Deactivation Requests in one message and send to the UE 202. The combined N2 Session Deactivation Request may include the combined N1 SM Session Deactivation Request.

In the AMF 218, upon receiving the N11 Message ACK (7222), the AMF 218 may store the deactivation state of deactivated PDU sessions, if any. It is noted that if the AMF 2204 sends the Session Deactivation Request to the UE 202, then the AMF 218 may send the N1 MM Message Container (including the Session Deactivation Request having the PDU Session ID(s)) to the UE 202. If the Target (R)AN 204t receives the N2 SM Session Deactivation Request in step (7222), the Target (R)AN 204t may delete the PDU Session Context of PDU sessions to be deactivated. The (R)AN 204 then forwards the N1 SM Container (including the Session Deactivation Request having the PDU Session ID) to the UE 202 by a RRC message (7224). It is noted that if the AMF 218 sends the Session Deactivation Request to the UE 202 in step (7222), then the (R)AN 204 may forward the N1 MM Container (including the Session Deactivation Request having the PDU Session ID) to the UE 202 by a RRC message (7224). The UE 202 may release radio context of deactivated PDU sessions. The UE sends a RRC message (7226) that includes the N1 SM Session Deactivation Response(s) to the SMF 220 for each of N1 SM Session Deactivation Request via Target (R)AN 204t (7228) and AMF 218 (7230). It is noted that if the AMF 218 sends the Session Deactivation Request to the UE 202 in step (7224), then the UE sends one N1 MM Session Deactivation Response (7228) to the AMF 218 via the Target (R)AN 204t. By sending a Release Resources message (7232) to the Source (R)AN 204s, the Target (R)AN 204 confirms success of the handover. It then triggers the release of resources with the Source (R)AN 204s.

It is noted that the Target (R)AN 204t may send in message (7232) an N2 SM Session Deactivation Response message to the SMF 220 to confirm the release of PDU session contexts for deactivated PDU sessions. The N2 SM Session Deactivation Response may include the N1 SM Session Deactivation Response (7226) from the UE 202.

It is noted that the Target (R)AN 204t may send message 7232 to the Source (R)AN 204s any time after receiving message 7222 from the AMF 218, for example before sending message 7224 to the UE 202.

It is noted that the SMF can make decision to either release or deactivate PDU session. In another embodiment, the SMF always deactivate PDU sessions that Target (R)AN rejects. In the Handover preparation (7202) and Handover Execution (7204), the Target (R)AN may inform the UE 202 the PDU sessions that are deactivated. The SMF 220 shall not send N1 SM Session Deactivation Request to the UE 202 and N2 SM Session Deactivation Requests to the Target (R)AN 204t. Hence, the messages 7224 to 7230 are not needed.

It is noted that the in FIG. 72, the PDU deactivation is triggered by the PDU session rejection due to the Target (R)AN 204t not having enough resources. A person skilled in the art may combine the PDU session deactivation during handover due to inactivity of PDU session in FIG. 63 and PDU session deactivation due to lacks of resources in Target (R)AN in FIG. 72.

Figure 73:
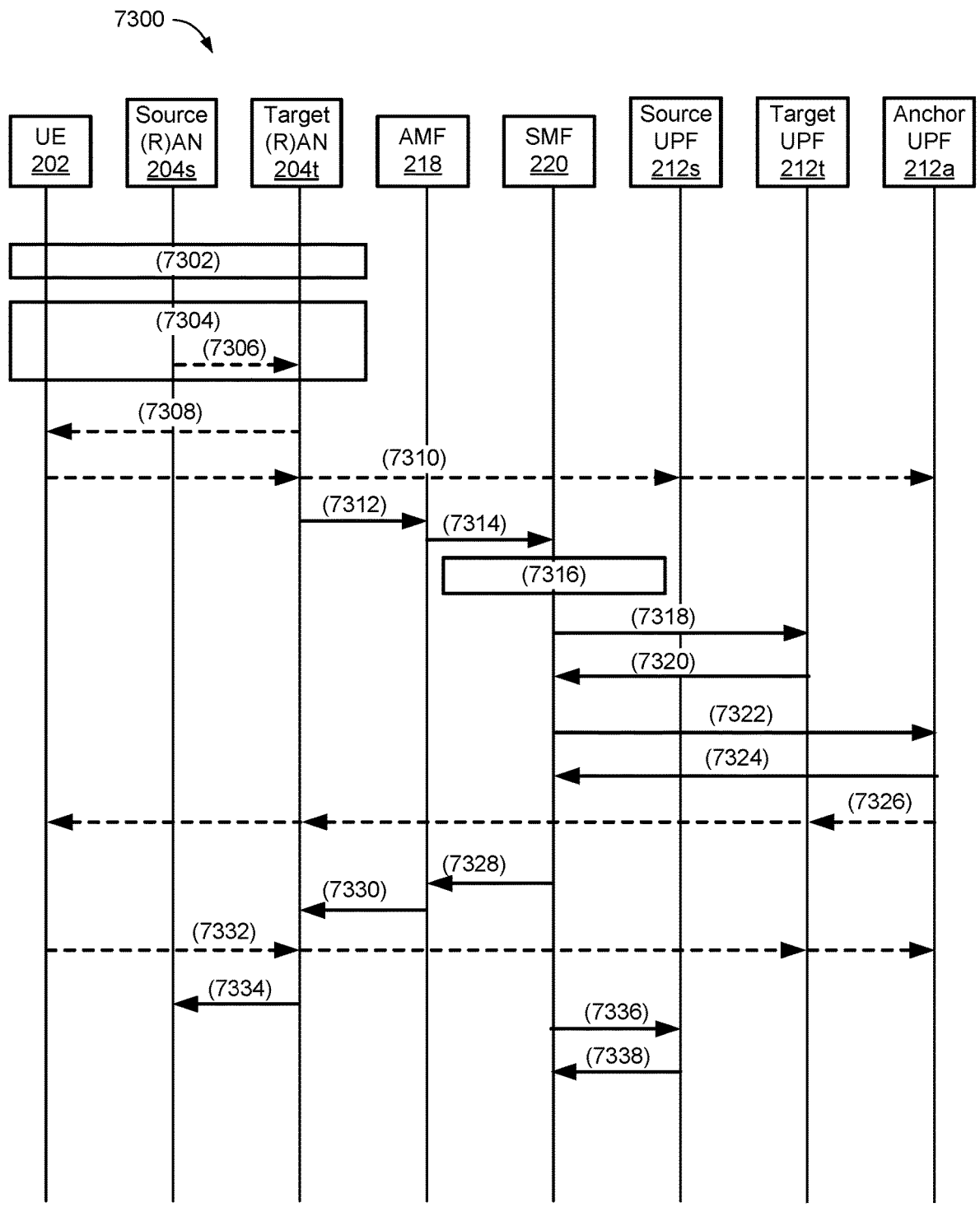
FIG. 73 illustrates, in a message flow diagram, an example of a Xn based inter NG (R)AN handover procedure with user plan function relocation, in accordance with embodiments of the present invention.

FIG. 73 illustrates, in a message flow diagram, an example of a Xn based inter NG (R)AN handover procedure (7300) with user plan function relocation, in accordance with embodiments of the present invention. The procedure (7300) may be used to hand over a UE 202 from a source (R)AN 204s to a target (R)AN 204t using Xn when the AMF 218 is unchanged and the SMF 220 determines that the source UPF 212s is to be relocated. The source UPF 212s is the UPF which terminates a N3 interface in the 5GC. The presence of an IP connectivity between the source UPF 212s and source (R)AN 204s, and between the target UPF 212t and target (R)AN 204t is assumed.

The procedure (7300) includes the handover preparation (7302) and the handover execution (7304). The handover execution (7304) includes the forwarding of data (7306) from a source (R)AN 204s to a target (R)AN 204t. The target (R)AN 204t may send downlink data (7308) to the UE 202. The UE 202 may send uplink data (7310). The target (R)AN 204t may send an N2 Path Switch Request (7312) message to an AMF 218 that includes an indication that the UE 202 has moved to a new target cell, and a list of PDU Sessions to be switched. Depending on the type of target cell, the target (R)AN 204t includes appropriate information in this message. For the QoS flows to be switched to the target (R)AN 204t, the N2 Path Switch Request message (7312) may include the list of accepted QoS flows.

The AMF 218 may send a N2 SM information via a N11 Message (7314) to each SMF 220 associated with the list of PDU Sessions and the list of accepted QoS flows of each PDU session received in the N2 Path Switch Request (7312). For the PDU Sessions to be switched to the Target (R)AN 204t, upon receipt of the N11 Message (7314), each of the SMFs 220 may determine whether the existing UPF 212 can continue to serve the UE 202. If the existing UPF 212 cannot continue to serve the UE 202 and it is not a PDU session anchor, steps 3-11 of clause 4.9.1.2 of TS 23.502 are performed. Otherwise, the following steps (7316) to (7328) may be performed by each of the SMFs 220 if their existing UPFs 212 can continue to serve the UE 202. For the activated PDU session(s) which are not included in the N2 Path Switch Request message (7312), the AMF 218 may send separate request(s) to the relevant SMF(s) 220 to notify that the Target (R)AN 204t does not support this PDU Session.

For PDU sessions to be switched, the SMF 220 may then select a new Target UPF 212t based on UPF Selection Criteria according to clause 6.3.3 of TS 23.501. Target UPF IP address assignment and allocation of downlink and uplink tunnel identifiers may be performed by the SMF 220 (7316). A N4 Session Establishment Request (including the Target (R)AN address, and uplink and downlink tunnel identifiers) message (7318) may be sent to the Target UPF 212t. The Target UPF 212t may then send an N4 Session Establishment Response message (7320) to the SMF 220. The SMF 220 may start a timer, to be used in step (7336). The SMF 220 may then send a N4 Session Modification message (7322) to the PDU session anchor 212a. The PDU session anchor 212a may responds with a N4 Session Modification Response message (7324). At this point, the PDU session anchor 212a may start sending downlink packets (7326) to the Target (R)AN 204t using the address and tunnel identifiers of the Target (R)AN 204t via the Target UPF 212t.

The SMF 220 may then send a N11 Message ACK (7328) (including CN Tunnel Information) to the AMF 218. Steps (7332) and (7334) may be similar to steps 7 and 10 defined in clause 4.9.1.1 of TS 23.502. Once the timer has expired after step (7320), the SMF 220 may initiate a Source UPF 212s release procedure by sending an N4 Session Termination Request message (7336) to the Source UPF 212s. The message (7336) may include a Release Cause (or cause code). The Source UPF 212s may acknowledge with an N4 Session Termination Response message (7338) to the SMF 220 to confirm the release of resources.

A Service Request procedure may be used by a 5G UE 202 in the CM IDLE state to request the establishment of a secure connection to an AMF 218. The UE 202 in the CM IDLE state may initiate the Service Request procedure in order to send uplink signalling messages, user data, or response to a network paging request. After receiving the Service Request message, the AMF 218 may perform authentication, and the AMF 218 may perform the security procedure. After the establishment of a secure signalling connection to an AMF 218, the UE 202 or network may send signalling messages, e.g., PDU session establishment from UE 202 to the network, or the SMF 220, via the AMF 218, may start the User Plane resource establishment for the PDU sessions requested by the network and/or indicated in the Service Request message.

For any Service Request, the AMF 218 may respond with a Service Response message to synchronize PDU session status between the UE 202 and the network. The AMF 218 may also respond with a Service Reject message to the UE 202, if the Service Request cannot be accepted by network. For a Service Request due to user data, the network may take further actions if the User Plane resource establishment is not successful. If the current UPF 212 terminating N3 connection cannot be connected to (R)AN 204, the SMF 220 may reselect a new N3-terminating UPF 212. It is noted that the procedure in clause 4.2.3.2 is not applicable for an access network (once the UE 202 is registered in the network) in which the UE 202 is always considered as in the CM-CONNECTED state, and in which the User Plane resource is always considered established for an active PDU session.

Figure 74:
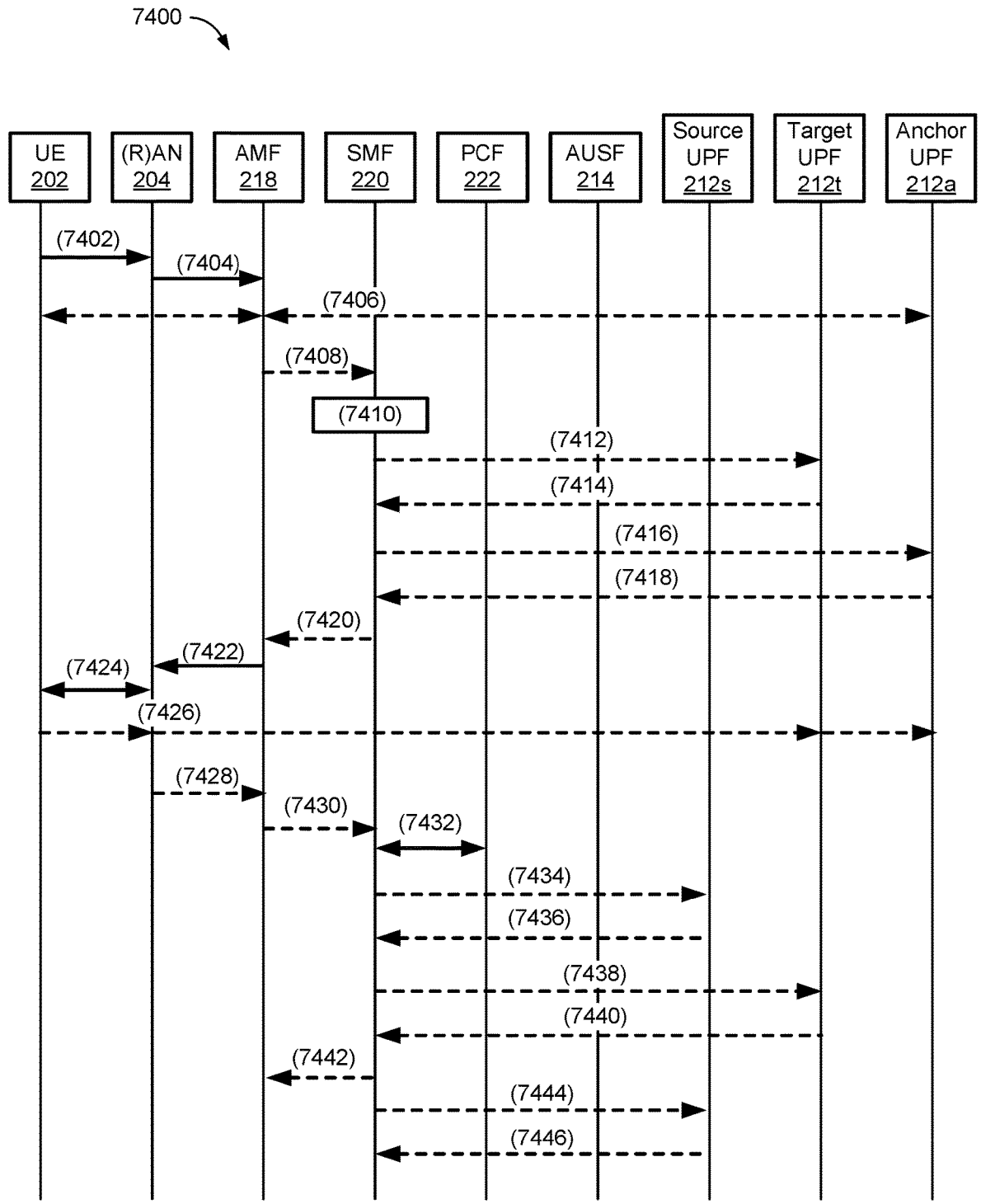
FIG. 74 illustrates, in a message flow diagram, an example of a UE triggered Service Request procedure, in accordance with embodiments of the present invention.

FIG. 74 illustrates, in a message flow diagram, an example of a UE triggered Service Request procedure (7400), in accordance with embodiments of the present invention. The UE 202 initiates a service request procedure to activate a PDU session. The 5G Core Network may reselect a new UPF terminating N3 connection. The Source UPF 204s and Target UPF 204t are not the UPF 212 that provides the N6 connection to Data Network (DN). The UE 202 may send to the (R)AN 204 a MM NAS Service Request message (7402). The message (7402) may include PDU session ID(s), security parameters, and a PDU session status. The UE 202 may send a NAS message Service Request (7402) towards the AMF 218 encapsulated in an RRC message to the (R)AN 204. If the Service Request is triggered for user data, the UE 202 may include the PDU session ID(s) in the NAS Service Request message to indicate the PDU session(s) that the UE 202 is to use. If the Service Request is triggered for signalling only, the UE 202 does not include any PDU session ID. When this procedure is triggered for a paging response, if the UE 202 needs to use some PDU session(s), the UE 202 may include the PDU session ID(s) in the MM NAS Service Request message to indicate the PDU session(s) that the UE 202 is to use. Otherwise the UE 202 will not include any PDU session ID. The PDU session status indicates the PDU sessions available in the UE 202.

Next, the (R)AN 204 may send to the AMF 218 a N2 Message (7404) that includes the MM NAS Service Request, a 5G Temporary ID, Location information, a RAT type, and a RRC establishment cause). If the AMF 218 cannot handle the Service Request, it may reject it. A 5G Temporary ID may be obtained in a RRC procedure. The (R)AN 204 may select the AMF 218 according to the Temporary ID. The Location Information and RAT type relates to the cell in which the UE 202 is camped. Based on the PDU session status, the AMF 218 may initiate a PDU session release procedure if the PDU session is not available in the UE 202. Next, if the Service Request was not sent integrity protected, or integrity protection is indicated as failed, the AMF 218 may initiate a NAS authentication/security procedure (7406) as defined in clause 4.6 of TS 23.502. If the UE 202 triggered the Service Request to establish a signalling connection only, after the security exchange, the UE 202 and the network can send signalling and steps (7408) and (7420) to (7430) are skipped.

Next, the AMF 218 may send to the SMF 220 a N11 Message (7408) that may include the PDU session ID(s), the Location Information, and the RAT type. If the MM NAS Service Request message includes PDU session ID(s), or if this procedure is triggered by the SMF 220 but the PDU session IDs from the UE 202 correlates to other SMFs 220 than the one triggering the procedure, the AMF 218 may send a N11 message to SMF(s) 220 associated with the PDU session ID(s). If the current Source UPF 212s cannot serve the requested PDU session, the SMF 220 may select a Target UPF 212t (7410) based on criteria in Clause 6.3.3 of TS 23.501. Otherwise, if the Source UPF 212s can serve the requested PDU session, steps (7412) to (7418), (7438) to (7440), and (7444) to (7446) are skipped.

Once the Target UPF 212t is determined, the SMF 220 may assign N3 tunnel information (such as a N3 uplink Tunnel Endpoint Identifier) and N9 tunnel information (such as a N9 Anchor UPF Address and a N9 uplink Tunnel Endpoint Identifier). The SMF 220 may then send a N4 Message PDU Session Establishment Request message (7412) to the Target UPF 212t. The message (7412) may include the UE and PDU Session Context, including the PDU Session ID, the QoS policy, the charging policy, and N3 and N9 tunnel information. Next, the Target UPF 212t may prepare resources to support the PDU session. The Target UPF 212t may send a N4 Message Session Establishment Response message (7414) to the SMF 220. The message (7414) may include a UE identifier (such as SUPI) and the PDU Session ID. Alternatively, the message (7414) may include a transaction ID representing both UE identifier and PDU session ID.

Next, the SMF 220 may send a N4 Message Session Modification Request message (7416) to the Anchor UPF 212a (i.e., Session Anchor UPF providing N6 connection to the DN). The message (7416) may include the UE identifier such as SUPI, and the N9 Target UPF 212t tunnel information such as the Target UPF Address and the N9 downlink Tunnel Endpoint Identifier. Next, the Anchor UPF 212a may update the Target UPF tunnel information. The Anchor UPF 212a may send a N4 Message Session Modification Response message (7418) to the SMF 220. The SMF 220 may sent send a N11 Message (7420) to the AMF 218. The message (7420) may include the N2 SM information such as the PDU Session ID, the QoS profile, the CN N3 Tunnel Info, and the S-NSSAI.

Upon reception of the N11 Message (7408), each SMF 220 may send a N11 Message (7420) to the AMF 218 to establish the User Plane(s) for the PDU sessions. The N2 SM information may include information that the AMF 218 can provide to the (R)AN 204. If a Target UPF212*t* is selected (7410), the SMF 220 may start a timer to be used in steps (7444) and (7446). The AMF 218 may send a N2 Request message (7422) to the (R)AN 204. The message (7422) may include the N2 SM information received from the SMF 220, the security context, the AMF Signalling Connection ID, a Handover Restriction List, and a MM NAS Service Accept. The (R)AN 204 may store the Security Context, the AMF Signalling Connection Id, the QoS Information for the QoS Flows of the PDU Sessions that are activated, and the N3 Tunnel IDs in the UE RAN context. The MM NAS Service Accept may include the PDU session status in the AMF 218. The AMF 218 may include at least one N2 SM information from the SMF 220 if the procedure is triggered for a PDU session User Plane setup. The AMF 218 may send additional N2 SM information from the SMFs 220 in separate N2 message(s) (e.g., a N2 tunnel setup request), if any. Alternatively, if multiple SMFs 220 are involved, the AMF 218 may send one N2 Request message to the (R)AN 204 after the N11 messages from SMFs 220 are received. In such cases, the N2 Request message may include the N2 SM information received in each of the N11 messages, and information to enable the AMF 218 to associate responses to relevant SMFs 220.

The (R)AN 204 may perform a RRC Connection Reconfiguration (7424) with the UE 202 UE depending on the QoS Information for the QoS Flows of the activated PDU Sessions and Data Radio Bearers. The User Plane security may be established at this step (7424). The (R)AN 204 may forward the MM NAS Service Accept to the UE 202. The UE 202 may locally delete the context of the PDU sessions that are not available in the 5G CN. After the User Plane radio resources are setup, the uplink data from the UE 202 may now be forwarded to the (R)AN 204 (7426). The 5G (R)AN 204 may send the uplink data to the UPF 212 address and Tunnel ID provided in the step (7422). The (R)AN 204 may send a N2 Request ACK message (7428) to the AMF 218. The message (7428) may include the N2 SM information that includes the (R)AN Tunnel info, the List of accepted QoS Flows for the PDU Sessions activated, and the List of rejected QoS Flows for the PDU Sessions activated. The N2 SM information may include the (R)AN 204 tunnel information. The (R)AN 204 may respond to the N2 SM information with a separate N2 message (e.g., a N2 tunnel setup response) if the AMF 218 sends a separate N2 message in step (7422). If multiple N2 SM information are included in the N2 Request message in step (7422), the N2 Request ACK (7428) may include the multiple N2 SM information, and information to enable the AMF 218 to associate the responses to the relevant SMF 220.

The AMF 218 may then send a N11 Message (7430) per accepted PDU Session to the SMF 220. The message (7430) may include the N2 SM information (that includes the (R)AN Tunnel information and the List of accepted QoS Flows), and the RAT Type. If the AMF 218 received N2 SM information (one or multiple) in step (7420), then the AMF 218 may forward the N2 SM information to the relevant SMF 220. If the UE Time Zone has changed compared to the last reported UE Time Zone, then the AMF 218 may include the UE Time Zone IE in this message (7430). If dynamic PCC is deployed, the SMF 220 may optionally initiate a PDU-CAN Session Modification (7432) and provide new location information to the PCF 222.

If a Source UPF 212*s* is selected in step (7410), and if a User Plane is to be setup or modified, the SMF 220 may initiate a N4 Session Modification Request procedure by sending a N4 Modification Request message (7434) to the Source UPF 212*s*. The message (7434) may include the (R)AN Tunnel Information. The Source UPF 212*s* may send a N4 Session Modification Response message (7436) to the SMF 220. If a Target UPF 212*t* is selected in step (7410), and if a User Plane is to be setup or modified, the SMF 220 may initiate a N4 Session Modification procedure by sending a N4 Message PDU Session Modification Request to the Target UPF 212*t* (7438). The message may include the (R)AN Tunnel Information. The Target UPF 212*t* may send a N4 Session Modification Response message (7440) to the SMF 220.

The SMF may send a N11 Message ACK message (7442) to the AMF 218. The message (7442) may include the PDU Session ID. The SMF 220 may indicate a successful session activation message (7442) to the AMF 218. The AMF 218 may store the activated state of the PDU session. Once the timer set in step (7420) expires, the SMF 220 may send a N4 Message Session Termination Request (7444) to the Source UPF 212*s*. The message (7440) may include a UE 202 identifier (e.g., a SUPI) and a PDU Session ID. The Source UPF 212*s* may delete the PDU session context. The Source UPF 212 may then send a N4 Message Session Termination Response message (7446) to the to the SMF 220.

In FIG. 74, the UPF terminating N3 connection is not the UPF 212 providing the N6 connection to Data Network (DN) 208. In case the UPF terminating N3 connection is also the UPF 212 that provides N6 connection to DN 208, the 5G Core Network (SMF 220) can insert a UPF function to terminate the N3 connection and connect the new UPF function to the UPF function providing N6 connection.

A Service Request procedure may be used by a 5G UE 202 in the CM-CONNECTED state to request the establishment of User Plane resources for the PDU sessions. It is noted that the network may take further actions if the User Plane resource establishment is not successful. It is also noted that the procedure shown in FIG. 75 is used for an access network (once the UE 202 is registered in the network) in which the UE 202 is always considered as in the CM-CONNECTED state, and in which the User Plane resource is always considered established for an active PDU session.

Figure 75:
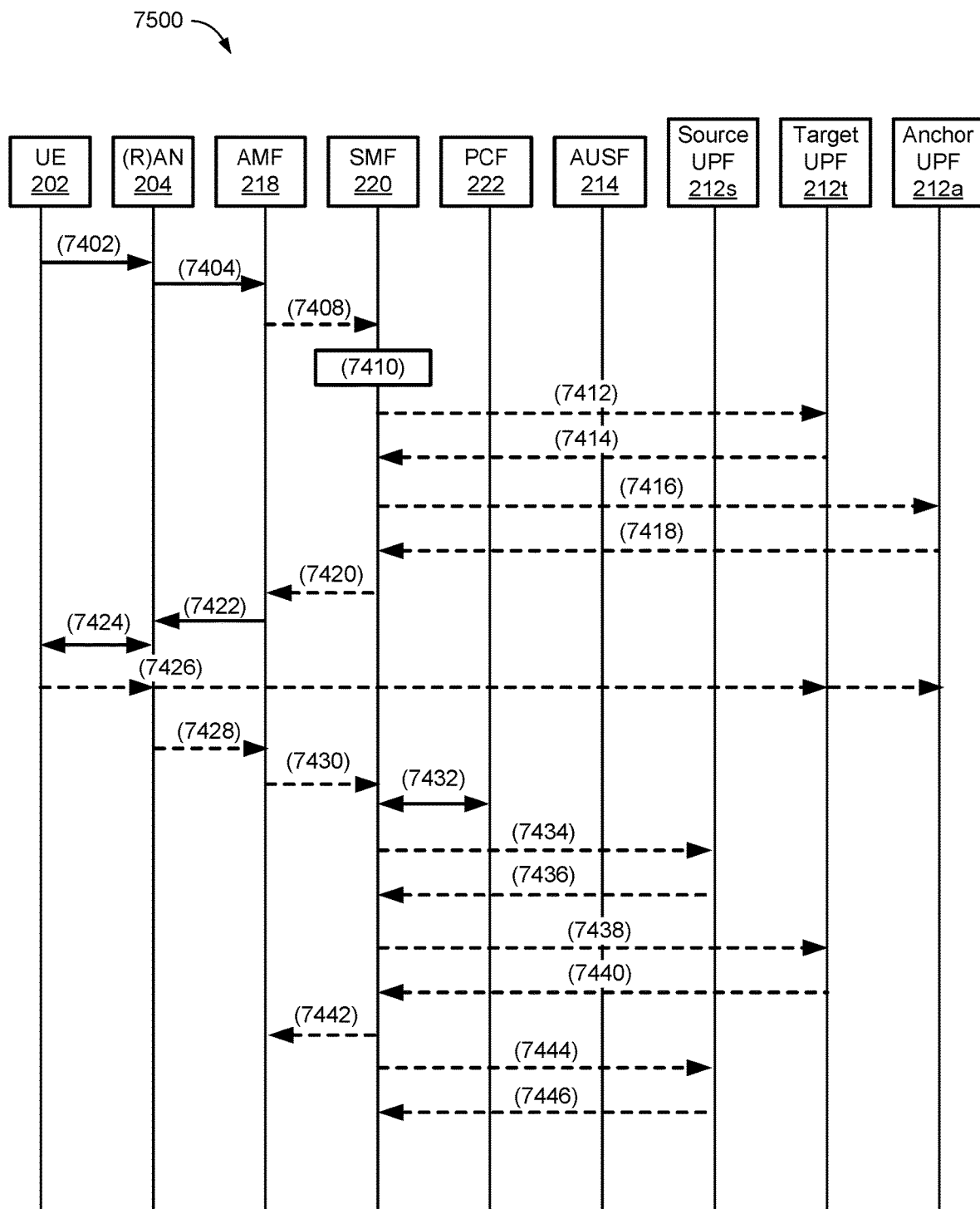
FIG. 75 illustrates, in a message flow diagram, an example of a UE triggered Service Request procedure in CM-CONNECTED state, in accordance with embodiments of the present invention.

FIG. 75 illustrates, in a message flow diagram, an example of a UE triggered Service Request procedure in CM-CONNECTED state (7500), in accordance with embodiments of the present invention. The UE 202 may send a MM NAS Service Request message (7402) to the (R)AN 204. The message (7402) may include the PDU session ID(s). The UE 202 may send the NAS message Service Request towards the AMF 218 encapsulated in an RRC message to the (R)AN 204. The MM NAS Service Request message may be encrypted and integrity protected. The PDU session ID(s) in the NAS message Service Request message may indicate the PDU session that the UE 202 selects to activate.

The (R)AN 204 may then send a N2 Message (7404) to the AMF 218. The message (7404) may include the MM NAS Service Request. If the Service Request (7404) cannot be handled by the AMF 218, the AMF 218 may reject it. The (R)AN 204 may forwards the MM NAS Service Request message to the AMF 218 based on the existing N2 connection. The AMF 218 may send a N11 Message (7408) to the SMF 220. The message may include the PDU session ID(s), the Location Information (of the UE, could be in the format of (R)AN Address), and the RAT type. If the current Source UPF 212s cannot serve the requested PDU session, the SMF 212s may select a Target UPF 212t (7410) based on criteria in Clause 6.3.3 of TS 23.501. Otherwise, if the Source UPF 212s can serve the requested PDU session, steps (7412) to (7418) and (7438), (7440), (7444) and (7446) are skipped.

Once the Target UPF 212t is determined, the SMF 220 may assign N3 tunnel information (such as a N3 uplink Tunnel Endpoint Identifier) and N9 tunnel information (such as a N9 Anchor UPF Address and a N9 uplink Tunnel Endpoint Identifier). The SMF 220 may then send a N4 Message PDU Session Establishment Request message (7412) to the Target UPF 212t. The message (7412) may include the UE and PDU Session Context, including the PDU Session ID, the QoS policy, the charging policy, and N3 and N9 tunnel information. Next, the Target UPF 212t may prepare resources to support the PDU session. The Target UPF 212t may send a N4 Message Session Establishment Response message (7414) to the SMF 220. The message (7414) may include a UE identifier (e.g., SUPI) and the PDU Session ID.

Next, the SMF 220 may send a N4 Message Session Modification Request message (7416) to the Anchor UPF 212a (i.e., Session Anchor UPF). The message (7416) may include the SUPI, and the N9 Target UPF 212t tunnel information such as the Target UPF Address and the N9 downlink Tunnel Endpoint Identifier. Next, the Anchor UPF 212a may update the Target UPF tunnel information. The Anchor UPF 212a may send a N4 Message Session Modification Response message (7418) to the SMF 220. The SMF 220 may sent send a N11 Message (7420) to the AMF 218. The message (7420) may include the N2 SM information such as the PDU Session ID, the QoS profile, the CN N3 Tunnel Info, and the S-NSSAI.

Upon reception of the N11 Message (7408), each SMF 220 may send a N11 Message (7420) to the AMF 218 to establish the User Plane(s) for the PDU sessions. The N2 SM information may include information that the AMF 218 can provide to the (R)AN 204. If a Target UPF212t is selected (7410), the SMF 220 may start a timer to be used in steps (7444) and (7446). The AMF 218 may send a N2 Request message (7422) to the (R)AN 204. The message (7422) may include the N2 SM information received from the SMF 220, including PDU Session ID, QoS profile, CN N3 Tunnel Info, S-NSSAI, and a MM NAS Service Accept. If there are multiple PDU Sessions that involves multiple SMFs 220, the AMF 218 does not need to wait for responses from all SMFs 220 in step (7420).

The RAN performs a RRC Connection Reconfiguration (7424) with the UE 202 depending on the QoS Information for the QoS Flows of the PDU Sessions and activated Data Radio Bearers. The (R)AN 204 may forward the MM NAS Service Accept to the UE 202. After the User Plane radio resources for the selected PDU session are setup, the uplink data from the UE 202 can now be forwarded (7426) to the (R)AN 204. The 5G (R)AN 204 may send the uplink data to the UPF address and Tunnel ID provided in the step (7422). The (R)AN 204 may next send a N2 Request ACK message (7428) to the AMF 218. The message (7428) may include the N2 SM information, such as the (R)AN Tunnel info, the List of accepted QoS Flows for the activated PDU Sessions, and the List of rejected QoS Flows for the activated PDU Sessions). The message (7428) may include the N2 SM information(s), e.g. the (R)AN tunnel information. The (R)AN may send N2 SM information with separate N2 messages (e.g., N2 tunnel setup response) in step (7422). The AMF 218 may next send a N11 Message (7430) per accepted PDU Session to the SMF 220. The message (7430) may include the N2 SM information (including the (R)AN Tunnel information, the List of accepted QoS Flows, and the List of rejected QoS Flows). If dynamic PCC is deployed, the SMF 220 may optionally initiate a PDU-CAN Session Modification (7432) and provide new location information to the PCF 222.

The SMF 220 may send a N4 Session Modification Request message (7434) to the Source UPF 212s. The message (7434) may include the (R)AN tunnel information and the List of accepted QoS Flows. If a Source UPF 212s is selected in step (7412), and if a User Plane is to be setup or modified, the SMF 220 may initiate a N4 Session Modification procedure by sending the N4 Session Modification Request message (7434), providing the (R)AN Tunnel Information (e.g., (R)AN Address and (R)AN N3 Tunnel Endpoint ID). The Source UPF 212s may send a N4 Session Modification Response message (7436) to the SMF 220. If a Target UPF 212t is selected in step (7410), and if a user plane is to be setup or modified, the SMF 220 may initiate a N4 Session Modification procedure by sending a N4 Session Modification Request (7438) to the Target UPF 212t that provides the (R)AN Tunnel Information (e.g., (R)AN Address and (R)AN N3 Tunnel Endpoint ID). The Target UPF 212t may send a N4 Session Modification Response message (7440) to the SMF 220. The SMF 220 may send a N11 Message ACK message (7442) to the AMF 218. The message (7442) includes the PDU Session ID. The SMF 220 may indicate successful session activation to the AMF 218. The AMF 218 may then store the activated state of PDU session. If the Target UPF 212t is selected in step (7410), once the timer set in step (7422) expires, the SMF 220 may send a N4 Message Session Termination Request message (7444) to the Source UPF 212s. The message (7444) may include a UE 202 identifier (e.g., a SUPI) and a PDU Session ID. The Source UPF 212s may delete the PDU session context and send a N4 Message Session Termination Response message (7646) to the SMF 220.

A Network triggered Service Request procedure may be used when the network needs to signal (e.g., N1 signalling to a UE 202, a Mobile-terminated SMS, a PDU session User Plane resource establishment to deliver mobile terminating user data) with a UE 202. If the UE 202 is in the CM-IDLE state or the CM-CONNECTED state, the network may initiate a network triggered Service Request procedure. If the UE 202 is in the CM-IDLE state, and asynchronous type communication is not activated, the network may send a Paging Request to the (R)AN/UE. The Paging Request may trigger the Service Request procedure in the UE 202. If asynchronous type communication is activated, the network may store the received message and forward the message to the (R)AN 204 and/or the UE 202 (i.e., synchronize the context with the (R)AN 204 and/or the UE 202) when the UE 202 enters the CM-CONNECTED state.

Figure 76:
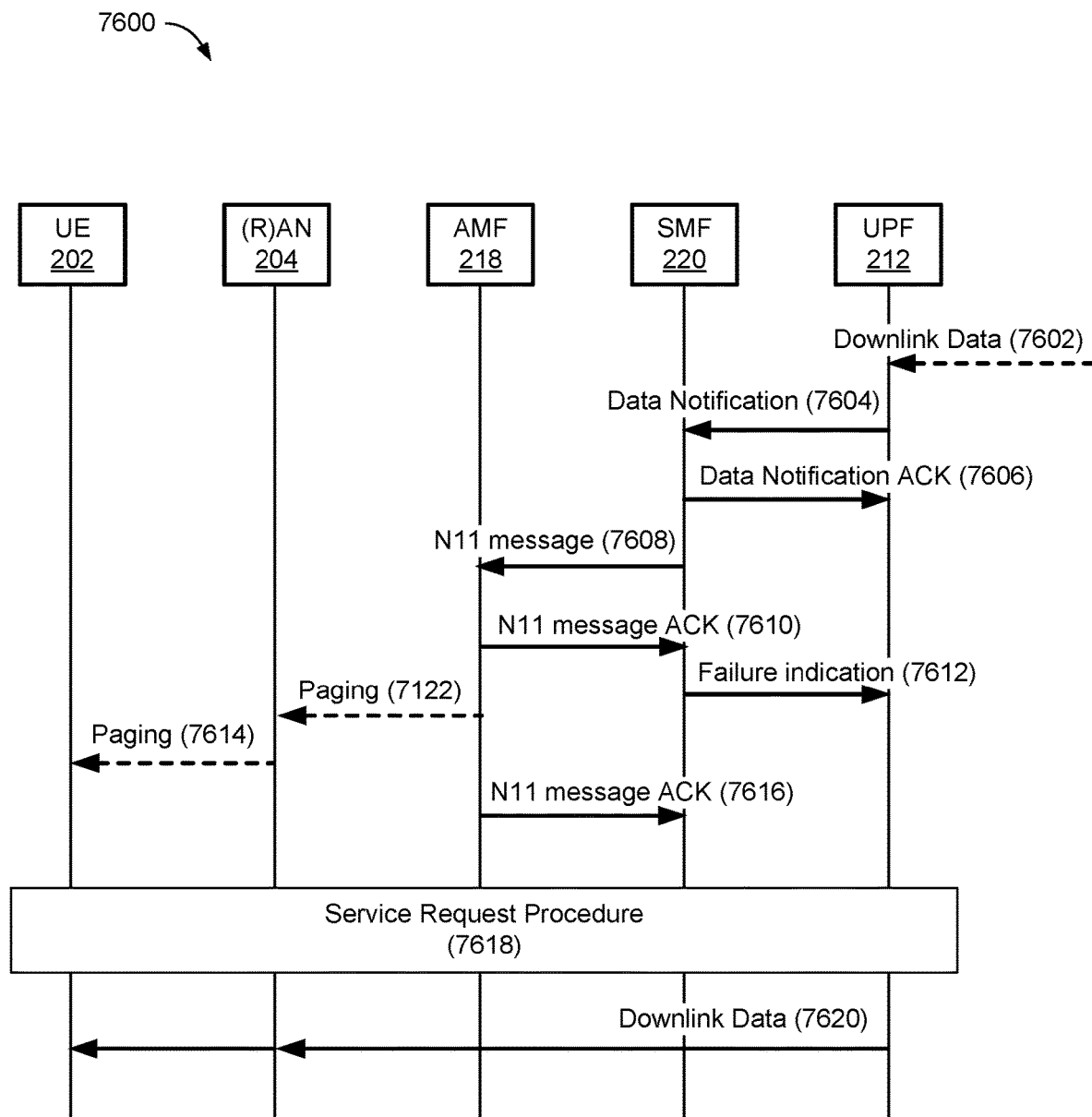
FIG. 76 illustrates in a message flow diagram, an example of a Network Triggered Service Request procedure, in accordance with embodiments of the present invention.

FIG. 76 illustrates in a message flow diagram, an example of a Network Triggered Service Request procedure (7600), in accordance with embodiments of the present invention. When the UPF 212 receives downlink data of a PDU session (7602) and there is no (R)AN 204 tunnel information stored in the UPF 212 for the PDU session, the UPF 212 may buffer the downlink data. On arrival of the first downlink data packet (7602), the UPF 212 may send a Data Notification message (7604) to the SMF 220. The message (7604) may include the PDU session ID and the Priority). If the UPF 212 receives additional downlink data packets (7602) for a QoS Flow in the same PDU Session with the same or a lower priority than used in any previous Data Notification for this PDU session, the UPF 212 may buffer these downlink data packets without sending a new Data Notification. It is noted that if the UPF 212 receives additional downlink data packets for a QoS Flow in the same PDU Session with a higher priority than used in any previous Data Notification for this PDU Session, the UPF 212 may send a Data Notification message (7604) to the SMF 220 indicating the higher priority. If the Paging Policy Differentiation feature (as specified in TS 23.501 clause 5.2.X) is supported by the UPF 212, and if it is activated by the SMF 220 for this N4 session, the UPF 212 may also include the DSCP in TOS (IPv4)/TC (IPv6) value from the IP header of the downlink data packet. If the SMF 220, while waiting for the User Plane to be established in the UPF 212, receives a N11 message notifying the new AMF 218 serving the UE 202 from the new AMF 218, the SMF 220 may resend the Data Notification message (7604) to the new AMF 218. The SMF 220 may send a Data Notification ACK (7606) to the UPF 212.

Upon reception of a Data Notification message (7604), the SMF 220 may determine the AMF 218, and send a N11 message (7608) to the AMF 218 including the Priority and PDU Session ID received in the Data Notification message (7604). The message (7608) may include the UE Permanent ID, the PDU session ID, the N2 SM information (including the PDU Session ID, the QoS profile, the CN N3 Tunnel Info, and the S-NSSAI), the Priority, and the Paging Policy Indication. If the SMF 220, while waiting for the User Plane Connection to be activated, receives any additional Data Notification message (7604) for the same PDU session but with higher priority than indicated in any previous Data Notification for this PDU session, the SMF 220 may send a new N11 message (7608) indicating the higher priority and PDU Session ID to the AMF 218. If the SMF 220, while waiting for the User Plane to be activated, receives an N11 message response (7606) from an AMF 218 other than the one to which the SMF 220 sent an N11 message, the SMF 220 may send the N11 message to this AMF 218. When supporting Paging Policy Differentiation, the SMF 220 may indicate in the N11 message (7608) the Paging Policy Indication related to the downlink data (7602) that triggered the Data Notification message (7604). It is noted that the AMF 218 may receive request message(s) from other network functions which may lead to signalling towards the UE/RAN, e.g., network initiated detach, and SMF 220 initiated PDU session modification. If the UE 202 is in the CM-CONNECTED state, and the AMF 218 only delivers N1 message towards the UE 202, the flow continues in step (7618) below. If the UE 202 is in the CM-IDLE state, and the AMF 218 determines that the UE 202 is not reachable for paging, the AMF 218 may either send an N11 message to the SMF (7610), or other network functions from which AMF 218 received the request message in step (7608) indicating the UE 202 is not reachable, or the AMF 218 performs an asynchronous type communication and stores the N11 message (7610). If asynchronous type communication is invoked and the AMF 218 stored an N11 message, the AMF 218 may initiate communication with the UE 202 and (R)AN 204 when the UE 202 is reachable, e.g., when the UE 202 enters the CM-CONNECTED state. If the Registration procedure with an AMF 218 change is in progress when the old AMF 218 receives a N11 message (7608), the old AMF 218 may reject the N11 message with an indication that the N11 message has been temporarily rejected. The SMF 220 may notify the UPF 212 about the User Plane setup failure (7612). Upon receiving the information that the N11 message requested from an SMF 220 has been temporarily rejected, and receiving the Downlink Data Notification from UPF 212, the SMF 220 may request the UPF 212 to apply extended buffering.

The AMF 218 may send a Paging message (7740) to a (R)AN node. If the UE 202 is in CM-CONNECTED state, the AMF 218 performs steps in a UE triggered Service Request procedure (7618) to activate the User Plane Connection for this PDU session (i.e., establish the radio resources and N3 tunnel). The rest of this procedure may be omitted. If the UE 202 is in RM-REGISTERED state, in the CM-IDLE state and reachable, the AMF 218 may send a Paging message (7740) to (R)AN node(s) belonging to the Registration Area(s) in which the UE 202 is registered. The Paging may include the NAS ID for paging, the Registration Area list, the Paging DRX length, and the Paging Priority indication. When supporting Paging Policy Differentiation, the AMF 218 may include a Paging Policy Indication in the Paging Request message.

Paging strategies may be configured in the AMF 218 for different combinations of DNN, Paging Policy Indication, PDU Session IDs from the SMF 220 when available, and other PDU Session context information identified by the PDU Session ID received in the N11 message. Paging strategies may include: a paging retransmission scheme (e.g., how frequently the paging is repeated or with what time interval); determining whether to send the Paging message (7740) to the (R)AN nodes during certain AMF 218 high load conditions; whether to apply sub-area based paging (e.g., first page in the last known cell-id or TA and retransmission in all registered TAs). The AMF 218 and the (R)AN 204 may support further paging optimizations in order to reduce the signalling load and the network resources used to successfully page a UE 202 by one or several of the following means:

by the AMF 218 implementing specific paging strategies (e.g., the N2 Paging message (7740) is sent to the (R)AN nodes that last served the UE 202);
  by the AMF 218 considering Information On Recommended Cells And RAN nodes provided by the (R)AN 204 at transition to the CM-IDLE state. The AMF 218 takes the (R)AN nodes related part of this information into account to determine the (R)AN nodes to be paged, and provides the information on recommended cells within the N2 Paging message to each of these (R)AN nodes;
  by the (R)AN 204 considering the Paging Attempt Count Information provided by the AMF 218 at paging.

If the UE Radio Capability for Paging Information is available in the AMF 218, the AMF 218 may add the UE Radio Capability for Paging Information in the N2 Paging message (7740) to the (R)AN nodes 204. If the Information On Recommended Cells And (R)AN nodes For Paging is available in the AMF 218, the AMF 218 may take that information into account to determine the (R)AN nodes for paging and, when paging a (R)AN node, the AMF 218 may transparently convey the information on recommended cells to the (R)AN node. The AMF 218 may include in the N2 Paging message(s) the paging attempt count information. The paging attempt count information may be the same for all (R)AN nodes selected by the AMF 218 for paging. If (R)AN nodes receive paging messages from the AMF 218, the UE 202 may be paged by the (R)AN node (7614).

The AMF 218 may send a N11 message ACK (7616) to the SMF 220. The AMF 218 may supervise the paging procedure with a timer. If the AMF 218 receives no response from the UE 202 to the Paging Request message (7614), the AMF 218 may apply further paging according to any applicable paging strategy. If the AMF 218 receives no response from the UE 202, the AMF 218 considers the UE 202 as unreachable and the SM N2 message cannot be routed to the (R)AN 204. The AMF 218 may then return an "N11 message Reject" (7616) with an appropriate "failure cause", e.g. UE unreachability, to SMF 220 or other network functions to indicate the failure of "message routing service", unless the AMF 218 is aware of an ongoing MM procedure that prevents the UE 202 from responding, i.e., the AMF 218 receives an N14 Context Request message indicating that the UE 202 is performing a Registration procedure with another AMF 218. When an "N11 message Reject" is received, the SMF 220 may informs the UPF 212.

When UE is in the CM-IDLE state, upon reception of the paging request (7614), the UE may initiate the UE triggered Service Request procedure (7618). The AMF 218 may send a N11 message to SMF(s) 220 associated with the PDU session identified by PDU session ID(s) in a MM NAS Service Request message, if any, but not to the SMF(s) 220 from which it receives the N11 message in step (7608). The UPF 212 transmits any buffered downlink data towards the UE 202 via the (R)AN node which performed the Service Request procedure (7618). The network may send downlink signalling (7620) if the procedure is triggered due to a request from other network entities described in step (7608).

A UE triggered Service Request in CM-IDLE state procedure may be used by a 5G UE 202 in the CM-IDLE state to request the establishment of a secure connection to an AMF 218. The UE 202 in the CM-IDLE state may initiate the Service Request procedure in order to send uplink signalling messages, user data, or response to a network paging request. After receiving the Service Request message, the AMF 218 may perform authentication, and the security procedure. After the establishment of a secure signalling connection to an AMF 218, the UE 202 or network may send signalling messages, e.g., a PDU session establishment from the UE 202 to the network, or the SMF 220, via the AMF 218, may start the User Plane resource establishment for the PDU sessions requested by the network and/or indicated in the Service Request message. For any Service Request, the AMF 218 may respond with a Service Response message to synchronize the PDU session status between the UE 202 and the network. The AMF 218 may also respond with a Service Reject message to the UE 202, if the Service Request cannot be accepted by network. For Service Request due to user data, they network may take further actions if the User Plane resource establishment is not successful. It is noted that the procedure shown in FIG. 64 is not applicable for an access network (once the UE 202 is registered in the network) in which the UE 202 is always considered as in the CM-CONNECTED state, and in which the User Plane resource is always considered established for an active PDU session.

FIG. 77 illustrates, in a message flow diagram, an example of a UE triggered Service Request procedure (7700) in CM-CONNECTED state, in accordance with embodiments of the present invention. The UE 202 may send a MM NAS Service Request message (6402) to a (R)AN 204. The message (6402) may include the PDU session ID(s). The UE 202 may send the NAS message Service Request towards the AMF 218 encapsulated in an RRC message to the (R)AN. The MM NAS Service Request message may be encrypted and integrity protected. The PDU session ID(s) in the NAS message Service Request message indicates the PDU session that the UE 202 selects to activate.

The (R)AN 204 may send a N2 Message (6404) to the AMF 218. The message (6404) may include the MM NAS Service Request. If the Service Request (6404) cannot be handled by the AMF 218, the AMF 218 may reject it. The (R)AN 204 may forward the MM NAS Service Request message to the AMF 218 based on the existing N2 connection. The AMF 218 may then send a N11 Message (6408) to SMF(s) 220 associated with the PDU session ID(s). Upon reception of the N11 Message (6408), each SMF 220 may send a N11 Message (6410) to the AMF 218 to establish the User Plane(s) for the PDU sessions. The message (6410) may include the N2 SM information that includes the PDU Session ID, the QoS profile, the CN N3 Tunnel Information and the S-NSSAI. The N2 SM information may include information that the AMF 218 may provide to the (R)AN 204.

The AMF 218 may next send a N2 Request message (6412) to (R)AN 204. The message (6412) may include the N2 SM information (including the QoS profile, and the CN N3 Tunnel Information) received from SMF, MM NAS Service Accept). If there are multiple PDU Sessions that involves multiple SMFs 220, the AMF 218 does not need wait for responses from all SMFs 220 in step (6410). The (R)AN 204 may then perform a RRC Connection Reconfiguration (6414) with the UE 202 depending on the QoS Information for the QoS Flows of the activated PDU Sessions and Data Radio Bearers. The (R)AN 204 may forward the MM NAS Service Accept to the UE 202. If the (R)AN 204 accepts at least one of QoS flows, the UE 202 may store the activated state of the PDU session. Otherwise, the UE 202 may consider the Service Request as not accepted by the (R)AN 204; The PDU session state in the UE remains deactivated.

After the User Plane radio resources for the selected PDU session are setup, the uplink data from the UE 202 may now be forwarded (6416) to the (R)AN 204. The 5G (R)AN 204 may send the uplink data to the UPF 212 address and Tunnel ID provided in the step (6410). If the (R)AN 204 accepts at least one QoS flow, the (R)AN 204 may send a N2 Request ACK message (6418) to the AMF 218. The message (6418) may include the PDU Session ID, the N2 SM information (including the (R)AN Tunnel information, the List of accepted QoS Flows for the PDU Sessions activated, and the List of rejected QoS Flows for the PDU Sessions activated). The (R)AN 204 may respond N2 SM information with separate N2 messages (e.g., a N2 tunnel setup response). If the (R)AN 204 does not accept the PDU session, the (R)AN 204 may send a N2 Request ACK message (6418) to the AMF 218 that indicates that the N2 Request is not accepted and a cause code. The message (6418) may include the N2 SM information (including the PDU Session ID, the PDU Session Reject, and the cause code). The AMF 218 may send a N11 Message (6420) per accepted PDU Session to the SMF 220. The message (6420) may include the PDU Session ID, and the N2 SM information received from (R)AN 204 in step (6418).

If the PDU session is accepted, and if dynamic PCC is deployed, the SMF 220 may initiate an IP-CAN Session Modification procedure (6422) and provide new location information to the PCF 222. If the PDU session is accepted, and if a User Plane is to be setup or modified the SMF initiates a N4 Session Modification procedure by sending a N4 Session Update Request (6424) message that provides RAN Tunnel Information and a List of accepted QoS Flows.

The UPF 212 may then send to SMF 220 a N4 Session Update Response message (6426). The SMF may then send a N11 Message ACK message (6428) to the AMF 218. The message may include the PDU Session ID, and the PDU session state. The SMF 220 may indicate the PDU session state (Activated or Deactivated) to the AMF 218.

An Xn based inter NG RAN handover procedure without User Plane function relocation may be used to hand over a UE 202 from a source (R)AN 204s to a target (R)AN 204t using Xn when the AMF 218 is unchanged and the SMF 220 determines to keep the existing UPF 212. The UPF 212 referred to is the UPF 212 which terminates N3 interface in the 5GC. The presence of IP connectivity between the Source UPF 212s and Target UPF 212t is assumed. If the Target (R)AN 204 does not have enough resources to serve some PDU sessions, the Target (R)AN 204 may notify the SMF 220. The SMF 220 may then determine to release or to keep the PDU session. For the PDU session to be released, the SMF 220 may initiate the PDU Session Release Procedure. For the PDU session to be kept, the SMF 220 may perform one of following: 1. Deactivate the N3 tunnel between the Target (R)AN 204t and the UPF 212; 2. Set the Session-AMBR (Aggregated Maximum Bit Rate) to zero; or 3. Deactivate the user plane, including air interface DRB and N3 tunnel.

Figure 78:
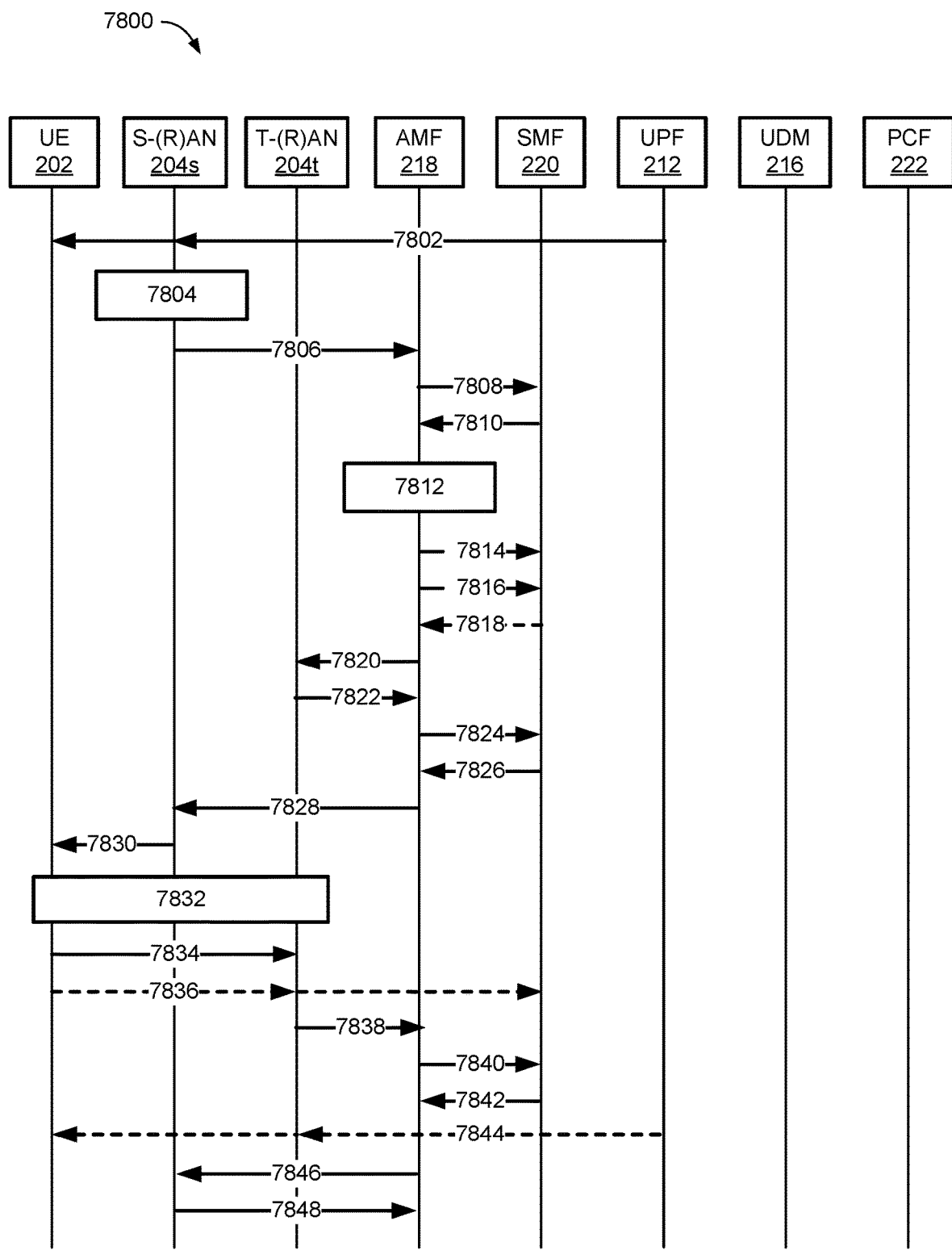
FIG. 78 illustrates, in a message flow diagram, an example of an Intra AMF, inter NG-RAN node handover procedure without Xn interface, in accordance with embodiments of the present invention.

FIG. 78 illustrates, in a message flow diagram, an example of an Intra AMF, inter NG-RAN node handover procedure (7800) without Xn interface, in accordance with embodiments of the present invention. Downlink UP data may be transmitting (7802) between the UPF 212 and the UE 202 via the S-RAN 204s. An event may occur that causes the S-RAN 204s to trigger a relocation via N2 (7804). The S-RAN 204s may send a Handover Required message (7806) to the AMF 218. The message (7806) may include a Target ID, a Source to Target transparent container, and the PDU session IDs. The Source to Target transparent container may include (R)AN information created by the S-RAN 204s to be used by the T-RAN 204t, and is transparent to 5GCN. All PDU sessions handled by the S-RAN 204s (i.e., all existing PDU sessions with active UP connections) may be included in the Handover Required message (7806), indicating which of those PDU session(s) are requested by S-RAN 204s to handover.

The AMF 218 may send a PDU Handover Request message (7808) to the SMF 220. The message may include the PDU session ID and the Target ID, and may be sent for each PDU-session indicated, by the S-RAN 204s, as an N2 Handover candidate. The PDU session ID indicates a PDU session candidate for N2 Handover.

The SMF 220 may send a PDU Handover Response message (7810) to the AMF 218. The message (7810) may include the PDU session ID and SM N2 information. The SMF 220 may select a UPF 212 that supports N3 connectivity towards the Target (R)AN node 204t. The SMF 220 may check if the N2 Handover for the indicated PDU session can be accepted and may include the result in SM N2 information sent, transparently for the AMF 220, to the T-RAN 204t. If the N2 handover for the PDU session is accepted, the SM N2 information may also include the PDU session ID, the N3 UP address and Tunnel ID of the UPF 212, and the QoS parameters.

The AMF 218 supervises the PDU Handover Response messages (7812) from the involved SMFs 220. The lowest value of the maximum delay indications for the PDU sessions that are candidates for handover gives the maximum time the AMF 218 may wait for the PDU Handover Response messages (7810) before continuing with the N2 Handover procedure. At the expiry of the maximum wait time, or when all PDU Handover Response messages are received, the AMF 218 continues with the N2 Handover procedure (Handover Request message in step (7820)).

The AMF 218 may send a PDU Handover Cancel message (7814) to the SMF 220. The message (7814) may include a PDU session ID. A PDU Handover Response message (7810) arriving too late is indicated to the SMF 220 allowing the SMF 220 to deallocate a possibly allocated N3 UP address and Tunnel ID of the selected UPF 212. It is noted that the Modify PDU Request message (7816) sent by the AMF 218 to the SMF 220 and the Modify PDU Response message (7818) sent by the SFM 220 to the AMF 218 start at step (7812) and be performed in parallel with that and later steps.

The AMF 218 may send a Handover Request message (7820) to the T-RAN 204t. The message (7820) may include the Source to Target transparent container, the MM N2 information, and the SM N2 info list). The AMF 218 may determine and/or select the T-RAN 204t based on the Target ID. The AMF 218 may allocate a GUTI valid for the UE 202 in the AMF 218 and target TAI. The Source to Target transparent container may be forwarded as received from the S-RAN 204s. The MM N2 information may include, for example, security information and the Handover Restriction List. The SM N2 information list may include SM N2 information from the SMFs 220 in the PDU Handover Response messages received until end of step (7814).

The T-RAN 204t may send a Handover Request Acknowledge message (7822) to the AMF 218. The message (7822) may include the Target to Source transparent container, the SM N2 response list, and the PDU sessions failed to be setup list. The Target to Source transparent container may include a UE 202 container with an access stratum part and a NAS part. The UE 202 container may be sent transparently via the AMF 218 and the S-RAN 204s to the UE 202. The information provided to the S-RAN 204s may also include a list of PDU session IDs indicating the PDU sessions that failed to be setup and the reason for the failure (e.g., SMF 220 decision, SMF 220 response too late, or T-RAN 204t decision). The SM N2 response list includes, per each received SM N2 information and by the SMF 220 accepted PDU session for N2 Handover, a PDU session ID and a SM N2 response indicating the PDU session ID and if T-RAN 204t accepted the N2 Handover request for the PDU session. For each by T-RAN 204t accepted PDU session for N2 Handover, the SM N2 response may include the N3 UP address and the Tunnel ID of the T-RAN 204t, and the list of accepted QoS flows. For PDU sessions that the T-RAN 204t rejects, the T-RAN 204t may set the Session-AMBR is set to zero. Alternatively, the T-RAN 204t may removed the N3 tunnel information of the UPF 212.

The AMF may send a Modify PDU Request message (7824) to the SMF 220. The message (7824) may include the PDU session ID, and the SM N2 response. For each T-RAN 204t received SM N2 response (included in the SM N2 response list), the AMF 218 may send the received SM N2 response to the SMF 220 indicated by the respective PDU Session ID.

The SMF 220 may send a Modify PDU Response message (7826) to the AMF 218. The message (7826) may include the PDU session ID, and the message (7826) may be sent for each received Modify PDU Request message (7824). The SMF 220 may perform preparations for N2 Handover by indicating the N3 UP address and the Tunnel ID of T-RAN 204t to the UPF 212 if the N2 Handover is accepted by the T-RAN 204t. If the N2 Handover is not accepted by T-RAN 204*t*, the SMF 212 may set the Session-AMBR of the rejected PDU sessions to zero. The SMF 220 may acknowledge the Modify Request message by sending the Modify PDU Response message to the AMF 218.

The AMF may send a Handover Command message (7828) to the S-RAN 204*s*. The message (7828) may include the Target to Source transparent container, the list of PDU sessions failed to be setup. The Target to Source transparent container may be forwarded as received from the AMF 218. The S-RAN 204*s* may use the list of PDU sessions that failed to be setup and the indicated reason for failure to determine whether or not to proceed with the N2 Handover procedure.

The S-RAN 204*s* may send a Handover Command message (7830) to the UE 202. The message may include the UE 202 container. The UE 202 container may be sent transparently from the T-RAN 204*t* via the AMF 218 to the S-RAN 204*s* and is provided to the UE 202 by the S-RAN 204*s*.

After the UE 202 has successfully synchronized (7832) to the target cell, it may send the Handover Confirm message (7834) to the T-RAN 204*t*. The Handover is, by this message, considered by the UE 202 to be successful. For rejected PDU sessions, the UE 202 does not send an uplink request for a Reactivation Timer. This timer can be set by a parameter in the UE 202 policy or by a message from the SMF 220.

The T-RAN 204*t* may next send to the AMF 218 a Handover Notify message (7838). The handover is, by this message, considered as successful in the T-RAN 204*t*. The AMF 218 may then send a Handover Complete message (7840) to the SMF 220. The message may include the PDU session ID. A Handover Complete message (7840) may be sent per each PDU Session to the corresponding SMF 220 to indicate the success of the N2 Handover.

The SMF 220 may send a Handover Complete ACK message (7842) to the AMF 218. The message (7842) may include the PDU session ID. The SMF 220 may indicate to the selected UPF 212 that the downlink User Plane for the indicated PDU session may be switched to the T-RAN 204*t*. For PDU sessions that are not supported by the T-RAN 204*t*, the SMF 220 may notify the selected UPF 212 to set the Session-AMBR to zero, Reactivation Timer, and Buffering Command. Before the Reactivation Timer expires, if the UPF does not send a downlink packet notification to the SMF 220 if the UPF 212 receives a downlink packet; these packet may be buffered or dropped, based on the Buffering Command. If the Buffering Command is set to TRUE, the downlink packets are buffered. If the Buffering Command is set to FALSE, the downlink packets are dropped. The SMF 220 may thus confirm reception of the Handover Complete message. The AMF 218 may send to the S-RAN 204*s* a UE Context Release Command ( ) message (7846). Next, the S-RAN 204*s* may send to the AMF 218 a UE Context Release Complete ( ) message (7848). The source (R)AN 204*s* may release its resources related to the UE 202 and respond with the UE Context Release Complete ( ) message (7846).

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

The AMF 218 is in charge of handling access and mobility management of the UE 202, while the SMF 220 is in charge of management of PDU sessions. The AMF may not need to store the state of PDU sessions (activated and deactivated). In some procedures presented earlier in FIG. 59 and FIG. 60 for N2 Release procedure (or UE Context Release in (R)AN procedure) and handover procedures in FIG. 72 and FIG. 74, the AMF may store the PDU session state. In the following embodiments, the AMF may not store the PDU session state, which helps to separate the functionalities of the AMF and SMF.

Figure 79:
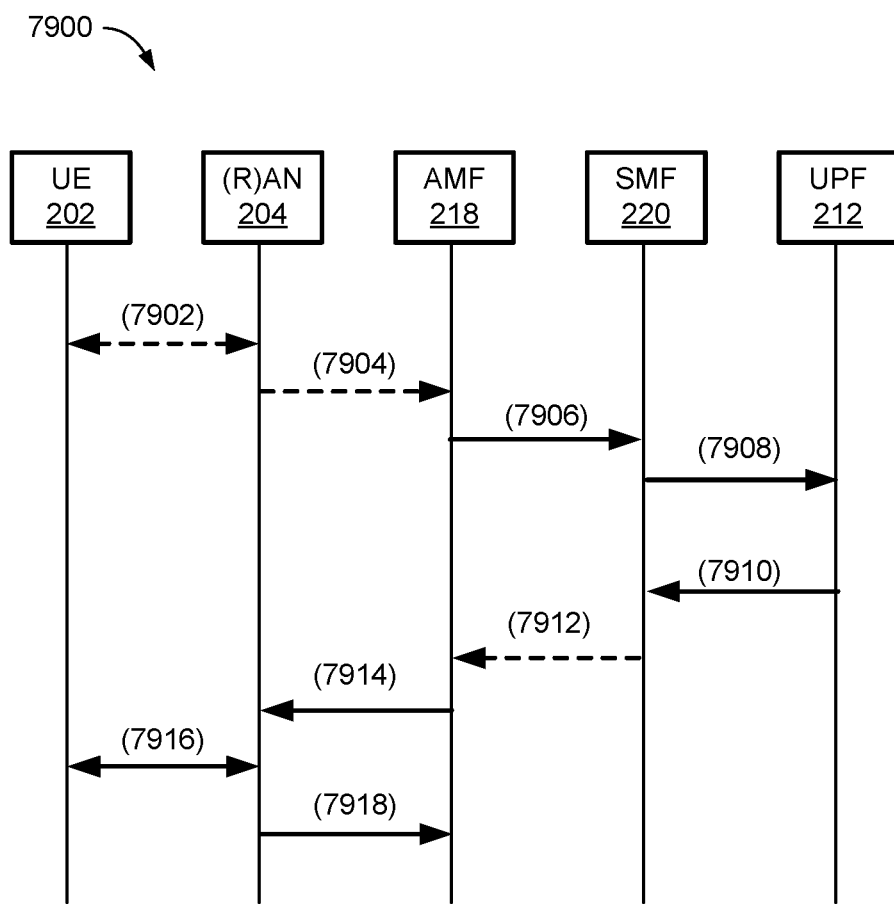
FIG. 79 illustrates, in a message flow diagram, an example of N2 Release procedure, which is also known as UE Context Release in AN procedure, in accordance with embodiments of the present invention.

An alternative solution to the N2 Release procedure in FIG. 59, which is also referred to as "UE Context Release in the AN" procedure, is illustrated in FIG. 79, where the AMF may not store the PDU session state. The UE Context Release in the AN procedure may be used to release a N2 connection and at the same time deactivate PDU sessions when the UE 202 enters the CM-IDLE state. FIG. 79 illustrates, in a message flow diagram, an example of a N2 Release and PDU Session deactivation procedure (5900), in accordance with embodiments of the present invention. The procedure (7900) may begin with the (R)AN 204 and the UE 202 performing a Release of Signaling Path over the (R)AN (7902). The RRC Release procedure (7902) may be similar to the RRC Release procedure (600A) describe above. The (R)AN 204 interacts with the UE 202 to release the RRC signalling connection. The UE 202 enters the CM-IDLE state and deactivates all PDU sessions. The (R)AN 204 may send (N2 message) a N2 UE Context Release (7904) to the AMF 218. The message (5904) may include a cause code, such as an O&M intervention, UE inactivity, etc. Those skilled in the art will appreciate that, in certain scenarios, step (7902) can be initiated before or in parallel with step (7904). The AMF 218 may send (N11 message) a UE Mobility Event Notification message (7906) to the SMF(s) 220 which have subscribed to the UE Mobility Event Notification service of the AMF for the event "UE enters CM-IDLE state". Other names of event "UE enters CM-IDLE state" could be "N2 Release" or "UE CM state transition to CM-IDLE, etc. The message (7906) may include a UE identifier (such as a SUPI), the (R)AN information in case the UE has multiple connections to multiple (R)AN, cause code, UE mobility event, list of PDU Session IDs. It should be noted that the SMF 220 may subscribe to a UE mobility Event Notification service of the AMF 218 when the PDU session is established or activated or by a separate subscribe procedure. For example, in TS 23.502, Version 0.3.0, published in March 2014, the SMF 220 may subscribe to the UE Mobility Event Notification service of the AMF 218, in step 4*b* of FIG. 4.2.3.2-1 of clause 4.2.3.2 "UE triggered Service Request in CM-IDLE state", or in step 3*b* of FIG. 4.2.3.3-1 of clause 4.2.3.3 "UE triggered Service Request in CM-CONNECTED state", or in step 16 of FIG. 4.3.2.2.1-1 of clause 4.3.2.2.1 "Non-roaming and Roaming with Local Breakout".

The SMF 220 then sends (N4 message) a N3 Release Request (7908) to the UPF(s) 212. Other names of Release Request message (7908) can be Session Modification Request, or PDU Session Deactivation Request. The message (7908) may include an identifier to identify the UE such as SUPI, or an identifier to identify PDU Session ID to be deactivated, Buffering Command, and a Reactivation Timer. The Buffering Command indicates whether the UPF will buffer the downlink PDU packet received for the UE then initiates a downlink data notification to the SMF to trigger "Network Triggered Service Request" procedure described in clause 4.2.3.3 of TS 23502, Version 0.3.0, published in March 2017. The Reactivation Timer indicates the minimal time the PDU session is deactivated before the UPF may send a downlink data notification to the SMF if a downlink PDU packet arrives. The UPF 212 then releases the N3 (R)AN tunnel information (e.g., the (R)AN IP address and tunnel identifier) in the UE's PDU Session Context of PDU sessions to be deactivated. The UPF sends (N4 message) a N3 Release Response (7910) to the SMF 220 confirming the release of the N3 (R)AN tunnel information. Other names of message (7910) could be Session Modification Response or Session Deactivation Response. The UPF 212 may begin to buffer downlink packets of the deactivated PDU sessions. The SMF 220 may not need to send message (7912) to confirm the reception of message (7906). Instead of message (7912), the transport layer protocol may use an acknowledgment message upon receiving message (7906). The SMF 220 may then change the state of the PDU session to Session-IDLE.

The AMF 218 then sends (N2 message) a N2 Release Response (7914) to the (R)AN 204 with a cause code over the N2 interface. Other names of message (7914) could be N2 UE Context Release Request. The AMF 218 may not need to store the session state of all PDU sessions of the UE 202 to Session-IDLE (or Session Deactivated state). Note that the message (7914) can be sent before, in parallel or after message (7906). If step (7902) was not performed, the RAN 204 and the UE 202 perform a RRC Release procedure (7916). The RRC Release procedure (7916) may be similar to the RRC Release procedure (600A) describe above. Other names of message (7916) could be "Release of Signalling path over the (R)AN", or "RRC Reconfiguration". The (R)AN 204 sends a message to UE 202 to release the RRC connection. The UE 202 enters the CM-IDLE state and all PDU sessions in the UE 202 transition to the Session-IDLE state (or in other words, session deactivated state). Upon receiving RRC connection release confirmation from the UE 202, the (R)AN 204 removes the UE Context. Next, the (R)AN 204 sends (N2 message) a N2 Release Confirmation (7918) to the AMF 218. Another name of message (7918) could be "N2 UE Context Release Complete". Upon receiving the N2 Release Response (7918) message, the AMF 218 sets the UE CM state to the CM-IDLE state and releases the N2 connection. It should be noted that the AMF 218 may keep or remove the subscription to UE Mobility Event Notification service of the AMF 218 for the SMF(s) service PDU sessions, for some UE mobility events such as "Serving Cell Change".

It should be noted that the SMF 220 may subscribe to a UE Mobility Event Notification service of the AMF 218 for the event "Serving Cell Change", when the PDU session is established or activated or by a separate subscribe procedure. For example, in TS 23.502, Version 0.3.0, published in March 2014, the SMF 220 may subscribe to the UE Mobility Event Notification service of the AMF 218, in step 4b of FIG. 4.2.3.2-1 of clause 4.2.3.2 "UE triggered Service Request in CM-IDLE state", or in step 3b of FIG. 4.2.3.3-1 of clause 4.2.3.3 "UE triggered Service Request in CM-CONNECTED state", or in step 16 of FIG. 4.3.2.2.1-1 of clause 4.3.2.2.1 "Non-roaming and Roaming with Local Breakout". Consequently, during the handover procedures, for example in FIG. 72, FIG. 73, and FIG. 78, the AMF 218 may send path switch requests to the SMFs 220 which have subscribed to the UE Mobility Event Notification service of the AMF 218 for the event "Serving Cell Change". The SMF 220 may subscribe to the UE Mobility Event Notification service of the AMF 218 if the SMF serves activated or deactivated PDU sessions. For deactivated PDU sessions during handover procedures, the SMF may relocate the UPF 212 or release the deactivated PDU session if there is no suitable UPF to serve the PDU session.

By employing the method that AMF may not store PDU session state and the SMF subscribe to the UE Mobility Even Notification, another embodiment of Xn based inter NG (R)AN handover illustrated in FIG. 72 can be derived.

In Handover Preparation (7202) and Handover Execution (7204), if the Target (R)AN 204t rejects some PDU sessions, the Target (R)AN 204t shall not set up any Data Radio Bearer (DRB) for the rejected PDU sessions with the UE 202. The UE shall not release the PDU sessions that have DRB assigned. The UE shall wait for decision from the SMF whether to release or deactivate the rejected PDU sessions. These requirements may be also applied to the Xn based inter NG (R)AN handover with UPF relocation described in FIG. 73.

In message (7208) the Target (R)AN 204t sends N2 Path Switch Request to the AMF 218. The message (7208) includes a list of accepted PDU session and a list of rejected PDU sessions.

The AMF 218 may send a N2 SM information via a N11 Message (7210) to each SMF 220 associated with the list of PDU Sessions and the list of accepted QoS flows of each PDU session received in the N2 Path Switch Request (7208). For the PDU Sessions to be switched to the Target (R)AN 204t, upon receipt of the N11 Message (7210), each of the SMFs 220 may determine whether the existing UPF 212 can continue to serve the UE 202. If the existing UPF 212 cannot continue to serve the UE 202 and it is not a PDU session anchor, steps 3-11 of clause 4.9.1.2 of TS 23.502 (version 0.3.0, published in March 2017), are performed. Otherwise, the following steps (7212) to (7220) may be performed by each of the SMFs 220 if their existing UPFs 212 can continue to serve the UE 202.

For the rejected PDU session(s), the AMF 218 may send separate request(s) to the relevant SMF(s) 220 to notify that the Target (R)AN 204t does not support this PDU Session. The AMF 218 may send separate request(s) to the SMF(s) 220, which have subscribed to the UE Mobility Even Notification triggered by Serving Cell Change. The message includes Address of the Target (R)AN.

For PDU Sessions requested (accepted) by the Target (R)AN 204t, the SMF 220 may send an N4 Session Modification Request message (7212) to the UPF 212. The message (7212) may include the (R)AN address, and tunnel identifiers for downlink User Plane. For PDU Sessions rejected by the Target (R)AN 204t, the SMF 218 may either release or deactivate the PDU sessions. For the PDU sessions to be released, the SMF 218 may initiate the PDU Session Release procedure as defined in Clause 4.3.4 of TS 23.502. For the PDU sessions to be deactivated, the SMF 218 may send an N4 Session Modification Request (7212) to the UPF 212 for these PDU sessions. The message (7212) may indicate the release of (R)AN N3 tunnel information such as the (R)AN Address and Tunnel Endpoint Identifier for the downlink user plane, a Buffering Command, and a Reactivation Timer, and cause code (e.g. Handover rejected, or No Data Activity). It is noted that the Buffering Command may be used to indicate whether the UPF 212 shall buffer the incoming downlink packets. It is also noted that the Reactivation Timer may indicate a duration that the UP of a deactivated PDU session remains in deactivated state after the UPF 212 removes the (R)AN N3 tunnel information. Before the Reactivation Timer expires, the UPF 214 may buffer the downlink packets according to the Buffering Command. After the Reactivation Timer expires, the UPF 212 may buffer the downlink packets according to the Buffering Command. If the UPF 212 receives downlink packets before or after the Reactivation Timer expires, the UPF 212 may send a downlink packet notification to the SMF 220 to initiate a Network Triggered Service Request.

For deactivated PDU sessions, the SMF may decide to select a new UPF function. In case a new UPF is selected, the SMF sends PDU session context to the new UPF and requests the old UPF to release the PDU session context. Alternatively, the SMF may set up a new N3-terminating UPF and connect the new N3-terminating UPF with the old UPF.

The UPF 212 may returns an N4 Session Modification Response message (7214) to the SMF 220 after the requested PDU Sessions are switched or modified/deactivated. The message (7214) may include the Tunnel identifiers for uplink traffic. In order to assist the reordering function in the Target (R)AN 204t for PDU sessions requiring a path switch, the UPF 212 may send one or more "end marker" packets (7216) on the old path immediately after switching the path. The UPF 212 may starts sending downlink packets to the Target (R)AN 204t (7218). The SMF 220 may send an N11 Message ACK (7220) to the AMF 218 for PDU Sessions which have been switched or deactivated successfully. For switched PDU sessions, the message (7220) may include the N2 SM message, which includes N3 CN Tunnel Information. For deactivated PDU sessions, the message 7220 may contain N1 SM Message Container containing Session Deactivation Request and PDU Session IDs. The SMF may store the deactivation state of deactivated PDU session(s).

Once the N11 Message ACK (7220) is received from all the SMFs 220, the AMF 218 may aggregate the received N2 SM messages and N1 SM messages in a N2 Path Switch Request ACK (7222) to the Target (R)AN 204t. If none of the requested PDP Sessions have been switched successfully, the AMF 218 may send an N2 Path Switch Request Failure message to the Target (R)AN 204t.

It is noted that the AMF may collect N11 Message ACK (7220) from the SMFs 220 that handles the path switched request for accepted PDU sessions and may send to the Target (R)AN 204t in a separate message. This will reduce the handover time for the accepted PDU sessions. The AMF 218 may collect N11 Message ACK (7220) from the SMF 220 for rejected PDU sessions and transfers the N1 SM Message Containers in a separate message to the Target (R)AN 204t.

If the Target (R)AN 204t receives the N1 SM Message Container in step (7222), the Target (R)AN 204t forwards the N1 SM Message Container (including the Session Deactivation Request having the PDU Session ID) to the UE 202 by a RRC message (7224). The UE stores the deactivated state of PDU session(s). The UE 202 may release radio context of deactivated PDU sessions. The UE sends a RRC message (7226) that includes the N1 SM Session Deactivation Response(s) and PDU Session ID(s) of deactivated PDU sessions to the SMF 220 via Target (R)AN 204t and AMF 218. By sending a Release Resources message (7232) to the Source (R)AN 204s, the Target (R)AN 204 confirms success of the handover. It then triggers the release of resources with the Source (R)AN 204s.

In the above description, the Target (R)AN 204t sends the N1 Session Deactivation Request message received from the SMF 220 to the UE 202 in the message (7224). Alternatively, the Target (R)AN 204t may forward the N1 Session Deactivation Request to the Source (R)AN 204s. The Source (R)AN 204s then may forward the N1 Session Deactivation Request to the UE via another RRC message similar to the message (7224). The UE acknowledges the PDU session deactivation by sending an N1 Session Deactivation Response to the SMF. This message is delivered to either the Source (R)AN 204s or Target (R)AN 204t by the same RRC message (7226). The Source (R)AN 204s or Target (R)AN 204t forwards the N1 Session Deactivation Response to the AMF 218 by the same message (7228); the AMF 218 then forwards the N1 Session Deactivation Response to the SMF 220 by the same message (7230).

By employing the method that AMF may not store PDU session state and the SMF subscribe to the UE Mobility Even Notification, another embodiment of Intra AMF, inter NG-RAN node handover without Xn interface can be derived as follows. FIG. 78 illustrates, in a message flow diagram, an example of an Intra AMF, inter NG-RAN node handover procedure (7800) without Xn interface, in accordance with embodiments of the present invention. Downlink UP data may be transmitting (7802) between the UPF 212 and the UE 202 via the S-RAN 204s. An event may occur that causes the S-RAN 204s to trigger a relocation via N2 (7804). The S-RAN 204s may send a Handover Request message (7806) to the AMF 218. The message (7806) may include a Target ID, a Source to Target transparent container, and the PDU session IDs. The Source to Target transparent container may include (R)AN information created by the S-RAN 204s to be used by the T-RAN 204t, and is transparent to 5GCN. All PDU sessions handled by the S-RAN 204s (i.e., all existing PDU sessions with active UP connections) may be included in the Handover Required message (7806), indicating which of those PDU session(s) are requested by S-RAN 204s to handover.

The AMF 218 may send a PDU Handover Request message (7808) to the SMF 220. The message may include the PDU session ID and the Target ID, and may be sent for each PDU-session indicated, by the S-RAN 204s, as an N2 Handover candidate. The PDU session ID indicates a PDU session candidate for N2 Handover. The AMF 218 may send separate message to the SMF 220 that has subscribed to the UE Mobility Event Notification. The message includes Target (R)AN. The SMF 220 may decide to select a new UPF to serve the deactivated PDU sessions. If a new UPF is selected, the SMF 220 sends session establishment request with PDU session contexts to the newly selected UPF. After that, the SMF requests the old UPF to release the PDU session contexts. Alternatively, the SMF may set up the N9 connection between the new UPF and the old UPF. The AMF 218 may send separate UE Mobility Event Notification message (7808) to the SMF 220, which SMF subscribes to the "UE Mobility Event Notification" service of AMF in clause 5.2.2.2 of TS 23.502, Version 0.3.0, published in March 2017, for the event of Serving Cell Change. The notification may include PDU session ID(s) new serving cell, which is Target ID.

The SMF 220 may send a PDU Handover Response message (7810) to the AMF 218. The message (7810) may include the PDU session ID and SM N2 information. The SMF 220 may select a UPF 212 that supports N3 connectivity towards the Target (R)AN node 204*t*. The SMF 220 may check if the N2 Handover for the indicated PDU session can be accepted and may include the result in SM N2 information sent, transparently for the AMF 220, to the T-RAN 204*t*. If the N2 handover for the PDU session is accepted, the SM N2 information may also include the PDU session ID, the N3 UP address and Tunnel ID of the UPF 212, and the QoS parameters.

The AMF 218 supervises the PDU Handover Response messages (7812) from the involved SMFs 220. The lowest value of the maximum delay indications for the PDU sessions that are candidates for handover gives the maximum time the AMF 218 may wait for the PDU Handover Response messages (7810) before continuing with the N2 Handover procedure. At the expiry of the maximum wait time, or when all PDU Handover Response messages are received, the AMF 218 continues with the N2 Handover procedure (Handover Request message in step (7820).

The AMF 218 may send a PDU Handover Cancel message (7814) to the SMF 220. The message (7814) may include a PDU session ID. A PDU Handover Response message (7810) arriving too late is indicated to the SMF 220 allowing the SMF 220 to deallocate a possibly allocated N3 UP address and Tunnel ID of the selected UPF 212. It is noted that the Modify PDU Request message (7816) sent by the AMF 218 to the SMF 220 and the Modify PDU Response message (7818) sent by the SFM 220 to the AMF 218 start at step (7812) and be performed in parallel with that and later steps.

The AMF 218 may send a Handover Request message (7820) to the T-RAN 204*t*. The message (7820) may include the Source to Target transparent container, the MM N2 information, and the SM N2 info list). The AMF 218 may determine and/or select the T-RAN 204*t* based on the Target ID. The AMF 218 may allocate a GUTI valid for the UE 202 in the AMF 218 and target TAI. The Source to Target transparent container may be forwarded as received from the S-RAN 204*s*. The MM N2 information may include, for example, security information and the Handover Restriction List. The SM N2 information list may include SM N2 information from the SMFs 220 in the PDU Handover Response messages received until end of step (7814).

The T-RAN 204*t* may send a Handover Request Acknowledge message (7822) to the AMF 218. The message (7822) may include the Target to Source transparent container, the SM N2 response list, and the PDU sessions failed to be setup list. The Target to Source transparent container may include a UE 202 container with an access stratum part and a NAS part. The UE 202 container may be sent transparently via the AMF 218 and the S-RAN 204*s* to the UE 202. The information provided to the S-RAN 204*s* may also include a list of PDU session IDs indicating the PDU sessions that failed to be setup and the reason for the failure (e.g., SMF 220 decision, SMF 220 response too late, or T-RAN 204*t* decision). The SM N2 response list includes, per each received SM N2 information and by the SMF 220 accepted PDU session for N2 Handover, a PDU session ID and a SM N2 response indicating the PDU session ID and if T-RAN 204*t* accepted the N2 Handover request for the PDU session. For each by T-RAN 204*t* accepted PDU session for N2 Handover, the SM N2 response may include the N3 UP address and the Tunnel ID of the T-RAN 204*t*, and the list of accepted QoS flows. For PDU sessions that the T-RAN 204*t* rejects, the T-RAN 204*t* may delete the PDU session contexts.

The AMF may send a Modify PDU Request message (7824) to the SMF 220. The message (7824) may include the PDU session ID, and the SM N2 response. For each T-RAN 204*t* received SM N2 response (included in the SM N2 response list), the AMF 218 may send the received SM N2 response to the SMF 220 indicated by the respective PDU Session ID.

The SMF 220 may send a Modify PDU Response message (7826) to the AMF 218. The message (7826) may include the PDU session ID, and the message (7826) may be sent for each received Modify PDU Request message (7824). The SMF 220 may perform preparations for N2 Handover by indicating the N3 UP address and the Tunnel ID of T-RAN 204*t* to the UPF 212 if the N2 Handover is accepted by the T-RAN 204*t*. If the N2 Handover is not accepted by T-RAN 204*t*, the SMF 212 may decides whether to release or deactivate PDU session. For PDU session to be released, the SMF initiates the PDU session release procedure described in Clause 4.3.4 of TS 23.502 Version 0.3.0, published in March 2017. For the PDU sessions to be deactivated, the SMF sends an N4 Session Modification Request to the UPF for these PDU sessions. The message indicates the release of (R)AN N3 tunnel information ((R) AN Address and Tunnel Endpoint Identifier for the downlink user plane), Buffering Command, Reactivation Timer). The Buffering Command is to indicate whether the UPF shall buffer the incoming downlink packets.

The Reactivation Timer indicates a duration that the UP of a deactivated PDU session remains in deactivated state after the UPF removes the (R)AN N3 tunnel information. Before the Reactivation Timer expires, the UPF shall buffer the downlink packets according to the Buffering Command. After the Reactivion Timer expires, the UPF shall buffer the downlink packets according to the Buffering Command. If the UPF receives downlink packet before or after the Reactivation Timer expires, the UPF sends downlink packet notification to the SMF to initiate Network Triggered Service Request.

The SMF 220 acknowledges the Modify Request message (7824) by sending a Modify PDU Response message (7826) to the AMF 218. For PDU sessions that are deactivated, the message (7826) may include N1 SM Message Container (Session Deactivation Request (PDU Session ID(s), Reactivation Timer). The SMF stores the deactivation state of deactivated PDU session(s).

The AMF may send a Handover Command message (7828) to the S-RAN 204*s*. The message (7828) may include the Target to Source transparent container, the list of PDU sessions failed to be setup, and N1 SM Message Container received in message (7826). The Target to Source transparent container may be forwarded as received from the AMF 218. The S-RAN 204*s* may use the list of PDU sessions that failed to be setup and the indicated reason for failure to determine whether or not to proceed with the N2 Handover procedure.

The S-RAN 204*s* may send a Handover Command message (7830) to the UE 202. The message may include the UE 202 container and N1 SM Message Container. The UE 202 container may be sent transparently from the T-RAN 204*t* via the AMF 218 to the S-RAN 204*s* and is provided to the UE 202 by the S-RAN 204*s*.

After the UE 202 has successfully synchronized (7832) to the target cell, it may send the Handover Confirm message (7834) to the T-RAN 204*t*. The Handover is, by this message, considered by the UE 202 to be successful. The message may include N1 SM Acknowledgement (PDU Session ID(s)) for successfully switched and deactivated PDU sessions. For deactivated PDU sessions, the UE 202 stores the deactivated state of PDU session(s). The UE 202 does not send an uplink request for a Reactivation Timer. This timer can be set by a parameter in the UE 202 policy or by a message from the SMF 220.

The T-RAN 204*t* may next send to the AMF 218 a Handover Notify message (7838). The message (7838) may contain N1 SM Acknowledgment received from the UE in message (7834). The handover is, by this message, considered as successful in the T-RAN 204*t*. The AMF 218 may then send a Handover Complete message (7840) to the SMF 220. The message may include the PDU session ID and N1 SM Message from the UE 202. A Handover Complete message (7840) may be sent per each PDU Session to the corresponding SMF 220 to indicate the success of the N2 Handover.

The SMF 220 may send a Handover Complete ACK message (7842) to the AMF 218. The message (7842) may include the PDU session ID. The SMF 220 may indicate to the selected UPF 212 that the downlink User Plane for the indicated PDU session may be switched to the T-RAN 204*t*. For PDU sessions that are not supported by the T-RAN 204*t* and are deactivated, the SMF 220 may notify the selected UPF 212 to remove the (R)AN N3 tunnel information, Reactivation Timer, and Buffering Command. The SMF 220 may thus confirm reception of the Handover Complete message. The AMF 218 may send to the S-RAN 204*s* a UE Context Release Command ( ) message (7846). Next, the S-RAN 204*s* may send to the AMF 218 a UE Context Release Complete ( ) message (7848). The source (R)AN 204*s* may release its resources related to the UE 202 and respond with the UE Context Release Complete ( ) message (7846).

UE or Network Requested PDU Session Release for Non-Roaming and Roaming with Local Breakout.

Figure 80:
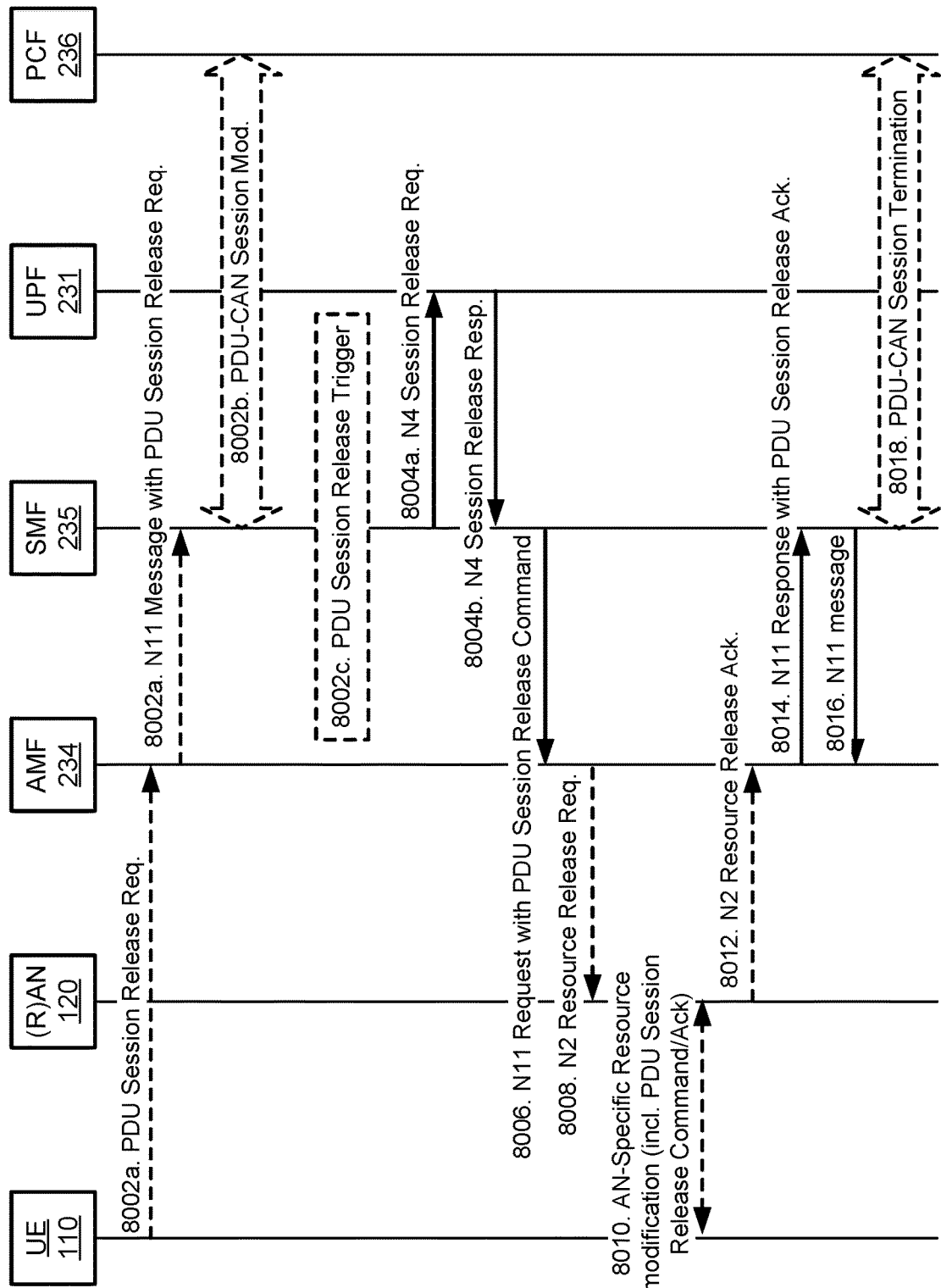
FIG. 80 is a message flow diagram illustrating an example of UE or network requested PDU session release for non-roaming and roaming with local breakout, in accordance with embodiments of the present invention.

FIG. 80 illustrates an example embodiment including both a UE requested PDU session release procedure and a network requested PDU session release procedure. This procedure allows the UE to request the release of one PDU session. The procedure also allows the SMF or PCF to initiate the release of a PDU session. In the case of LBO, the procedure is as in the case of non-roaming with the difference that the SMF, the UPF and the PCF are located in the visited network.

The procedure of FIG. 80 is triggered by one of the following options:

Step 8002*a*: The UE initiates the UE requested PDU session release procedure by the transmission of an N1 SM PDU Session Release Request (PDU Session ID) message. The N1 message is forwarded by the (R)AN to the 5G Core with an indication of User Location Information. This message is relayed to the SMF corresponding to the PDU Session ID via N2 and the AMF. Depending on the access type, when the UE is in CM-IDLE state, the UE can trigger a Service Request procedure before being able to release the PDU session.

Step 8002*b*: The PCF may initiate the PDU-CAN Session modification procedure to request the release of the PDU session.

Step 8002*c*: The SMF may initiate release of a PDU session, for example based on a request from the DN (cancelling the UE authorization to access to the DN) or based on a request from the UDM (subscription change) or from the OCS. The release procedure also may be triggered based on locally configured policy (e.g. the release procedure may be related with the UPF relocation for SSC mode 2/mode 3).

When the SMF receives any one of the triggers in step 8002*a*-8002*c*, the SMF starts PDU session release procedure.

Step 8004: The SMF releases the IP address/Prefix(es) that were allocated to the PDU session and releases the corresponding User Plane resources:

Step 8004*a*: The SMF sends an N4 Session Release Request (N4 Session ID) message to the UPF. The UPF may drop any remaining packets of the PDU session and release all tunnel resource and contexts associated with the N4 Session.

Step 8004*b*: The UPF acknowledges the N4 Session Release Request by the transmission of an N4 Session Release Response (N4 Session ID) message to the SMF.

If there are multiple UPFs associated with the PDU session, the Session Release Request procedure (steps 8004*a* and 8004*b*) may be done for each UPF.

Step 8006: The SMF sends an N11 Request message to the AMF (N2 SM Resource Release request, N1 SM Information (PDU Session Release Command))

The SMF creates an N1 SM Information including PDU Session Release Command message (PDU Session ID, Cause). The Cause may indicate a trigger to establish a new PDU session with the same characteristics (e.g. when procedures related with SSC mode 2 are invoked).

SSC mode 2 is defined in clause 5.6.9. of TS 23.501

If the UP connection of the PDU session is active, the SMF shall also create an N2 SM request to release the (R)AN resources associated with the PDU session (N2 Resource Release request (PDU Session ID)).

If the PDU session is deactivated, the SMF may send a Session Release indication and PDU Session ID to the AMF.

The SMF sends an N11 message to the AMF (N2 SM Resource Release request, N1 SM Container (PDU Session Release Command), PDU Session Release Indication, PDU Session ID) message to the AMF. The PDU Session Release Indication tells the AMF about PDU session release notification. The AMF may skip sending the N1 SM container to the UE when the UE is in CM-IDLE state.

Step 8008: If the UE is in CM-IDLE state, the AMF may acknowledge the step 8006 in step 8014; and steps 8008 to 8012 and 8016 may be skipped.

The UE and the 5GC will get synchronized about the status (released) of the PDU session at the next Service Request or Registration procedure.

If the UE is in CM-CONNECTED state, then the AMF transfers the message received from the SMF in step 8006 (N2 SM Resource Release request, N1 SM Information) message to the (R)AN.

Step 8010: If the (R)AN receives an N2 SM request to release the AN resources associated with the PDU session it issues AN specific signalling exchange(s) with the UE to release the corresponding AN resources.

In case of a 3GPP RAN, an RRC Connection Reconfiguration may take place with the UE releasing the RAN resources related to the PDU session.

During this procedure, the (R)AN sends any NAS message (N1 SM PDU Session Release Command) received from the AMF in step 8008. If the (R)AN receives only N1

SM Container (PDU Session Release Command), the (R)AN forwards this messages to the UE.

The UE acknowledges the PDU Session Release Command by sending a PDU Session Release Ack message via N1 SM signalling sent over the (R)AN.

Step 8012: [Conditional] If the (R)AN had received an N2 SM request to release the AN resources, the (R)AN acknowledges the N2 SM Resource Release Request by sending an N2 SM Resource Release Ack (N1 SM Information (PDU Session Release Ack), User Location Information) Message to the AMF. Otherwise, the (R)AN just forwards the N1 SM Information (PDU Session Release Ack) from the UE to the AMF.

Step 8014: If the UE is in CM-CONNECTED state, the AMF sends N11 Response message (an N2 SM Resource Release Ack) to forward the message received from (R)AN in step 6 to the SMF. If the UE is in CM-IDLE state, the AMF sends to the SMF an N11 Response message (Session Release Acknowledgment, PDU Session ID). The AMF may remove all contexts (including the PDU session ID) associated with the PDU session.

Step 8016: If the PDU session is activated, the SMF notifies the AMF that the PDU session is released. The AMF and SMF may remove all contexts (including the PDU session ID) associated with the PDU session. In some embodiments, this may take the form of an Nsmf_PDU Session Event Report Notification (AMF): The SMF sends (N11 Message) PDU Session Event Report Notification as defined in Clause 5.2.8.1 to the AMF; the event trigger is PDU session release.

Step 8018: If Dynamic PCC applied to this session the SMF initiates the PDU-CAN session termination procedure. SMF notifies any entity that has subscribed to User Location Information related with PDU session change. If it is the last PDU session it is handling for the UE the SMF releases the association with the UDM. The order with which SMF releases the resources is implementation dependant. If PDU session is deactivated, step 8018 can be performed in parallel, before or after step 8006.

Alternative Embodiments A

In alternative embodiments, steps 8006 through 8018 may operate as follows:

Step 8006: The SMF sends an N11 message to the AMF (N2 SM PDU Session Release request, N1 SM PDU Session Release request, N11 PDU Session Release notification). The N1 SM PDU Session Release request includes PDU Session ID, Cause. The Cause may indicate a trigger to establish a new PDU session with the same characteristics (e.g. when procedures related with SSC mode 2 are invoked).

SSC mode 2 is defined in TS 23.501[2] clause 5.6.9.

The N2 SM PDU Session Release request is to release the (R)AN resources associated with the PDU session (N2 Resource Release request (PDU Session ID)). The N11 PDU Session Release notification includes PDU Session ID for the AMF to delete PDU session context.

If the UP of PDU session is activated, the SMF sends N1 SM PDU Session Release request and N2 SM PDU Session Release request via the AMF.

If the UP of PDU session is deactivated, and if the SMF does not subscribe to the Namf_EventExpose service of AMF for UE CM state changes, the SMF sends the N1 SM message to the UE via the AMF.

If the UP of PDU session is deactivated, and the SMF knows that the UE is in CM-IDLE state, the SMF sends N11 PDU Session Release request. Otherwise, if the SMF knows that the UE is in CM-CONNECTED state, the SMF sends N1 SM PDU Session Release Request.

In some embodiments, this may take the form a Namf_Message Transfer (SMF): The SMF requests Namf_Message Transfer service of the AMF defined in Clause 5.2.2.4 to sends N1 SM and N2 SM messages to the UE and (R)AN.

Step 8008: If the UE is in CM-IDLE state and N11 PDU Session Release notification is received, the AMF acknowledges the step 8006 in step 8014; and steps 8008 to 8012 and 8016 are skipped. If the UE is in CM-IDLE state and the N1 SM message received, the AMF sends a delivery reject in step 8014; steps 8008 to 8012 and 8016 are skipped.

The UE and the 5GC will get synchronized about the status (released) of the PDU session at the next Service Request or Registration procedure.

If the UE is in CM-CONNECTED state, then the AMF transfers the message received from the SMF in step 3 (N2 SM PDU Session Release request, N1 SM PDU Session Release request) message to the (R)AN.

8010: If the (R)AN receives an N2 SM PDU Session Release request to release the AN resources associated with the PDU session it issues AN specific signalling exchange(s) with the UE to release the corresponding AN resources. In case of a 3GPP RAN, an RRC Connection Reconfiguration may take place with the UE releasing the RAN resources related to the PDU session. During this procedure, the (R)AN sends any NAS message (N1 SM PDU Session Release Request) received from the AMF in step 8008.

If the (R)AN receives only N1 SM Container (PDU Session Release request), the (R)AN forwards this messages to the UE. The UE acknowledges the PDU Session Release Request by sending a PDU Session Release Ack message via N1 SM signalling sent over the (R)AN.

8012: [Conditional] If the (R)AN had received an N2 SM request to release the AN resources, the (R)AN acknowledges the N2 SM PDU Session Release Request by sending an N2 SM PDU Session Release Ack (N1 SM Information (PDU Session Release Ack), User Location Information) Message to the AMF. Otherwise, the (R)AN just forwards the N1 SM Information (PDU Session Release Ack) from the UE to the AMF.

8014: If the UE is in CM-CONNECTED state, the AMF sends N11 Response message (an N2 SM PDU Session Release Ack) to forward the message received from (R)AN in step 6 to the SMF. If the UE is in CM-IDLE state and the AMF received N11 PDU Session Release notification in step 3, the AMF sends to the SMF an N11 Response message (PDU Session Release acknowledgment, PDU Session ID). If the UE is in CM-IDLE state and the AMF received N1 SM message in step 3, the AMF sends a delivery reject message to the SMF indicating CM-IDLE state of the UE. The AMF and SMF may remove all contexts (including the PDU session ID) associated with the PDU session.

8016: If the PDU session is activated, the SMF sends N11 PDU Session Release notification to the AMF. The AMF and SMF may remove all contexts (including the PDU session ID) associated with the PDU session. In some embodiments, this may take the form of a Nsmf_PDU Session Event Report Notification (AMF): The SMF sends (N11 Message) PDU Session Event Report Notification as defined in Clause 5.2.8.1 to the AMF; the event trigger is PDU session release.

8018: If Dynamic PCC applied to this session the SMF initiates the PDU-CAN session termination procedure. SMF notifies any entity that has subscribed to User Location Information related with PDU session change. If it is the last PDU session it is handling for the UE the SMF releases the association with the UDM. The order with which SMF releases the resources is implementation dependant. If PDU session is deactivated, step 8018 can be performed in parallel, before or after step 8006.

Alternative Embodiments B

In further alternative embodiments, steps 8006 through 8018 may operate as follows:

Step 8006: The SMF sends to the AMF N2 SM PDU Session Release request, N1 SM PDU Session Release request, N11 PDU Session Release notification. The N1 SM PDU Session Release request includes PDU Session ID, Cause. The Cause may indicate a trigger to establish a new PDU session with the same characteristics (e.g. when procedures related with SSC mode 2 are invoked). SSC mode 2 is defined in TS 23.501[2] clause 5.6.9.

The N2 SM PDU Session Release request is to release the (R)AN resources associated with the PDU session (N2 Resource Release request (PDU Session ID)). The N11 PDU Session Release notification includes PDU Session ID for the AMF to delete PDU session context. If the UP of PDU session is activated, the SMF sends N1 SM PDU Session Release request and N2 SM PDU Session Release request. If the UE is unreachable, the SMF sends N11 PDU Session Release notification. If the UP of PDU session is deactivated, the SMF sends the N1 SM PDU Session Release request.

In some embodiments, this may take the form a Namf_Message Transfer (SMF): The SMF requests Namf_Message Transfer service of the AMF defined in Clause 5.2.2.4 to sends N1 SM and N2 SM messages to the UE and (R)AN.

Step 8008: If the UE is in CM-IDLE state and N1 SM message is received, the AMF drops the N1 SM message and acknowledges the step 8006 in step 8014; and steps 8008 to 8012 are skipped. The UE and the 5GC will get synchronized about the status (released) of the PDU session at the next Service Request or Registration procedure.

If the UE is in CM-CONNECTED state, then the AMF transfers the message received from the SMF in step 3 (N2 SM PDU Session Release request, N1 SM PDU Session Release request) message to the (R)AN.

Step 8010: When the (R)AN has received an N2 SM PDU Session Release request to release the AN resources associated with the PDU session it issues AN specific signalling exchange(s) with the UE to release the corresponding AN resources. In case of a 3GPP RAN, an RRC Connection Reconfiguration may take place with the UE releasing the RAN resources related to the PDU session. During the this procedure, the (R)AN sends any NAS message (N1 SM PDU Session Releaserequest) received from the AMF in step 8008.

If the (R)AN only receives N1 SM Container (PDU Session Release request), the (R)AN forwards this message to the UE. The UE acknowledges the PDU Session Release requestby sending a PDU Session Release Ack message via N1 SM signalling sent over the (R)AN.

Step 8012: [Conditional] If the (R)AN had received an N2 SM request to release the AN resources, the (R)AN acknowledges the N2 SM PDU Session Release Request by sending an N2 SM PDU SessionRelease Ack (N1 SM Information (PDU Session Release Ack), User Location Information) Message to the AMF. Otherwise, the (R)AN just forwards the N1 SM Information (PDU Session Release Ack) from the UE to the AMF.

Step 8014: If the UE is in CM-CONNECTED state, the AMF sends N11 Response message (an N2 SM PDU SessionRelease Ack) to forward the message received from (R)AN in step 6 to the SMF.

If the AMF received N11 PDU Session Release notification in step 8006, the AMF sends to the SMF an N11 Response message (PDU Session Release acknowledgment, PDU Session ID), and step 8016 is skipped. The AMF and SMF may remove all contexts (including the PDU session ID) associated with the PDU session.

If the SBA message is used, the N11 Response message (PDU Session Release acknowledgment, PDU Session ID) may be not required.

If the UE is in CM-IDLE state and the AMF received N1 SM message in step 8006, the AMF sends a delivery reject message to the SMF with a cause code indicating CM-IDLE state of the UE. This is particularly applicable to cases in which the process is started via either of steps 8002*b* or 8002*c*.

Step 8016: The SMF sends N11 PDU Session Release notification to the AMF. The AMF and SMF may remove all contexts (including the PDU session ID) associated with the PDU session. In some embodiments, this may take the form of a Nsmf_PDU Session Event Report Notification (AMF): The SMF sends (N11 Message) PDU Session Event Report Notification as defined in Clause 5.2.8.1 to the AMF; the event trigger is PDU session release.

Step 8018: If Dynamic PCC applied to this session the SMF initiates the PDU-CAN session termination procedure. SMF notifies any entity that has subscribed to User Location Information related with PDU session change. If it is the last PDU session it is handling for the UE, the SMF releases the association with the UDM. The order with which SMF releases the resources is implementation dependant. If PDU session is deactivated and the SMF knows the CM state, step 8018 can be performed in parallel, before or after step 8006.

Alternative Embodiment C

In further alternative embodiments, steps 8006 through 8018 may operate as follows:

Step 8006: The SMF sends to the AMF (N2 SM Resource Release request, N1 SM Information). The N1 SM Information includes PDU Session Release Command message (PDU Session ID, Cause. The Cause may indicate a trigger to establish a new PDU session with the same characteristics (e.g. when procedures related with SSC mode 2 are invoked). The SSC mode 2 is defined in TS 23.501, clause 5.6.9. The N2 SM Resource Release request (PDU Session ID) is to release the (R)AN resources associated with the PDU session.

If the UP of PDU session is activated, the SMF sends N1 SM PDU Session Release Command and N2 SM Resource Release request by invoking Namf_Communication_N1MessageTransfer and Namf_Communication_N2MessageTrigger service operations respectively.

If the UP of PDU session is deactivated, the SMF requests the UE to release the PDU session by invoking Namf_Communication_N1MessageTransfer (N1 SM message (PDU Session Release Command), Skip Indication). If the UE is in CM-IDLE state and the AMF receives N1 SM message with Skip Indication, the AMF drops the N1 SM message and notifies the SMF "Message Not Transferred with a cause code"; Steps 8008 to 8014 are skipped. The "Skip Indication" is optional and described in clause 5.2.2.2.7 of TS 23.502.

If the UE is unreachable, the SMF notifies the AMF that the PDU session is released by invoking the Nsmf_EventExposure_Notify(PDU Session Release indication, PDU Session ID). The AMF and SMF shall remove all contexts (including the PDU session ID) associated with the PDU session as well as any event subscriptions by the SMF on the AMF. Steps 8008 to 8016 are skipped.

If the procedure is triggered to relocate PDU session anchor of a PDU session with SSC mode 2, the SMF is assumed not to include the "Skip Indication".

The UE and the 5GC will get synchronized about the status (released) of the PDU session at the next Service Request or Registration procedure.

Step 8008: If the UE is in CM-IDLE state and "Skip Indication" is not received, the AMF initiates the network triggered Service Request procedure to transmit the N1 SM Information to the UE.

If the UE is in CM-CONNECTED state, then the AMF transfers the message received from the SMF in step 3 (N2 SM Resource Release request, N1 SM Information) message to the (R)AN.

Step 8010: When the (R)AN has received an N2 SM request to release the AN resources associated with the PDU session it issues AN specific signalling exchange(s) with the UE to release the corresponding AN resources.

In case of a 3GPP RAN, an RRC Connection Reconfiguration may take place with the UE releasing the RAN resources related to the PDU session.

During this procedure, the (R)AN sends any NAS message (N1 SM PDU Session Release Command) received from the AMF in step 8008.

The UE acknowledges the PDU Session Release Command by sending a PDU Session Release Ack message via N1 SM signalling sent over the (R)AN.

Step 8012. [Conditional] If the (R)AN had received an N2 SM request to release the AN resources, the (R)AN acknowledges the N2 SM Resource Release Request by sending an N2 SM Resource Release Ack (N1 SM Information (PDU Session Release Ack), User Location Information) Message to the AMF.

Otherwise, the (R)AN just forwards the N1 SM Information (PDU Session Release Ack) from the UE to the AMF.

Step 8014: The AMF invokes the Namf_Communication_N1MessageNotify(N1 SM Release Ack) as defined in clause 5.2.2.2.4 of TS 23.502 to the SMF. The AMF invokes the Namf_Communication_N2InfoNotify (N2 SM Resource Release Ack) as defined in clause 5.2.2.2.11 of TS 23.502 to the SMF.

Step 8016: The SMF notifies the AMF that the PDU session is released by invoking the Nsmf_EventExposure_Notify service operation as defined in clause 5.2.8.3.2 of TS 23.502. The AMF and SMF shall remove all contexts (including the PDU session ID) associated with the PDU session as well as any event subscriptions by the SMF on the AMF.

Step 8018: If Dynamic PCC applied to this session the SMF initiates the PDU-CAN session termination procedure. The SMF notifies any entity that has subscribed to User Location Information related with PDU session change. If it is the last PDU session it is handling for the UE the SMF releases the association with the UDM. The order with which SMF releases the resources is implementation dependant. If PDU session is deactivated and the SMF knows the CM state, step 9 can be performed in parallel, before or after step 3.

In the alternative embodiment C, the Namf_Communication_N1MessageTransfer service operation is described as follows:

Service operation name: Namf_Communication_N1MessageTransfer.

Description: CN NF request to transfer downlink N1 message to the UE through the AMF.

Known NF Consumers: SMF, SMSF, PCF, NEF

Inputs, Required: CN NF ID, Message Container (s)

Inputs, Optional: One subscribe Indication on whether the transferring creates a temporary binding on the AMF for later notification of response message. "Skip Indication" indicates that the AMF shall skip sending the N1 SM container to the UE if the UE is in CM-IDLE state.

Outputs, Required: Result indication includes "Transferred" and "Not Transferred with cause".

Outputs, Optional: None.

See step 10 of clause 4.3.2.2.1, step 14 of clause 4.3.2.2.2 and step 5a of clause 4.13.3.6 for details of this service operation. If the AMF does not have a N1 context for the UE and if the UE is in CM-IDLE state, the AMF initiates the network triggered service request procedure as specified in clause 4.2.3.4. The AMF responds to the consumer NF, with a Namf_Communication_N1MessageTransfer response, providing a result indication of whether the AMF was able to successfully transfer the N1 message towards the UE.

In some embodiments, an explicit subscription (Namf_Communication_N1MessageSubscribe) for the N1 response message type may piggyback Namf_Communication_N1MessageTransfer service operation invocation.

Avoid Storing PDU Session State in AMF and Update Related Procedures

In some procedures of TS 23.502, such as UE Context release in the AN and Handover procedures, it is assumed that the AMF stores the PDU session state (activated or deactivated). However, this assumption violates the AMF and SMF separation principle. Alternative solutions that do not require the knowledge of PDU session state at the AMF are described below.

Clause 5.2.2.3 of TS 23.502 defines that the AMF provides and "Event Exposure" service. Accordingly, the SMF may subscribe to this service if the SMF serves at least one PDU session of a specific RAT. The SMF can subscribe to this service even if all of PDU sessions it serves are deactivated. Regarding UE Context Release in the AN procedure, the SMF can subscribe to "Event Exposure" triggered by CM state change from CONNECTED to IDLE state when the UE request session establishment or session activation. Then the AMF just needs to notifies the SMF about CM state transitioning to CM-IDLE, to the subscribed SMF. It is up to SMF to decide suitable actions.

The SMF may subscribe to "Namf_EventExposure" service of the AMF in Session Establishment and Service Request procedures.

The SMF may subscribed to "Namf_Communication_N2InfoSubscribe" service of the AMF as defined in clause 5.2.2.2.9 of TS 23.502 in order to get notified about the N2 UE Context Release Request from the (R)AN to AMF. The SMF performs "Namf_Communication_N2InfoSubscribe" service operation in the Session Establishment and Service Request procedures.

In the Service Request procedures in TS 23.502, the AMF may reject the service activation request. It is also possible that the (R)AN may not have resources to serve the PDU session, in which case the (R)AN may also reject the PDU session establishment request. In order to implement this functionality, the procedures defined in TS 23.502 may be revised as follows:

Clause 4.3.2.2.1 Non-Roaming and Roaming with Local Breakout

Step 16. SMF to AMF: SM response (Cause).

After this step, the AMF forwards relevant events to the SMF, for example at handover where the (R)AN Tunnel Info changes or the AMF is relocated.

The SMF may subscribe to Namf EventExposure service of the AMF (UE ID, event filter) as defined in clause 5.2.2.3. The event filter is "CM state change to CM-IDLE".

The SMF may subscribe to N2 messages of type SM and "N2 UE Context Release Request" using the Namf_Communication_N2InfoSubscribe service operation of the AMF as defined in clause 5.2.2.2.9.

Clause 4.3.2.2.2 Home-routed Roaming

Step 20. This step is the same as step 16 in clause 4.3.2.2.1. with the following differences:

The SMF is a V-SMF

Clause 4.2.6 UE Context Release in the AN

This procedure is used to release the logical N2-AP signalling connection and the associated N3 User Plane connections.

When the N2-AP signalling connection is lost due to (R)AN or AMF failure, the UE context release in the AN procedure is performed locally by the AMF or the (R)AN as described in the procedure flow below without using or relying on any of the signalling shown between (R)AN and AMF. The UE context release in the AN causes all PDU sessions of the UE to be deactivated.

The initiation of UE context release in the AN procedure may be due to:

(R)AN-initiated with cause e.g. O&M Intervention, Unspecified Failure, AN (e.g. Radio)

Link Failure, User Inactivity, Release due to UE generated signalling connection release, etc; or AMF-initiated with cause e.g. Unspecified Failure, etc.

Figure 81:
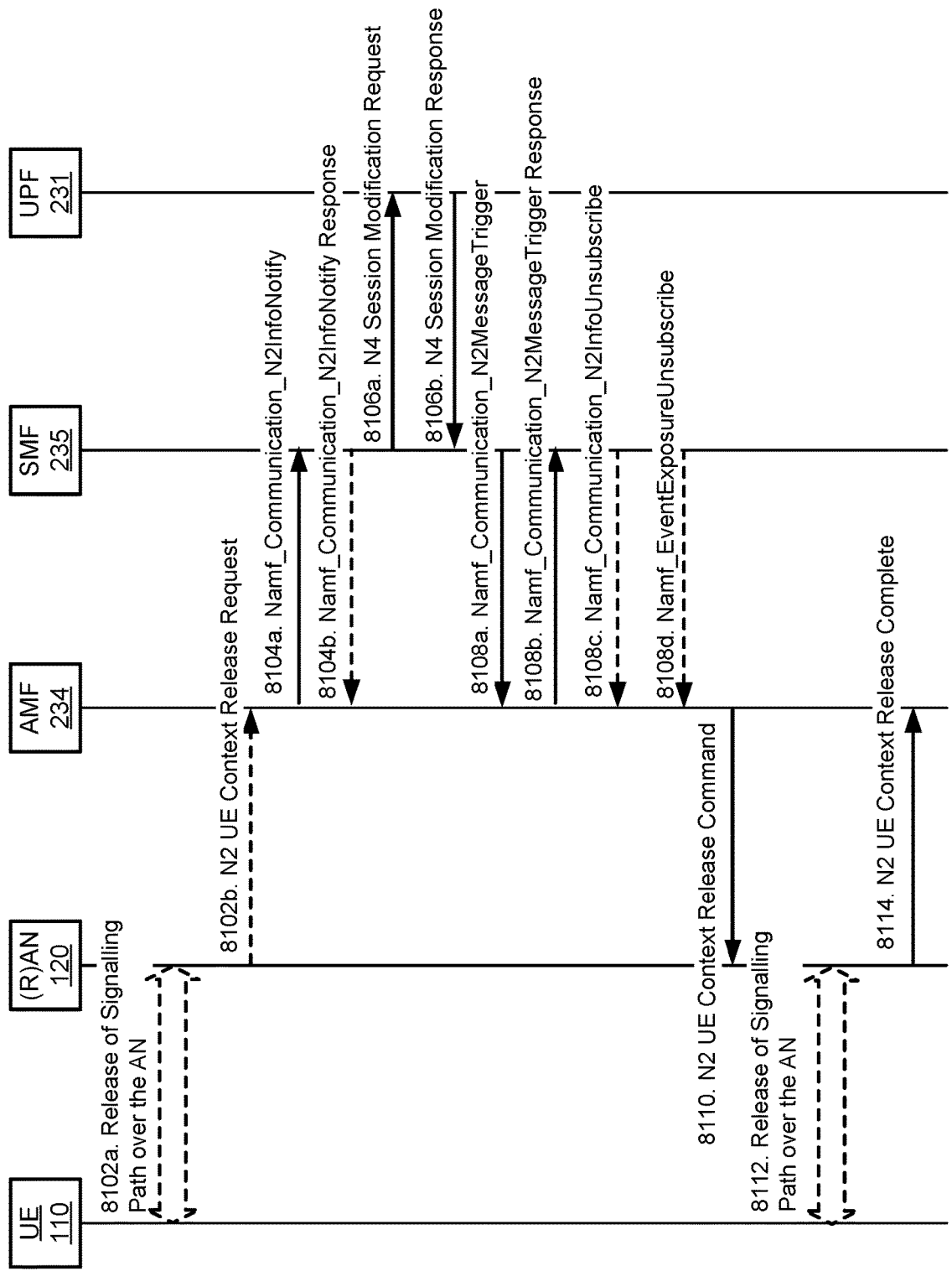
FIG. 81 is a message flow diagram illustrating an example procedure for UE context release in the AN, in accordance with embodiments of the present invention.

Both (R)AN-initiated and AMF-initiated UE context release in the AN procedures are shown in FIG. 81. Referring to the figure:

Step 8102: If there is some confirmed AN conditions (e.g. Radio Link Failure) or for other (R)AN internal reason, the (R)AN may decide to initiate the UE context release in the AN. In this case, the (R)AN sends a N2 UE Context Release Request (Cause) message to the AMF. Cause indicates the reason for the release (e.g. AN Link Failure, O&M intervention, unspecified failure, etc.). The decision to initiate a UE context release in the AN Procedure may also be triggered by an internal AMF event Step 8104: [Conditional] For each of the SMF serving PDU sessions that subscribed to Namf_EventExposure_Subscribe, the AMF performs Namf_EventExposure_Notify as described in clause 5.2.2.3.4. In some embodiments, the (R)AN information may be used in cases in which the UE has multiple connections. Alternatively, the mobility event container may contain a list of PDU Session ID(s).

Alternative Embodiment of Step 8104:

Step 8104*a*: [Conditional] For each of the SMF serving PDU sessions that subscribed to Namf_Communication_N2InfoSubscribe for N2 Information Type "N2 UE Context Release Request" the AMF performs Namf_Communication_N2InfoNotify service operation as described in clause 5.2.2.2.11 to notify PDU session Id, Release Cause (N2 UE Context Release Request).

The AMF may send (R)AN information to the SMF in case the UE has multiple connections. Alternatively, the AMF may send the list of PDU Session ID(s).

Step 8104*b*: [Conditional] The SMF sends to the AMF a response to the message received in Step 8104*a*.

Step 8106*a*: [Conditional] SMF to UPF: N4 Session Modification Request (AN tunnel info to be removed, Buffering on/off). The SMF initiates a N4 Session Modification procedure indicating the need to remove AN Tunnel Info. Buffering on/off indicates whether the UPF may buffer incoming DL PDU or not. See clause 4.4 for more details.

Step 8106*b*: [Conditional] UPF to SMF: N4 Session Modification Response acknowledging the SMF request. See clause 4.4 for more details.

Step 8108*a*: the SMF sends N2 Context Release Command to the AMF via Namf_Communication_N2MessageTrigger service operation as defined in clause 5.2.2.2.8 of TS 23.502.

Step 8108*b*: The AMF sends a response message for Step 8108*a*.

Step 8108*c*. The SMF may perform Namf_Communication_N2InfoUnsubscribe for specific N2 Information Type, such as N2 UE Context Release Request, as defined in clause 5.2.2.2.10 of TS 23.502.

Step 8108*d*: [Conditional] The SMF may perform Namf_EventExposureUnSubscribe procedure for some types of UE mobility events as defined in clause 5.2.2.3.3 of TS 23.502.

Step 8110: After the AMF collects all the N2 Context Release Command in step 4 from the SMF(s) that were notified in Step 2, the AMF sends to the (R)AN a N2 UE Context Release Request. In case the AN is a RAN this step is described in detail in RAN specifications. In case the AN is a N3IWF this step is described in clause 4.12.

This step may be performed before, in parallel with, or after step 8104, as desired.

Step 8112: If the AN connection (e.g. RRC connection) with the UE is not already released (step 8102), the (R)AN requests the UE to release the AN connection. Upon receiving AN connection release confirmation from the UE, the (R)AN deletes the UE's context.

Step 8114: The (R)AN confirms the N2 Release by returning an N2 UE Context Release Complete ( ) message to the AMF. With this, the signalling connection between the AMF and the (R)AN for that UE is released.

During the procedure of FIG. 81, the AN may provide location information to the AMF.

Clause 4.2.3.2 UE Triggered Service Request in CM-IDLE State

Figure 82A:
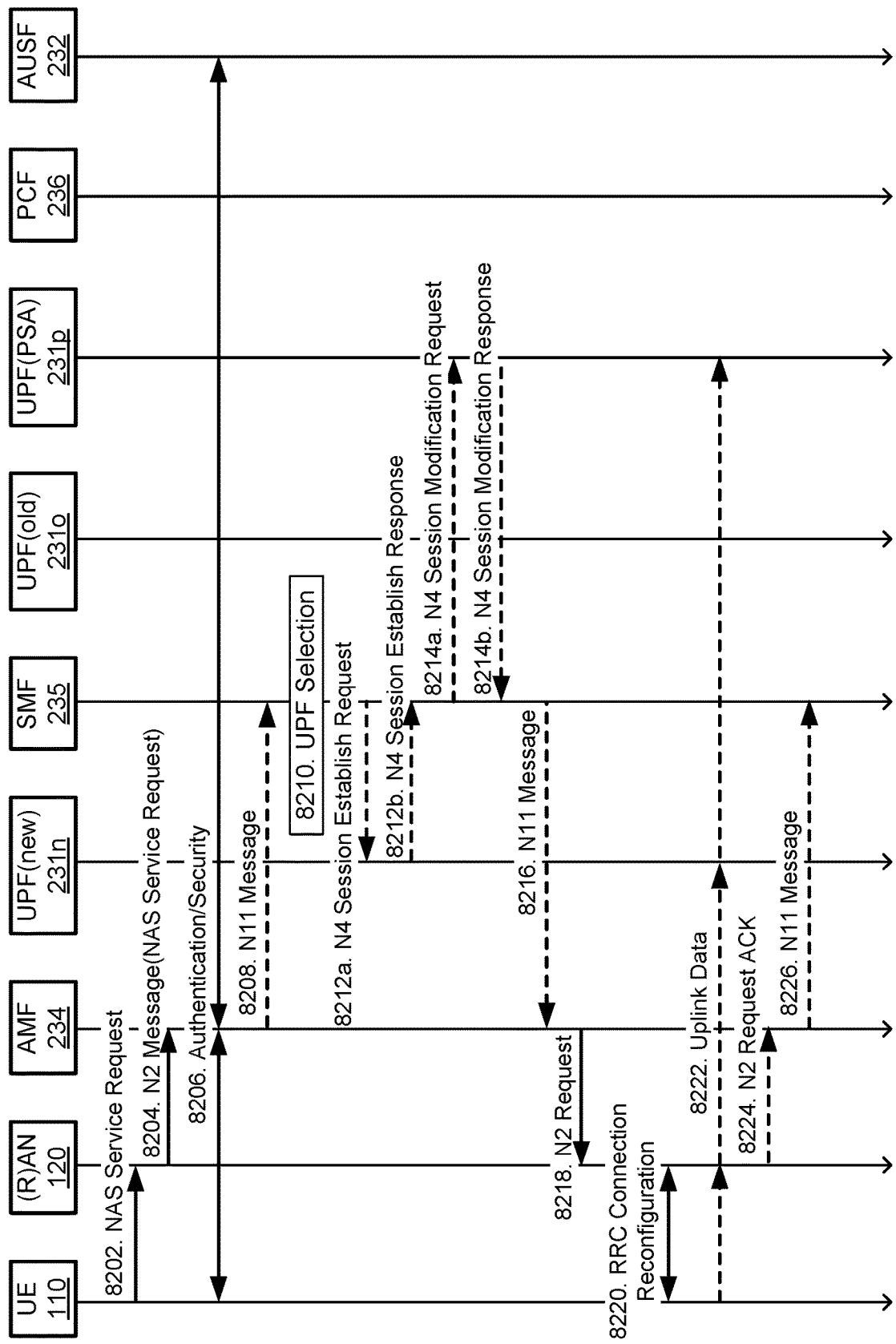
FIGS. 82A and 82B are a message flow diagram illustrating an example UE triggered Service Request procedure, in accordance with embodiments of the present invention.
Figure 82B:
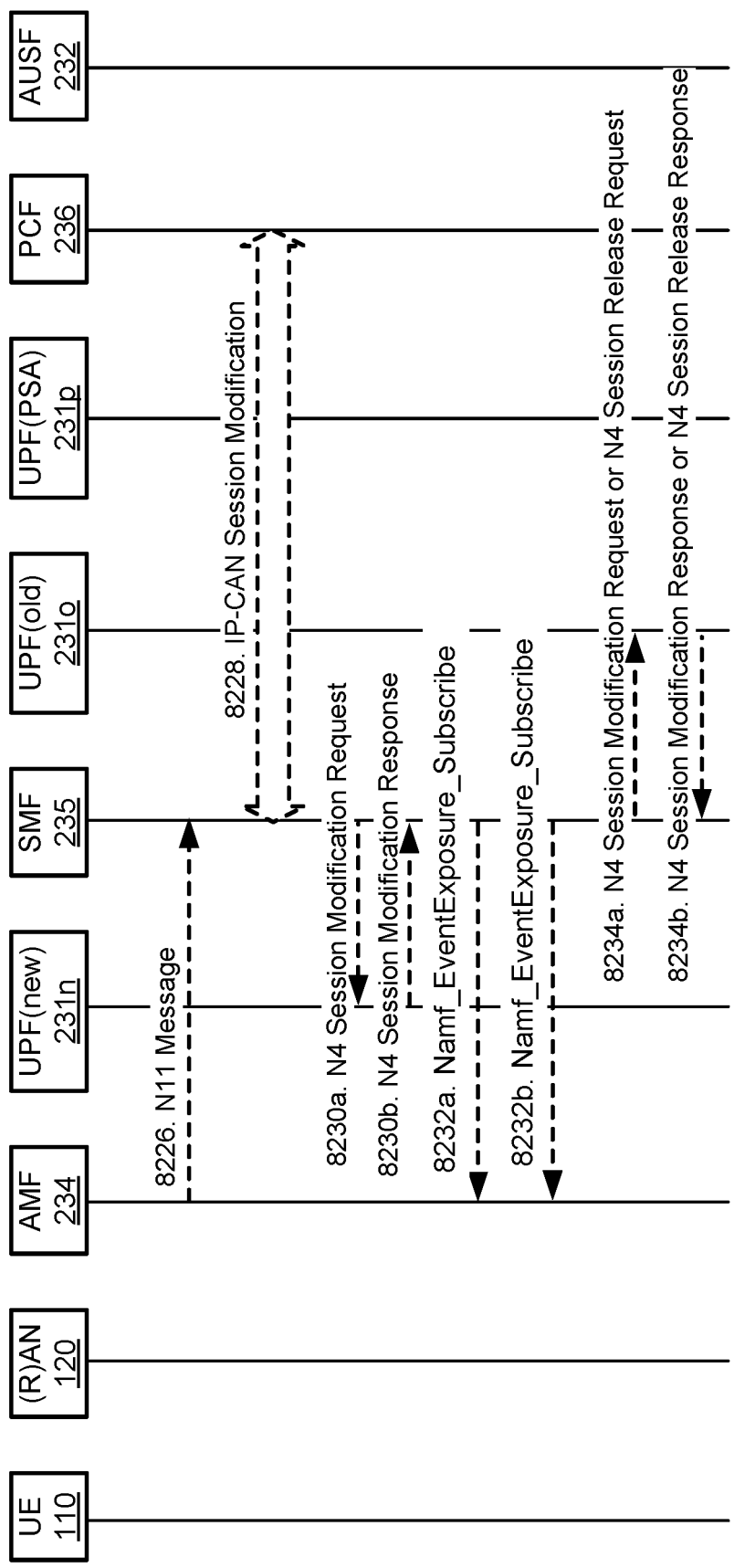

FIGS. 82A and 82B illustrate an example procedure for UE triggered Service Request in CM-IDLE state. This example procedure also includes aspects required to support network slicing.

The Service Request procedure may be used by a 5G UE in CM-IDLE state to request the establishment of a secure connection to an AMF. The UE in CM-IDLE state initiates the Service Request procedure in order to send uplink signalling messages, user data, or response to a network paging request. After receiving the Service Request message, the AMF may perform authentication, and the AMF may perform the security procedure. After the establishment of a secure signalling connection to an AMF, the UE or network may send signalling messages, e.g. PDU session establishment from UE to the network, or the SMF, via the AMF, may start the User Plane resource establishment for the PDU sessions requested by network and/or indicated in the Service Request message.

For any Service Request, the AMF may respond with a Service Response message to synchronize PDU session status between UE and network. The AMF may also respond with Service Reject message to UE, if the Service Request cannot be accepted by network. For Service Request due to user data, the network may take further actions if User Plane resource establishment is not successful.

The procedure in this clause 4.2.3.2 is applicable to the scenarios with or without intermediate UPF, and with or without intermediate UPF reselection.

The procedure defined in clause 4.2.3.2 of TS 23.502 is not applicable for an access network (once the UE is registered in the network) in which the UE is always considered as in CM-CONNECTED state and in which the User Plane resource is always considered established for an active PDU session.

Referring to FIGS. 82A and 82B:

Step 8202: UE to (R)AN: MM NAS Service Request (PDU session ID(s), security parameters, PDU session status). The UE sends NAS message Service Request towards the AMF encapsulated in an RRC message to the RAN. The RRC message(s) that can be used to carry the 5G Temporary ID and this NAS message are described in RAN specifications. If the Service Request is triggered for user data, the UE includes the PDU session ID(s) in NAS Service Request message to indicate the PDU session(s) that the UE needs to use. If the Service Request is triggered for signalling only, the UE doesn't include any PDU session ID. When this procedure is triggered for paging response, if the UE needs to use some PDU session(s), the UE includes the PDU session ID(s) in MM NAS Service Request message to indicate the PDU session(s) that the UE needs to use. Otherwise the UE will not include any PDU session ID. The PDU session status indicates the PDU sessions available in the UE. In some embodiments, the NAS Service Request may also include an indication of user data, signalling or paging response.

Step 8204: (R)AN to AMF: N2 Message (MM NAS Service Request, 5G Temporary ID, Location information, RAT type, RRC establishment cause). Details of this step are described in RAN specifications. If the AMF can't handle the Service Request it will reject it. 5G Temporary ID is obtained in RRC procedure. RAN selects the AMF according to Temporary ID. The Location Information and RAT type relates to the cell in which the UE is camping. Based on the PDU session status, the AMF may initiate PDU session release procedure if the PDU session is not available in the UE.

Step 8206: If the Service Request was not sent integrity protected or integrity protection is indicated as failed, the AMF may initiate NAS authentication/security procedure as defined in clause 4.6. If the UE triggered the Service Request to establish a signalling connection only, after the security exchange the UE and the network can send signalling and steps 8208 and 8214 to 8224 are skipped.

Step 8208: [Conditional] AMF to SMF: N11 Message (PDU session ID(s), Cause(s), UE location information). The N11 message is sent in one or more of the following scenarios:

If the MM NAS Service Request message includes PDU session ID(s), or this procedure is triggered by SMF but PDU session IDs from UE correlates to other SMFs than the one triggering the procedure, the AMF sends N11 message to SMF(s) associated with the PDU session ID(s) with Cause set to indicate "establishment of user plane resources" for a PDU session.

If the UE was in MICO mode and the AMF had notified an SMF of the UE being unreachable and that SMF needs not send DL data notifications to the AMF, the AMF informs the SMF that the UE is reachable.

The AMF may also notify any other NF that subscribed to UE reachability that the UE is reachable.

Step 8210: Based on the new location info, the SMF checks the UPF Selection Criteria according to clause 6.3.3 of TS 23.501 [2], and determines to perform one of the following:

continue using the current UPF(s);

select a new intermediate UPF, if the UE has moved out of the service area of UPF that is connecting to RAN, while maintaining the UPF(s) acting as PDU Session Anchor; or trigger re-establishment of the PDU Session to perform relocation of the UPF acting as PDU Session anchor.

Step 8212a: [Conditional] SMF to new UPF: N4 Session Establishment Request. If the SMF selects a new UPF to act as intermediate UPF for the PDU session, an N4 Session Establishment Request message is sent to the new UPF, providing Packet detection, enforcement and reporting rules to be installed on the intermediate UPF. The PDU session anchor info for this PDU Session is also provided to the intermediate UPF.

Step 8212b: New UPF (intermediate) to SMF: N4 Session Establishment Response. The new intermediate UPF sends an N4 Session Establishment Response message to the SMF. In case the UPF allocates CN tunnel info, it provides CN DL tunnel info and UL tunnel info (i.e. CN N3 tunnel info) to the SMF. The SMF starts a timer, to be used in step 17a to release the resource in old intermediate UPF if there is one.

Step 8214a: [Conditional] SMF to UPF (PSA): N4 Session Modification Request. If the SMF selects a new UPF to act as intermediate UPF for the PDU session, the SMF sends N4 Session Modification Request message to PDU session anchor UPF, UPF (PSA), providing the DL tunnel information from new intermediate UPF.

Step 8214b: UPF (PSA) to SMF: N4 Session Modification Response. The UPF (PSA) sends N4 Session Modification Response message to SMF.

Step 8216: [Conditional] SMF to AMF: N11 Message (N1 SM information (PDU session ID, PDU Session re-establishment indication), N2 SM information (PDU Session ID, QoS profile, CN N3 Tunnel Info, S-NSSAI)) to the ANT. Upon reception of the N11 Message in 4 with cause including "establishment of user plane resources", the SMF determines whether UPF reallocation is performed, based on the UE location information, UPF service area and operator policies:

For PDU session that SMF determines to be served by the current PDU Session Anchor UPF in step 8210, the SMF generates only N2 SM information and sends N11 Message to the AMF to establish the User Plane(s). The N2 SM information contains information that the AMF may provide to the RAN.

For PDU sessions that SMF determines that UPF reallocation for PDU Session Anchor UPF is needed in step 8210, SMF may send N11 Message containing only N1 SM information to UE via AMF. The N1 SM information includes the corresponding PDU session ID and PDU Session re-establishment indication, which is the same as step 2 described in clause 4.3.5.1.1 of TS 23.501[2].

Upon reception of the N11 Message in step 8208 with an indication that the UE is reachable, if the SMF has pending DL data the SMF sends N11 Message to the AMF to establish the User Plane(s) for the PDU sessions, otherwise the SMF resumes sending DL data notifications to the AMF in case of DL data.

Step 8218: AMF to (R)AN: N2 Request (N2 SM information received from SMF, security context, AMF Signalling Connection ID, Handover Restriction List, MM NAS Service Accept). RAN stores the Security Context, AMF Signalling Connection Id, QoS Information for the QoS Flows of the PDU Sessions that are activated and N3 Tunnel IDs in the UE RAN context. The step is described in detail in RAN specifications. Handover Restriction List is described in TS 23.501 [2] clause 5.3.4.1 "Mobility Restrictions". MM NAS Service Accept includes PDU session status in AMF. If N1 SM information is received from step 8, the Service Accept message also includes N1 SM information. AMF may include at least one N2 SM information from SMF if the procedure is triggered for PDU session User Plane setup. AMF may send additional N2 SM information from SMFs in separate N2 message(s) (e.g. N2 tunnel setup request), if there is any. Alternatively, if multiple SMFs are involved, the AMF may send one N2 Request message to (R)AN after all the N11 messages from SMFs are received. In such case, the N2 Request message includes the N2 SM information received in each of the N11 messages and information to enable AMF to associate responses to relevant SMF.

Step 8220: (R)AN to UE: The RAN performs RRC Connection Reconfiguration with the UE depending on the QoS Information for all the QoS Flows of the PDU Sessions activated and Data Radio Bearers. The User Plane security is established at this step, which is described in detail in RAN specifications. The RAN forwards the MM NAS Service Accept to the UE. The UE locally deletes context of PDU sessions that are not available in 5G CN. If the N1 message is present in the Service Accept and indicates that the any PDU session needs to be re-established, the UE initiates PDU session re-establishment after Service Request procedure is complete. That is, for SSC mode 2, step 3 and step 4 is defined in clause 4.3.5.1.1 is performed. For SSC mode 3, step 3 and 4 defined in clause 4.3.5.2 is performed.

Step 8222: After the User Plane radio resources are setup, the uplink data from the UE can now be forwarded to RAN. The 5G RAN sends the uplink data to the UPF address and Tunnel ID provided in the step 4.

Step 8224: [Conditional] (R)AN to AMF: N2 Request Ack (N2 SM information (RAN Tunnel info, List of accepted QoS Flows for the PDU Sessions activated, List of rejected QoS Flows for the PDU Sessions activated). This step is described in detail in RAN specifications. The message may include N2 SM information(s), e.g. RAN tunnel information. RAN may respond N2 SM information with separate N2 message (e.g. N2 tunnel setup response) if AMF sends separate N2 message in step 8210. If multiple N2 SM information are included in the N2 Request message in step 8210, the N2 Request Ack includes multiple N2 SM information and information to enable the AMF to associate the responses to relevant SMF.

Step 8226: [Conditional] AMF to SMF: N11 Message (N2 SM information (RAN Tunnel info), RAT Type) per accepted PDU Session to the SMF. If the AMF received N2 SM information (one or multiple) in step 8, then the AMF may forward the N2 SM information to the relevant SMF. If the UE Time Zone has changed compared to the last reported UE Time Zone then the AMF may include the UE Time Zone IE in this message.

Step 8228: [Optional] SMF to PCF: If dynamic PCC is deployed, SMF may initiate IP-CAN Session Modification and provides new location information to the PCF. Step 8230*a*: [Conditional] SMF to new intermediate UPF: N4 Session Modification Request (RAN tunnel info). If the SMF selected a new UPF to act as intermediate UPF for the PDU session in step 5, SMF initiates a N4 Session Modification procedure and provides RAN Tunnel Info.

Step 8230*b*: [Conditional] UPF to SMF: N4 Session Update Response.

Step 8232*a*: [Conditional] The SMF may perform Namf_Communication_N2InfoSubscribe service operation as defined in clause 5.2.2.2.9 for N2 Information Type "N2 UE Context Release Request".

Step 8232*b*: [Conditional] The SMF may perform Namf_EventExpose_Subscribe procedure as defined in clause 5.2.2.3.2 for certain UE mobility events. If desired, this step may be performed together with step 8216.

Step 8234*a*: [Conditional] SMF to old intermediate UPF: N4 Session Modification Request or N4 Session Release Request. If the SMF decided to continue using the old intermediate UPF in step 5, the SMF sends an N4 Session Modification Request, providing (R)AN tunnel information. If the SMF decided to select a new UPF to act as intermediate UPF, the SMF initiates resource release, after timer in step 8212*b* expires, by sending an N4 Session Release Request (Release Cause) to the old intermediate UPF. If there is no intermediate UPF, the SMF sends an N4 Session Modification Request to the PSA UPF, providing (R)AN tunnel information.

Step 8234*b*: Old intermediate UPF to SMF: N4 Session Modification Response or N4 Session Release Response. The old UPF acknowledges with an N4 Session Modification Response or N4 Session Release Response message to confirm the modification or release of resources. If there is no intermediate UPF, the PSA UPF sends an N4 Session Modification Response to the SMF to confirm the modification of resources.

Clause 4.2.3.3 UE Triggered Service Request in CM-CONNECTED State

Figure 83A:
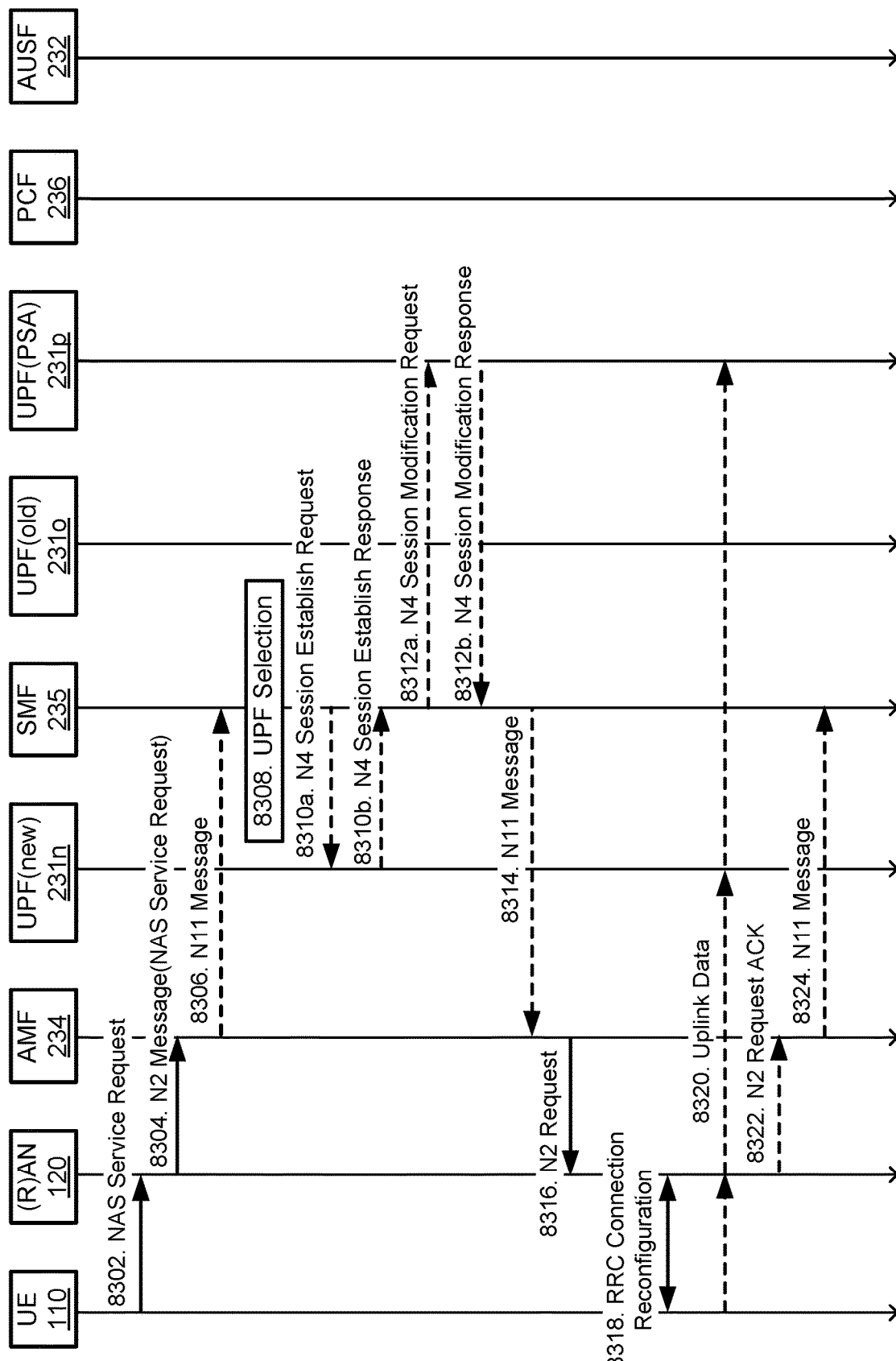
FIGS. 83A and 83B are a message flow diagram illustrating an example UE triggered Service Request procedure in CM-CONNECTED state, in accordance with embodiments of the present invention.
Figure 83B:
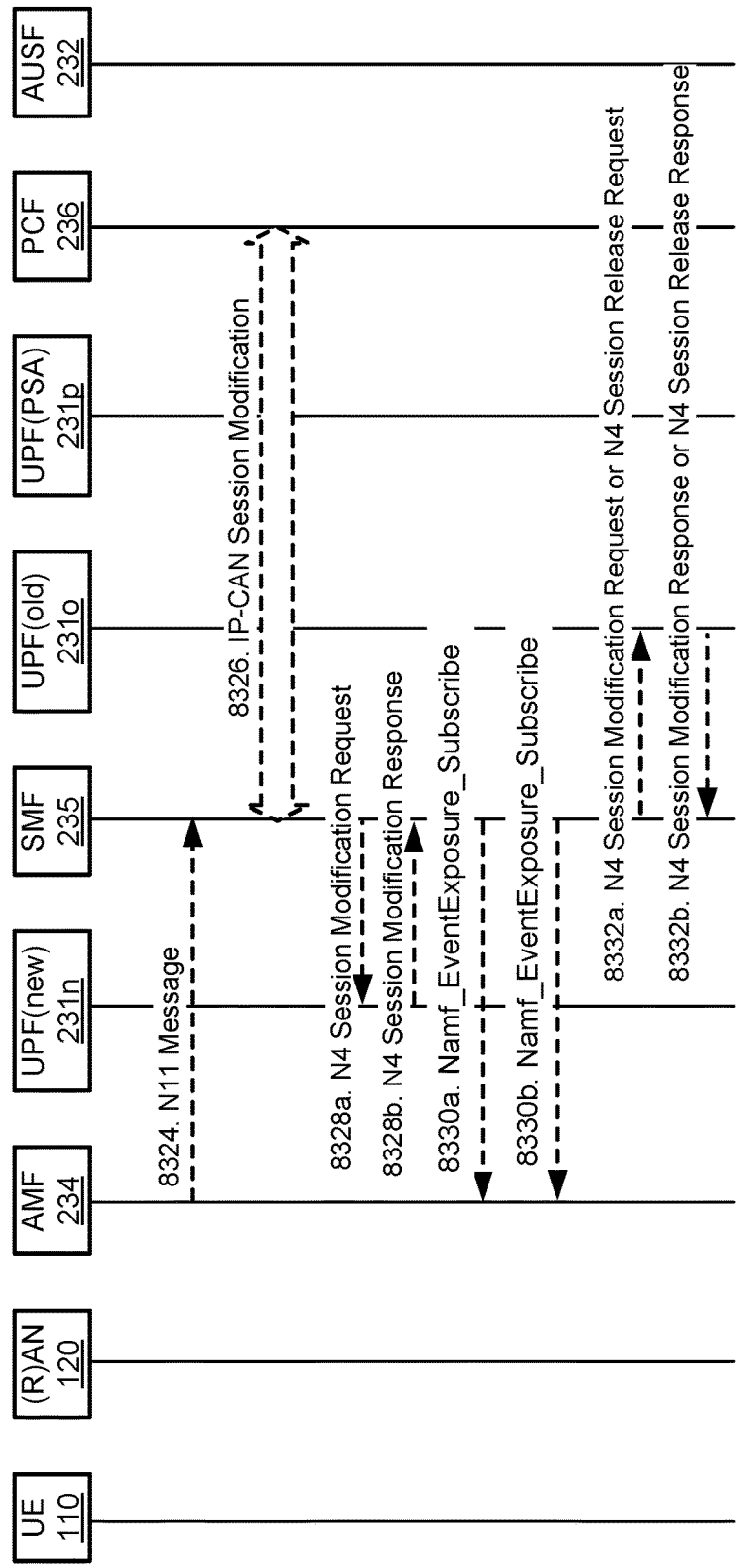

FIGS. 83A and 83B illustrate an example procedure for UE triggered Service Request in CM-IDLE state. This example procedure also includes aspects required to support network slicing.

The network may take further actions if User Plane resource establishment is not successful.

The procedure in this clause 4.2.3.3 is applicable to the scenarios with or without intermediate UPF, and with or without intermediate UPF reselection.

The procedure in this clause 4.2.3.3 TS 23.502 is not applicable for an access network (once the UE is registered in the network) in which the UE is always considered as in CM-CONNECTED state and in which the User Plane resource is always considered established for an active PDU session.

Referring to FIGS. 83A and 83B:

Step 8302: UE to (R)AN: MM NAS Service Request (PDU session ID(s)). The UE sends NAS message Service Request towards the AMF encapsulated in an RRC message to the RAN. The MM NAS Service Request message may be encrypted and integrity protected. The PDU session ID(s) in NAS message Service Request message indicates the PDU session that the UE selects to activate.

Step 8304: (R)AN to AMF: N2 Message (MM NAS Service Request). Details of this step are described in RAN specifications. If the Service Request cannot be handled by the AMF, the AMF reject it. The (R)AN forwards the MM NAS Service Request message to the AMF based on the existing N2 connection.

Step 8306: [Conditional] AMF to SMF: N11 Message (PDU session ID(s)). The AMF sends N11 message to SMF(s) associated with the PDU session ID(s).

Step 8308: Based on the new location info, the SMF checks the UPF Selection Criteria according to clause 6.3.3 of TS 23.501 [2]. If the UE has moved out of the service area of UPF that is connecting the UE to the RAN, the SMF may select a new intermediate UPF.

Step 8310*a*: [Conditional] SMF to new intermediate UPF: N4 Session Establishment Request, If the SMF selects a new intermediate UPF for the PDU session, an N4 Session Establishment Request message is sent to the new intermediate UPF, providing Packet detection, enforcement and reporting rules to be installed on the T-UPF. The PDU session anchor info for this PDU Session is also provided to the T-UPF.

Step 8310*b*: New UPF to SMF: N4 Session Establishment Response. The new UPF sends an N4 Session Establishment Response message to the SMF. If the UPF allocates CN tunnel info, the UPF provides CN DL tunnel info and UL tunnel info (i.e. CN N3 tunnel info) to the SMF. The SMF starts a timer, to be used in step 8417*a* to release the resource in old UPF if there is one.

Step 8312*a*: [Conditional] SMF to UPF (PSA): N4 Session Modification Request. If the SMF selects a new UPF to act as intermediate UPF for the PDU session, the SMF sends N4 Session Modification Request message to PDU session anchor UPF, UPF (PSA), providing the DL tunnel information for the new intermediate UPF.

Step 8312*b*: UPF (PSA) to SMF: N4 Session Modification Response. The UPF (PSA) sends N4 Session Modification Response message to SMF.

Step 8314: [Conditional]SMF to AMF: N11 Message (N2 SM information (PDU Session ID, QoS profile, CN N3 Tunnel Info, S-NSSAI)) to the AMF The SMF generates N2 SM information and sends N11 Message to the AMF to establish the User Plane(s) for the PDU sessions. The N2 SM information contains information that the AMF may provide to the RAN.

Step 8316: [Conditional]AMF to (R)AN: N2 Request (N2 SM information (QoS profile, CN N3 Tunnel Info) received from SMF, MM NAS Service Accept). If there are multiple PDU Sessions that involves multiple SMFs, AMF does not need wait for responses from all SMFs in step 8306*b*.

Step 8318: (R)AN to UE: The RAN performs RRC Connection Reconfiguration with the UE depending on the QoS Information for all the QoS Flows of the PDU Sessions and Data Radio Bearers activated. The RAN forwards the MM NAS Service Accept to the UE.

Step 8320: After the User Plane radio resources for the selected PDU session are setup, the uplink data from the UE can now be forwarded to RAN. The 5G RAN sends the uplink data to the UPF address and Tunnel ID provided in the step 8314.

Step 8322: [Conditional] (R)AN to AMF: N2 Request Ack (N2 SM information (RAN Tunnel info, List of accepted QoS Flows for the PDU Sessions activated, List of rejected QoS Flows for the PDU Sessions activated). This step is described in detail in RAN specifications. The message may include N2 SM information(s), e.g. RAN tunnel information. RAN may respond N2 SM information with separate N2 message (e.g. N2 tunnel setup response).

Step 8324: [Conditional] AMF to SMF: N11 Message (N2 SM information (RAN Tunnel info, List of accepted QoS Flows, List of rejected QoS Flows)) per accepted PDU Session to the SMF.

Step 8326: [Optional] SMF to PCF: If dynamic PCC is deployed, SMF may initiate IP-CAN Session Modification and provides new location information to the PCF.

Step 8328*a*: [Conditional] SMF to UPF: N4 Session Update Request (RAN tunnel info and List of accepted QoS Flows). If the SMF selects a new UPF to act as intermediate UPF for the PDU session in step 4, the SMF initiates a N4 Session Modification procedure and provides RAN Tunnel Info.

Step 8328*b*: [Conditional] UPF to SMF: N4 Session Update Response.

Step 8330*a*: [Conditional] The SMF performs Namf_Communication_N2InfoSubscribe service operation as defined in clause 5.2.2.2.9 for N2 Information Type "N2 UE Context Release Request".

Step 8330*b*: [Conditional] The SMF may perform Namf_EventExpose_Subscribe procedure as defined in clause 5.2.2.3.2 for certain UE mobility events. This step may be performed together with step 8314.

Step 8332*a*: [Conditional] SMF to old UPF (intermediate): N4 Session Modification Request or N4 Session Release Request. If the SMF decided to continue using the old intermediate UPF in step 4, the SMF sends an N4 Session Modification Request, providing (R)AN tunnel information. If the SMF decided to select a new UPF to act as intermediate UPF in Step 8308, the SMF initiates resource release, after timer in step 8312*b* expires, by sending an N4 Session Release Request (Release Cause) to old intermediate UPF. If there is no intermediate UPF, the SMF sends an N4 Session Modification Request to the PSA UPF, providing (R)AN tunnel information.

Step 8332*b*: Old UPF (intermediate) to SMF: N4 Session Modification Response or N4 Session Release Response. The old UPF (intermediate) acknowledges with an N4 Session Release Response message to confirm the modification or release of resources. If there is no intermediate UPF, the PSA UPF sends an N4 Session Modification Response to the SMF to confirm the modification of resources.

Based on the foregoing, it will be appreciated that aspects of the present invention provide any one or more of:

A method of releasing a packet data unit (PDU) session, the method comprising:
  determining to trigger a PDU session release;
  sending a N4 Session Release Request message to a User Plane Function (UPF);
  receiving a N4 Session Release Response message from the UPF;
  sending a N11 Request with PDU Session Release Command to an access and mobility function (AMF);
  receiving a N11 Response with PDU Session Release Acknowledgement from the AMF; and
  sending a N11 message to the AMF.

A handover method, the method comprising:
  receiving a N2 Path Switch Request from a Target Radio Access Network (T-RAN);
  sending a N11 Message to a Session Management Function (SMF);
  receiving N11 Message Acknowledgment from the SMF; and
  sending a N2 Path Switch Request Acknowledgment to the T-RAN.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

We claim:

1. A method of releasing a N2 connection associated with a user equipment (UE), the method comprising:
    receiving, by an access and mobility management function (AMF) from an access network (AN), a message including packet data unit (PDU) session identifiers (IDs) associated with PDU sessions of the UE;
    sending, by the AMF, a PDU session deactivation request to a session management function (SMF), the PDU session deactivation request being a request to deactivate a PDU session and including an identifier indicating the PDU session;
    sending, by the SMF, in response to the PDU session deactivation request, a PDU session deactivation response to the AMF;
    receiving, by the AMF from the SMF, the PDU session deactivation response associated with the PDU session deactivation request;
    indicating, by the AMF, to the AN to release a UE context of the UE after receiving the PDU session deactivation response;
    receiving, by the AMF from the AN, a confirmation of releasing the UE context; and
    releasing, by the AMF, the N2 connection associated with the UE.

2. The method of claim 1, wherein the message received by the AMF from the AN includes a cause code.

3. The method of claim 2, wherein the cause code indicates PDU session inactivity.

4. The method of claim 1, wherein the session deactivation request includes a notification of release of the N2 connection.

5. The method of claim 1, wherein the AMF indicates to the AN to release the UE context after receiving all the responses associated with the PDU session deactivation requests that the AMF has sent.

6. The method of claim 1, wherein the PDU session IDs have an active N3 user plane.

7. The method of claim 1,
    wherein sending the PDU session deactivation request to the SMF comprises:
        sending, by the AMF, multiple PDU session deactivation requests to one or more SMFs, each of the multiple PDU session deactivation requests including an identifier indicating corresponding PDU session ID; and
    wherein sending the PDU session deactivation response to the AMF comprises:
        sending, by each of the one or more SMFs to the AMF, one or more PDU session deactivation responses each of which is a response to a corresponding received one of the PDU session deactivation requests.

8. The method of claim 1, wherein the PDU session deactivation request includes a cause code.

9. A communication system comprising at least one processor and a memory storing instructions for execution by the at least one processor to implement an access and mobility management function (AMF) and a session management function (SMF), the AMF and the SMF being communicatively coupled through a network interface, wherein the AMF is configured to perform steps of:
    receiving, from an access network (AN), a message including packet data unit (PDU) session identifiers (IDs) associated with PDU sessions of a user equipment (UE);
    sending a PDU session deactivation request to the SMF via the network interface, the PDU deactivation request for deactivating a PDU session and including an identifier indicating the PDU session;
    receiving, from the SMF, a PDU session deactivation response associated with the PDU session deactivation request;
    indicating to the AN to release a UE context of the UE after receiving the PDU session deactivation response;
    receiving, from the AN, a confirmation of releasing the UE context; and
    releasing a N2 connection associated with the UE; the SMF is configured to implement steps of:
    receiving, from the AMF via the network interface, the PDU session deactivation request; and
    sending, to the AMF, in response to the PDU session deactivation request, the PDU session deactivation response associated with the PDU session deactivation request.

10. The communication system according to claim 9, wherein the message received by the AMF from the AN includes a cause code.

11. The communication system according to claim 10, wherein the cause code indicates PDU session inactivity.

12. The communication system according to claim 9, wherein the session deactivation request includes a notification of release of the N2 connection.

13. The communication system according to claim 9, wherein the AMF is further configured to:
    trigger indicating to the AN to release the UE context after receiving all the responses associated with the PDU session deactivation requests that the AMF has sent.

14. The communication system according to claim 9, wherein the PDU session IDs have an active N3 user plane.

15. The communication system according to claim 9, wherein sending the PDU session deactivation request to the SMF comprises: sending, by the AMF, multiple PDU session deactivation requests to one or more SMFs, each of the multiple PDU session deactivation requests including an identifier indicating a corresponding PDU session; and
    wherein sending the PDU session deactivation response to the AMF comprises:

sending, by each of the one or more SMFs to the AMF, one or more PDU session deactivation responses each of which is a response to a corresponding received one of the PDU session deactivation requests.

16. The communication system according to claim 9, wherein the PDU session deactivation request includes a cause code.

17. The method of claim 1, further comprising:
receiving, by the AN, the message including the PDU session identifiers;
releasing, by the AN, the UE context; and
sending, by the AN, the confirmation of releasing the UE context.

18. The communication system according to claim 9, wherein the AN is included in the communication system and configured to implement steps of:
receiving the message including the PDU session identifiers;
releasing the UE context; and
sending the confirmation of releasing the UE context.

* * * * *

UNITED STATES PATENT AND TRADEMARK OFFICE
CERTIFICATE OF CORRECTION

PATENT NO. : 10,728,952 B2
APPLICATION NO. : 15/862194
DATED : July 28, 2020
INVENTOR(S) : Ngoc Dung Dao, Hang Zhang and Xu Li It is certified that error appears in the above-identified patent and that said Letters Patent is hereby corrected as shown below:

In the Claims

Column 132, Lines 3-5, Claim 7 "multiple PDU session deactivation requests including an identifier indicating corresponding PDU session ID; and" should read --multiple PDU session deactivation requests including an identifier indicating a corresponding PDU session; and--

Column 131, Lines 59-62, cancel the text "5. The method of claim 1, wherein the AMF indicates to the AN to release the UE context after receiving all the responses associated with the PDU session deactivation requests that the AMF has sent."

Column 132, Lines 53-57, cancel the text "13. The communication system according to claim 9, wherein the AMF is further configured to: trigger indicating to the AN to release the UE context after receiving all the responses associated with the PDU session deactivation requests that the AMF has sent."

Column 133, Line 22, insert the following claims:

--19. The method of claim 7, wherein the AMF indicates to the AN to release the UE context after receiving all the responses associated with the PDU session deactivation requests that the AMF has sent.

20. The communication system according to claim 15, wherein the AMF is further configured to: trigger indicating to the AN to release the UE context after receiving all the responses associated with the PDU session deactivation requests that the AMF has sent.--

Signed and Sealed this
Twenty-third Day of May, 2023

Katherine Kelly Vidal
*Director of the United States Patent and Trademark Office*